US007187998B2

(12) United States Patent
Okamoto et al.

(10) Patent No.: US 7,187,998 B2
(45) Date of Patent: *Mar. 6, 2007

(54) ARTICLE HANDLING SYSTEM AND METHOD AND ARTICLE MANAGEMENT SYSTEM AND METHOD

(75) Inventors: Shusaku Okamoto, Osaka (JP); Osamu Yamada, Nara (JP); Tomonobu Naruoka, Kanagawa (JP); Yoshihiko Matsukawa, Nara (JP); Satoshi Sato, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/330,379

(22) Filed: Jan. 11, 2006

(65) Prior Publication Data

US 2006/0111811 A1   May 25, 2006

Related U.S. Application Data

(63) Continuation of application No. 11/293,771, filed on Dec. 2, 2005, which is a continuation of application No. PCT/JP04/08019, filed on Jun. 2, 2004.

(30) Foreign Application Priority Data

| Jun. 2, 2003 | (JP) | ............................. 2003-156205 |
| Jun. 3, 2003 | (JP) | ............................. 2003-158346 |

(51) Int. Cl.
*G06F 19/00* (2006.01)

(52) U.S. Cl. ...................... 700/245; 700/246; 700/250; 700/254; 700/260; 700/261; 700/262; 318/568.12; 901/1; 901/2; 702/188

(58) Field of Classification Search ................. 700/245
See application file for complete search history.

(56) References Cited

U.S. PATENT DOCUMENTS

| 5,156,513 A | 10/1992 | Galan et al. |
| 5,172,147 A * | 12/1992 | Rockhill ..................... 396/428 |

(Continued)

FOREIGN PATENT DOCUMENTS

| EP | 0 221 643 A2 | 5/1987 |

(Continued)

OTHER PUBLICATIONS

Martens et al., A Friend for Assisting Handicapped People, 2001, IEEE, p. 57-65.*

(Continued)

*Primary Examiner*—Thomas Black
*Assistant Examiner*—McDieunel Marc
(74) *Attorney, Agent, or Firm*—Harness, Dickey & Pierce, PLC

(57) ABSTRACT

A camera or other sensing unit senses the conditions of articles and mobile entities, including humans within a living space. An article management/operation server manages, within an article database, attribute information about the articles, including operators, according to the information from the sensing unit. The server receives a user's instruction, input through a console unit, and refers to the article database to convert this instruction into a control command, which is then transmitted to a life-support robot.

8 Claims, 72 Drawing Sheets

U.S. PATENT DOCUMENTS

| | | | |
|---|---|---|---|
| 5,323,470 A * | 6/1994 | Kara et al. | 382/103 |
| 5,413,454 A * | 5/1995 | Movsesian | 414/729 |
| 5,526,254 A | 6/1996 | Sato et al. | |
| 5,684,531 A * | 11/1997 | Li et al. | 348/139 |
| 6,246,931 B1 | 6/2001 | Shinogi | |
| 6,511,442 B1 * | 1/2003 | Lathan et al. | 600/595 |
| 6,592,315 B2 * | 7/2003 | Osborne, Jr. | 414/9 |
| 6,917,854 B2 * | 7/2005 | Bayer | 700/245 |
| 2002/0064438 A1 * | 5/2002 | Osborne | 414/9 |
| 2002/0064444 A1 * | 5/2002 | Wunderly et al. | 414/680 |
| 2002/0137425 A1 | 9/2002 | Furumura | |
| 2004/0040086 A1 * | 3/2004 | Eisenberg et al. | 5/81.1 R |
| 2006/0111812 A1 * | 5/2006 | Okamoto et al. | 700/214 |
| 2006/0112034 A1 * | 5/2006 | Okamoto et al. | 706/16 |
| 2006/0116973 A1 * | 6/2006 | Okamoto et al. | 706/16 |

FOREIGN PATENT DOCUMENTS

| | | |
|---|---|---|
| EP | 0333891 A1 | 9/1989 |
| EP | 0967055 A2 | 12/1999 |
| JP | 61-079589 | 4/1986 |
| JP | 62-037762 | 2/1987 |
| JP | 62-079926 | 4/1987 |
| JP | 62-229306 | 10/1987 |
| JP | 02-188318 | 7/1990 |
| JP | 05-104465 | 4/1993 |
| JP | 05-126548 | 5/1993 |
| JP | 06-262553 | 9/1994 |
| JP | 07-237159 | 9/1995 |
| JP | 09-267276 | 10/1997 |
| JP | 10-031510 | 2/1998 |
| JP | 2000-010617 A | 1/2000 |
| JP | 2000-127070 A | 5/2000 |
| JP | 2000-238906 A | 9/2000 |
| JP | 2000-296916 A | 10/2000 |
| JP | 2001-122438 A | 5/2001 |
| JP | 2001-191281 A | 7/2001 |
| JP | 2003-018665 A | 1/2003 |
| JP | 2003-090661 A | 3/2003 |
| JP | 2003-117866 A | 4/2003 |
| JP | 2003-136455 A | 5/2003 |
| WO | WO 94/17964 * | 8/1994 |
| WO | WO-96/36186 | 11/1996 |
| WO | WO-01/49461 A1 | 7/2001 |

OTHER PUBLICATIONS

Shibata et al., Development and integration of generic components for teachable vision-based mobile robot, 1996, IEEE, p. 230-236.*

Maxwell et al., Alfred: The robot waiter who remembers you, 1999, Internet, p. 1-12.*

* cited by examiner

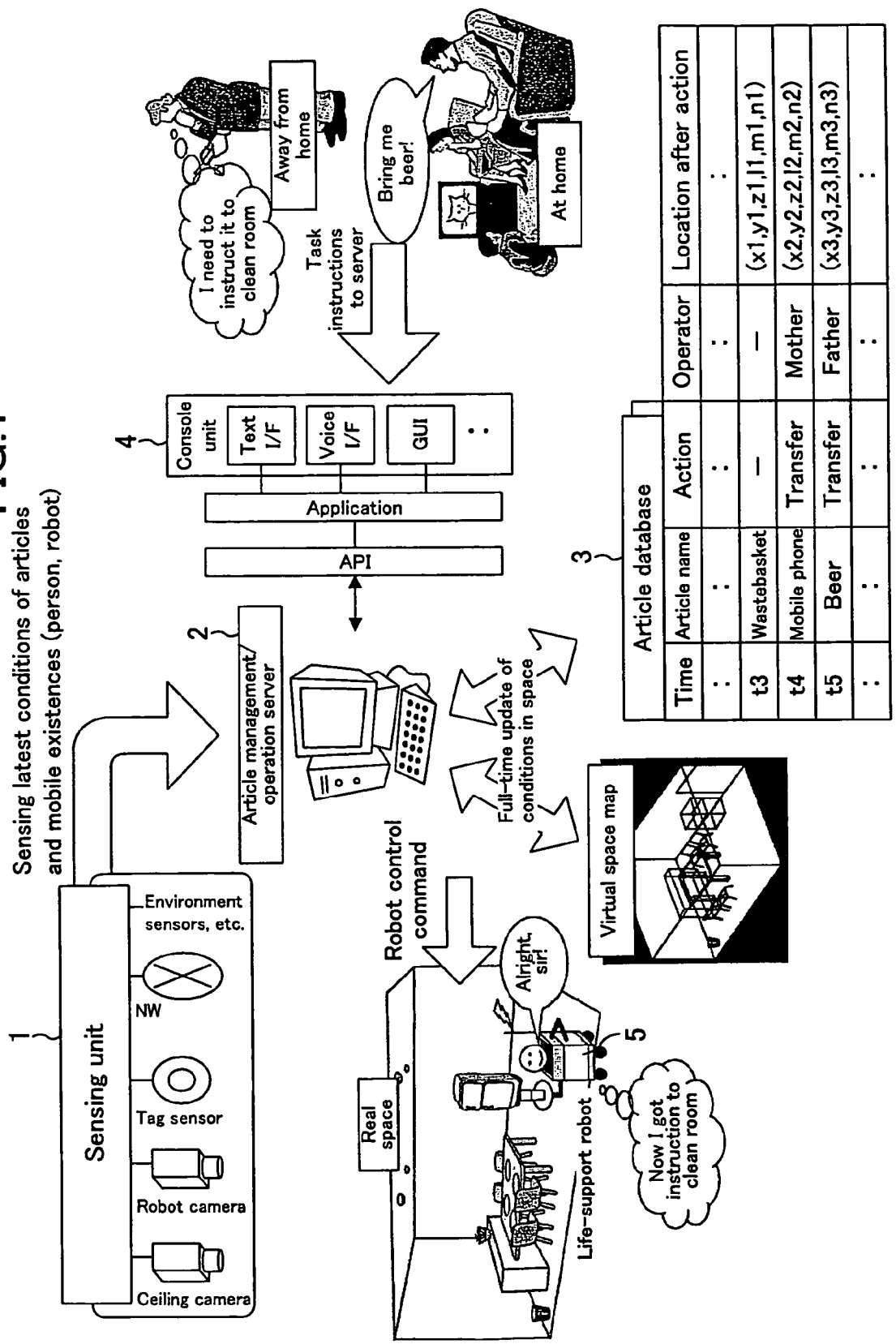

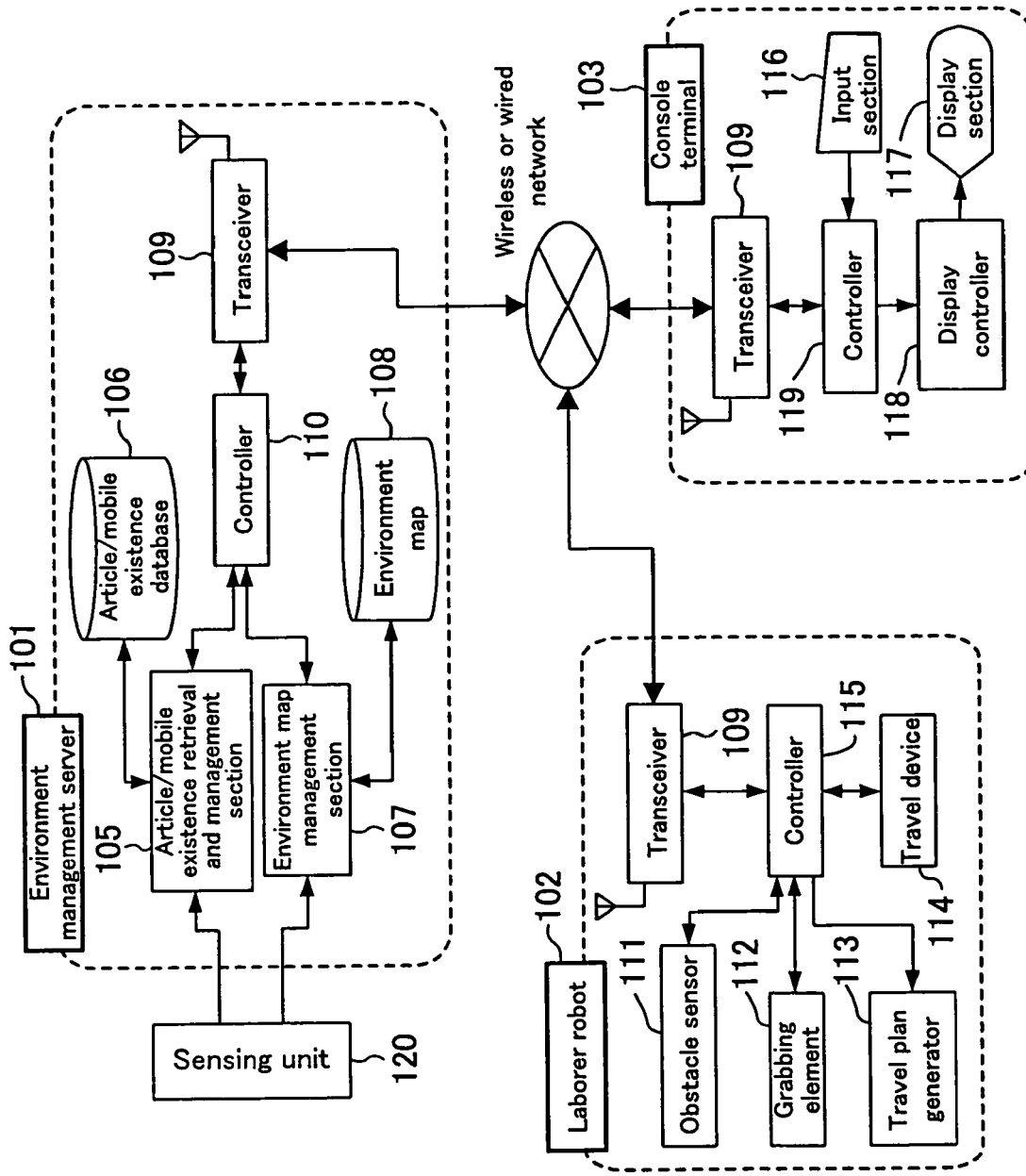

FIG.3A  Model image
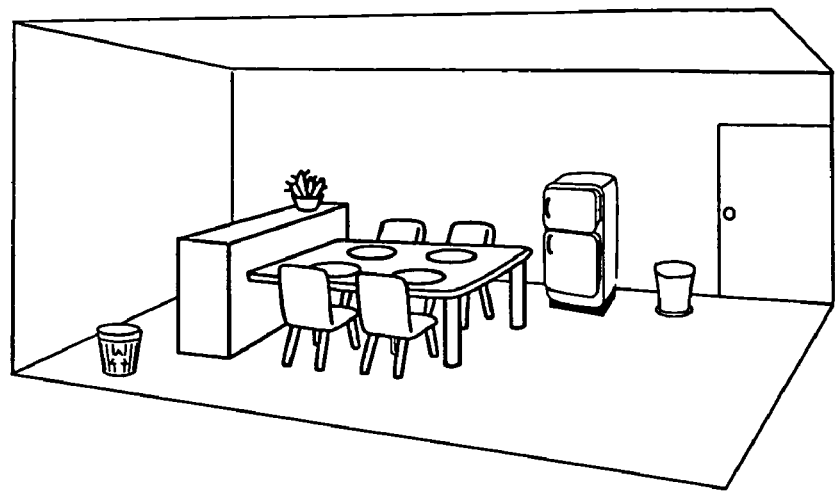
FIG.3B  Camera image
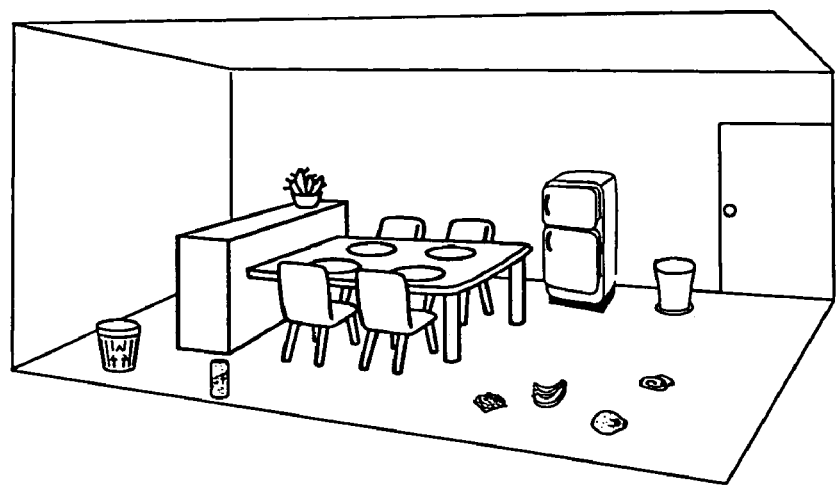
FIG.3C  Background difference image
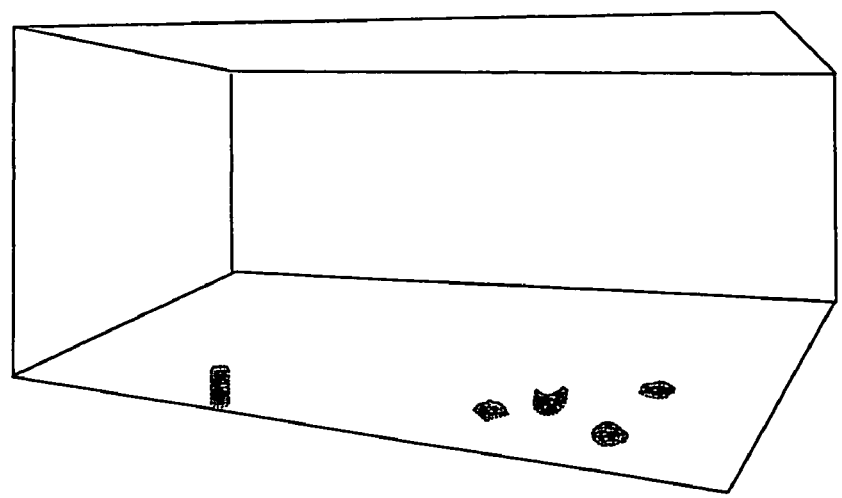

| Location: Door | | | |
|---|---|---|---|
| Time | Article | Handling detail | Handler |
| ⋮ | ⋮ | ⋮ | ⋮ |
| t1 | Bag A | Brought IN | Mother |
| t2 | Bag C | Brought OUT | Father |
| t2 | Garment A @ Bag C | Brought OUT | Father |
| t2 | Towel C @ Bag C | Brought OUT | Father |
| t2 | Umbrella B @ Bag C | Brought OUT | Father |
| ⋮ | ⋮ | ⋮ | ⋮ |

Real-life environment

Environment map
(cubic model)

Environment map
(planer model)

FIG.17
P1001
Display console window
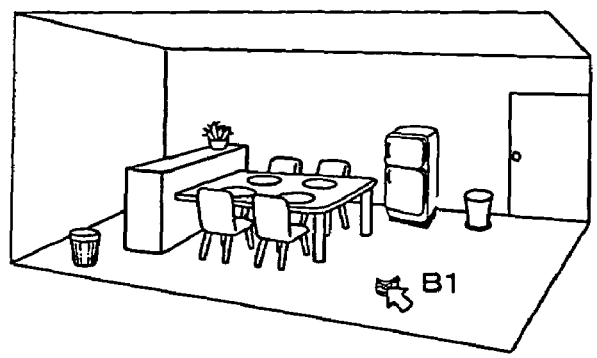
P1002
Highlight designated article icon
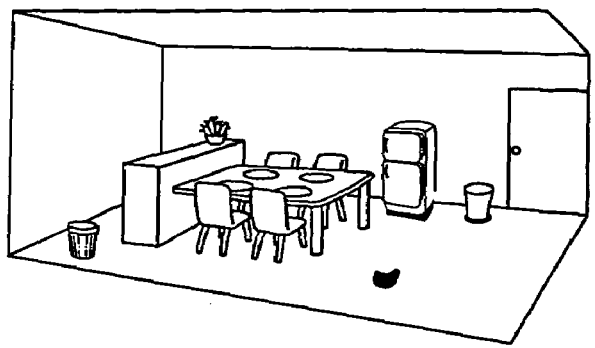
P1003
Drag-and-drop article icon onto destination
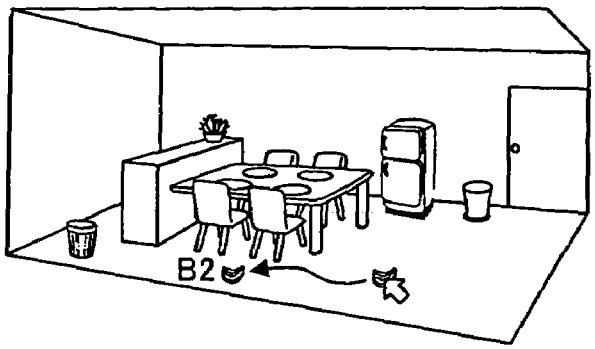

| Action icon name | Article attribute | Location |
|---|---|---|
| Throw away | Recyclable | Recycle basket |
| | * | General wastebasket |
| Clean up | Eating utensil | Kitchen |
| | Toy | Closet |
| | Garment | Clothesbasket |
| | * | — |
| Keep | Frozen food | Freezer compartment |
| | Vegetable, fruit | Refrigerating compartment |
| | * | — |
| ⋮ | ⋮ | ⋮ |

FIG.28

| Action icon name | Article attribute | Location |
|---|---|---|
| ⋮ | ⋮ | ⋮ |
| Clean up | Eating utensil | Kitchen |
| | Toy | Closet |
| | Garment (used) | Clothesbasket |
| | Garment(*) | Wardrobe |
| | * | — |
| ⋮ | ⋮ | ⋮ |

FIG.32A
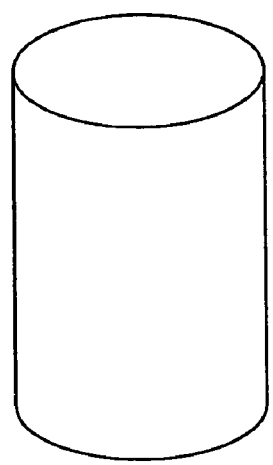
Conversion to data
FIG.32B
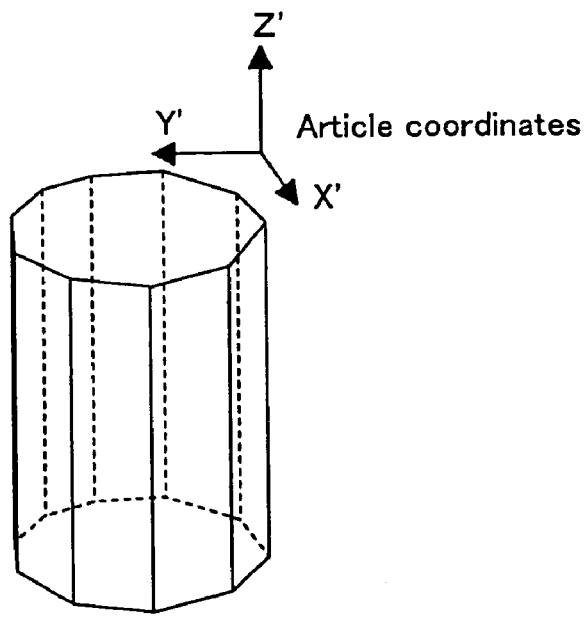
Article coordinates
FIG.32C
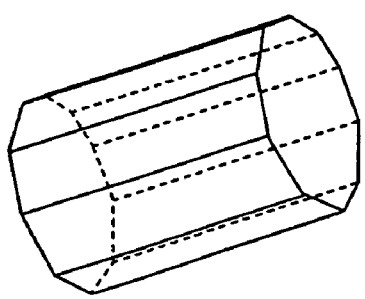
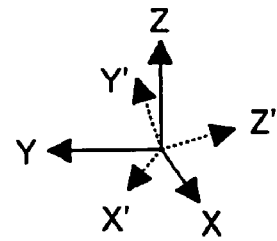

After Y' axis rotation

Real-life environment

Environment map
(Cubic model)

Environment map
(Planar model)

FIG.39

| Number | Item | Length(BYTE) |
|---|---|---|
| 1 | STX | 1 |
| 2 | Message length | 3 |
| 3 | Total packet count | 3 |
| 4 | Packet number | 3 |
| 5 | Sent date and time | 14 |
| 6 | Message ID | 4 |
| 7 | Source | 2 |
| 8 | Destination | 2 |
| 9 | Command number | 2 |
| 10 | Parameter | |
| 11 | ETX | 1 |

FIG.40

ACK/NACK message

| Number | Item | Length(BYTE) |
|---|---|---|
| 1 | ACK, NACK | 1 |
| 2 | Message length | 3 |
| 3 | Total packet count | 3 |
| 4 | Packet number | 3 |
| 5 | Sent date and time | 14 |
| 6 | Message ID | 4 |
| 7 | Source (Own code) | 2 |
| 8 | Destination (Destination to which response is sent) | 2 |
| 9 | Command number | 2 |
| 10 | Error code | 3 |
| 11 | ETX | 1 |

143(Display)

Example of message generated in handling message generator

| Number | Item | Value |
|---|---|---|
| 1 | STX | STX |
| : | : | : |
| 6 | Message ID | "0001" |
| 7 | Source | "P0" |
| 8 | Destination | "I0" |
| 9 | Command number | "01" |
| 10 | Parameter | "001", "X0", "Y0", "Z0", "X1", "Y1", "Z1" |
| 11 | ETX | ETX |

FIG.47

Example of message for sending one task unit (travel) to laborer robot

| Number | Item | Value |
|---|---|---|
| 1 | STX | STX |
| : | : | : |
| 6 | Message ID | "0002" |
| 7 | Source | "I0" |
| 8 | Destination | "R0" |
| 9 | Command number | "01" |
| 10 | Parameter | "X0", "Y0", "Z0", |
| 11 | ETX | ETX |

FIG.49

Commands to laborer robot and contents thereof

| Command number | Parameter | Content |
|---|---|---|
| 01 | Travel destination | Travel |
| 02 | Location of grabbed article | Grabbing |
| 03 | Placement location of grabbed article | Placement |
| ⋮ | ⋮ | ⋮ |

FIG.56

Commands to environment management server and contents thereof

| Command number | Parameter | Content |
|---|---|---|
| 01 | None | Query about location of robot |
| 11 | None | Query about environment map |
| 12 | Location | Query about environment attribute |
| 23 | Article ID<br>Number of attribute | Query about article attribute |
| 24 | Article ID<br>Number of attribute,<br>Value of attribute | Registration of article attribute |
| ⋮ | ⋮ | ⋮ |

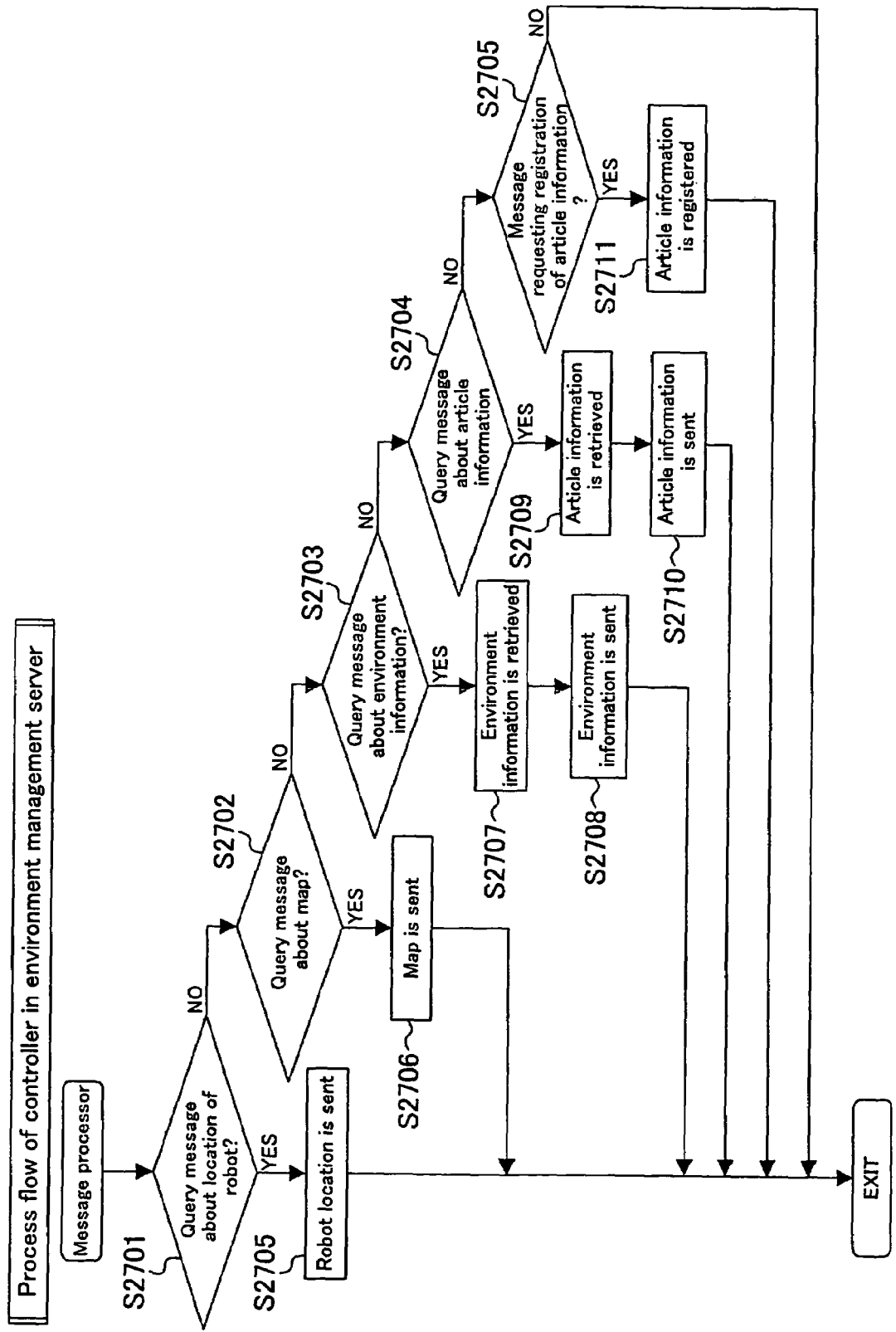

Conversion to data

Article coordinates

FIG.63

Example of messages generated in handling message generator

| Number | Item | Value |
|---|---|---|
| 1 | STX | STX |
| : | : | : |
| 6 | Message ID | "0001" |
| 7 | Source | "P0" |
| 8 | Destination | "I0" |
| 9 | Command number | "01" |
| 10 | Parameter | "001", "X0", "Y0", "Z0", "X1", "Y1", "Z1" |
| 11 | ETX | ETX |

FIG.65

Commands to laborer robot and their contents

| Command number | Parameter | Meaning |
|---|---|---|
| 01 | Destination | travel |
| 02 | Position of grabbed article | grabbing |
| 03 | Placement location for grabbed article | placement |
| ⋮ | ⋮ | ⋮ |

Environment map (planer model)

| Contact surface | Pair of grabbing surfaces |
|---|---|
| A1 | (A3,A8), (A4,A9), (A5,A10), (A6,A11), (A7,A12) |
| A2 | (A3,A8), (A4,A9), (A5,A10), (A6,A11), (A7,A12) |
| A3 | (A1,A2), (A5,A10) |
| ⋮ | ⋮ |
| A12 | (A1,A2), (A4,A9) |

FIG.71

| Article ID | Article name | Time | Location | Article image |
|---|---|---|---|---|
| D_0001 | Juice can | 2002/10/09 22:00 | floor_0001 (x1,y1,0) |  |
| F_0001 | Lunchbox | 2002/10/09 21:00 | floor_0001 (x2,y2,0) |  |
| S_0001 | Notebook | 2002/10/10 8:00 | floor_0001 (x3,y3,0) |  |
| F_0002 | Banana | 2002/10/09 21:00 | floor_0001 (x4,y4,0) |  |
| O_0001 | Paper trash | 2002/10/10 8:10 | floor_0001 (x5,y5,0) |  |
| F_0003 | Ice cream | 2002/10/10 8:10 | Freezer_0001 |  |
| F_0004 | Popsicle | 2002/10/10 8:10 | Freezer_0001 |  |

FIG.72

| Article ID | Article name | Time | Location | Article image |
|---|---|---|---|---|
| D_0001 | Juice can | 2002/10/10 10:00 | wastebasket_0002 |  |
| F_0001 | Lunchbox | 2002/10/10 10:00 | Refrigerator_0001 |  |
| S_0001 | Notebook | 2002/10/10 10:00 | table_0001 |  |
| F_0002 | Banana | 2002/10/10 10:00 | Refrigerator_0001 |  |
| O_0001 | Paper trash | 2002/10/10 10:00 | wastebasket_0001 |  |

Real-life environment

Environment map (cubic model)

Environment map (planar model)

FIG.77A

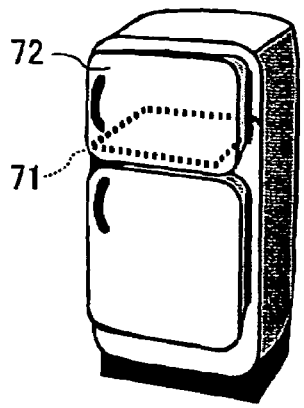

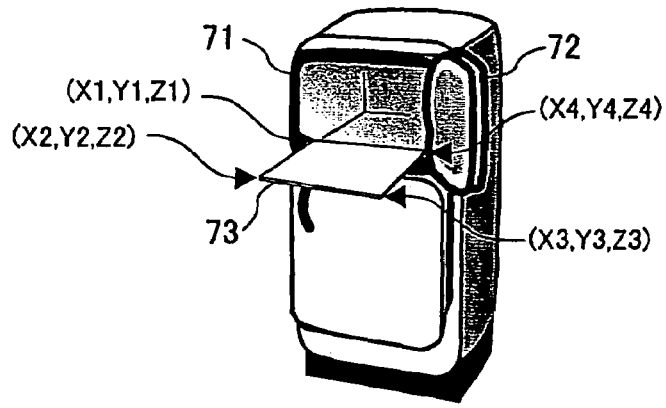

| Appliance ID | Appliance operation commands | Procedures | Return values |
|---|---|---|---|
| Refrigerating compartment | door_open | Open door | Ack/Nack |
|  | door_close | Close door | Ack/Nack |

| Appliance ID | Appliance operation commands | Procedures | Return values |
|---|---|---|---|
| Freezer compartment | door_open | Open door | Ack/Nack |
|  | door_close | Close door | Ack/Nack |

| Appliance ID | Appliance operation commands | Procedures | Return values |
|---|---|---|---|
| Microwave oven | door_open | Open door | Ack/Nack |
|  | door_close | Close door | Ack/Nack |
|  | warm_start | Start heating | Ack/Nack |
|  | warm_end | Inquire about end of heating | True/False |
|  | is_object | Check for presence of article | True/False |

FIG.83

| Appliance ID | Location attribute | Robot control command |
|---|---|---|
| Refrigerator_0001 | Transfer origin | ( Robot_0001, Refrigerator_0001, door_open) |
| | | (grad,$object) |
| | | ( Robot_0001, Refrigerator_0001, door_close) |
| | Transfer destination | ( Robot_0001, Refrigerator_0001, door_open) |
| | | (release, $object) |
| | | ( Robot_0001, Refrigerator_0001, door_close) |

| Appliance ID | Location attribute | Robot control command |
|---|---|---|
| Microwave_oven_0001 | Transfer origin | (Robot_0001, Microwave_oven_0001, warm_end) |
| | | (Robot_0001, Microwave_oven_0001, door_open) |
| | | (grad,$object) |
| | | (Robot_0001, Microwave_oven_0001, door_close) |
| | Transfer destination | (Robot_0001, Microwave_oven_0001, is_object) |
| | | (Robot_0001, Microwave_oven_0001, door_open) |
| | | (release, $object) |
| | | (Robot_0001, Microwave_oven_0001, door_close) |
| | | (Robot_0001, Microwave_oven_0001, warm_start) |

| |
|---|
| ( move, Refrigerator_0001 ) |
| ( Robot_0001, Refrigerator_0001, door_open ) |
| ( grab, F_0001 ) |
| ( Robot_0001, Refrigerator_0001, door_close ) |
| ( move, Microwave_oven_ 0001 ) |
| ( Robot_0001, Microwave_oven_ 0001, is_object ) |
| ( Robot_0001, Microwave_oven_ 0001, door_open ) |
| ( release, F_0001 ) |
| ( Robot_0001, Microwave_oven_ 0001, door_close ) |
| ( Robot_0001, Microwave_oven_ 0001, warm_start ) |

ARTICLE HANDLING SYSTEM AND METHOD AND ARTICLE MANAGEMENT SYSTEM AND METHOD

CROSS-REFERENCE TO RELATED APPLICATIONS

This application is a continuation of U.S. patent application Ser. No. 11/293,771 filed on Dec. 2, 2005. This application also claims the benefit of Japanese Patent Application Nos. 2003-156205 filed Jun. 2, 2003 and 2003-158346 filed Jun. 3, 2003. The disclosure(s) of the above application(s) are incorporated herein by reference.

BACKGROUND OF THE INVENTION

1. Technical Field

The present invention relates to a technique for supporting management or handling of an article in a life space, i.e., a space in which human beings live, such as an ordinary house, office, hotel, store, hospital, or the like.

2. Background Art

Conventionally, robots have been used effectively in a broad variety of fields. For example, a robot having an article grabbing mechanism is used on an automated production assembly line in a factory for grabbing/carrying parts or in an automated warehouse for carrying/managing stocked merchandise. Such application of the robot has an abundant number of examples.

The shape of such industrial robots is limited more or less to a rectangular parallelepiped, or the like, even when they handle articles of the same shape and size or have some flexibility. A technique of using a robot in view of such circumstances for improving the efficiency in a carrying operation has been disclosed. A typical example disclosed in Document 1 (see below) is a robot system for loading/unloading articles.

(Document 1) Japanese Laid-Open Patent Publication No. 7-237159

(Document 2) Japanese Laid-Open Patent Publication No. 2000-238906

(Document 3) Japanese Laid-Open Patent Publication No. 2000-127070

PROBLEMS TO BE SOLVED

Recently, research and development activities for non-industrial robots and, specifically, for household robots, have been increasingly carried out, using the robotics technology matured for industrial purposes as widely known, toward a high goal of supporting the human life in harmony with human beings in ordinary houses. For example, an entertainment robot which behaves like a pet to heal the hearts of people, a housework support robot for, for example, automatically cleaning a room while circumventing obstacles detected by a sensor in the room, etc., have been practically developed and released into the market. The supplementary techniques, for example, a handling technique of flexibly grabbing various articles and a sensing technique of perceive the conditions of a space in which a robot works, which are indispensable for housework support, have also been intensely developed. With advancement of such technical developments, a robot which replaces a human being to do various houseworks will be realized in the future.

Considering our daily lives, we can say that we, living our lives in the modern world, are constrained by materials to work incessantly all the time. For example, in a house, we spend much time for moving articles, i.e., picking up dust, carrying plates, storing away toys of kids, collecting and folding the laundry, etc. In addition, we frequently do the tasks of receiving/shipping packs and mails from/to someone.

We sometimes forget the places where we left remote controllers of home electronic appliances, keys, mobile phones, watches, etc. In such cases, we have to search throughout the entire house for the missing articles. We sometimes forget the places where leisure goods for camping, or the like, or wedding/funeral-related materials were stored many years ago, and cannot find them in time for the occasion.

If we have a system for supporting complicated works relating to articles, article handling and article management, our life will be more convenient and more comfortable. Such a system is applicable to non-household labors, for example, rearranging chairs and tables in restaurants after service hours, cleaning and bedmaking in hotels, merchandise management in supermarkets and convenience stores, etc.

It should be noted that it is difficult to apply the above-mentioned industrial techniques, as they are, to a life space in a house, or the like, because articles to be handled are greatly different between a work site in a factory, warehouse, or the like, and a life space in a house, office, or the like.

The first reason is location of articles. In industrial uses, locations of articles are arranged in a certain order, and the locations are limited to particular places, for example, on a conveyer belt. In life spaces, articles are placed in various locations, and the locations occur at random and frequently change. Now, consider an example of eating utensils. They are stacked in a cupboard when not used, placed in the kitchen during cooking, and placed on the table during dining. After dining, they are moved into the sink or put into a dishwasher. After washed up, they are returned to the cupboard.

In industrial uses, the type and shape of articles to be handled are predetermined and, therefore, unification of the shape, and the like, can be achieved relatively easily, whereas the articles to be handed in houses and offices have a wide variety of types and shapes.

Thus, to effectively apply robots to a life space, a system for managing attribute information of each article in the life space, such as a current location, etc., on a realtime basis is necessary in addition to indispensable improvements in the robotics technology.

Even if without article handling by a robot, convenience in human life is greatly improved only by providing a user with information about the current location of an article, and the like, using a system for managing attribute information of each article in the life space on a realtime basis.

DISCLOSURE OF INVENTION

An objective of the present invention is to provide a system for supporting tasks of managing and handling articles in a life space.

Specifically, the present invention provides an article handling system, comprising: a sensing unit for sensing the conditions of articles and mobile existences in a predetermined life space, the mobile existences including a person(s); a server for managing, on an article database, attribute information of the articles in the life space according to the information from the sensing unit, the attribute information including at least current locations of the articles; and a console unit communicable with the server for a user to instruct of a task, wherein the server receives the user's instruction input through the console unit and refers to the article database to convert this instruction to a control command which commands a robot to execute a task on an article, the control command being transmitted to the robot.

According to the above invention, the conditions of articles and mobile existences, including a person(s), in a predetermined life space in a house, or the like, are sensed by the sensing unit. The attribute information extracted from the information sensed by the sensing unit, including at least the current locations of the articles, are managed by the server on the article database. The server receives a user's instruction input through the console unit and refers to the article database to convert this instruction to a control command, which is then transmitted to the robot. With this mechanism, the robot can work appropriately even in a complicated situation in the life space where articles exist at various locations and the locations change from moment to moment. As a result, the robot can successfully support handling of articles by a human being.

The present invention also provides an article management system, comprising: a sensing unit for sensing the conditions of articles and mobile existences in a predetermined life space, the mobile existences including a person(s); a server for managing, on an article database, attribute information of the articles in the life space according to the information from the sensing unit, the attribute information including at least current locations of the articles and a history of action (manipulation) by the mobile existences; and a console unit communicable with the server for a user to put a query, wherein the server receives the user's query input through the console unit and refers to the article database according to this query to generate information which is to be presented to the user, and transmits the generated information to the console unit.

According to the above invention, the conditions of articles and mobile existences, including a person(s), in a predetermined life space in a house, or the like, are sensed by the sensing unit. The attribute information extracted from the information sensed by the sensing unit, including at least the current locations of the articles and a history of action by the mobile existences, are managed by the server on the article database. The server receives a user's query input through the console unit and refers to the article database according to this query to generate information which is to be presented to the user, and transmits the generated information to the console unit. With this mechanism, information is provided appropriately in consideration of the current locations of the articles and the action history even in a complicated situation in the life space where articles exist at various locations and the locations change from moment to moment. As a result, article management by a human being is appropriately supported.

BRIEF DESCRIPTION OF THE DRAWINGS

FIG. 1 conceptually illustrates the present invention.

FIG. 2 is a block diagram showing an example of the entire structure of an article handling system or article management system according to embodiment 1 of the present invention.

FIG. 3A, FIG. 3B and FIG. 3C illustrate the principle of a background difference method.

FIG. 17 illustrates a procedure of designating on the console window the task of transferring an article which is to be assigned to a robot.

FIG. 28 is an example of an action/location translation table including subdivided conditions.

FIGS. 32A, 32B and 32C are explanatory views of the shape and posture of an article.

FIG. 32A shows the original shape of the article, FIG. 32B shows the shape of a model of the article, and FIG. 32C shows the shape of the model of the article placed in the real world.

FIG. 34A shows a real-life environment, FIG. 34B shows a cubic model of the real-life environment of FIG. 34A, and FIG. 34C shows a planar model of the real-life environment of FIG. 34A.

FIG. 38A is an oblique view of the placed articles, FIG. 38B is a plan view of the articles before the placement location is corrected, and FIG. 38C is a plan view of the articles after the placement location is corrected.

FIG. 39 shows an example of a message form.

FIG. 40 shows an example of the format of an ACK/NACK message.

FIG. 47 shows an example of a message for sending one task unit to the laborer robot.

FIG. 49 shows examples of messages to the laborer robot.

FIG. 56 shows examples of messages to the environment management server.

FIG. 57 is a flow chart of operation of a message processor of the controller in the environment management server.

FIG. 60 illustrates the shape and posture of an article.

FIG. 63 is a diagram showing an example of a message generated in a handling message generator in the console terminal.

FIG. 65 is a diagram showing an example of a message to the laborer robot.

FIG. 71 is a table illustrating the structure of an article database and exemplary contents described therein.

FIG. 72 is a table illustrating an updated article database.

FIGS. 77 are diagrams illustrating the correspondence between the conditions of an appliance and the appliance attribute data.

FIG. 78 is a diagram illustrating an example of appliance operation commands in the form of tables.

FIG. 83 shows in the form of lists examples of robot control commands for operation of appliances.

BEST MODES FOR CARRYING OUT THE INVENTION

Figure 4:
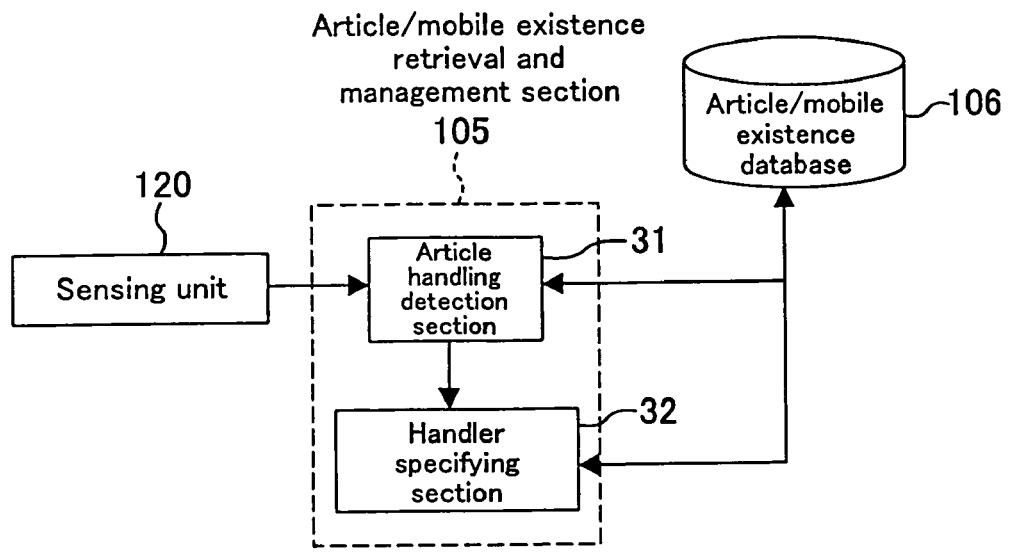
FIG. 4 is a block diagram showing an example of the structure of an article/mobile existence retrieval and management section.

According to the first example of the present invention, there is provided an article handling system, comprising: a sensing unit for sensing the conditions of articles and mobile existences in a predetermined life space, the mobile existences including a person(s); a server for managing, on an article database, attribute information of the articles in the life space according to the information from the sensing unit, the attribute information including at least current locations of the articles; and a console unit communicable with the server for a user to instruct of a task, wherein the server receives the user's instruction input through the console unit and refers to the article database to convert this instruction to a control command which commands a robot to execute a task on an article, the control command being transmitted to the robot.

According to the second example of the present invention, in the above article handling system, the sensing unit includes at least one of a camera installed in the life space, a camera installed in the robot, and a tag sensor for receiving information transmitted from an electronic tag.

According to the third example of the present invention, there is provided an article management system, comprising: a sensing unit for sensing the conditions of articles and mobile existences in a predetermined life space, the mobile existences including a person(s); a server for managing, on an article database, attribute information of the articles in the life space according to the information from the sensing unit, the attribute information including at least current locations of the articles and a history of action by the mobile existences; and a console unit communicable with the server for a user to put a query, wherein the server receives the user's query input through the console unit and refers to the article database according to this query to generate information which is to be presented to the user, and transmits the generated information to the console unit.

According to the fourth example of the present invention, in the above article management system, the article database has article history data for each article which is indicative of an action history of the article; and the article history data includes, as to each action exerted in the past, at least an operator, action detail, and the location of the article after the action.

According to the fifth example of the present invention, in the above article management system, the sensing unit includes at least one of a camera installed in the life space and a tag sensor for receiving information transmitted from an electronic tag.

According to the sixth example of the present invention, there is provided an article handling method, comprising the steps of: displaying an image which represents a predetermined life space on a display section of a console terminal; a user issuing through the console terminal an instruction to exert an action on an article included in the image; a server referring to an article database which manages attribute information of an article in the life space to convert the user's instruction transmitted from the console terminal to a control command executable for a robot, the attribute information including at least a current location of the article; and the server transmitting the control command to the robot.

According to the seventh example of the present invention, there is provided an article handling method, comprising the steps of: displaying an image which represents a predetermined life space on a display section of a console terminal; a user putting a query through the console terminal about an article included in the image; a server receiving the user's query transmitted from the console terminal and referring to an article database which manages attribute information of an article in the life space to generate information which is to be presented to the user, the attribute information including at least a current location of the article and an action history; and the server transmitting the generated information to the console terminal.

According to the eighth example of the present invention, there is provided a server communicable with a sensing unit for sensing the conditions of articles and mobile existences including a person(s) in a predetermined life space and a console unit for a user to instruct of a task, wherein the server manages, on an article database, attribute information of the articles in the life space according to the information from the sensing unit, the attribute information including at least current locations of the articles, and the server receives the user's instruction input through the console unit and refers to the article database to convert this instruction to a control command which commands a robot to execute a task on an article, and transmits the control command to the robot.

According to the ninth example of the present invention, there is provided a server communicable with a sensing unit for sensing the conditions of articles and mobile existences including a person(s) in a predetermined life space and a console unit for a user to put a query, wherein the server manages, on an article database, attribute information of the articles in the life space according to the information from the sensing unit, the attribute information including at least current locations of the articles and a history of action by the mobile existences, and the server receives the user's query input through the console unit and refers to the article database according to this query to generate information which is to be presented to the user, and transmits the generated information to the console unit.

According to the tenth example the present invention, in the above server, the article database has article history data for each article which is indicative of an action history of the article; and the article history data includes, as to each action exerted in the past, at least an operator, action detail, and the location of the article after the action.

First, the concept of the present invention is described.

FIG. 1 conceptually illustrates the present invention. In FIG. 1, it is assumed that an article handling system of the present invention is established in a house (predetermined life space). In the real space, a life support robot 5 is placed. It should be noted that the "life space" in this invention means a space where a human being performs activities, i.e., a space where a human being lives his/her life, which includes not only a house of an ordinary household but also an office, hotel, store, hospital, and the like, but does not include an industrial space, such as a factory, warehouse, or the like.

In FIG. 1, a sensing unit 1 is for sensing the conditions of articles and mobile existences including human beings in a house. For example, the sensing unit 1 is formed by a camera installed on the ceiling, a tag sensor for receiving information transmitted from electronic tags, or the like. An article management/operation server 2 receives information from the sensing unit 1 to manage the conditions in the house on a realtime basis all the time. For this management, an article database 3 which stores attribute information of articles in the house is used. In the example of FIG. 1, the action time, action detail, operator, location after operation for a wastebasket, mobile phone, beer, etc., are managed as the attribute information.

A dweller in the house, i.e., a user, gives an instruction through a console unit 4. This instruction is realized through various interfaces of the console unit 4 by word input, voice input, on-screen input, or the like. The server 2 receives a user's instruction input through the console unit 4 and refers to the article database 3 to convert this instruction to a control command which commands the robot 5 to carry out a task. The server 2 transmits the control command to the robot 5. The robot 5 carries out the task assigned by the user according to the control command.

For example, when a user gives an instruction to clean up a room through a mobile phone away from the house, the server 2 refers to the article database 3 to grasp information about the current conditions inside the designated room, the location of a wastebasket, etc, and assigns a clean-up task to the robot 5. When a user in a living room of the house gives an instruction to bring back a bottle of beer, the server 2 refers to the article database 3 to grasp information about the current conditions inside a refrigerator, etc, and instructs the robot 5 to bring back a bottle of beer.

Thus, the attribute information of articles are managed using the sensing unit 1 and the article database 3 on a realtime basis, whereby the robot is instructed to work appropriately even in a complicated situation in the house. Therefore, users can live comfortable lives.

When receiving a query about a missing mobile phone, the server 2 may refer to the article database 3 to generate information about the current location of the mobile phone and the last operator and present the generated information to the user. Therefore, the convenience of life is greatly improved by using the system of FIG. 1 as an article management system to provide information to a user without exerting an action on an article by a robot.

Hereinafter, embodiments of the present invention will be described with reference to the drawings.

(Embodiment 1)

FIG. 2 is a block diagram showing a system structure of an article handling system or article management system according to embodiment 1 of the present invention. As shown in FIG. 2, roughly explaining, the system of FIG. 2 is formed by a sensing unit 120 for grasping the conditions inside an environment and three subsystems, an environment management server 101, a laborer robot 102, and a console terminal (console unit) 103. The subsystems 101 to 103 each has a transceiver 109 for transmitting/receiving information, data, signals, etc., over a wireless or wired network. The transceivers 109 performs a common operation and are therefore denoted by the same reference numeral in FIG. 2.

It is assumed herein that the "environment" means a room of a house.

The structure and operation of each subsystem are sequentially described.

<Structure of Environment Management Server>

The environment management server 101 includes an article/mobile existence retrieval and management section 105, an article/mobile existence database 106, an environment map management section 107, and an environment map 108. The article/mobile existence retrieval and management section 105 manages the conditions of articles and mobile existences (including persons and the robot 102) in the environment among the conditions grasped by the sensing unit 120. The article/mobile existence database 106 stores data about the articles and mobile existences. The environment map management section 107 manages the conditions of the entire environment excluding the articles and mobile existences. The environment map 108 stores data about the entire environment. The transceiver 109 receives a query (signal) about the data of the article/mobile existence database 106 and the data of the environment map 108 from the outside. The transceiver 109 transmits a reply signal to the query to the outside. The transceiver 109 transmits a control command to the robot 102. A controller 110 controls the article/mobile existence retrieval and management section 105, the environment map management section 107 and the transceiver 109.

The sensing unit 120 monitors all the time the location and conditions of articles existing in the environment, such as future, and a person(s) and the robot 102 existing in the environment. The sensing unit 120 can also detect that an article is brought into or out of the environment by a person or the robot 102. Specifically, the sensing unit 120 is realized by a camera (image sensor) installed in the environment, a tag sensor, or the like, but the details thereof will be described later. When detecting an article or mobile existence, the sensing unit 120 transmits the information about the detected article or existence to the article/mobile existence retrieval and management section 105. The transmitted information includes, for example, the time of detection of the article, the location and posture of the article, etc.

The article/mobile existence retrieval and management section 105 accumulates the information about articles and mobile existences detected by the sensing unit 120 in the article/mobile existence database (DB) 106. The information managed in the article/mobile existence DB 106 includes at least the current location of articles and mobile existences. The details of the article/mobile existence DB 106 and a method for updating the article/mobile existence DB 106 will be described later.

The article/mobile existence retrieval and management section 105 conjectures what mobile existence (person/robot) is handling (e.g., transferring) an article based on the information from the sensing unit 120 and accumulates the conjecture result in the article/mobile existence DB 106.

When a query is issued from the controller 110 to the article/mobile existence DB 106, the article/mobile existence retrieval and management section 105 retrieves information necessary in view of the query from the article/mobile existence DB 106 and transmits the retrieved information to the controller 110.

The environment map management section 107 creates the environment map 108 based on the information from the sensing unit 120 and manages the created environment map 108. The environment map 108 is used when the robot 102 travels in the environment. The robot 102 acquires the environment map 108 from the server 101 to make a travel route plan.

When a query is issued from the controller 110 to the environment map 108, the environment map management section 107 retrieves information necessary in view of the query from the environment map 108 and transmits the retrieved information to the controller 110.

The controller 110 is an element which controls the entire server 101, and the primary control operations thereof are as follows:

1) When the transceiver 109 receives a query about various data in the server 101, the controller 110 analyzes the query and issue a data reference request to the article/mobile existence retrieval and management section 105 or the environment map management section 107 according to the analysis result.

2) The controller 110 forwards a result transmitted from the article/mobile existence retrieval and management section 105 or the environment map management section 107 in response to the request to the origin of the query through the transceiver 109.

3) The controller 110 interprets a robot task detail massage transmitted from the console terminal 103 through the transceiver 109 to generate a robot control command string for commanding the robot 102 to carry out a task and transmits the generated command string to the robot 102. The robot control command string will be described later.

4) When necessary, the controller 110 periodically broadcasts the conditions of part or all of articles managed in the article/mobile existence DB 106 or the conditions of the environment map 108 to the robot 102 or a user (console terminal 103) through the transceiver 109.

For example, the control operations 1) and 2) are carried out when a user searches for an article using the console terminal 103. In this case, as the query to the server 101, the search criterion may be given in the form of a natural language sentence, "By whom and to where the money placed on about time T on day D of month M was moved away?". Alternatively, a search keyword for more specificity about the attribute of a wanted article, e.g., the date, handler, type of the article, etc., may be entered.

In response to the above query, the environment management server 101 searches the article/mobile existence DB 106 for the wanted article. Then, the environment management server 101 may order the console terminal 103 to generate a voice message, for example, "Mr. X moved it away to place Y", or present a map of the environment on which the current location of the wanted article is shown.

When the article has been brought out of the environment, the server 101 may output information about a carrier who brought it out of the environment. The carrier is a person, the server 101 may ask the carrier via telephone or e-mail about the current location of the article that has been brought out. If the current location of the carrier is within an environment managed by another environment management server, the server 101 may directly ask the another environment management server about the current location of the article that has been brought out.

(Specific Examples of Sensing Unit)

The environment that the present system is intended to be installed in is a life space, such as a house of a household, or the like. Therefore, articles are placed in various locations, and the locations occur at random and frequently change. Further, mobile existences, such as a person and robot, are not limited to any particular travel route but freely travels in the environment. Thus, the present system requires a sensing technique of precisely detecting the conditions of articles and mobile existences in the environment.

Image Sensor

One of the sensors best used for detection of articles is an image sensor (camera). To efficiently monitor a relatively large area, e.g., an entire room, with a small equipment, in general, an image sensor, i.e., a camera, is fixed on the ceiling or wall of the room, and camera images (captured images) taken by the camera are used to detect articles in the room.

A generally-employed method for detecting articles and mobile existences in an environment using camera images is a background difference method. In the background difference method, a model image is prepared in advance as a background, and differences between a current camera image and the model image are examined to detect a target object. Since the object of the present system is to detect and monitor articles and mobile existences in an environment, if variation in the conditions of the environment is small, an image taken when the articles and mobile existences do not exist in the environment may be used as the model image. If variation in the conditions of the environment is prominent, an image obtained by averaging a plurality of images taken with predetermined time intervals is used as the model image.

Article detection using the background difference method is specifically described with reference to FIG. 3A, FIG. 3B and FIG. 3C. FIG. 3A shows an example of a model image. FIG. 3B shows an example of an image taken by a camera at a certain time. FIG. 3C shows an example of a background difference image which is obtained by subtracting the model image of FIG. 3A from the camera image of FIG. 3B. As seen from FIG. 3C, the differences between the camera image and the model image (hatched portions) are isolated in the background difference image. Therefore, only the isolated portions are extracted, whereby articles existing in the environment are detected. Further, the type of the articles can be specified through image processing of the background difference image. Thus, the conditions of articles and mobile existences in the environment can be detected using the background difference method. Furthermore, when two cameras are installed in the environment, information about the shape and posture of an article can be obtained using a stereoscopic three-dimensional measurement technique.

However, in general, article detection using an image sensor has various problems: for example, vulnerability to a brightness variation and low definition. An article can be hidden by another article (problem of blind spots). A plurality of articles overlapping each other can be detected as a single article. For example, the problem of blind spots can be dismissed by distributing a plurality of cameras in an environment generally uniformly such that an image of every article existing in the environment is capturable by any of the cameras. However, removal of the blind spots does not necessarily promise the success of article detection. That is, the problems of low definition and overlapping articles cannot be dismissed even when the number of cameras is increased as much as possible. Therefore, the isolated portions in the background difference image cannot be necessarily identified.

Use of Electronic Tags

In recent years, methods for locating articles and mobile existences using electronic tags have been developed and improved. The electronic tag is a device formed by an IC for storing data and an antenna for transmitting/receiving data by wireless. With the electronic tag, a device called a reader/writer is used to read information written in the electronic tag and write information in the electronic tag.

For example, an electronic tag is attached to each article, and data about the article, for example, the type, shape, weight, picture, and production date of the article, are buried in the electronic tag. Electronic tags may also be attached to mobile existences (persons and robot), and data about the mobile existences, for example, the name, date of birth, etc., are written in the electronic tags. In the case of a person, an electronic tag may be buried in an accessory that he/she always takes on (e.g., a watch). Meanwhile, a large number of reader/writers are installed in the environment. The reader/writers read the information buried in the electronic tags attached to articles and mobile existences to detect the articles and mobile existences in the environment without a camera.

Use of such an electronic tag system enables not only detecting the presence of articles but also utilizing data of the articles which are buried in the electronic tags, although the camera system only enables detection of articles. The electronic tag system provides considerable merits to users. For example, the robot 102 is enabled to readily grab an article by utilizing the shape data of the article. Management of the quality guaranteed period is enabled by utilizing production date data. Use of data about the type of articles makes it easy to find a missing item.

However, article detection using electronic tags has the disadvantage of a short communication distance. That is, communications between electronic tags and reader/writers have to be established using a very weak radio wave which causes no adverse effect to human body. Therefore, the communication distance is as very short as about several tens of centimeters. To overcome the problem of short communication distance, a large number of reader/writers can be installed in the environment, but this is not realistic because a reader/writer is more expensive than a camera Combination of Image Sensors and Electronic Tags As described above, the method using image sensors and the method using electronic tags have merits and demerits. Now, consider a method which uses both image sensors and electronic tag. That is, a hybrid process is carried out. Specifically, the locations of articles in the environment are approximately specified using the above-described background difference method, and the articles are further specified using electronic tags.

Two specific example of the hybrid process are described below.

In the first example, cameras are installed on the ceiling and walls in an environment, and a reader/writer is incorporated in the robot 102. Meanwhile, an electronic tag is attached to each of articles and mobile existences. First, the location of an article in the environment is specified using camera images based on the background difference method. The robot 102 is moved to the vicinity of the location-specified article to read information from an electronic tag attached to the article by the reader/writer incorporated in the robot 102 and specifies the article based on the information.

In the second example, cameras are installed on the ceiling and walls in an environment, and a plurality of reader/writers are installed generally uniformly in the environment. Each of the reader/writers has directivity for reading of data from electronic tags, and the reading direction is variable. First, the location of an article in the environment is specified using camera images based on the background difference method. Then, a reader/writer closest to the location-specified article is selected, and the reading direction of the reader/writer is set toward the article. The reader/writer reads information from an electronic tag attached to the article to specify the article based on the information. It should be noted that, in this example, the distance between a reader/writer and an electronic tag can be long in some cases, and therefore, it is necessary to use a relatively strong radio wave. Thus, it is preferable to read information from an electronic tag after confirming by, for example, the background difference method that no person exists in the environment.

It should be noted that sensing in the present system may be realized by another method different from the above-described methods using image sensors and/or electronic tags.

For example, a reader/writer is installed as the sensing unit 120 at a gate between an environment and the outside, such as a door, window, or the like. With this reader/writer, entry and exit of articles in and out of the environment can be detected. This example will be described later in detail.

(Article/Mobile Existence Retrieval and Management Section)

FIG. 4 conceptually illustrates an internal structure of the article/mobile existence retrieval and management section 105. In FIG. 4, an article handling detection section 31 detects that an article is handled by a mobile existence (article-handled state), and a handler specifying section 32 specifies a mobile existence (handler) which is handling an article according to a detection result of the article handling detection section 31.

The article handling detection section 31 detects an article-handled condition based on information from the sensing unit 120. For example, in article detection using the above-described image sensors and background difference method, when a camera image and a model image are compared to find a difference therebetween, the article handling detection section 31 detects that an article is handled at a location corresponding to the difference. As a matter of course, an article-handled state may be detected using, for example, an electronic tag.

When the article handling detection section 31 detects an article-handled state, the handler specifying section 32 specifies a handler who is handling an article and accumulates information of the handler in the article/mobile existence DB 106.

The process of specifying (identifying) a handler is specifically carried out as follows. In the case where a camera is used as the sensing unit 120, images of an area in which an article-handled state is detected are captured by the camera. Then, it is determined based on the captured images whether a mobile existence is a person or a robot, and a face authentication process is performed to specify the mobile existence. The specified mobile existence is considered to be in the vicinity of the handled article, and therefore, the mobile existence is estimated to be a handler. In general, a wide-angle camera is used as the sensing unit 120 for capturing images from a wide area. However, the resolution of images captured by the wide-angle camera is relatively low and can be insufficient for the face authentication process. In such a case, a narrow-angle high resolution camera may be installed in the environment or incorporated in the robot 102 as a face authentication camera independently of the wide-angle camera. An images of the region in which an article-handled state is detected by the article handling detection section 31 is captured by this narrow-angle camera, and the face authentication process is performed based on the captured image, whereby the handler is specified with high accuracy.

Specification of a handler is not limited to the face authentication process but may be realized by other authentication processes, such as iris authentication, etc. Alternatively, camera images themselves may be accumulated in the article/mobile existence DB 106 without the authentication process. This may be limited to a case where a mobile existence cannot be specified by the authentication process. Further, specification of a handler may be carried out using an electronic tag.

Further, entry and exist of articles in and out of an environment can be managed using electronic tags and a reader/writer.

Figure 5:
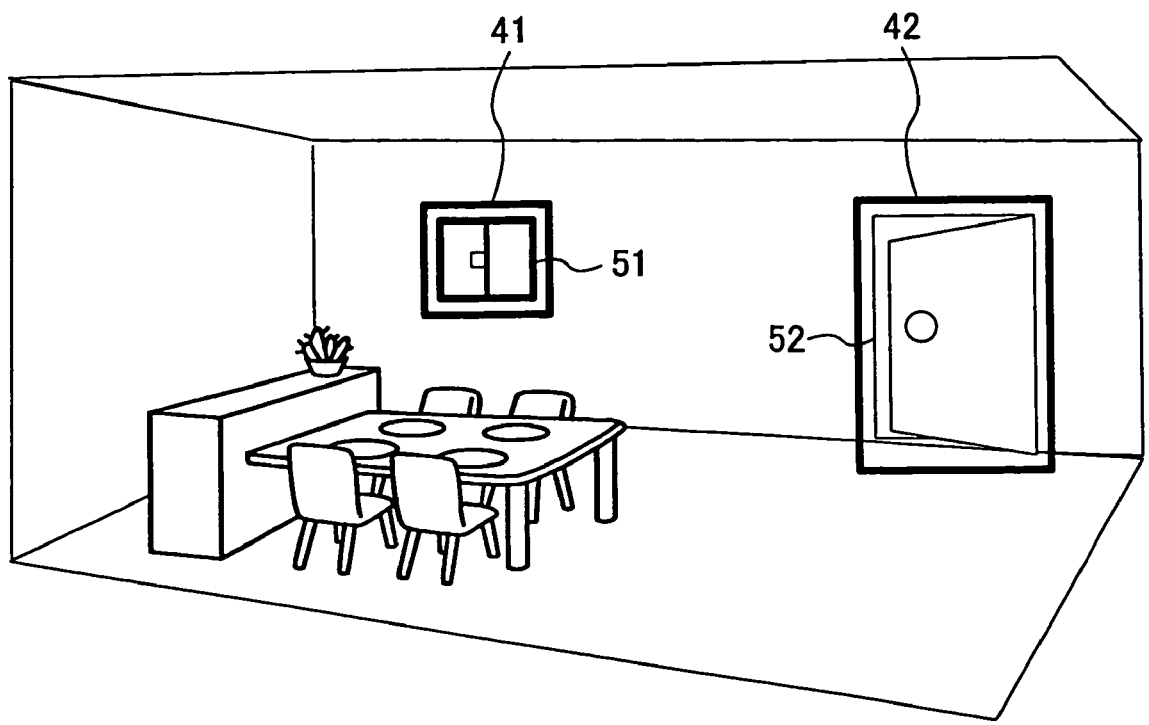
FIG. 5 is an example of gate-type reader/writers installed at a door and window.

Specifically, as shown in FIG. 5, gate-type reader/writers (RF antennas) 41 and 42 are installed at the openings of a window 51 and door 52, respectively, which are the gates between an environment and the outside. When an article or mobile existence passes through the window 51 or door 52, the reader/writer 41 or 42 reads information from an electronic tag attached to the article or mobile existence. The article handling detection section 31 detects entry or exist of an article based on the information from the reader/writer 41 or 42. The handler specifying section 32 specifies a mobile existence, which passes through the window 51 or door 52 together with the article as a handler and accumulates information of the handler in the article/mobile existence DB 106. Through such a process, a person who brings in and out an article can be managed automatically and easily.

In FIG. 5, the reader/writers 41 and 42 are installed to cover the four sides of the openings of the window 51 and door 52, respectively, for the purpose of accurate detection without depending on the direction of electronic tags. However, the reader/writers 41 and 42 may be installed to cover only the upper and lower sides or only the left and right sides of the window 51 and door 52 or may be installed at the center of the window 51 and door 52.

Management of articles at a specific location using the above-described reader/writer is not limited to the window 51 and door 52 but is applicable to other locations. For example, a reader/writer may be installed at the opening of a storage of articles, such as a refrigerator, shelf, or the like, in order to manage entry and exit of articles in and out of the storage.

Two sets of such reader/writers may be installed at the window 51 or door 52 for readily determining whether an article is brought in an environment or brought out of the environment. Specifically, although not shown, the first reader/writer is installed on the outer surface of the opening of the window 51 or door 52, i.e., outside the environment, while the second reader/writer is installed on the inner surface of the opening of the window 51 or door 52, i.e., inside the environment. With this structure, when the second reader/writer installed inside the environment detects information from an electronic tag after the first reader/writer installed outside the environment detects the information from the electronic tag, it is determined that an article to which the electronic tag is attached is brought in the environment from the outside. On the contrary, when the first reader/writer installed outside the environment detects information from an electronic tag after the second reader/writer installed inside the environment detects the information from the electronic tag, it is determined that an article to which the electronic tag is attached is brought out of the environment to the outside.

It should be noted that, in the present system, a handler of an article is not limited to a person. The robot 102 may handle an article according to a task designated by a person through the console terminal 103. In the case where the robot 102 handles an article, the robot 102 may be recognized as a handler, but alternatively, a person who operates the robot 102 may be recognized as a handler. For example, when a person who operates the robot 102 is recognized as a handler, a biometric authentication process, such as fingerprint authentication, face authentication, voice print authentication, iris authentication, or the like, may be performed on the operator of the robot 102 to specify the operator (article hander) of the robot 102 based on the authentication result. Alternatively, in the case where user authentication is carried out through a so-called LOGIN/LOGON procedure at the console terminal 103 at the start of operation of the robot 102, its user information may be used to specify the operator of the robot 102.

(Article/Mobile Existence DB)

Figure 6:
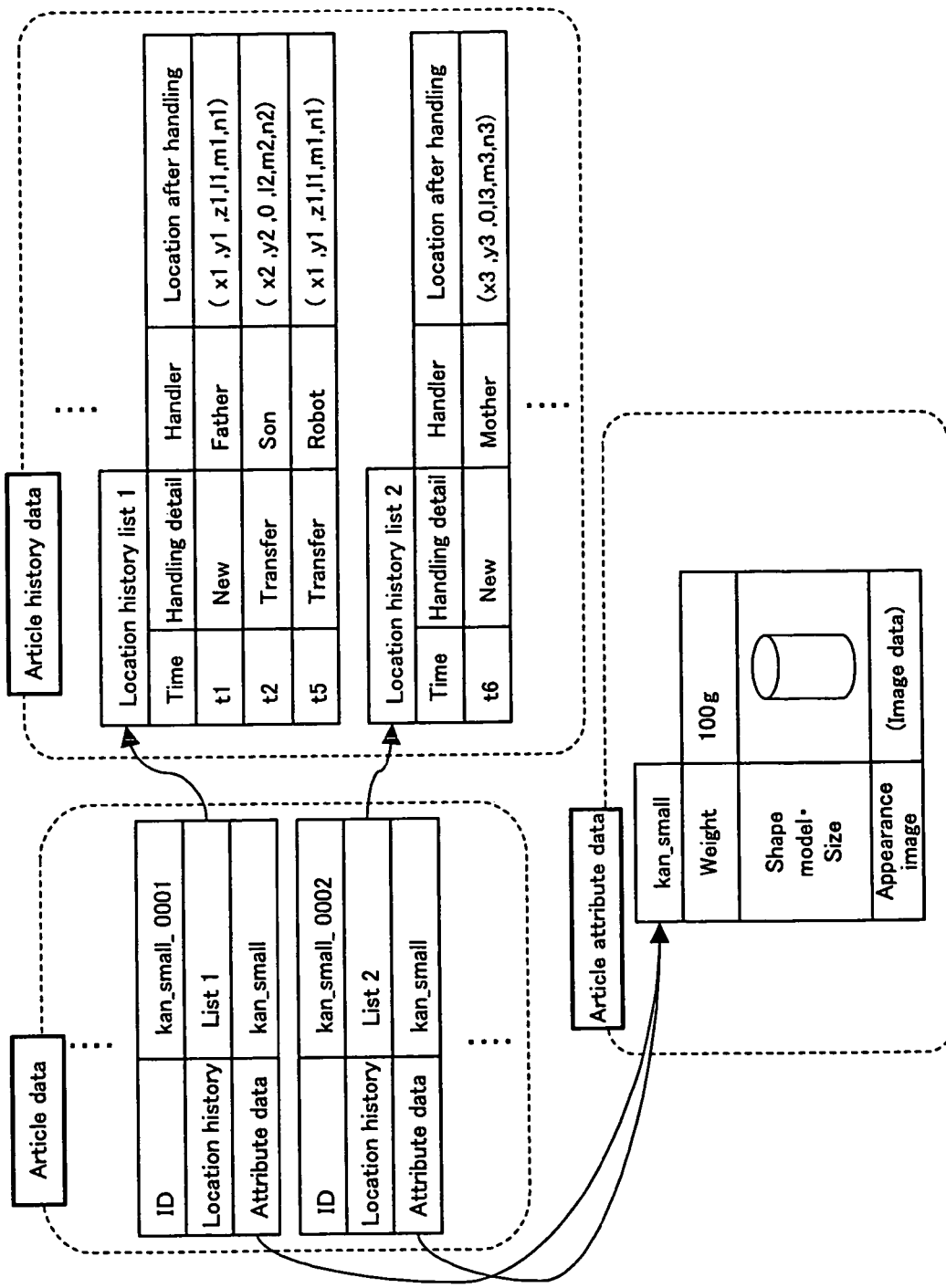
FIG. 6 shows a structure of an article database of an article/mobile existence database and an example of information stored therein.
Figure 7:
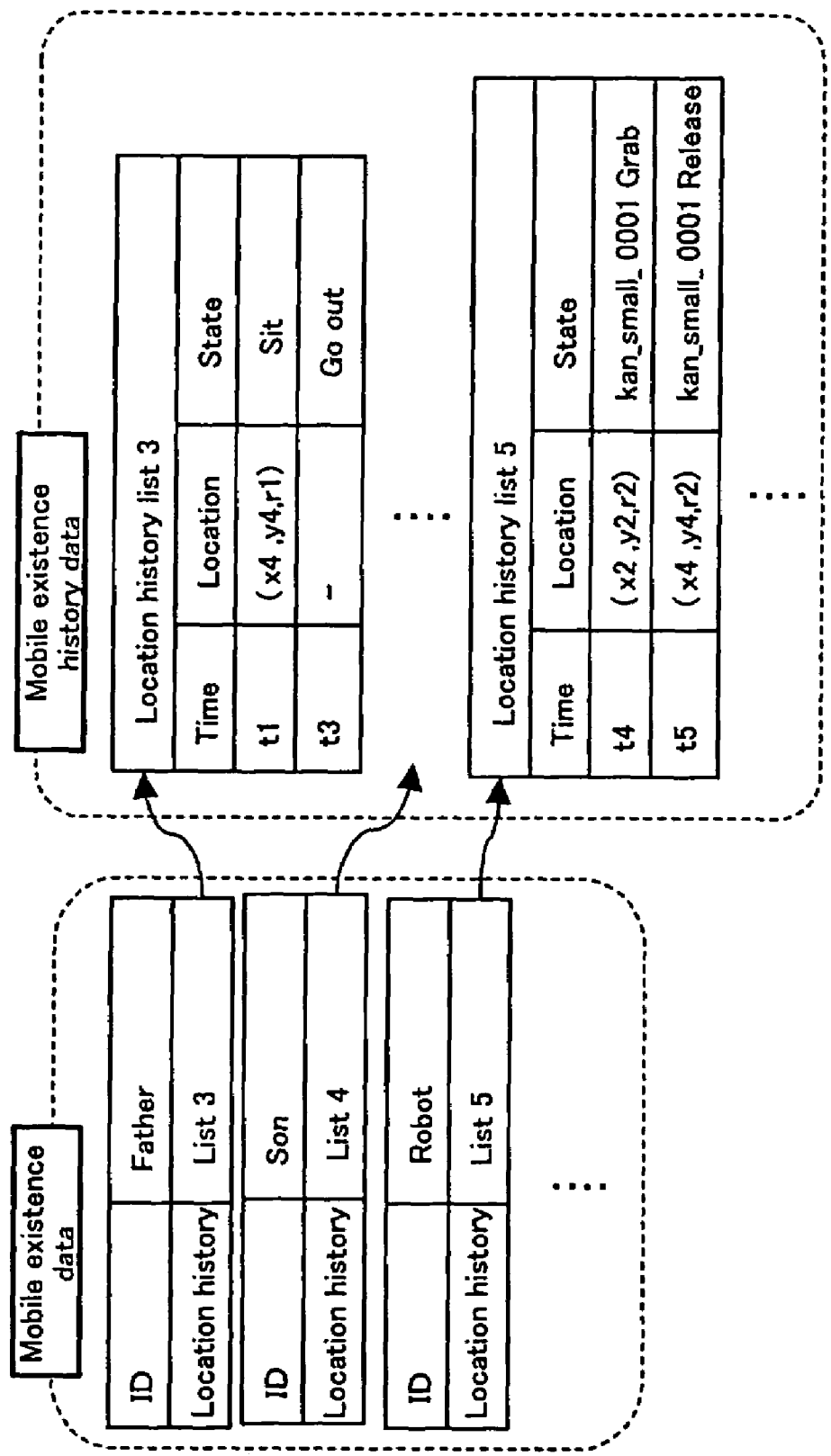
FIG. 7 shows a structure of a mobile existence database of the article/mobile existence database and an example of information stored therein.

The article/mobile existence DB 106 is a database for accumulating information about articles and mobile existences and includes, for example, an article database (DB) for storing information about articles as shown in FIG. 6 and a mobile existence database (DB) for storing information about mobile existences as shown in FIG. 7.

The article DB of FIG. 6 includes three sub-databases for separately accumulating article data, article history data, and article attribute data.

1) Article Data

Article data includes IDs for distinguishing articles, pointers to article history data, and pointers to article attribute data. In the example of FIG. 6, different IDs are assigned to physically different articles even if they are of the same type, and these articles are treated as different articles. However, articles of the same type have the same physical attribute and therefore have the same pointer to the article attribute data, although they have different IDs. With this structure, the capacity of the database can be saved.

2) Article History Data

Article history data represents a history of handling of articles. In FIG. 6, the article history data consists of four particulars, the time of handling, handling detail, handler, and the location after handling. In the example of FIG. 6, the location data is expressed by six parameters, including three parameters (x1, y1, z1) for determining the location of an article (e.g., location of the center of gravity) and three parameters (l1, m1, n1) for determining the direction of an article, although the location data can have various expressions. The handler is a mobile existence specified by the handler specifying section 32.

3) Article Attribute Data

Article attribute data represents physical attribute information that an article has and includes, for example, the weight, shape, and appearance image data of the article, etc., as shown in FIG. 6.

Figures 8, 9:
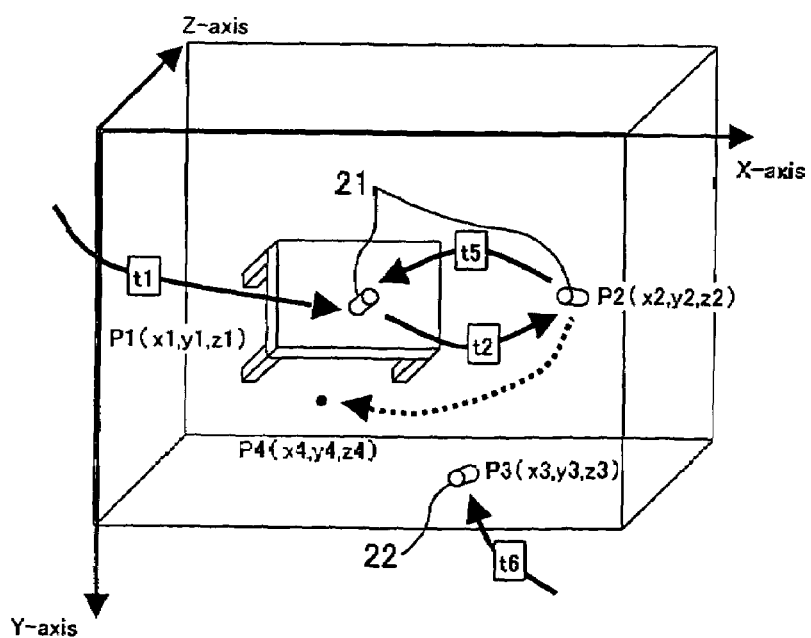
FIG. 8 shows a structure of a brought-away/brought-in database and an example of information stored therein.
FIG. 9 illustrates an example of transfer of an article in an environment.

A history of handling of an article at a particular location may be managed in another sub-database. FIG. 8 shows an example of a brought-IN/OUT database for storing a history of bringing articles in and out through a door. The history data of FIG. 8 consists of four particulars: the time of handling, handled article, handling detail, and handler. In FIG. 8, the indication of "article name @ Bag C" in the column of "Article" means that the subject article contained in Bag C passed through the door. This is detectable by a reader/writer incorporated in the bag. Referring to the brought-IN/OUT database of FIG. 8, it is seen that a father put Garment A, Towel C, and Umbrella B in Bag C and brought them out of the room at time t2.

In the brought-IN/OUT database, the destination of the father carrying Bag C and the purpose of his going out (e.g., business trip) may be registered. With these registered information, necessary articles (e.g., articles necessary for business trip) can be specified by referring to the brought-IN/OUT database by designated destination and purpose. Further, it is also possible to instruct the robot 102 to execute the task of putting the necessary articles in Bag C.

The mobile existence DB of FIG. 7 includes two sub-databases for separately accumulating mobile existence data and mobile existence history data.

1) Mobile Existence Data

Mobile existence data includes IDs for distinguishing mobile existences and pointers to the mobile existence history data. The mobile existences stored in the mobile existence data may be registered manually by a user in advance.

2) Mobile Existence History Data

Mobile existence history data consists of three particulars: the time, the location of a mobile existence at the time, and the state of the mobile existence at the time. The mobile existence has a large volume which occupies a large part of the space, as compared with articles, and is therefore likely to constitute an obstacle in the travel of the robot 102. Thus, the location of the mobile existence is preferably expressed in consideration of real-life situations such that the robot 102 can avoid obstacles during traveling. In FIG. 7, to express the location of a mobile existence by the minimum necessary information, an area occupied by the mobile existence on the floor is approximated by a circle, and the location of the mobile existence is expressed by the coordinates of the center and the radius of the circle. As a matter of course, the location of a mobile existence may be expressed more strictly. For example, the contour of a region occupied by the mobile existence on the floor may be approximated using a plurality of line segment vectors.

When the mobile existence is a human being, the state of the mobile existence is expressed by common actions of the human beings, e.g., "sit", "stand", "lie", "walk", etc. When the mobile existence is the robot 102, the state of the mobile existence is expressed by actions exerted by the robot 102 on an article, e.g., "grab", "release", etc. The state of the robot 102 is expressed not only by its action but also together with the article ID of the subject article of the action in the form of "article ID: action". Specifically, for example, "kan_small_0001 Grab". Specification of the state may be carried out as follows. For example, a plurality of candidate states for the mobile existence are prepared in advance, and it is determined based on a detection result of the sensing unit 120, or the like, which candidate state the state of the mobile existence falls within.

The article/mobile existence retrieval and management section 105 stores information about articles and mobile existences in the article/mobile existence DB 106 and updates the information every time the location of any article or mobile existence is changed. It should be noted that the update is not limited to this timing but may be carried out at an appropriate timing.

It should be noted that the article history data and mobile existence history data are preferably accumulated as for a long time as possible. With this, the history can be checked into the more distant past. The mobile existence history data are preferably accumulated with as short intervals as possible. With this, the travel routes of mobile existences, such as persons and robots, can be managed in more detail. However, since the capacity of the database is limited, data of a predetermined period are accumulated, and data older than the predetermined period may be erased whenever necessary. When the state of a mobile existence greatly changes, the interval of data accumulation may be shortened; whereas when the state of a mobile existence does not change much, the interval of data accumulation may be extended.

(Example of Updating Article/Mobile Existence DB)

Herein, the progress of an update of data in the article/mobile existence DB 106 is specifically described with reference to FIG. 6, FIG. 7, and FIG. 8.

FIG. 9 shows a situation where two cans of juice (juice cans 21 and 22) have been brought in a certain room. In FIG. 9, transfers of the juice cans 21 and 22 are shown by arrows and are assumed to have occurred in the order of time t1 to time t6. In the room of FIG. 9, a reader/writer for electronic tags is installed as the sensing unit 120. Each of the juice cans 21 and 22 and the robot 102 who enter and exit the room has an electronic tag attached thereto. The article attribute data of the juice cans 21 and 22 are read from the electronic tags attached thereto.

It is assumed that, in the article/mobile existence DB 106, registration of mobile existences in the mobile existence data and initialization of the mobile existence history data have already been performed. The article data of the article/mobile existence DB 106 is empty data wherein nothing has been recorded.

First, a father (not shown), who is a mobile existence, comes into the room with the juice can 21 in his hand. The sensing unit 120 detects the father and the juice can 21, and the detection result is transmitted to the article/mobile existence retrieval and management section 105. The section 105 allocates an ID, [kan_small_0001], to the juice can 21 and associates this ID with a pointer to the article attribute data to store these information in the article data. The article attribute data of the juice can 21 are stored together with the ID and pointer. Further, "location history list 1" is generated for storing a transfer history of the juice can 21 (see FIG. 6). At this point in time, location history list 1 is still empty. Meanwhile, to update the mobile existence history of the father, the location history corresponding to ID "Father" in the mobile existence data is referred to, and "location history list 3" is retrieved (see FIG. 7).

Then, at time t1, the father sits at position P4 (x4, y4) in the vicinity of a table and places the juice can 21 held in his hand at position P1 (x1, y1, z1) on the table. This is detected by the sensing unit 120, and the article/mobile existence retrieval and management section 105 sets data of location history list 1 of the article history data (see FIG. 6). Specifically, the following information are set:

Time: t1
Handling detail: new
Handler: father
Location after handling: P1 (x1, y1, z1, l1, m1, n1)

Herein, "new" of the handling detail means that an article which had not been in the environment was newly brought in from the outside. The article/mobile existence retrieval and management section 105 sets data in location history list 3 of the mobile existence history data (see FIG. 7). Specifically, the following information are set:

Time: t1
Location: (x4, y4, r1)
State: sit

Then, at time t2, a son, who is another mobile existence (not shown), moves the juice can 21 placed at position P1 (x1, y1, z1) on the table to position P2 (x2, y2, z2) on the floor. This is detected by the sensing unit 120, and the article/mobile existence retrieval and management section 105 sets new data of location history list 1 of the article history data (see FIG. 6). Specifically, the following information are set:

Time: t2
Handling detail: transfer
Handler: son
Location after handling: P2 (x2, y2, z2, l2, m2, n2)

Herein, handling detail "transfer" means that an article which had already been registered in the article history data was transferred. Since the location of the son changes at time t2, the article/mobile existence retrieval and management section 105 sets data of the mobile existence history data of the son (location history list 4) (not shown).

Then, at time t3, the father goes out of the room. This is detected by the sensing unit 120, and the article/mobile existence retrieval and management section 105 sets new data of location history list 3 of the mobile existence history data (see FIG. 7). Specifically, the following information are set:
- Time: t3
- Location: -
- State: Go out Herein, the indication "-" of the location means that the location is out of the coverage of the present system because the father went out of the room.

When the father goes out of the room, he instructs the robot 102 to return the juice can 21, which have been transferred by the son, to the original location on the table, i.e., position P1 (x1, y1, z1), through the console terminal 103 (this instruction to the robot 102 10 will be described later). The instructed robot 102 travels to position P2 (x2, y2, z2) to grab the juice can 21 at time t4. The article/mobile existence retrieval and management section 105 sets the data of mobile existence history data of the robot 102 (location history list 5) (see FIG. 7). Specifically, the following information are set:
- Time: t4
- Location: (x2, y2, r2)
- State: [kan_small_0001]: Grab The operation of the robot 102 may be detected by the sensing unit 120 or may be detected by the server 101 receiving the operation information from the robot 102 via a network.

Then, at time t5, the robot 102, having the juice can 21 grabbed in its holder, 20 travels to position P4 (x4, y4) in the vicinity of the table and release the juice can 21 at position P1 (x1, y1, z1) on the table. The article/mobile existence retrieval and management section 105 sets new data of location history list 5 of the mobile existence history data (see FIG. 7). Specifically, the following information are set:
- Time: t5
- Location: (x4, y4, r2)
- State: [kan_small_0001]: Release The article/mobile existence retrieval and management section 105 also sets new data of location history list 1 of the article history data (see FIG. 6). Specifically, the following information are set:
- Time: t5
- Handling detail: transfer
- Handler: robot
- Location after handling: P1 (x1, y1, z1, l1, m1, n1)

After a while, a mother, who is still another mobile existence, comes in the room together with new juice can 22. The sensing unit 120 detects the mother and the new juice can 22, and the article/mobile existence retrieval and management section 105 allocates an ID, [kan_small_0002], to the new juice can 22 and associates this ID with a pointer to the article attribute data to store these information in the article data. The article attribute data of the new juice can 22 are the same as those of the juice can 21. Further, "location history list 2" is generated for storing a transfer history of the new juice can 22 (see FIG. 6). At this point in time, location history list 2 is still empty.

Then, at time t6, the mother places the new juice can 22 at position P3 (x3, y3, z3) on the floor. This is detected by the sensing unit 120, and the article/mobile existence retrieval and management section 105 sets the data of location history list 2 of the article history data (see FIG. 6). Specifically, the following information are set:
- Time: t6
- Handling detail: new
- Handler: mother
- Location after handling: P3 (x3, y3, z3, l3, m3, n3)

It should be noted that, in FIG. 7, the mobile existence data and mobile existence history of the mother are omitted.

(Environment Map and Appliance Database)

Figure 10A:
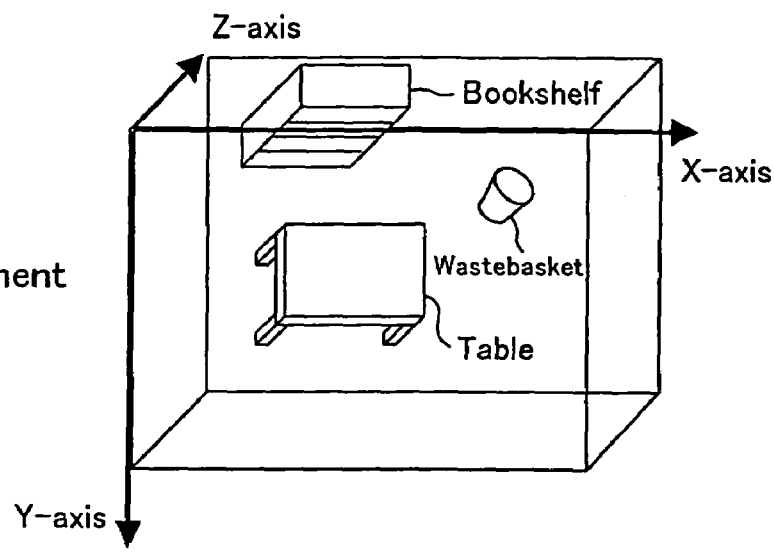
FIG. 10A, FIG. 10B and FIG. 10C illustrate examples of an environment map.
Figure 10B:
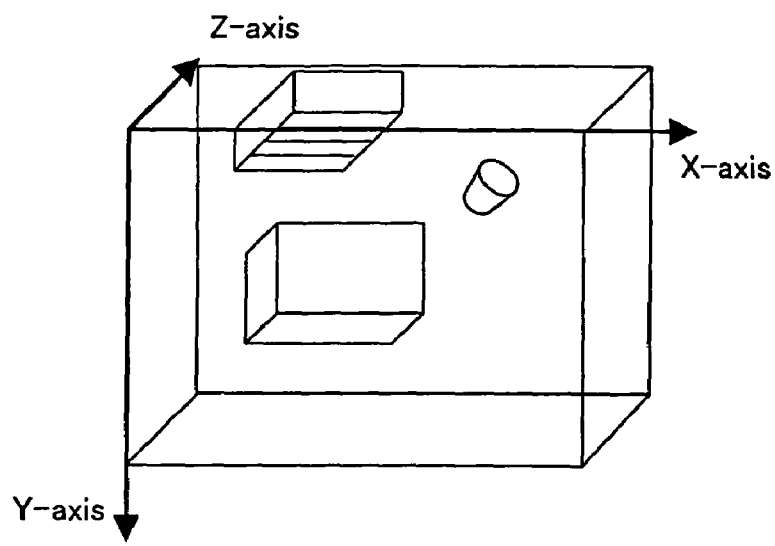
Figure 10C:
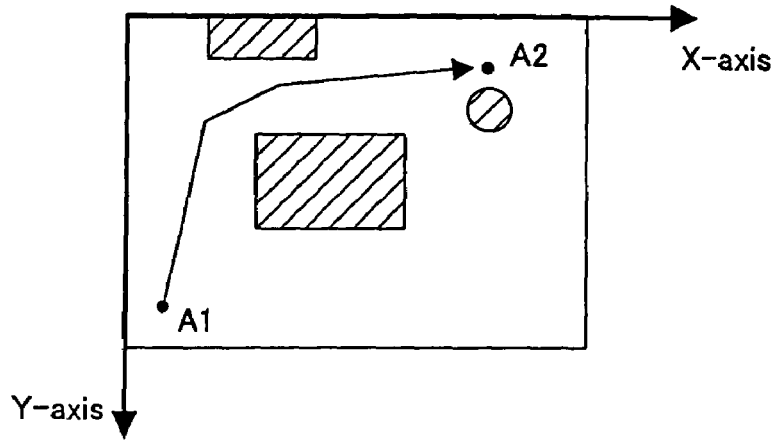

FIG. 10A, FIG. 10B and FIG. 10C shows examples of the environment map 108. FIG. 10A shows an example of a real-life environment. FIG. 10A shows an environment map obtained by simplifying the real-life environment of FIG. 10A by a cubic model. FIG. 10C shows an environment map obtained by further simplifying the map by a planer model.

The environment map 108 may be created in consideration of its purpose and time (efforts) required for creation. For example, when it is necessary to create an environment map of a cubic model within a very short period of time, a cubic object existing in the environment is modeled by the minimum rectangular parallelepiped which covers the object as shown in FIG. 10B. In FIG. 10B, a table and a bookshelf are each modeled by a rectangular parallelepiped, and a wastebasket is modeled by a generally-circular cylinder. This procedure also applies to an environment map of a planer model. In FIG. 10C, the table and the bookshelf are each modeled by a rectangular region (hatched region) projected on a plane, and the wastebasket is modeled by a circular region (hatched region). These two rectangular regions and circular region are set as a region where the robot 102 cannot move in. A cubic model of a real-life environment as shown in FIG. 10A may be used as the environment map 108.

Figure 11:
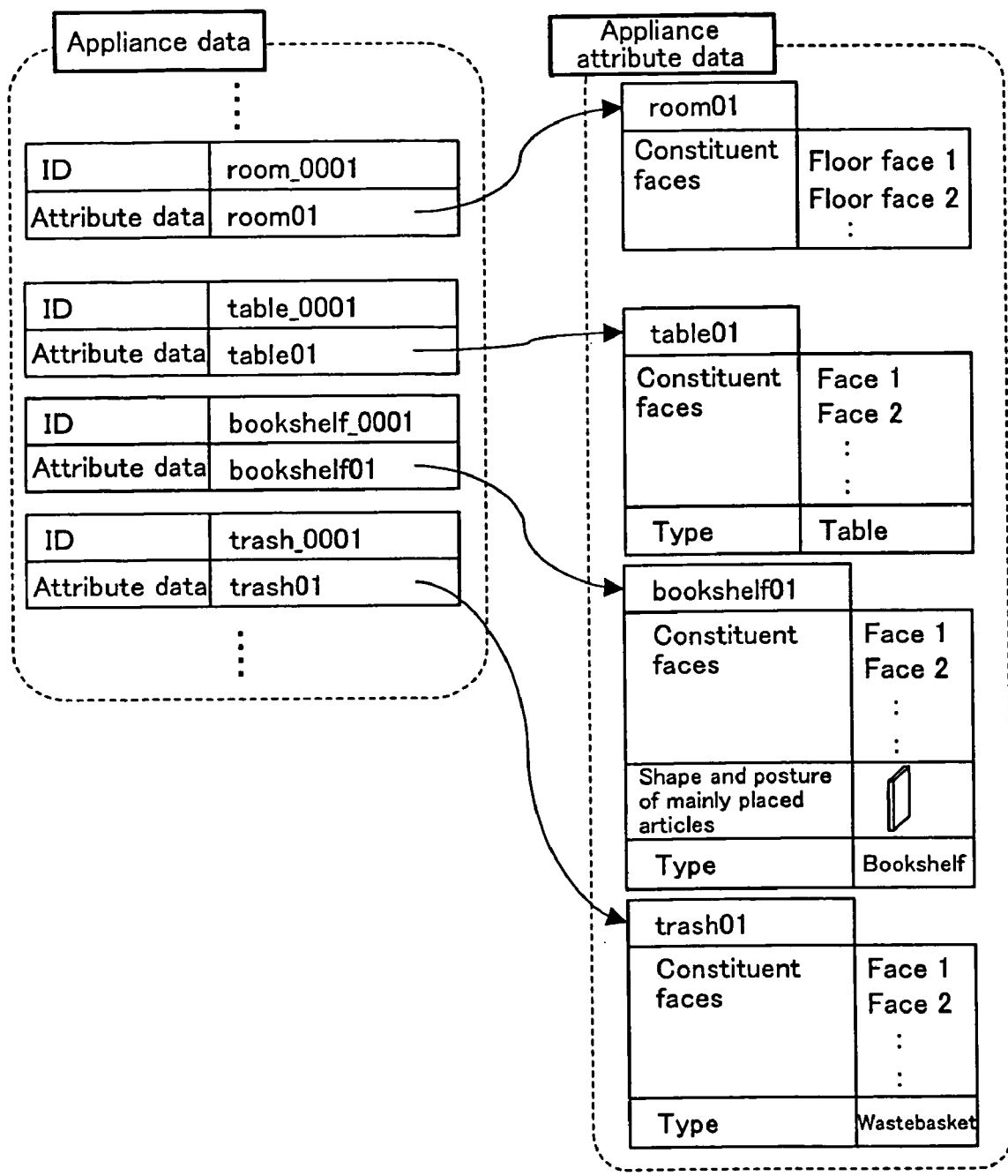
FIG. 11 shows a structure of an appliance database accompanying the environment map and an example of information stored therein.

FIG. 11 shows an example of an appliance database accompanying the environment map, which corresponds to the environment shown in FIGS. 10A to 10C. This appliance database includes two sub-databases in which appliance data and appliance attribute data are accumulated.

1) Appliance Data

Appliance data includes IDs for specifying an environment itself and various appliances in this environment (the appliances are different from articles in that they are fixed to or installed in the environment and do not fall within the subjects of handling of a robot) and pointers to the appliance attribute data. In FIG. 11, an ID, "room_0001", is allocated to the environment (room), and IDs, "table_0001", "bookshelf_0001", and "trash_0001", are allocated to a table, bookshelf, and wastebasket, which exist in the environment.

2) Appliance Attribute Data

The appliance attribute data relating to the environment itself includes floor face data in the environment. For example, if the environment has a plurality of floor faces at different levels, a number of floor face data pieces (floor face 1 and floor face 2 in FIG. 11) equal to the number of floor faces are accumulated. For example, the floor face data is expressed as follows:

((X1, Y1, Z1), (X2, Y2, Z2), (X3, Y3, Z3), (X4, Y4, Z4), 2200, 0).

Herein, the first four sets of coordinate values represent real-world coordinates at the corners of the floor face. The subsequent value (2200) represents the distance (mm) between the floor face and the ceiling. The last value (0) means the type of floor face. For example, "0" means wood floor, "1" means tatami floor (Japanese traditional mat), and "2" means carpet.

The appliance attribute data relating to an appliances, such as furniture, or the like, includes data of the faces which constitute the appliance (face 1, face 2) and the type of the appliance. If the appliance has a face on which articles are placeable, the appliance attribute data further includes the shape and posture of articles mainly placeable thereon. Specifically, data of a face which constitutes an appliance is expressed as follows:

((X1, Y1, Z1), (X2, Y2, Z2), (X3, Y3, Z3), 1, 400).

Herein, the three sets of coordinate values represent real-world coordinates at the corners of the floor face. The subsequent value (1) is a flag indicative of whether or not an article is placeable on the face. For example, "1" means that an article is placeable, and "0" means unplaceable. The last value (400) indicates, if an article is placeable on the surface, the maximum allowable height (mm) of the placeable article. For example, when the face is the top plate of a table, the distance between the top place and the ceiling is the maximum allowable height. When the face is one of the shelf faces of a bookshelf, the distance between the shelf face and an upper neighboring shelf is the maximum allowable height.

The "shape of mainly placed articles" in the appliance attribute data mean the shape of articles accommodated in the appliance. The type of the appliance is a bookshelf, it is the "shape of a book". That is, a rectangular parallelepiped where the depth and height are much greater than the width is the shape of a mainly placed article of the bookshelf. The "posture of mainly placed articles" mean the posture of articles accommodated in the appliance. When the type of an appliance is a bookshelf, the "posture" means in what posture a book is placed on a shelf face of the bookshelf. In general, it is the upright posture of the book. With the data of the "shape and posture of mainly placed articles" accumulated in the appliance attribute data, for example, when the task of transferring a book to a bookshelf is assigned to the robot 102, the robot 102 places the designated book upright on a shelf of the bookshelf based on the data of the "shape and posture of mainly placed articles".

It should be noted that appliances of certain types do not have data of the "shape and posture of mainly placed articles". For example, a table and wastebasket are not limited to particular shape and posture of articles. Therefore, the appliance attribute data of the table and wastebasket do not have data of the "shape and posture of mainly placed articles".

<Structure of Laborer Robot>

The laborer robot 102 handles articles in an environment. Herein, it is assumed that the robot 102 carries out the task of transferring an article in an environment according to an instruction of a user.

As shown in FIG. 2, the robot 102 includes: an obstacle sensor 111 for detecting obstacles around the robot 102; a grabbing element 112 for grabbing an article; a travel plan generator 113 for generating a travel plan with reference to the environment map 108; and a travel device 114 for moving the robot 102 itself. A transceiver 109 transmits/receives various data to/from the environment management server 101 and the console terminal 103. A controller 115 controls the obstacle sensor 111, the transceiver 109, the grabbing element 112, the travel plan generator 113 and the travel device 114.

Figure 12:
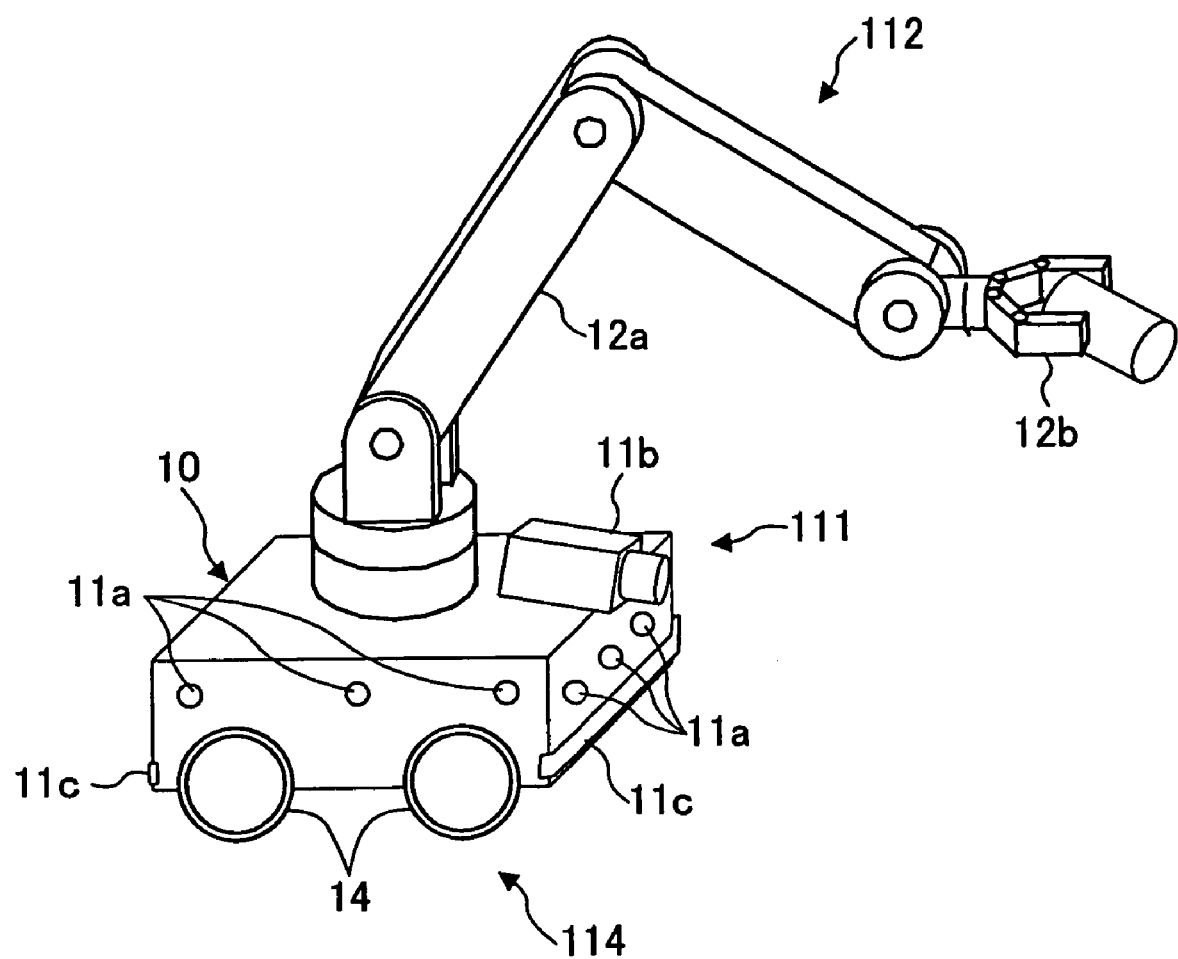
FIG. 12 generally shows an example of the structure of a laborer robot.

FIG. 12 schematically shows an example of the structure of the robot 102. The robot 102 has a generally box-like main body 10 for accommodating the travel plan generator 113, the controller 115, etc. Hereinafter, the right side of the sheet of FIG. 12 is referred to as the front side, the left side of the sheet is referred to as the rear side, the backward side of the sheet is referred to as the left side, and the frontward side of the sheet is referred to as the right side.

The grabbing element 112 is formed by a joint arm 12a and a hand 12b provided at the end of the arm 12a. The grabbing element 112 is fixed on the upper surface of the main body 10. The arm 12a and the hand 12b may have a motor-controlled actuator or may have an actuator of other type, for example, an artificial muscle actuator. In this system, the grabbing element 112 has a reader/writer as the sensing unit 120 on the assumption that electronic tags are attached to articles existing in the environment. When an article is grabbed by the grabbing element 112, the reader/writer reads information written in its electronic tag, whereby it becomes possible to specify the grabbed article. The reader/writer incorporated in the grabbing element 112 may be omitted.

The travel device 114 is formed by wheels 14, two of which are attached on the right side of the main body 10, and the other two being attached on the left side (in FIG. 12, the left side wheels are not shown). The structure of the travel device 114 may be optimally selected according to the environment in which the robot 102 is used. For example, in the case where the floor of the environment has a greatly-irregular surface, the travel device 114 may be a crawler device or myriapod device.

In this example, the obstacle sensor 111 is formed by ultrasonic sensors 11a, a camera (visual sensor) 11b, and collision sensors 11c. The ultrasonic sensor 11a emits an ultrasonic wave and measures the time that has passed until reception of a reflection of the ultrasonic wave to calculate a general distance to an obstacle, thereby detecting obstacles in a nearby area to avoid collision. Each of the side faces (front face, rear face, and right and left faces) have three ultrasonic sensors 11a. The camera 11b captures the situations around the robot 102 in the form of images (pictures). These images are subjected to a recognition process, and the like, to determine the presence/absence of an obstacle or gain more correct information about an article which is to be grabbed. The camera 11b is provided at the front part of the main body 10. The collision sensor 11c detects certain impact applied to the robot 102. For example, collision of a moving obstacle with the robot 102 or collision of the traveling robot 102 with an obstacle is detected by the collision sensor 11c. Each of the front face and rear face of the main body 10 has the collision sensor 11c.

In this embodiment, the laborer robot 102 is an automotive robot which has the travel device 114 formed by the wheels 14, but the laborer robot 102 is not limited to this structure. For example, the laborer robot 102 may be built such that the grabbing element 112, which is formed by the above-described arm 12a and hand 12b, is combined with a guide rail fixed on the ceiling of the environment. In the laborer robot 102 having this structure, the grabbing element 112 moves along the guide rail to a designated location, whereby the task of transferring a designated article to the designated location in the environment is carried out.

The laborer robot 102 may be built such that a plurality of grabbing elements 112 (each consisting of an arm 12a and a hand 12b) are fixed at predetermined positions in the environment. In this case, the grabbing elements 112 are distributed such that every article existing in the life space is grabbable by any of the grabbing elements 112. In the process of transferring a designated article to a designated location, the laborer robot 102 having this structure selects one of the grabbing elements 112 whose hand 12b can reach the article. The selected grabbing element 112 grabs the article and transfers the article to the designated location using its arm 12a and hand 12b. If the arm 12a of the selected grabbing element 112 does not reach the designated location, the article is handed among the plurality of grabbing elements 112 to reach the designated location.

When a transfer task of an article or a transfer which accompanies other task is designated, the travel plan generator 113 generates a travel plan of the robot 102 from the current location to a destination with reference to the environment map 108. As shown in FIG. 10C, unpassable regions (hatched regions) are set in the environment map 108. Therefore, when a travel route is generated within an area excluding the unpassable regions, the generated travel route can avoid obstacles. For example, in FIG. 10C, in the case of a travel from point A1 to point A2, a route avoiding the unpassable regions (shown by an arrow) is generated in consideration of the size of the robot 102. The generation of a travel route may use the most popular Dijkstra method. When the environment is complicated, a route search algorithm improved from the Dijkstra method may be used. A mode where a user designates the travel route of the robot 102 may be provided as a countermeasure to the case where an excessively-complicated environment disables calculation of the travel route or causes consumption of a considerable time for the calculation.

(Control Command of Robot)

The controller 115 interprets a robot control command string mainly transmitted from the environment management server 101 through the transceiver 109 and sequentially executes the control commands.

The robot control command is a command for controlling the grabbing of an article or the traveling of the robot 102 itself. The robot control command generally includes three commands, "move", "grab", and "release". These three commands are described below in brief.

1) Move: (Move, Coordinates) or (Move, Appliance ID)

The "Move" command is a command for moving the robot 102 from the current location to a location designated by coordinates or to a location of an appliance designated by an application ID. The coordinates are designated based on the world coordinate system. A travel route from the current location to the destination is planned by the travel plan generator 113. In the case of traveling to the location of an appliance designated by an application ID, a route away from the appliance by a predetermined distance is generated. In this case, the appliance attribute data in the environment map is used.

2) Grab: (Grab, Article ID)

The "Grab" command is a command for grabbing an article designated by the article ID using the hand 12b. The article is located by referring to the article DB, and the grabbing plan is generated by the grabbing element 112.

3) Release: (Release)

The "Release" command is a command for releasing an article from the hand 12b.

For example, when the task of transferring a certain article to a certain location is assigned by the user, the task is divided into four task units: "transfer (of the article to location B1)", "grab (of the article)", "travel (to location B2)", and "release (of the article)". In this case, the robot control command string is:

move, B1 (moving the robot to location B1 at which an article exists);

grab, article ID (grabbing the article existing at location B1);

move, B2 (traveling to location B2 (with the article grabbed)); and release (releasing the grabbed article).

When a transfer of a plurality of articles is assigned, a set of the above four commands is duplicated by the number of articles, and the controller 115 executes the control commands sequentially for all the articles.

As a matter of course, the robot control command is not limited to the above three types of commands but may further include other types of commands when necessary.

Figure 13:
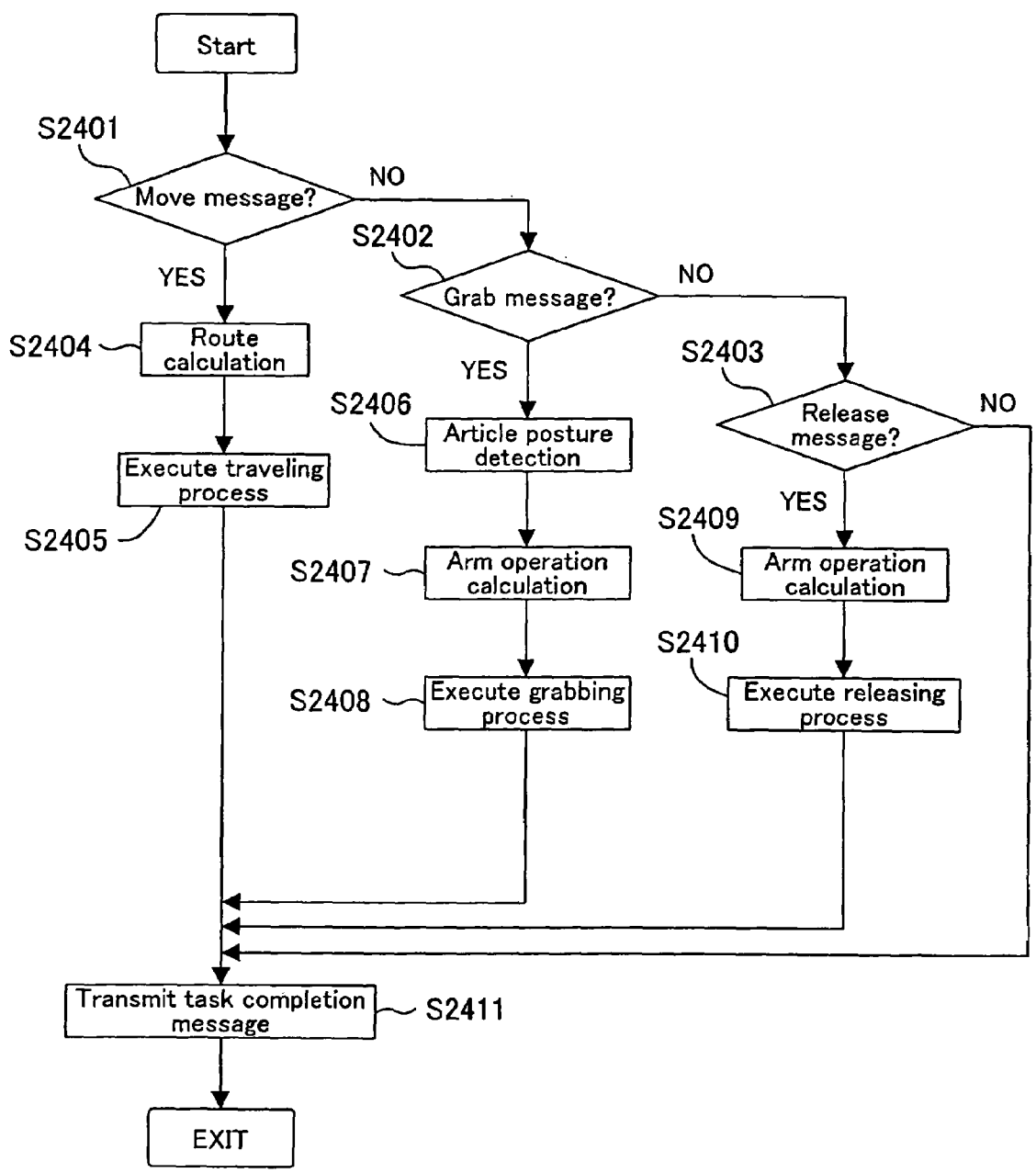
FIG. 13 is a flowchart illustrating an operation of a controller of the laborer robot.

FIG. 13 is a flowchart illustrating an example of the operation of the controller 115. When the transceiver 109 receives a control command string transmitted from the environment management server 101, the controller 115 determines what task unit it is (S2401 to S2403) and executes a process based on the determined task unit.

If the task unit is "travel" (YES at S2401), the route to a designated location is generated by the travel plan generator 113 (S2404). A move control command issued according to the route generated by the travel plan generator 113 is transmitted to the travel device 114. Based on the move control command, the travel device 114 executes the process of traveling to the designated location (S2405).

If the task unit is "grab" (YES at S2402), the posture of an article to be grabbed is detected by the obstacle sensor 111 (S2406), and the operation of the arm 12a and hand 12b is calculated according to the detection result (S2407). Then, a grab control command is transmitted to the grabbing element 112. Based on the grab control command, the grabbing element 112 executes the process of grabbing the article (S2408). It should be noted that since the posture of the article is recorded in the article/mobile existence database 106 of the environment management server 101, a query about the posture of the article may be issued to the server 101.

If the task unit is "release" (YES at S2403), the operation of the arm 12a and hand 12b is calculated such that the article is placed at the designated destination (S2409). Then, a release control command is transmitted to the grabbing element 112. Based on the release control command, the grabbing element 112 executes the process of releasing the article (S2410).

When the operations of the move, grasp, and release commands are completed, a message of completion is transmitted to the server 101 which is the task assigner (S2411). In this way, the task assigned through the console terminal 103 is executed by the robot 102.

<Structure of Console Terminal>

The console terminal 103 is a user interface of this system, which is used for instructing the robot 102 to execute the task of handling an article or issuing a query about an article.

As shown in FIG. 2, the console terminal 103 includes: a display section 117 formed by, for example, a CRT or liquid crystal display, for displaying a console window; an input section 116 formed by, for example, a pointing device, for instructing the robot 102 on the task on the console window; and a display controller 118 for controlling display-related operations, for example, generation of a console window to be displayed on the display section 117. The transceiver 109 transmits the task or query details of the robot 102, which have been input to the input section 116, to the server 101 and receives a reply to the query from the server 101. A controller 119 controls the transceiver 109, the input section 116, the display section 117 and the display controller 118.

For example, a general-purpose PC may be used as the console terminal 103. In this case, a control program for executing the processes is installed in the PC, whereby the PC can be used as the console terminal 103.

The display controller 118 generates a console window based on information obtained from the server 101, specifically, data of images of the environment captured by a camera as the sensing unit 120, data accumulated in the article/mobile existence database 106, and the environment map 108. The generated console window is displayed on the display section 117.

(Console Mode)

The present system includes several console modes for a user designating a task allocated to a robot. The console modes are switched by the user using the input section 116. Herein, the "virtual space console mode" is described as an example of the console mode.

Figure 14:
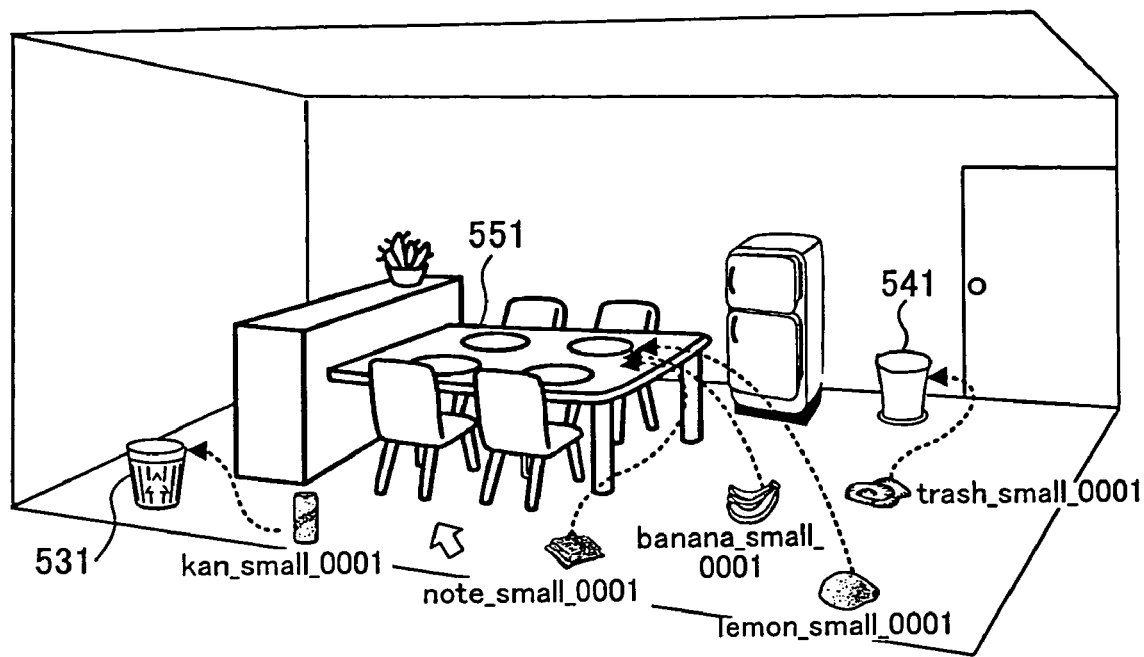
FIG. 14 is an example of a console window displayed in a virtual space console mode.

FIG. 14 shows an example of the console window displayed on the display section 117 of the console terminal 103 in the virtual space console mode. This console window is formed by a virtual space which simulates a real-life environment. This virtual space is created based on image data obtained by a camera(s) (not shown) installed in the environment.

The console window of FIG. 14 has a cursor (pointer) and article icons placed in the virtual space such that the article icons correspond to article existing in the environment. Specifically, the console window includes icons of an empty can (kan_small_0001), lemon (lemon_small_0001), a notebook (note small_0001), banana (banana_small_0001), and paper trash (trash_small_0001). In the virtual space console mode, article icons on the console window are generated only for articles handleable by the robot 102 but not generated for appliances unhandleable by the robot 102, such as furniture, and the like, although the appliances are shown on the console window.

In this console window, the user moves the cursor on the console window using the input section 116 of the console terminal 103 to designate a task assigned to the robot 102. To instruct the robot 102 to transfer an article, the user designate a desired article icon and a desired location in the virtual space. This console window is configured such that the article icons are movable in the virtual space by "dragging". In this console window, a desired article icon in the virtual space is designated by the cursor, and the designated article icon is drag-and-dropped onto a desired destination in the virtual space, whereby the article and the destination of the article are designated.

Arrows in FIG. 14 illustrate the drag-and-drop operations for transfer of empty can icon (kan_small_0001) to a recycle wastebasket 531, transfer of lemon icon (lemon_small_0001), notebook icon (note_small_0001) and banana icon (banana_small_0001) to a table 551, and transfer of paper trash icon (trash_small_0001) to a general trash wastebasket 541.

The virtual space included in the console window of this example is image data obtained by the camera, and therefore, it is necessary to specify which region of the image data corresponds to an article icon. To this end, the console window has, in addition to the image data which constitutes the virtual space, window mask data which correspond to the image data on a one-to-one basis and specify the location of an article icon in the virtual space.

In the window mask data, mask data is set to be corresponding to a region on the console window where an article icon is placed. When the location (coordinate values) of an article icon is designated by the cursor on the console window, the same coordinate values are referred to in the window mask data, whereby it is determined whether or not the designated region is an article (article icon). Further, a pointer to article data of the article database (see FIG. 6) is described in the coordinate data of the mask data in the window mask data. When an article icon is designated, the article data is referred to using the pointer described in the coordinate data as a key, whereby it is specified which article is indicated by an article icon selected by the cursor on the console window. This window mask data car, be generated by a background difference image because the location of an article in an image captured by a camera is specified in the background difference image.

When a transfer task of the article is designated by drag-and-dropping an article icon on the console window, a message of this task is transmitted from the console terminal 103 to the environment management server 101. This message may include at least the information that the task is a transfer of an article, the information about an article to be transferred, and the coordinates of the transfer destination.

When receiving the message, the server 101 refers to the article database to generate a robot control command string according to the message, and transmits the generated robot control command string to the robot 102. The controller 115 of the robot 102 executes a control command according to the flowchart of FIG. 13. As a result, this laborer robot 102 executes the task of transferring the article designated on the console window to the location designated in the virtual space.

As described above, in the virtual space console mode, the console window displayed on the display section 117 of the console terminal 103 is formed by a virtual space which simulates a real-life environment. The transfer task of an article can be designated by an intuitive operation, i.e., drag-and-dropping an article icon in the virtual space onto a desired destination in the virtual space. Therefore, a user can designate a task assigned to a robot very easily. As a matter of course, the operation mode is not limited to the virtual space console mode described in this section.

In this embodiment, a console terminal shows an image which represents a predetermined life space on a display section. A user uses the console terminal to designate an action exerted on an article included in the image. Receiving the user's designation from the console terminal, a server refers to an article database to convert the designation to a robot-executable control command and transmits the control command to a robot. With such an article handling method, a user can readily instruct a life-support robot to work appropriately in a complicated situation in the life space.

In this embodiment, a console terminal shows an image which represents a predetermined life space on a display section. A user uses the console terminal to issue a query about an article included in the image. Receiving the user's query from the console terminal, a server refers to an article database to generate information which is to be presented to the user and transmits the generated information to the control terminal. With such an article management method, a user can readily acquire correct information about an article in a complicated situation in the life space.

Effects of the Invention

As described above, according to the present invention, it is possible to instruct a life-support robot to work appropriately in a complicated situation in a life space where articles exist at various locations and the locations change from moment to moment. Further, it is possible to provide a user with precise information about articles. As a result, it is possible to support handling of articles and article management by a human being.

(Embodiment 2)

Herein, an objective of the present invention is to provide a non-industrial article handling system for instructing a robot to handle an article in a life space in which people live their lives, such as a house of an ordinary household, office, hotel, store, hospital, or the like, wherein appropriate presentation of the conditions of a life space to a user and easy designation of a task assigned to a robot are enabled.

An article handling system of the present invention includes a robot for handling an article existing in a predetermined life space and a console unit which has a display section for displaying a console window and an input section which serves as an interface for a user. The display section displays a console window which includes a virtual space simulating the actual conditions of the life space. The user uses the input section to designate a task assigned to a robot in the virtual space. The robot handles an article in the life space based on the designated task.

According to the above structure, a console window is displayed on the display section of the console unit. The console window displayed on the display section includes a virtual space which simulates the actual conditions of the life space. Herein, simulation of the virtual space to the actual condition of the life space means that the conditions of the virtual space and the actual condition of the life space correspond to each other. The user uses the input section to designate a task assigned to a robot in the virtual life space of the console window. After the task has been thus assigned, the robot handles an article in the life space based on the task.

Thus, according to the present invention, a console window includes a virtual space which simulates the actual conditions of a life space. Therefore, although the actual conditions of the life space, such as an ordinary house, or the like, are more complicated than those of a factory or warehouse, the complicated conditions are displayed in the form of a console window as they are. For example, although arrangement of articles is random in a life space, articles are placed in the virtual space according to the random arrangement of the articles in the life space. In this way, the complicated conditions of the life space are presented to users in an appropriate and clear fashion.

Further, according to the present invention, the task assigned to the robot is designated in the virtual space. With this feature, the task for the robot in the life space under the complicated conditions can be readily designated.

In the first example of this embodiment, there is provided an article handling system, comprising: a robot for handling an article existing in a predetermined life space; and a console unit which has a display section for displaying a console window and an input section which serves as an interface for a user, wherein a console window which includes a virtual space simulating the actual conditions of the life space is displayed on the display section; the user uses the input section to designate a task assigned to the robot in the virtual space; the robot handles an article in the life space based on the designated task.

According to the second example, in the first example, the task carried out by the robot is a transfer of an article in the life space.

According to the third example, in the second example, the console window has an article icon placed in the virtual space such that the article icon corresponds to an article existing in the life space, and the transfer of the article is designated by manipulating the article icon.

According to the fourth example, in the third example, the transfer of the article is designated by drag-and-dropping a desired article icon onto a desired transfer destination in the virtual space.

According to the fifth example, the article handling system of the first example further comprises an image capturer for capturing images of the life space, wherein the virtual space of the console window is constructed from data of the images captured by the image capturer.

According to the sixth example, in the fifth example, the console window includes image data which constitute a virtual space, an article icon placed in the virtual space such that the article icon corresponds to an article existing in the life space, and window mask data which includes coordinate values corresponding to the image data and specifies the location of an article icon in the virtual space.

According to the seventh example, in the sixth example, the article handling system further includes a sensing unit for detecting the location of an article in the life space, wherein the window mask data is generated based on the location of the article which is detected by the sensing unit.

According to the eighth example, in the first example, the console window includes an article icon placed in the virtual space such that the article icon corresponds to an article existing in the life space and a pointer, and when the pointer points at an article icon corresponding to an article handleable by the robot on the console window, the article icon is highlighted.

According to the ninth example, in the first example, the console window includes an article icon placed in the virtual space such that the article icon corresponds to an article existing in the life space and a pointer, and when the pointer points at an article icon corresponding to an article handleable by the robot on the console window, information about the article is displayed.

According to the tenth example, in the first example, the console window includes an article icon placed in the virtual space such that the article icon corresponds to an article existing in the life space and a pointer, and when an article is selected as a task subject of the robot by designating a corresponding article icon on the console window, the article icon is highlighted.

According to the eleventh example, in the first example, a viewpoint of the virtual space included in the console window is switchable.

According to the twelfth example, there is provided a robot controller unit for designating a task which is assigned to a robot for handling an article existing in a predetermined life space, comprising: a display section for displaying a console window; and an input section which serves as an interface for a user, wherein the display section displays a console window which includes a virtual space simulating the actual conditions of the life space; and the user uses the input section to designate a task assigned to the robot in the virtual space.

According to the thirteenth example, there is provided an article handling method which uses a robot for transferring an article existing in a predetermined life space, comprising the steps of: displaying a console window which includes a virtual space simulating the actual conditions of the life space and an article icon placed in the virtual space such that the article icon corresponds to an article existing in the life space; designating a desired article icon on the console window; drag-and-dropping the designated article icon onto a desired transfer destination in the virtual space; and transferring by the robot an article corresponding to the designated article icon to a location corresponding to the transfer destination designated in the virtual space.

According to the fourteenth example, the method of the thirteenth example further comprises switching the viewpoint of the virtual space included in the console window.

Embodiment 2 of the present invention relates to an article handling system which instructs a laborer robot to handle an article existing in a life space. In this embodiment, a room in a building, e.g., a room of an ordinary house, is considered as a subject space for the article handling system (hereinafter, referred to as "environment"). In this embodiment, the laborer robot transfers an article designated by a user to a designated position, although the handling of an article by the laborer robot can include various tasks.

The structure of the system of this embodiment is the same as that shown in FIG. 2 described in embodiment 1. The components common among embodiment 2 and embodiment 1 are not described herein in detail.

Figure 15A:
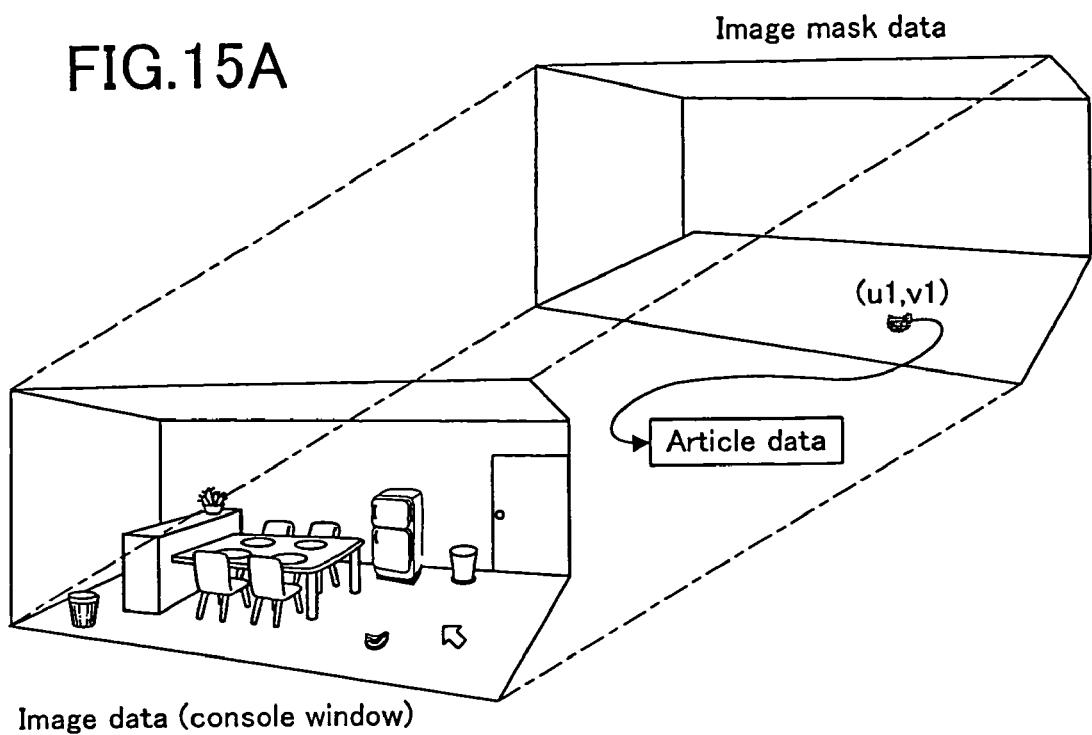
FIG. 15A and FIG. 15B show a structure of a console window consisting of image data and window mask data.
Figure 15B:
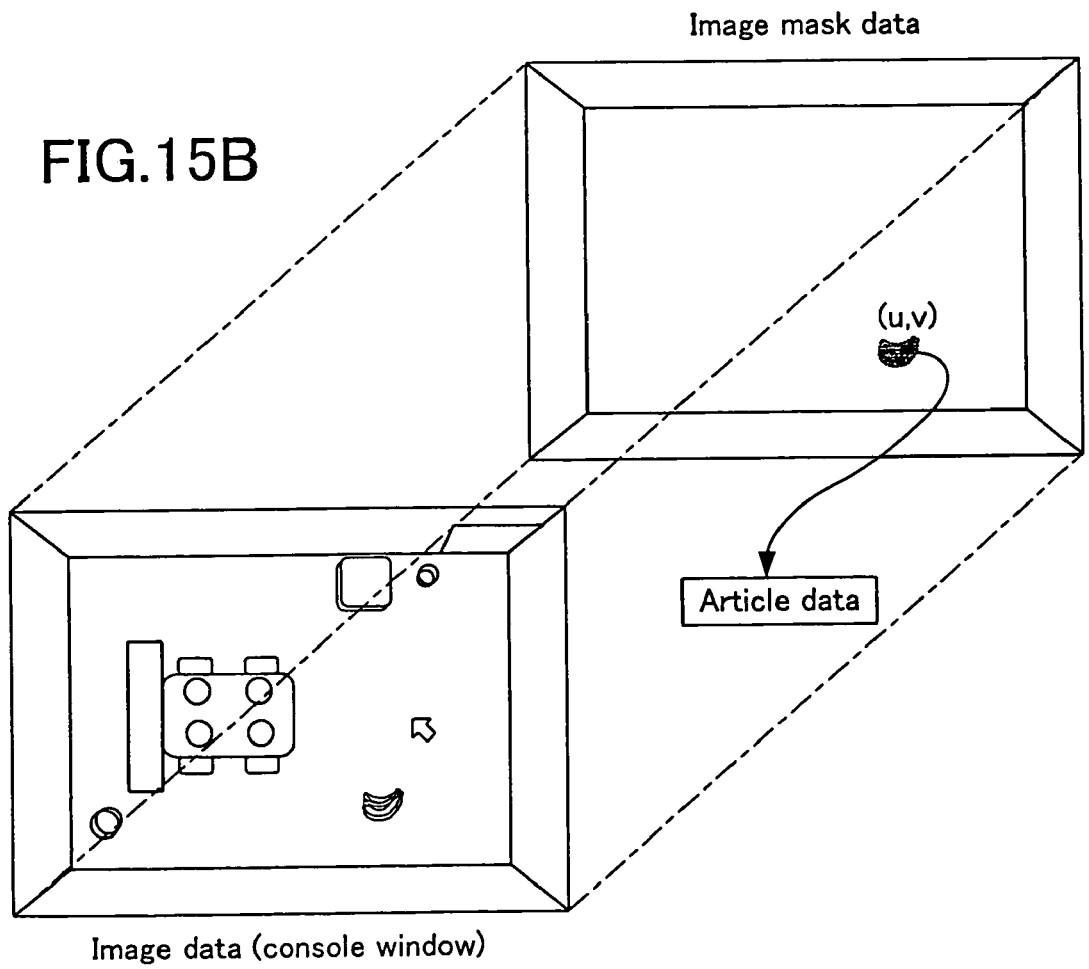

First, a console window generated by the display controller 118 and displayed on the display section 117 is described. FIG. 15A and FIG. 15B show an example of the console window. This console window is formed by a virtual space which simulates actual conditions of the environment.

The virtual space has a plurality of different viewpoints. In this embodiment, the virtual space has two viewpoints: the viewpoint for looking at the virtual space in a generally horizontal direction as shown in FIG. 15A; and the viewpoint for looking down the virtual space as shown in FIG. 15B. The viewpoints of the virtual space included in the console window are switched by a user through the console terminal 103.

The virtual space included in the console window is generated based on image data captured by a camera (not shown) installed in the environment. The plurality of virtual space viewpoints based on the camera images are realized by, for example, the following methods.

The first method is constructing a virtual space based on image data captured by a plurality of cameras installed in the environment. For example, cameras are installed on a side wall and ceiling of the environment (room). The virtual space of the viewpoint of FIG. 15A is constructed based on image data captured by the camera installed on the side wall, while the virtual space of the viewpoint of FIG. 15B is constructed based on image data captured by the camera installed on the ceiling.

At least one camera is installed at an appropriate location in the environment, and camera images captured by the at least one camera are transformed and synthesized to create an image (virtual space) viewed from an arbitrary viewpoint. Such a method of creating an image viewed from an arbitrary virtual viewpoint based on camera images is disclosed in the gazette of Japanese Patent No. 3286306 and, therefore, the detail descriptions thereof are herein omitted.

In this embodiment, it is assumed that the virtual space of the viewpoint of FIG. 15A is constructed based on image data captured by the camera (sensing unit 120) installed on the side wall in the environment (hereinafter, also referred to as "camera viewpoint image"), while the virtual space of the viewpoint of FIG. 15B is constructed based on image data obtained by transforming and synthesizing image data captured by the camera (hereinafter, also referred to as "virtual viewpoint image"). That is, the number of viewpoints that a virtual space included in the console window has does not necessarily need to be equal to the number of camera viewpoints for capturing image data based on which the virtual space is constructed.

The console window has a cursor (pointer) and an article icon placed in the virtual space such that the article icon corresponds to an article existing in the environment (in the example of FIG. 15A and FIG. 15B, banana is an article icon). The article icon may be presented in any form perceivable as an article by a user. For example, the icon may be in the form of an animation image (pictorial image) of an article or may be in the form of a camera picture of an article which is automatically or manually cut out of a camera image that includes the article.

A user controls the cursor in the console window through the input section 116 of the console terminal 103 to handle icons, thereby designating a task assigned to the robot. In this embodiment, the article icon is constructed to be movable in the virtual space included in the console window by dragging, although the procedure for designating the task on the console window will be described later. To instruct the robot 102 to transfer an article, a desired article icon in the virtual space is designated by the cursor, and a desired transfer destination in the virtual space is designated by the cursor, whereby the transfer task is designated. It should be noted that appliances existing in the environment, such as furniture, and the like, are not in the form of article icons, although they are shown on the console window. Only the articles handleable by the robot 102 are shown in the form of article icons on the console window.

The virtual space included in the console window is, as described above, image data captured by a camera(s) or image data obtained by transforming and synthesizing the image data captured by the camera(s), and therefore, it is necessary to specify which part of the image data corresponds to article icons. To this end, the console window includes window mask data for specifying the location of an article icon in the virtual space in addition to the image data which constitutes the virtual space (and the transformed and synthesized image data). The window mask data corresponds to the image data (virtual space) on a one-to-one basis. Herein, the phrase "corresponds . . . on a one-to-one basis" means that coordinate values correspond between these data.

FIG. 15A and FIG. 15B show an example of the window mask data which corresponds to image data included in the virtual space (console window) on a one-to-one basis. In this window mask data, mask data (see shaded part of FIG. 15A and FIG. 15B) corresponding to a region in which an article icon is placed on the console window is set, and a pointer to article data of the article database (see FIG. 6) is described in the coordinate data of this mask data. This pointer corresponds to an article associated with the article icon and makes it possible to determine which article is indicated by each article icon included in the console window.

When the location of an article icon (coordinate values) is designated by the cursor on the console window including the virtual space, the same coordinate values are referred to in the window mask data, whereby it is determined whether or not the designated region is an article (article icon) or not. When the location of the article icon is designated, the article data is referred to using the pointer described in the coordinate data as a key whereby it is specified which article is designated by an article icon indicated by the cursor on the console window.

In the case where a virtual space of the console window is constructed by an image captured by a camera (sensing unit 120) as shown in FIG. 15A, image mask data corresponding to the virtual space on a one-to-one basis can be generated by the background difference method because the location of an article in the image captured by the camera is specified in this background difference method.

In the case where a virtual space of the console window is constructed by an image obtained by transforming and synthesizing camera images, i.e., virtual viewpoint image (see FIG. 15B), window mask data corresponding to the virtual space on a one-to-one basis may be generated as described below.

Figure 16A:
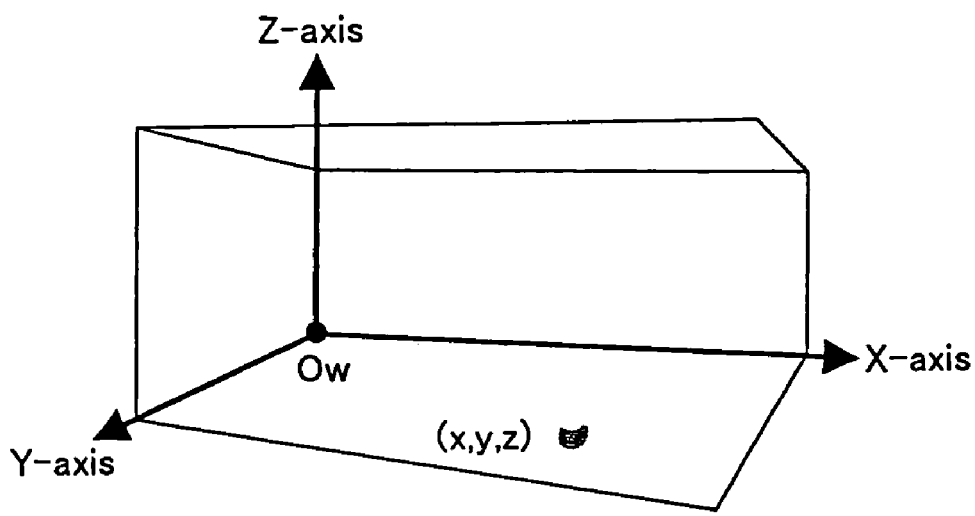
FIG. 16A and FIG. 16B show the relationship between an actual world coordinate system and a virtual viewpoint coordinate system established in an environment.
Figure 16B:
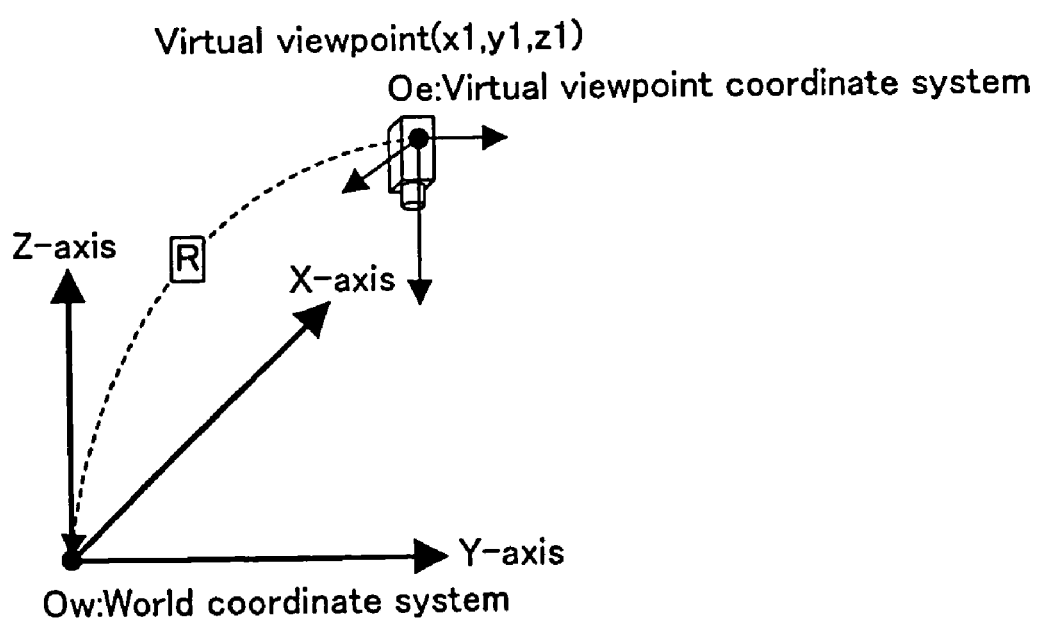

FIG. 16A and FIG. 16B illustrate generation of window mask data of a console window which is constructed based on a virtual viewpoint image. In FIG. 16B, the coordinate system defined by X-, Y- and Z-axes, where Ow is the origin, is a real world coordinate system. In this coordinate system, the location of a virtual viewpoint (corresponding to the ceiling of the environment) is expressed by (x1, y1, z1). Meanwhile, a virtual viewpoint coordinate system, where virtual viewpoint Oe, is the origin is provided. The coordinate values (x, y, z) shown in FIG. 16A are coordinate values at an arbitrary point in the real world coordinate system in a region including an article detected by the sensing unit 120. The coordinate values (u, v) shown in FIG. 15B are coordinate values obtained by converting the coordinate values (x, y, z) onto the console window formed by a virtual viewpoint image. The conversion is realized by the following expressions (1), (2) and (3):

$$\begin{pmatrix} x_e \\ y_e \\ z_e \end{pmatrix} = R^T \left( \begin{pmatrix} x \\ y \\ z \end{pmatrix} - \begin{pmatrix} x_n \\ y_n \\ z_n \end{pmatrix} \right) \quad (1)$$

$$u = \frac{f}{z_e} x_e \quad (2)$$

$$v = \frac{f}{z_e} y_e \quad (3)$$

In expression (1), R is a rotation matrix around three axes which define the virtual viewpoint coordinate system. The values of the rotation matrix are set such that the coordinate values of this matrix are converted to coordinate values of the real world coordinate system by multiplying the matrix by the coordinate values in the virtual viewpoint coordinate system. In expressions (2) and (3), f is the focal length of the virtual viewpoint.

Explaining generation of window mask data of a console window formed by a virtual viewpoint image by a specific process, a region occupied by an article obtained by the sensing unit 120 is converted to a region occupied by the article when seen from a virtual viewpoint, and the region is converted to coordinate values on the console window, the resultant coordinate values being treated as mask data. This means that the calculations of:

1) converting point (x, y, z) of an article region expressed by the coordinate values of the real world coordinate system to coordinate values (xe, ye, ze) in a virtual viewpoint coordinate system by expression (1); and
2) converting coordinate values (xe, ye, ze) to coordinate values (u, v) on the console window of the virtual viewpoint image by expressions (2) and (3), are carried out on every point of the article region expressed by coordinate values of the real world coordinate system.

To generate more correct mask data, the coordinate values of (u, v) obtained through calculation 2) are plotted, and the minimum polygonal region enclosing the plotted values may be used as the mask data, although the window mask data of the console window based on the virtual viewpoint image can be generated by the above conversions.

It should be noted that, although a console window is generated by the display controller 118 of the console terminal 103 in this embodiment, a console window may be generated by the environment management server 101. In this case, a console window generated by the server 101 may be transmitted to the console terminal 103 via a network and displayed on the display section 117 of the console terminal 103. In the case where switching of the viewpoint of the virtual space is instructed through the input section 116, a viewpoint switching request signal may be transmitted from the console terminal 103 to the environment management server 101. The environment management server 101 may generate a console window based on the switched viewpoint according to the viewpoint switching request signal, the resultant console window being transmitted to the console terminal 103.

Procedure of Designating Task for Robot

Next, the procedure of designating a transfer of an article, which is assigned to the robot 102, on a console window displayed on the display section 117 of the console terminal 103 is specifically described with two examples.

First, the designation procedure for a transfer by the robot 102 is described with an example where a banana placed at location B1 on the floor of a room is transferred to location B2 in front of the table with reference to FIG. 17.

The designation of the transfer task is realized by drag-and-dropping an icon on the console window: specifically, selecting a banana (article icon), moving (dragging) the selected banana onto a desired transfer destination in the virtual space, and dropping the banana icon at the transfer destination.

(Step of Displaying Console Window: P1001)

A console window is displayed on the display section 117 of the console terminal 103. Herein, a virtual space of the console window is formed based on a camera viewpoint image captured by a camera. Since this virtual space simulates actual conditions of a room, appliances existing in the room (table, etc.) are displayed on the console window. Articles existing in the room (banana, etc.) are placed as article icons in the virtual space.

Figure 19A:
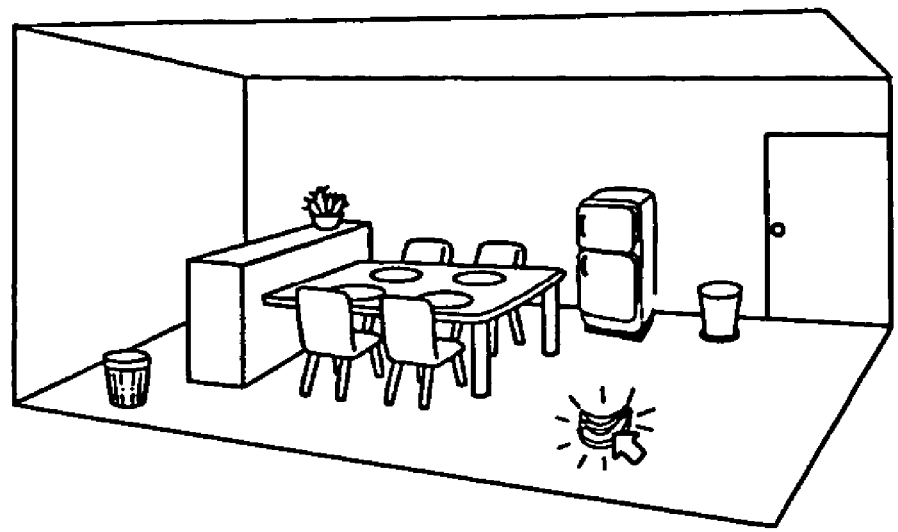
FIG. 19A and FIG. 19B show examples of the display form of an article icon on the console window.
Figure 19B:
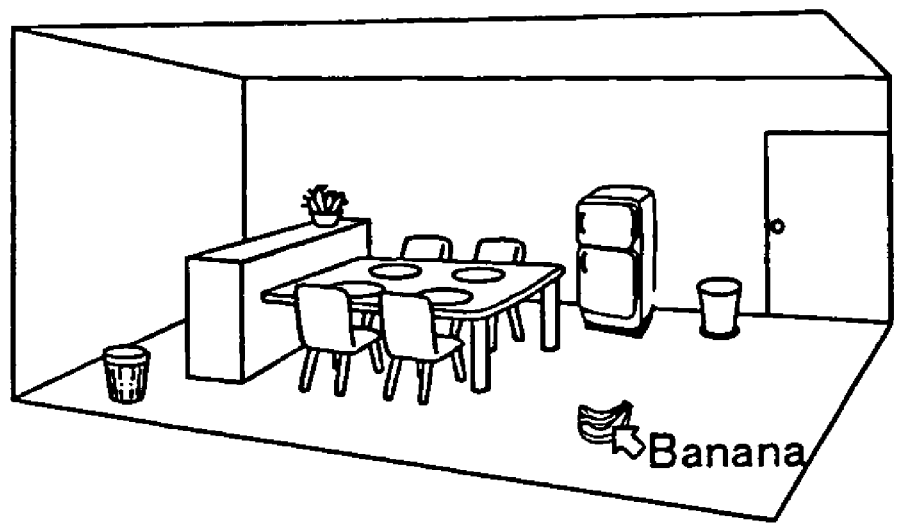

A user can move the cursor on the console window using the input section 116 of the console terminal 103. When the cursor points at an article icon, the article icon is highlighted. Specifically, when the cursor points at a banana icon, the color of the banana icon is changed, for example. Alternatively, the outline of the banana icon is emphasized as shown in FIG. 19A, or an pop-up indication of the name of an article corresponding to an article icon, "Banana" in this example, is displayed as shown in FIG. 19B. However, if the cursor points at an appliance, such as a table, or the like, the appliance is not highlighted because it is not an article icon. With this feature, the user can perceive the banana as an article handleable by the robot 102 on the console window and readily designate a task for the robot. As a result, the convenience of the user improves.

In the case where the name of an article is popped up, the information about the article may be displayed together. If the article is food, the taste expiration date, the quality guaranteed period, the date of purchase, etc., may be popped up, i.e., displayed in the form of pop-up indications. With this feature, the user can designate a task for the robot in consideration of the displayed information (for example, the user can change the place to which the article is to be transferred). Further, tasks for the article which are recommended in consideration of the information about the article may be popped up. For example, when the article icon (article) pointed by the cursor is food whose taste expiration date is coming, the task of "transferring the article into refrigerator" is popped up.

When the cursor is pointing at an article icon, the article (article icon) may be displayed in an enlarged size in addition to the change of color in an article region and/or emphasis of the outline of the article region. Alternatively, when the cursor is pointing at an article icon, a user may be phonetically notified of the name of the article, for example, by a voice message saying "There is a banana". This feature makes the system friendly to a visually handicapped user.

When the cursor is pointing at an article icon, the display form of the cursor may be changed, although in this example the display form of the article icon is changed. With this feature also, the user can perceive the article icon pointed by the cursor as an article handleable by the robot 102.

Although in this example an article icon is highlighted when the cursor is pointing at the article icon, all the article icons placed in the virtual space may be highlighted during a predetermined interval. Especially when a user starts operation in the console window, all the article icons may be highlighted during a predetermined interval. Alternatively, all the article icons may be highlighted during a predetermined interval upon request by a user. With this feature, a user can confirm at one glance where in the environment article icons in the virtual space, i.e., articles handleable by the robot 102, are placed.

(Step of Designating Article: P1002)

An article which is to be transferred by the robot 102 is designated by moving the cursor onto the location of an article icon corresponding to the article and clicking the article icon. When the article icon is designated, an indication for confirmation, for example, "Is the subject article is a banana?", is presented to the user to request the user to confirm by selecting "OK" or "Cancel", for example.

After the article icon is selected, the article icon is highlighted for clear notification of the designation. The highlighted indication can be realized in various display forms but may be realized in any display form so long as the designation of the article is recognized at one glance, for example, by changing the color of the article icon or by painting the article icon black as shown in FIG. 17. However, the form of highlighted indication provided when a subject article is designated is preferably distinguishable from a highlighted indication provided when a cursor is pointing at an article icon. This is for the purpose of distinguishing the designation of an article as a subject for a task of the robot 102 from the indication of an article handleable by the robot 102.

(Step of Designating Transfer Destination: P1003)

After the article which is to be transferred by the robot 102 is designated, the transfer destination of the article is designated. The designation of the transfer destination is realized by drag-and-dropping the article icon onto a desired transfer destination in the virtual space (in this example, location B2 in front of the table) using the cursor as shown in FIG. 17 (see the arrow in FIG. 17). When the article icon is drag-and-dropped, an indication for confirmation, for example, "Is transfer destination here?", may be presented to the user. In this confirmation message, "here" may be replaced by a specific location. Alternatively, the location may be highlighted. Thus, the designation of the transfer by the user is completed.

As described above, the transfer task of an article is designated by an intuitive operation, drag-and-dropping an article icon, which is placed in the virtual space so as to correspond to an article existing in the environment, onto a desired destination in the virtual space. Therefore, a user can designate a task assigned to a robot very easily.

Figure 18:
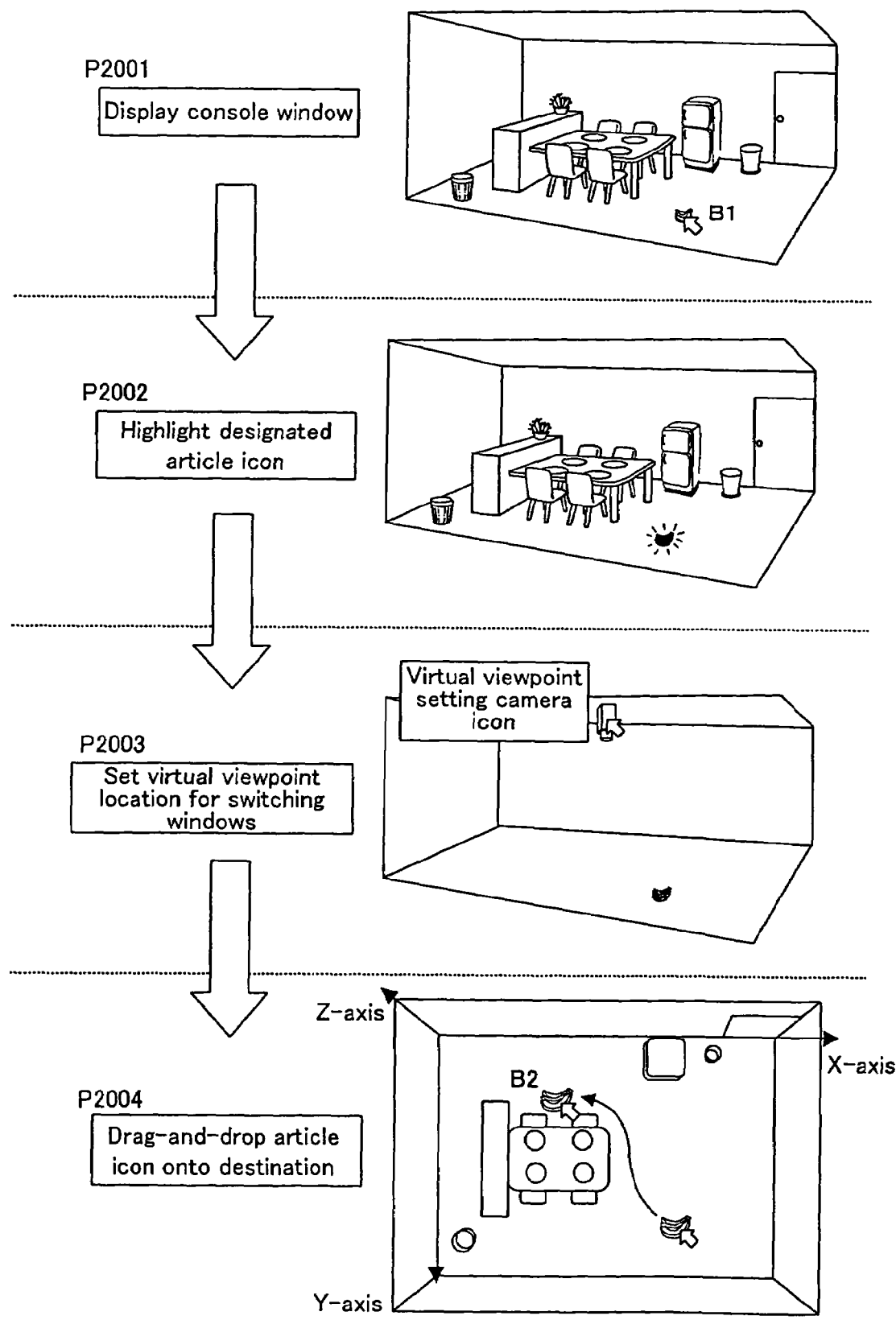
FIG. 18 illustrates an alternative procedure of designating the task of transferring an article on the console window, which is different from that illustrated in FIG. 17.

Next, the designation procedure for a transfer by the robot 102 is described with an example where a banana placed at location B1 on the floor of the room is transferred to location B2 behind the table with reference to FIG. 18.

(Step of Displaying Console Window: P2001)

The step of displaying a console window is the same as step P1001. At step P2001, a console window including a virtual space formed by a camera viewpoint image is displayed on the display section 117 of the console terminal 103.

(Step of Designating Article: P2002)

The step of designating an article is the same as step P1002. At step P2002, an article which is to be transferred by the robot 102 is designated by clicking a corresponding article icon. The designated icon is highlighted.

(Step of Switching Viewpoint: P2003)

After the article which is to be transferred by the robot 102 is designated, the transfer destination of the designated article is designated. In this example, the transfer destination is location B2 behind the table, and location B2 is not shown in the console window of the camera viewpoint image. Thus, the viewpoint of the virtual space of the console window is switched.

At the time of switching the viewpoint, a camera icon is shown at the viewpoint position on the console window as shown in FIG. 18. A user can switch the viewpoint of the virtual space of the console window by clicking the camera icon. It should be noted that, when the virtual space has three or more viewpoints, a plurality of camera icons are shown on the console window so as to correspond to respective viewpoint positions, although only one camera icon is shown in FIG. 18 because the virtual space has two viewpoints.

(Step of Designating Transfer Destination: P2004)

As a result of switching the viewpoint of the virtual space, the virtual space of the console window is switched to a virtual viewpoint image obtained by transforming and synthesizing camera images. In this new console window, the article icon is drag-and-dropped onto a desired transfer destination in the virtual space (in this example, location B2 behind the table) using the cursor (see the arrow in FIG. 18). Thus, the designation of the transfer by the user is completed.

As described above, since the virtual space of the console window has a plurality of viewpoints, a blind spot caused when seen from a certain viewpoint is removed by switching the viewpoints. Although in a life space of an ordinary house, or the like, the arrangement of appliances and the locations of articles are highly flexible and this high flexibility is likely to cause a blind spot in a camera image, a user can appropriately designate a task assigned to a robot on the console window including the virtual space.

Controlling Execution of Task for Robot

After the task assigned to the robot 102 is designated by a user using the console terminal 103 as described above, the console terminal 103 transmits a message about details of the task to the environment management server 101. This message may include at least information that the task is a transfer of an article, information about an article which is to be transferred, and the coordinates of a transfer destination. It should be noted that the coordinates of the transfer destination which are transmitted from the console terminal 103 to the server 101 may be coordinates on the console window or may be coordinates obtained by converting coordinates on the console window to real world coordinates.

When receiving the message, the server 101 generates a robot control command string according to the message and transmits the generated robot control command string to the robot 102. The task of transferring an article is divided into four task units: "transfer (of the article to a location)", "grab (of the article)", "travel (to a destination)", and "release (of the article)". In the above example, the robot control command string is:

move, B1 (moving the robot to location B1 at which a banana exists);

grab, banana (grabbing the banana existing at location B1);

move, B2 (traveling to location B2 (with the banana grabbed)); and release (releasing the grabbed banana).

When a transfer of a plurality of articles is assigned, a set of the above four commands is duplicated by the number of articles.

The controller 115 of the robot 102 operates in the same way as described in embodiment 1 with FIG. 13, and therefore, the descriptions thereof are herein omitted.

Thus, the task designated through the console terminal 103 is executed by the robot 102 such that the banana at location B1 is transferred to location B2.

During the operation of the robot 102, the console window displayed on the display section 117 of the console terminal 103 may be linked with a camera image such that the execution of a task by the robot 102 is shown in the console window. With this arrangement, a user can confirm on the console window whether or not a designated task is carried into execution by the robot 102. For example, when the robot 102 is carrying out a wrong operation, the user can immediately stop the operation.

Alternatively, during the operation of the robot 102, the console window may be fixed at the camera image displayed before the robot 102 starts the operation. With this arrangement, the difficulty in designating a new task during the travel of the robot 102 in the console window is dismissed.

Switching of such display mode may be carried out according to a user's designation. During the operation of the robot 102, the frequency of changing the console window linked with the camera image may be adjustable.

As described above, an article handling system of the present invention includes the robot 102 for handling an article existing in a predetermined life space (environment) and the console unit (console terminal 103) which has the display section 117 and the input section 116 which serves as an interface for a user. The display section 117 displays a console window including a virtual space which simulates the actual conditions of the life space. A user uses the input section 116 to designate a task assigned to the robot 102 in the virtual space. The robot 102 handles an article in the life space based on the designated task.

As described above, according to the present invention, the console window is formed by a virtual space which simulates the actual conditions of a life space. Therefore, although the actual conditions of the life space, such as an ordinary house, or the like, are more complicated than those of a factory or warehouse, the complicated conditions are displayed in the form of a console window as they are. For example, although arrangement of articles is random in a life space, articles are placed in the virtual space according to the random arrangement of the articles in the life space. In this way, the complicated conditions of the life space are presented to users in an appropriate and clear fashion.

Further, according to the present invention, the task assigned to the robot 102 is designated in the virtual space. With this feature, the task for the robot in the life space under the complicated conditions can be readily designated.

According to an article handling system of the present invention, when the task carried out by the robot is a transfer of an article in the life space, the console window includes article icons placed in the virtual space such that the article icons correspond to articles existing in the life space, and the transfer of an article is designated by manipulating a corresponding article icon.

Since article icons are placed in the virtual space such that the article icons correspond to articles existing in the life space, it is possible to easily designate an article which is to be transferred by a robot among articles placed at various locations in the life space. Since a task for the robot 102 is designated by manipulating an article icon, the task is designated adequately and easily.

According to an article handling system of the present invention, the article transfer task is designated by drag-and-dropping a desired article icon onto a desired transfer destination in the virtual space. Thus, to designate an article transfer task, a user selects a desired article icon among article icons placed in the virtual space of the console window and drag-and-drops the selected article icon onto a desired transfer destination in the virtual space. Based on the designation, the robot 102 transfers an article corresponding to the designated article icon to a location in the life space which corresponds to the transfer destination designated in the virtual space.

Since the transfer task of an article is designated by an intuitive operation, drag-and-dropping a designated article icon onto a desired transfer destination in the virtual space, a user can designate a task assigned to the robot 102 very easily.

The article handling system according to the present invention further includes an image capturer (a camera as the sensing unit 120) for capturing images of the life space. The virtual space of the console window is constructed from the data of images captured by the image capturer.

With such a feature, the virtual space which simulates the actual conditions of the life space can readily be created. It should be noted that the virtual space may be constructed by computer graphics.

In an article handling system of the present invention, a console window is formed by image data used for constructing a virtual space, article icons placed in the virtual space such that the article icons correspond to articles existing in the life space, and window mask data which has coordinate values corresponding to the image data and specifies the locations of the article icons in the virtual space.

That is, when the virtual space is constructed from image data, it is necessary to specify which part of the image data corresponds to article icons in order to manipulate the article icons on the console window. To this end, the console window is formed by the image data, article icons, and window mask data and, due to the window mask data, the locations of the article icons in the virtual space are specified. As a result, it is possible to manipulate the article icons on the console window constructed from the image data.

The article handling system according to the present invention further includes the sensing unit 120 for detecting the locations of articles in the life space. The window mask data is generated based on the locations of the articles detected by the sensing unit 120.

By detecting the location of an article existing in the life space using the sensing unit 120, a location in the virtual space which corresponds to the detected location in the life space is specified. Therefore, window mask data which specifies the location of an article icon in the virtual space can be generated.

In a system constructed for use in a life space, such as an ordinary house, or the like, various articles exist in the life space as in the article handling system of the present invention. For example, fixtures and appliances fixed or installed in the space also fall within the articles. However, such fixtures and installed appliances cannot be transferred by the robot 102. The articles existing in the life space are distinguishable into articles handleable by the robot 102 and articles unhandleable by the robot 102, but both the articles handleable by the robot 102 and the articles unhandleable by the robot 102 are shown on the console window including the virtual space.

In view of such, in an article handling system according to the present invention, when a pointer (cursor) is pointing at an article icon corresponding to an article handleable by the robot 102 on a console window, the article icon is highlighted, or information about the article is displayed.

With such a feature, a user can easily specify articles handleable by the robot 102 among numerous articles displayed in the console window. Thus, it is possible to easily designate a task assigned to the robot 102. The criteria for distinguishment between the articles handleable by the robot 102 and the articles unhandleable by the robot 102 varies according to details of the task assigned to the robot 102. For example, as for the task of transferring an article, fixtures and installed appliances and large or heavy items that the robot 102 cannot transfer are articles unhandleable by the robot 102, and the others are articles handleable by the robot 102.

When the robot 102 is changed in the system, the handleable articles can be changed according to the change of the robot 102. Herein, the change of the robot 102 includes not only a change in hardware, e.g., replacement of the robot 102 by a new one, but also a change in software, e.g., a change made in a control program of the robot 102.

When the articles handleable by the robot 102 are thus changed, all the article icons placed in the virtual space may be highlighted during a predetermined time interval for the purpose of notifying a user about the change. With this feature, a user can recognize the articles handleable by the robot 102 at one glance.

The article handling system according to the present invention may be constructed such that, when the articles handleable by the robot 102 are changed, all the article icons corresponding to the articles handleable by the robot 102 are highlighted.

In the article handling system according to the present invention, when a subject article for a task of the robot 102 is designated by designating a corresponding article icon on the console window, the article icon is highlighted.

With the above feature, a user can confirm designation of an article icon, and accordingly, the robot 102 is prevented from handling a falsely designated article.

As described above, an article handling system according to the present invention is provided for use in a life space, such as an ordinary house, office, hotel, store, hospital, or the like. Therefore, in the life space, there are fixtures and installed appliances, e.g., furniture, and the like, and articles handleable by the robot exist at various locations.

In this case, in a console window formed by a virtual space which simulates the actual conditions of the life space, if the viewpoint of the virtual space is fixed at one viewpoint, an article can be hidden by furniture, or the like, from the viewpoint or, in the case of transferring the article to a desired transfer destination, the transfer destination of an article can be in a blind spot. This problem cannot be happen, in general, in an industrial system used in a factory, warehouse, or the like. This is because, in the, industrial system, articles are placed at predetermined locations in many cases, and the arrangement of the space is predetermined such that a blind spot is not caused even if the system has only one viewpoint for monitoring the space.

In view of the above, in the article handling system according to the present invention, the viewpoint of the virtual space of the console window is switchable.

Due to the switchability among a plurality of viewpoints of the virtual space, a blind spot caused for a certain viewpoint can be removed by switching the viewpoint to another. Thus, in an article handling system used in a life space having complicated situations, it is possible to adequately designate a task assigned to the robot 102 on the console window.

A robot console unit (console terminal 103) according to the present invention is a unit for designating a task assigned to the robot 102 for handling an article existing in a predetermined life space.

The robot controller unit includes a display section 117 for displaying a console window and an input section 116 which serves as an interface for a user. The display section 117 displays a console window including a virtual space which simulates actual conditions of the life space. The user uses the input section 116 to designate a task assigned to the robot 102 in the virtual space.

With the above structure, as described above, the display section 117 displays a console window including a virtual space which simulates actual conditions of the life space. Thus, the complicated conditions of the life space are presented to the user in an appropriate and clear fashion.

The designation of the task for the robot 102 is carried out in the console window including the virtual space. Therefore, a user can easily designate the task assigned to the robot 102.

An article handling method according to the present invention is a method which uses the robot 102 for transferring an article existing in a predetermined life space.

The above article handling method comprises the steps of: displaying a console window which includes a virtual space simulating actual conditions of the life space and article icons placed in the virtual space such that the article icons correspond to articles existing in the life space; designating a desired article icon on the console window; drag-and-dropping the designated article icon onto a desired transfer destination in the virtual space; and the robot 102 in the life space transferring an article corresponding to the designated article icon to the transfer destination designated in the virtual space.

The article handling method according to the present invention further includes the step of switching the viewpoint of the virtual space of the console window. In the above-described embodiment, this viewpoint switching step is carried out before the step of drag-and-dropping the article icon onto a desired transfer destination in the virtual space but may alternatively or additionally be carried out before the step of designating a desired article icon.

Other Embodiments

In this embodiment, the server 101 generates a robot control command string according to a task detail message from the console terminal 103 and transmits the generated robot control command string to the laborer robot 102. However, alternatively, the console terminal 103 may generate a robot control command string according to a task designated on the console window and transmit the generated robot control command string to the laborer robot 102.

In this embodiment, the article handling system is formed by three subsystems, the environment management server 101, the robot 102 and the console terminal 103, and these subsystems 101, 102 and 103 communicate information over a wireless or wired network, or the like. However, the article handling system is not limited to this structure. For example, the console terminal 103 may be integrated with the environment management server 101.

The robot 102 is not limited to one robot unit. A plurality of robots may work in cooperation with one another to execute tasks in parallel.

In this embodiment, the robot 102 transfers an article, and a task for the robot 102 is designated by drag-and-dropping an article icon on the console window including a virtual space which simulates the actual conditions of an environment. However, the task for the robot 102 which is designated on the console window including the virtual space is not limited to transfer of an article but may be different types of tasks, which include tasks not involving transfer of an article. For example, when an article icon which is a subject of a task for the robot 102 is designated on the console window, tasks which can be executed by the robot 102 may be displayed in the form of a menu on the console window. In this case, a user selects a task from the menu, thereby designating a task assigned to the robot 102.

Effects of the Invention

As described above, in an article handling system, article handling method, and robot console unit for use in a life space according to the present invention, a console window including a virtual space which simulates the actual conditions of the life space is displayed on a display section of a console terminal (robot console unit). With such features, a user can precisely grasp the complicated situations in the life space. Further, the user can designate a task assigned to a robot on the console window. For example, to designate an article transfer task, an article icon placed in a virtual space so as to correspond to an article existing in the life space is manipulated, for example, drag-and-dropped onto a desired destination in the virtual space, whereby the transfer task is designated. Since the task assigned to the robot can be designated by such an intuitive operation, anybody can easily designate the task.

On the console window, when a cursor is pointing at an article icon handleable by a robot, a clear illustration is presented to a user to notify the user about it. Therefore, the user can surely designate an article which is to be handled by the robot.

When an article (article icon) which is to be handled by a robot is designated, an illustration is presented on the console window such that a user can recognize the designation. Therefore, the robot is prevented from handling a falsely designated article.

Furthermore, the viewpoint of the virtual space of the console window is switchable. For example, an article which is in a blind spot from a certain viewpoint can be made observable by switching the viewpoint, and a location which is in a blind spot from a certain viewpoint can be made observable by switching the viewpoint. That is, the entire virtual space which simulates the complicated actual conditions of the life space can surely be displayed.

If the virtual space which simulates the actual conditions of the life space is constructed from image data captured by a camera, the virtual space can readily be generated.

(Embodiment 3)

Here, in connection with a nonindustrial article transfer system for instructing a robot to transfer an article in life space where people live their lives, such as homes, offices, hotels, stores and hospitals, an object of the present invention is to allow easy designation of a task of the robot to execute.

The article transfer system according to the present invention includes a robot for transferring an article existing in a predetermined life space and a designation device including a display section for displaying a console window and an input section which serves as an interface for a user, wherein the console window is displayed oh the display section and the user designates a task of the robot to execute in the console window through the input section such that the robot transfers the article in the life space according to the task designated in the console window. The system has, as a console mode of the designation device, a location icon console mode for displaying on the display section a console window showing an article icon indicative of an article existing in the life space and a location icon indicative of a specific location in the life space.

According to the above-described structure, a console window is displayed on the display section of the designation device. When the console mode of the designation device is the location icon console mode, the display section displays a console window showing an article icon indicative of an article existing in the life space and a location icon indicative of a specific location in the life space. In the console window, the user designates a task of the robot to execute through the input section. For example, in order to designate an article transferred by the robot and the destination of the article, a desired article icon and a desired location icon are designated in the console window. Once the article and the destination are designated, the robot transfers the article in the life space according to the designated task.

In the life space such as homes, locations of articles are not fixed and their destinations are not fixed either. According to the present invention, the console window shows article icons corresponding to articles existing in the complicated life space and location icons indicative of specific locations in the life space. Once the user designates a desired article icon and a desired location icon, the robot transfers the designated article to the designated location. Thus, in the complicated life space, everybody can easily designate the task of the robot.

Specifically, according to a first aspect, the present invention provides an article transfer system including a robot for transferring an article existing in a predetermined life space and a designation device including a display section for displaying a console window and an input section which serves as an interface for a user, wherein the console window is displayed on the display section and the user designates a task of the robot to execute in the console window through the input section such that the robot transfers the article in the life space according to the task designated in the console window, and the system has, as a console mode of the designation device, a location icon console mode for displaying on the display section a console window showing an article icon indicative of an article existing in the life space and a location icon indicative of a specific location in the life space.

According to a second aspect related to the first aspect, the article icon and the location icon are designated in the console window in the location icon console mode, whereby the article transferred by the robot and the destination of the article are designated.

According to a third aspect related to the first aspect the console window shows a generic icon covering (generically indicative of) a plurality of locations in the life space. When the article icon and the generic icon are designated in the console window, a location suitable for the attribute of the designated article is selected from the plurality of locations covered (generically indicated) by the generic icon and the robot transfers the designated article to the selected location in the life space.

According to a fourth aspect related to the first aspect, the article transfer system further has, as a console mode of the designation device, a virtual space console mode for displaying on the display section a console window showing a virtual space which simulates actual conditions of the life space and an article icon which is placed in the virtual space to correspond to an article existing in the life space.

According to a fifth aspect related to the first aspect, the article icon and a location in the virtual space are designated in the console window in the virtual space console mode, whereby the article transferred by the robot and the destination of the article are designated.

According to a sixth aspect related to the first or fourth aspect, the article transfer system further has, as a console mode of the designation device, an action icon console mode for displaying on the display section a console window showing an article icon indicative of an article existing in the life space and an action icon indicative of an action exerted on the article.

According to a seventh aspect related to the sixth aspect, the article icon and the action icon are designated in the console window in the action icon console mode, whereby the article handled by the robot and the action exerted on the article are designated. Once the article icon and the action icon are designated in the console window, a location in the life space is selected according to the attribute of the designated article and the designated action and the robot transfers the designated article to the selected location.

According to an eighth aspect related to any one of the second, third and seventh aspects, the console window is configured such that the article icon is drag-and-droppable onto a different icon.

According to a ninth aspect related to the eighth aspect, the console window is configured such that a plurality of article icons are drag-and-droppable onto a different icon.

According to a tenth aspect, the present invention provides an article transfer system including a robot for transferring an article existing in a predetermined life space and a designation device including a display section for displaying a console window and an input section which serves as an interface for a user, wherein the display section displays a console window showing an article icon indicative of an article existing in the life space and an action icon indicative of an action exerted on the article and the user designates an article handled by the robot and an action exerted on the article in the console window through the input section such that a location in the life space is selected according to the attribute of the designated article and the designated action and the robot transfers the designated article to the selected location.

According to an eleventh aspect related to any one of the first, fourth, sixth and tenth aspects, the article transfer system further includes a sensing unit for detecting an article existing in a life space and the console window shows an article icon corresponding to an article detected by the sensing unit.

According to a twelfth aspect, the present invention provides a robot control unit including a display section for displaying a console window and an input section which serves as an interface for a user so as to designate a task of a robot for transferring an article existing in a predetermined life space, wherein the robot control unit has a location icon console mode for displaying on the display section a console window showing an article icon indicative of an article existing in the life space and a location icon indicative of a specific location in the life space such that the user designates a task executed by the robot in the console window through the input section.

According to a thirteenth aspect related to the twelfth aspect, the robot control unit further has a virtual space console mode for displaying on the display section a console window showing a virtual space which simulates the actual conditions of the life space and an article icon which is placed in the virtual space to correspond to an article existing in the life space.

According to a fourteenth aspect related to the twelfth or thirteenth aspect, the robot control unit further has an action icon console mode for displaying on the display section a console window showing an article icon indicative of an article existing in the life space and an action icon indicative of an action exerted on the article such that the user designates a task executed by the robot in the console window through the input section.

According to a fifteenth aspect, the present invention provides a robot control unit including a display section for displaying a console window and an input section which serves as an interface for a user so as to designate a task of a robot for transferring an article existing in a predetermined life space, wherein the robot control unit has an action icon console mode for displaying on the display section a console window showing an article icon indicative of an article existing in the life space and an action icon indicative of an action exerted on the article such that the user designates a task executed by the robot in the console window through the input section.

Embodiment 3 of the present invention is directed to an article transfer system for instructing a laborer robot to transfer an article existing in life space. According to the present embodiment, a certain room in a general residential construction is considered as target space of the article transfer system (hereinafter the space is referred to as environment). In addition to the transfer of the article, the laborer robot may handle various kinds of tasks related to the article. However, in the present embodiment, the laborer robot is configured to transfer an article designated by the user to a designated location.

Figure 20:
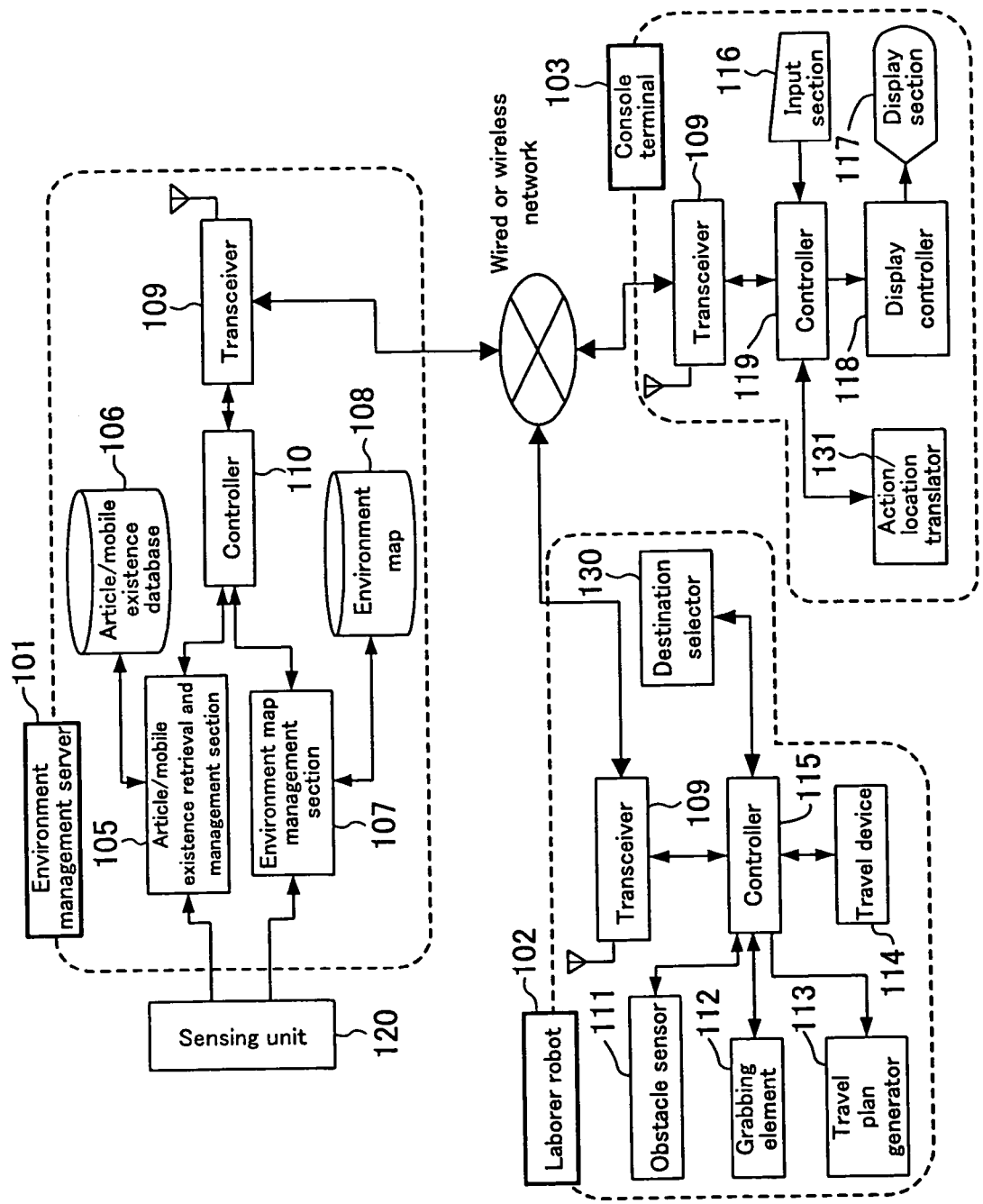
FIG. 20 is a block diagram illustrating an example of the entire structure of an article transfer system of Embodiment 3.

FIG. 20 is a block diagram illustrating the structure of the article transfer system according to the present embodiment.

In FIG. 20, the same components as those shown in FIG. 2 are indicated with the same reference numerals and a detailed explanation thereof is omitted.

A robot 102 is provided with a destination selector 130 in addition to the obstacle sensor 111, grabbing element 112, travel plan generator 113, travel device 114 and transceiver 109 described in Embodiment 1. When a task is designated by the user in a location icon console mode described later, the destination selector 130 selects the destination of a target article (article to be transferred) according to the attribute of the article. A controller 115 controls the sensor 111 and the constituents 109, 112, 113, 114 and 120.

According to the present embodiment, assuming that articles existing in the environment are added with electronic tags, respectively, the grabbing element 112 is provided with a reader/writer. Therefore, when the grabbing element 112 grabs an article, the reader/writer reads out information written in the electronic tag, thereby identifying what the grabbed article is. However, the grabbing element 112 may not have the reader/writer.

A console terminal 103 includes an action/location translator 131 in addition to the display section 117, input section 116, display controller 118 and transceiver 109 described in Embodiment 1. When a task is designated by the user in an action icon console mode described later, the action/location translator 131 determines the destination of a target article (article to be transferred) according to the attribute of the target article and an action exerted on the article. A controller 119 controls the constituents 109, 116, 117, 118 and 121.

In the present system, there are three different console modes for designating a task of the robot through the console terminal 103: 1) a virtual space console mode; 2) a location icon console mode; and 3) an action icon console mode. Switching among the console modes is carried out by the user through the input section 116.

The three console modes are the same in that the user designates the task in the console window displayed on the display section 117, but different in the configuration of the console window displayed on the display section 117. Hereinafter, an explanation of the three console modes will be provided.

(Virtual Space Console Mode)

Figure 21:
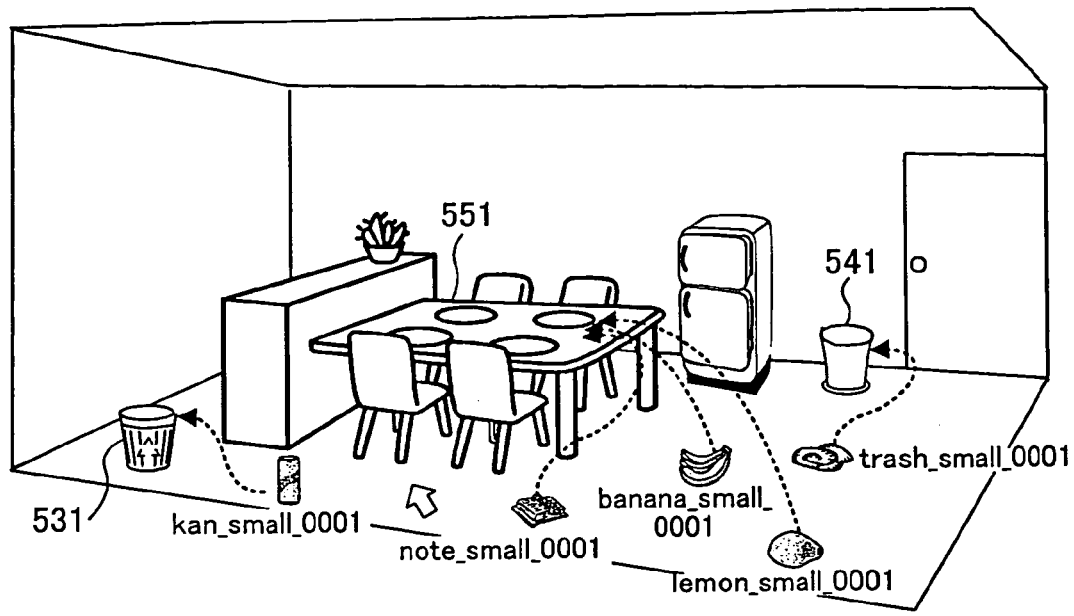
FIG. 21 is a view illustrating an example of a console window displayed in the virtual space console mode.

FIG. 21 illustrates an example of a console window appears on the display section 117 of the console terminal 103 in the virtual space console mode. The console window shows a virtual space which simulates actual conditions of the environment. The virtual space in the console window is created based on image data captured by a camera (not shown) placed in the environment. In the present embodiment, the camera is placed on a sidewall within the environment as a sensing unit 120.

The console window also shows a cursor (pointer) and article icons placed in the virtual space to correspond to articles existing in the environment. The console window of FIG. 21 shows article icons such as an empty can icon (kan_small_0001), a lemon icon (lemon_small_0001), a notebook icon (note_small_0001), a banana icon (banana_small_0001) and a paper trash icon (trash_small_0001). In the virtual space console mode, furnishings existing in the environment also appear in the console window. However, they will not be regarded as the article icons. Only those which the robot 102 can handle are shown as the article icons in the console window.

In the console window in the virtual space console mode, the user moves the cursor in the console window through the input section 116 of the console terminal 103, thereby designating a task executed by the robot 102. In order to instruct the robot 102 to execute the task of transferring an article, the user designates a desired article icon and a desired location in the virtual space. The console window is configured such that the article icons are moved in the virtual space created in the console window by so-called dragging. Therefore, in order to designate the article icon and the location in the virtual space, the user designates the desired article icon in the virtual space by the cursor, and then drags and drops the designated article icon onto the desired location in the virtual space. Then, the article and the destination of the article are designated. Arrows indicated in FIG. 21 illustrate how the empty can icon (kan_small_ 0001) is dragged and dropped onto a recycle basket 531 in the virtual space and how the lemon icon (lemon_small_ 0001), notebook icon (note_small_0001) and banana icon (banana_small_0001) are dragged and dropped onto a table 551 in the virtual space and how the paper trash icon (trash_small_0001) is dragged and dropped onto a general wastebasket 541 in the virtual space.

As described above, the virtual space shown in the console window in the virtual space console window is image data captured by the camera. Therefore, it is necessary to specify which region of the image data corresponds to the article icon. For this reason, the console window includes, in addition to the image data for creating the virtual space, window mask data which corresponds to the image data (virtual space) in a one-by-one relationship and specifies the position of the article icon in the virtual space. The window mask data contains mask data corresponding to a region in the console window at which the article icon is placed. When the position (coordinate values) at which the article icon is placed is designated by the cursor in the console window showing the virtual space, the same coordinate values are referred to in the window mask data, thereby judging whether or not the designated position is an article (article icon). In the coordinates of the mask data in the window mask data, a pointer for article data in an article database (see FIG. 6) is described. When the article icon is designated, the article data is referred to using the pointer described in the coordinates as a key, thereby identifying which article is indicated by the article icon pointed out by the cursor. The window mask data is created by a background-subtracted image because the background-subtracted image specifies the position of the article in the image captured by the camera.

When the article icon is dragged and dropped in the console window to designate the task of transferring the article, the console terminal 103 sends a task message to an environment management server 101. The message contains at least information that the task is to transfer the article, information of the article to be transferred and the coordinates of the destination of the article.

Upon receiving the message, the server 101 generates a sequence of robot control commands in accordance with the message contents, and then sends the generated sequence of robot control commands to the robot 102.

The controller 115 of the laborer robot 102 receives the sequence of robot control commands and executes the control commands along the flowchart shown in FIG. 13. As a result, the laborer robot 102 transfers the article designated in the console window to the designated location in the virtual space.

In the virtual space console mode, as described above, the console window appears on the display section 117 of the console terminal 103 shows a virtual space which simulates the actual conditions of the environment. Further, the task of transferring the article is designated by intuitively dragging and dropping an article icon which is placed in the virtual space to correspond to an article existing in the environment onto a desired destination in the virtual space. Thus, the user is allowed to designate the task of the robot with great ease.

Different from the location icon console mode and the action icon console mode to be described later, the virtual space console mode allows the user to designate the destination of the article in the virtual space as he/she likes. Therefore, the degree of freedom of the task assigned to the robot increases.

(Location Icon Console Mode)

Figure 22:
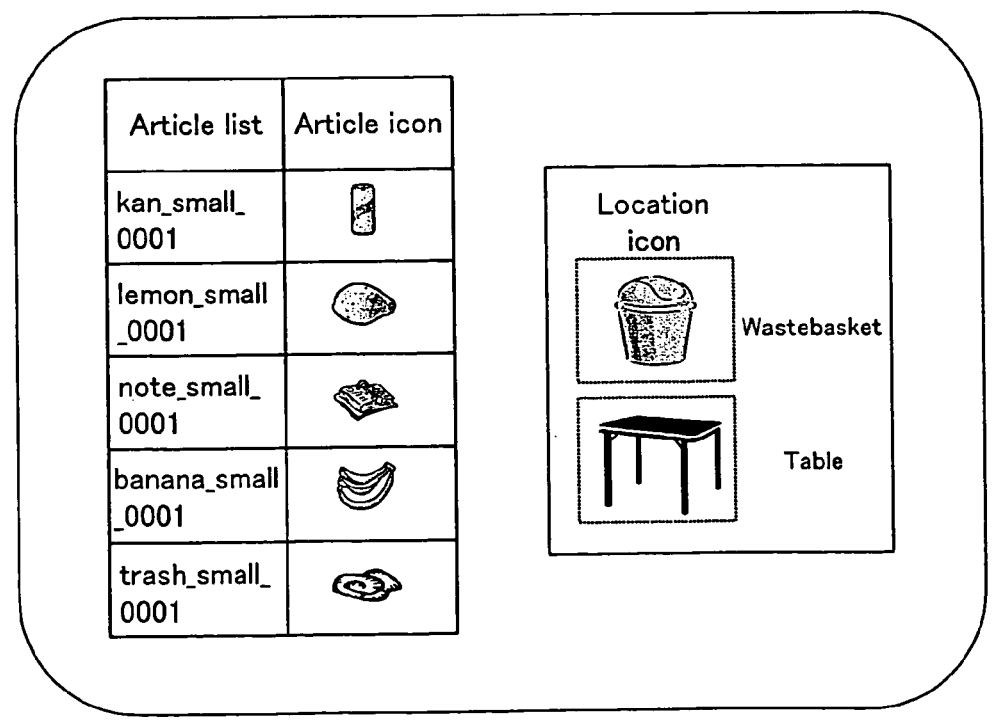
FIG. 22 is a view illustrating an example of a console window displayed in the location icon console mode.

FIG. 22 illustrates an example of a console window appears on the display section 117 of the console terminal 103 in the location icon console mode.

The console window shows article icons together with location icons indicative of the destinations of articles existing in the environment. The article icons correspond to the articles detected by the sensing unit 120 in the environment. Specifically, the article icons shown in the console window indicate articles actually existing in the environment. The article icons are listed in relation to article IDs. The console window illustrated in FIG. 22 shows article icons such as an empty can icon (kan_small_0001), a lemon icon (lemon_small_0001), a notebook icon (note_small_0001), a banana icon (banana_small_0001) and a paper trash icon (trash small_0001). Therefore, the user recognizes the articles existing in the environment at a glance. When the articles existing in the environment are too many to display on a single window, a scroll bar is used. Alternatively, the articles existing in the environment may be classified into a tree structure according to category such as food and garment such that the articles are displayed along the hierarchy from the higher order category to the lower order category.

The article icons may also be sorted by name of the articles, frequency of designation or the like. Alternatively, the article icons may be displayed in an automatically established order according to the details of the articles. For example, as described above, in order to classify the article icons according to category, e.g., food, a default setting may be carried out such that the article icons belonging to that category are displayed in ascending order of use-by date. Also in this case, the article icons may preferably be sorted by other criteria.

The article icons may be created by actual images of the articles captured by the camera serving as the sensing unit 120. Alternatively, icon data may be used if contained in the electronic tags attached to the articles.

As described above, the location icons shown in the console window in the location icon console mode are indicative of the destinations of the articles in the environment. For example, the location icons may be designated as locations to which the articles are transferred frequently. The console window of FIG. 22 shows a wastebasket icon and a table icon as the location icons. The wastebasket icon, which is one of the location icons, is a generic icon indicative of both a recycle basket and a general wastebasket existing in the environment. That is, the generic icon is provided in the console window to cover (generically indicate) a plurality of locations in the environment. The table icon, which is also one of the location icons displayed in the console window shown in FIG. 22, is not a generic icon but a location icon only indicative of a table existing in the environment.

When the transfer of the article is designated in the console window in the location icon console mode, the article icon and the location icon are designated. Also in this console window, the article icons may be moved within the console window by so-called dragging. Therefore, in order to designate the article icon and the location icon, a desired article icon is designated by the above-described cursor and the designated article icon is dragged and dropped onto a desired location icon (generic icon). Thus, the article and the destination of the article are designated. Further, in the console window in the location icon console mode, a plurality of article icons may be dragged and dropped onto the desired location icon at one time.

Next, with reference to FIG. 23, how to designate the task in the console window in the location icon console mode will be described. Now, an explanation of how to designate the task of transferring (throwing away) an empty can and paper trash into the wastebasket will be provided. Arrows indicated in FIG. 23 illustrate the paths of the cursor.

The article transferred by the robot 102 is designated by moving the cursor to an article icon corresponding to the article and clicking the article icon. Here, the cursor is moved to the empty can icon and then the icon is clicked (see P0001 of FIG. 23). When the article icon is designated, the designated article icon is highlighted to let the user notice that the icon is surely designated. By so doing, the user recognizes at a glance which icon has been designated.

Figure 23:
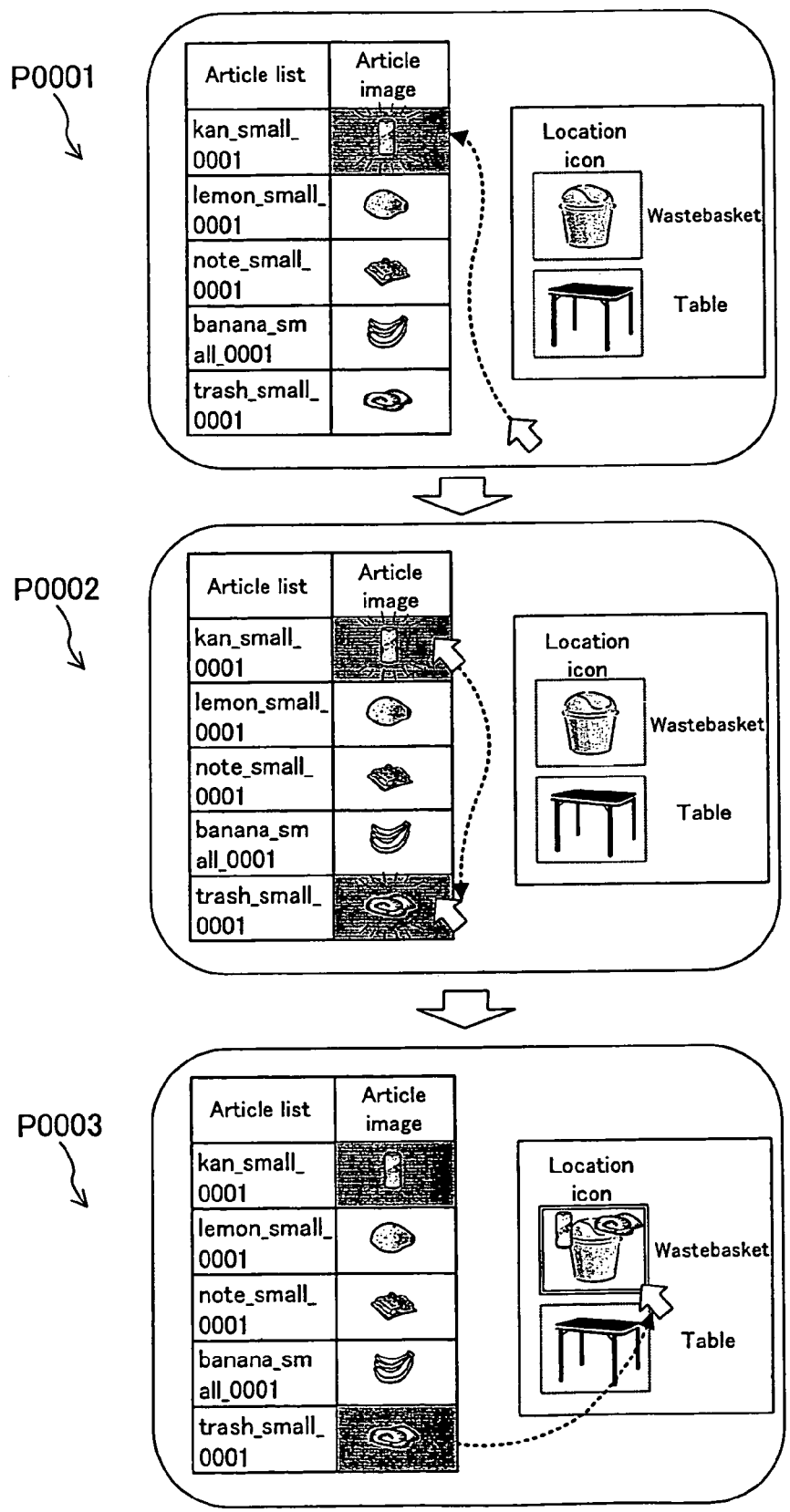
FIG. 23 is a view illustrating how the task of transferring an article is designated to the robot in the console window in the location icon console mode.

In order to designate a second article that the robot 102 transfers, the cursor is moved to an article icon corresponding to the second article and the icon is clicked (see P0002 of FIG. 23). Also in this case, the designated article icon is highlighted. Thus, the empty can icon and the paper trash icon are highlighted. If a third article is further designated, an article icon corresponding to the third article is clicked.

After the article icons corresponding to the articles transferred by the robot 102 are designated, the designated article icons are dragged and dropped onto the location icon. The drag-and-drop is exerted on all the designated articles at one time. In this case, the empty can icon and the paper trash icon are dragged and dropped onto the wastebasket icon (see P0003 of FIG. 23).

Thus, the transfer of the empty can and the paper trash into the wastebasket (a recycle basket or a general wastebasket) is designated as the task.

When the task of the robot 102 is designated in this way, as described above, the console terminal 103 sends a task message to the environment management server 101 and the server 101 sends a sequence of robot control commands to the laborer robot 102.

The controller 115 of the laborer robot 102 executes the received sequence of robot control commands along the flowchart shown in FIG. 13. Thus, the articles designated in the console window are transferred to the designated locations.

In the location icon console mode, the destination of the article may be designated via the general icon (the wastebasket icon in the above-described example). In such a case, the destination selector 130 of the laborer robot 102 selects a suitable destination of the designated article.

The destination selector 130 of the laborer robot 102 selects a suitable destination from the locations covered (generically indicated) by the general icon according to the attribute of the article designated by the user. The destination selector 130 selects the destination based on destination selection knowledge which is stored in the destination selector 130. For example, the destination selection knowledge may be described based on an if-then rule. Specifically, in the case of the wastebasket icon covering (generically indicative of) both of the recycle basket and the general wastebasket, it may be described as follows.

```
if (destination == wastebasket) {
    if (grabbed article == recyclable article) {
        destination = recycle basket;
    } else {
        destination = general wastebasket;
    }
}
```

That is to say, "when the destination is designated as the wastebasket and if the target article (article grabbed by the grabbing element 112) is recyclable, the designated wastebasket is the recycle basket, or alternatively, if the target article (article grabbed by the grabbing element 112) is not recyclable, the designated wastebasket is the general wastebasket." The destination selection knowledge may be other description than that based on the if-then rule.

According to the present system, as described above, the grabbing element 112 of the laborer robot 102 is provided with a reader/writer. The attribute of the article (in the above case, whether it is recyclable or not) is judged by reading the information written in the electronic tag attached to the article grabbed by the grabbing element 112.

Figure 24:
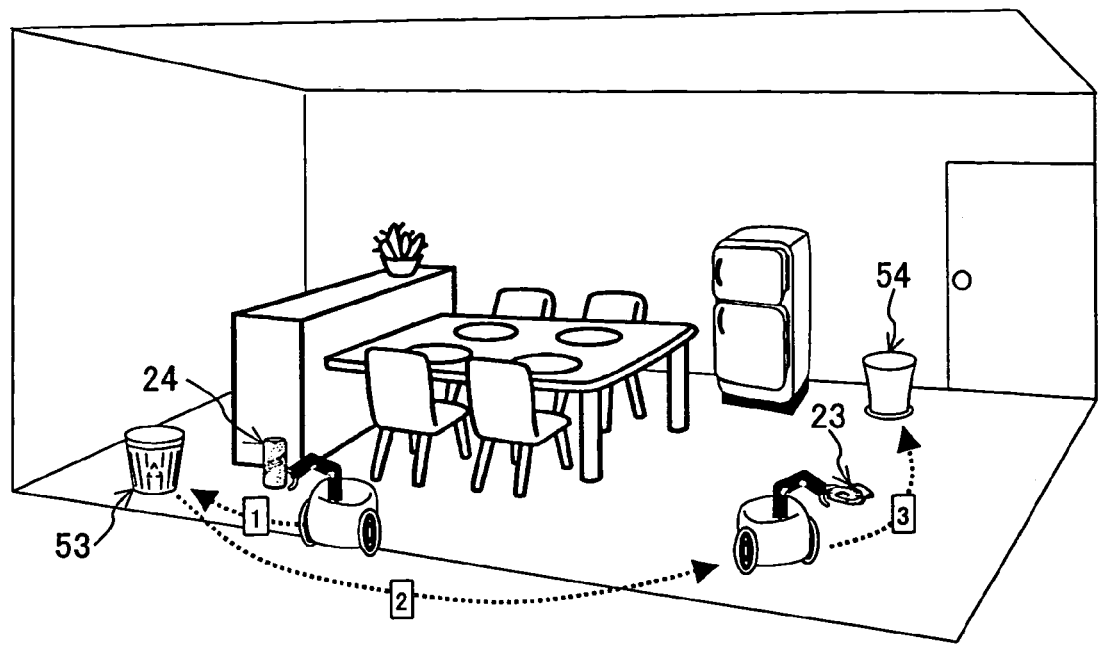
FIG. 24 is a view illustrating the robot executing the designated task in the environment.

As shown in FIG. 23, when the transfer of the empty can and paper trash into the wastebasket is designated as the task, the laborer robot 102 executes the task as follows (see FIG. 24). Here, it is assumed that the electronic tag is attached to the empty can but not to the paper trash.

If the grabbing element 112 of the laborer robot 102 grabs the empty can 24 first among the two designated articles, the reader/writer of the grabbing element 112 reads the information from the electronic tag attached to the empty can 24. Based on the information, the controller 115 of the laborer robot 102 recognizes that the empty can 24 is recyclable. Once the attribute of the article is distinguished, the destination selector 130 determines the destination based on the destination selection knowledge. Since the empty can 24 is recyclable, the recycle basket 53 is selected as the destination. As the destination has been selected, the robot 102 grabbing the empty cam 24 travels to the recycle basket 53 (see the arrow 1 shown in FIG. 24) and then releases the empty can 24 there, thereby putting the empty can 24 in the recycle basket 53.

Next, the laborer robot 102 travels to the paper trash 23 which is another designated article (see the arrow 2 shown in FIG. 24) to grab the paper trash 23. Upon grabbing an article, the reader/writer of the grabbing element 112 is supposed to read information from the electronic tag attached to the article. However, since the electronic tag is not attached to the paper trash 23, information is not obtained. In this case, the controller 115 of the laborer robot 102 recognizes that the paper trash 23 is general trash. Then, the destination selector 130 determines the destination of the paper trash 23 as the general wastebasket 54 based on the destination selection knowledge. Then, the robot 102 grabbing the paper trash 23 travels to the general wastebasket 54 (see the arrow 3 shown in FIG. 24) and releases the paper trash 23 there, thereby putting the paper trash 23 in the general wastebasket 54.

In this case, the reader/writer is attached to the grabbing element 112 and the attribute of the article is distinguished by reading the information written in the electronic tag attached to the article. However, for example, the attribute of the article may be distinguished by referring to data accumulated in an article database.

In the location icon console mode, as described above, the console window shows an article icon corresponding to an article existing in the environment and a location icon indicative of a specific location in the environment such that the user designates a task of the robot by dragging and dropping a desired article icon onto a desired location icon. Thus, everybody can easily designate the task of the robot.

In the location icon console mode, a plurality of article icons are dragged and dropped at one time. For example, when the user wants to transfer a lot of articles at one time, the task is easily designated. In particular, when the generic icon is used, the destinations of the designated articles are determined according to the article attributes. Therefore, two or more article icons are effectively handled at one time.

The console window in the location icon console mode shows the generic icon. With use of the generic icon, the articles are automatically transferred to the destinations suitable for the attributes of the articles even if the user does not designate specific destinations of the designated articles. Especially, as described above, when the user wants to transfer a lot of articles, e.g., to put some kinds of trash (empty can and paper trash) in the wastebasket, the generic icon is effectively used because the articles are transferred to the destinations suitable for their attributes (to the recycle basket and the general wastebasket in the above-described case) by a single instruction without need of paying attention to their attributes. Thus, the task is assigned to the robot more easily. Further, errors in transferring the general trash into the recycle basket or the recyclable trash into the general wastebasket are less likely to occur.

The generic icon is not limited to the above-described wastebasket icon covering (generically indicative of) both of the general wastebasket and the recycle basket and may be applied to various cases. For example, where a refrigerator including a refrigerating compartment, a vegetable compartment and a freezer compartment is placed in the environment, a refrigerator icon covering (generically indicative of) the three locations of the refrigerating compartment, vegetable compartment and freezer compartment may be displayed in the console window. When the user keeps food items in the refrigerator, he/she selects the refrigerating compartment, vegetable compartment or freezer compartment according to the attributes (kinds) of the food items. If the refrigerator icon is shown in the console window as the generic icon and the article icon is dragged and dropped thereon, the destination selector 130 selects the freezer compartment, vegetable compartment or refrigerating compartment according to the attribute of the article corresponding to the article icon, i.e., whether the article is a frozen food, a vegetable or other food items. Thus, the articles are kept in proper locations (compartments) even if the user does not specifically designate the destinations.

In the above-described location icon console mode, the generic icon (wastebasket icon) is shown in the console window. However, instead of the generic icon, a recycle basket icon and a general wastebasket icon may be displayed in the console window to correspond to the actual locations of the wastebaskets existing in the environment as displayed in the console window of FIG. 25.

Figure 25:
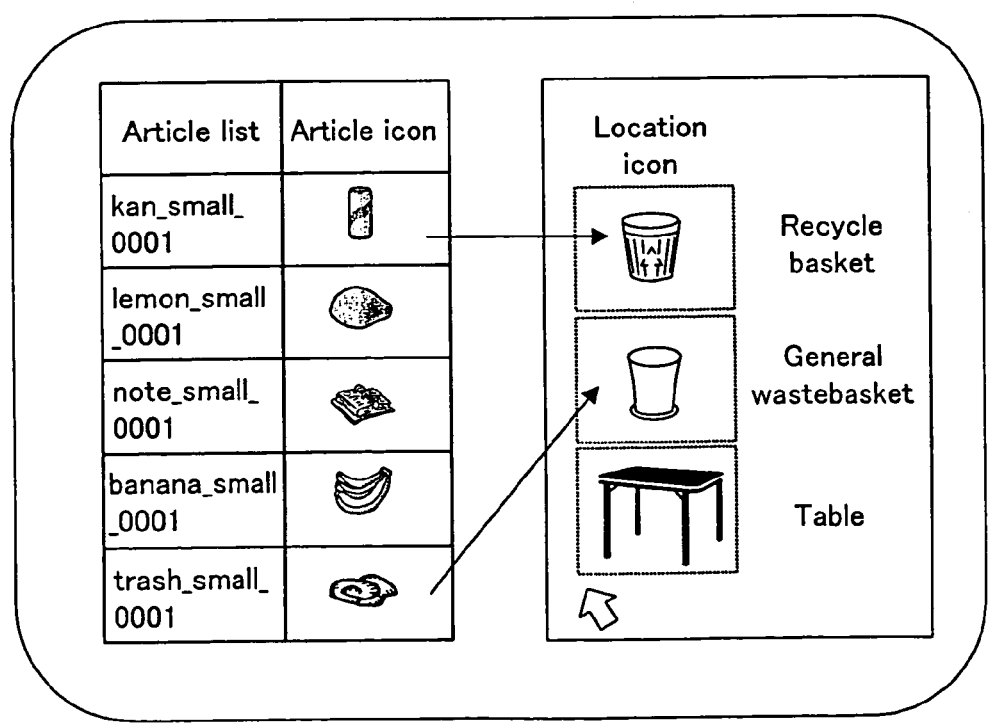
FIG. 25 is a view illustrating an example of a console window displayed in the location icon console mode different from the example shown in FIG. 23.

Then, in order to designate the robot 102 to execute the task of transferring the empty can and the paper trash to the suitable wastebaskets in the console window, the empty can icon is dragged and dropped onto the recycle basket icon and the paper trash icon is dragged and dropped onto the general wastebasket (see the arrows shown in FIG. 25).

(Action Icon Console Mode)

In the action icon console mode, an action exerted on an article is designated. According to the designation, the robot 102 executes the task of transferring the article to the destination corresponding to the designated action. The "action" exerted on the article is, for example, to "throw away", "clean up" or "keep" the article. The "destination corresponding to the action" is, for example, "a recycle basket", when the article is "recyclable trash" and the action exerted thereon is "throw away". Further, when the article is an "eating utensil" and the action exerted thereon is "clean up", the destination corresponding to the action is a "kitchen". Thus, the "destination corresponding to the action" is determined according to the attributes of the articles.

Figures 26, 27:
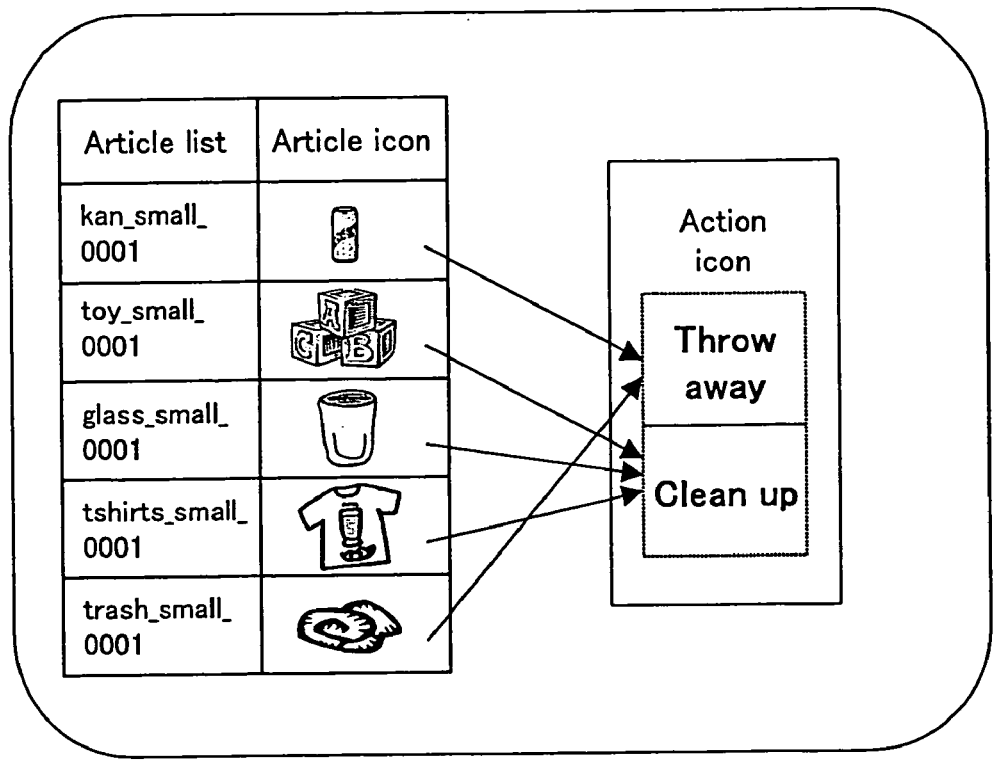
FIG. 26 is a view illustrating an example of a console window displayed in the action icon console mode.
FIG. 27 is a view illustrating an example of an action/location translation table.

FIG. 26 illustrates an example of a console window appears on the display section 117 of the console terminal 103. The console window shows article icons together with and the action icons indicative of actions exerted on the articles.

The article icons are the same as those shown in the console window in the location icon console mode (see FIG. 22). The console window in FIG. 26 shows the article icons such as an empty can icon (kan_small_0001), a block icon (toy_small_0001), a glass icon (glass_small_0001), a T-shirt icon (tshirts_small_0001) and a paper trash icon (trash_small_0001).

The action icons shown in the console window in the action icon console mode indicate actions exerted on the articles. The console window of FIG. 26 shows the action icons such as a "throw away" icon and a "clean up" icon.

In order to designate the task of transferring the article in the action icon console mode, the user designates the article icon and the action icon in the console window. Also in this console window, the article icons are moved within the console window by so-called dragging. In order to designate the task of transferring the article, a desired article icon is designated and then dragged and dropped onto a desired action icon using the cursor. Thus, the article and the action exerted on the article are designated.

As described above, the console window in the action icon console mode is also configured to such that a plurality of article icons are dragged and dropped onto a desired action icon. This allows the user to easily designate the task.

The arrows shown in FIG. 26 illustrate how the empty can icon (kan_small_0001) and the paper trash icon (trash_small_0001) are dragged and dropped onto the "throw away" icon and how the block icon (toy_small_0001), glass icon (glass_small_0001) and T-shirt icon (tshirts_small_0001) are dragged and dropped onto the "clean up" icon.

When the task of the robot 102 is thus designated, the console terminal 103 sends a task message to the environment management server 101 as described above. However, in the action icon console mode, the action/location translator 131 of the console terminal 103 determines the destination of the designated article according to the designated action before sending the task message.

For example, the action/location translator 131 stores an action/location translation table as shown in FIG. 27. The action/location translator 131 refers to the action/location translation table to determine the destination of the designated article. The action/location translation table includes a column of action icon names, a column of article attributes and a column of destinations.

Now, the processing in the action/location translator 131 will be described in relation to the case where an instruction is made to "clean up" the block, glass and T-shirt in the console window shown in FIG. 26.

When the article and the corresponding action are designated in the console window, the action/location translator 131 first selects the designated action icon from the action icon name column of the action/location translation table. When the designated action icon is not found in the table, the absence of the action icon is informed to the user and the processing is terminated. As the "clean up" action has been designated, a "clean up" line, which is the second line from the top, is selected from the action icon name column.

Then, the attribute of the article corresponding to the designated article icon is identified (for example, by referring to information accumulated in the article database). Then, from the article attribute column of the action/location translation table, an attribute that agrees with the identified attribute or an attribute including the identified attribute (higher order attribute) is selected. For example, the article attribute "glass" is included in "eating utensil" which is the higher order attribute of the glass. The relationship between the higher order attribute and the article attribute may previously be stored in the form of a tree structure (hierarchical structure) in the action/location translator 131. The markings (*) in the article attribute column of the action/location translation table indicate that attention to the attribute is unnecessary (any article will do). Here, as the "glass" is the designated article, the "eating utensil" line, which is the higher order attribute of the "glass", is selected from the article attribute column.

Thus, when the action icon and the article attribute are determined, the destination of the article is selected from the location column of the action/location translation table. In the location column, the markings (-) indicate that the destination cannot be determined (a suitable destination is not found). In such a case, the user is informed that the selection has been failed and the processing is terminated. In the location column, a "kitchen" line corresponds to the "eating utensil". Therefore, the destination of the "eating utensil" is determined as the "kitchen".

A second designated article "block" is subordinate to a higher order attribute "toy". As a "toy" line corresponds to a "closet" line of the location column, the destination of the "toy" is determined as the "closet". Moreover, a third designated article "T-shirt" is subordinate to a higher order attribute "garments". As a "T-shirt" line corresponds to a "clothesbasket" line of the location column, the destination of the "T-shirt" is determined as the "clothesbasket".

The action/location translation table shown in FIG. 27 is relatively simply configured. However, the action/location translation table may be subdivided as shown in FIG. 28. Referring to the action/location translation table shown in FIG. 28, when the "clean up" action is exerted on a "garment", the destination is selected from two options in accordance with the condition of the garment. Specifically, when the garment is the used one, a "garment (used)" line is selected from the article attribute column. As a result, the destination of the used garment is determined as a "clothesbasket". Further, when the garment is not used, a "garment (*)" line is selected from the article attribute column ((*) indicates that the object does not meet any condition established for the garment). As a result, the destination of the garment is determined as a "wardrobe". The condition of the article (in the above case, the garment is used) may be judged by referring to the historical data of the article accumulated in the article database.

When the action/location translator 131 determines the destination of the designated article according to the designated action, the console terminal 103 sends a task message to the server 101 and the server 101 sends a sequence of robot control commands to the laborer robot 102.

Then, the controller 115 of the laborer robot 102 executes the sequence of robot control commands along the flowchart shown in FIG. 13.

In the action icon console mode, the console window shows the article icons and the action icons such that the user drags and drops a desired article icon onto a desired action icon to designate the task of the robot. All that the user has to do is to designate the action exerted on the article and there is no need of specifically designating the destination of the article. By so doing, the article is automatically transferred to a suitable destination according to the attribute of the article and the designated action. Thus, everybody can easily designate the task of the robot.

Also in the action icon console mode, a plurality of article icons may be dragged and dropped at one time. For example, even when the user wants to transfer a lot of articles at one time, the task is easily designated. In particular, in the action icon console mode, the destinations of the designated articles are determined according to the article attributes. Therefore, two or more article icons are effectively handled at one time.

In the action icon console mode, in some cases, a suitable destination for the article cannot be found in relation to the article and the corresponding action and the task designated by the user cannot be executed. Therefore, in the action icon console mode, the console window may be configured as follows.

Specifically, at first, only the article icons are shown in the console window on the display section 117 of the console terminal 103, while the action icons are not shown. Then, when an article icon is designated by the user, the action/location translator 131 refers to the action/location translation table to select a possible action that the robot 102 can execute on the designated article icon (article). Then, the selected action icon is displayed in the console window. The user drags and drops the designated article icon to the displayed action icon, thereby designating the task.

Alternatively, both of the article icons and the action icons are shown in the console window of the display part 117 of the console terminal 103 at first, and when the user designates an article icon, some of the action icons indicating actions that the robot 102 can execute on the designated article are left in the console window, while the other action icons indicating actions that the robot 102 cannot execute are dismissed. The action icons indicating actions that the robot 102 cannot execute may be dimmed so as to inform the user that the actions are not selectable. These action icons may be displayed in any way as long as the user can recognize that the action icons are not selectable. If the user drags and drops the article icon to the action icon indicative of the action that the robot 102 cannot execute, a message such as "unable to execute" may be displayed in the console window. For example, if the actions that the robot 102 can execute are accumulated in the article database in advance in relation to the articles, the action icons may be switched between displayed and hidden states.

Thus, the case where the robot 102 cannot execute the task designated by the user is avoided.

According to the present system, the virtual space console mode, location icon console mode and action icon console mode are established. The console modes are selected based on the designated task, thereby increasing convenience of the article transfer system.

Upon request by the user, switching is carried out among the above-described three console modes. However, the three console modes may not be executed in a selective manner. For example, on the display section 117 of the console terminal 103, the console window in the virtual space console mode may be displayed together with the console window in the location icon console mode or the action icon console mode. Alternatively, the console window in the location icon console mode may be displayed together with the console window in the action icon console mode.

According to the present embodiment, the display controller 118 of the console terminal 103 creates the console window. However, the console window may be created by the environment management server 101. In this case, the console window created by the server 101 is sent to the console terminal 103 via a network and the console terminal 103 displays the received console window on the display section 117. When the console mode is switched through the input section 116, the console terminal 103 sends a mode switch request signal to the server 101. The server 101 then creates the console window in the requested console mode and sends it to the console terminal 103.

As described above, the article transfer system according to the present invention includes a robot 102 for transferring an article existing in a predetermined life space (environment) and a designation device (console terminal 103) having a display section 117 for displaying a console window and an input section 116 which serves as an interface for a user. The display section 117 displays the console window and the user designates a task of the robot 102 to execute in the console window through the input section 116 such that the robot 102 transfers the article in the life space according to the task designated in the console window. The system has, as a console mode of the designation device, a location icon console mode for displaying on the display section 117 a console window including an article icon indicative of an article existing in the life space and a location icon indicative of a specific location in the life space.

In the life space such as homes, locations of articles are not fixed and their destinations are not fixed either. According to the present invention, the console window shows article icons corresponding to articles existing in the complicated life space and location icons indicative of specific locations in the life space. Once the user designates a desired article icon and a desired location icon, the robot transfers the designated article to the designated location. Thus, in the complicated life space, everybody can easily designate the task of the robot.

According to the present invention, the console window shows a generic icon covering (generically indicative of) a plurality of locations in the life space. When the article icon and the generic icon are designated in the console window, a location suitable for the attribute of the designated article is selected from the plurality of locations in the life space covered (generically indicated) by the generic icon. Then, the robot 102 transfers the designated article to the selected location in the life space.

Where two wastebaskets (locations) such as a recycle basket for recyclable trash and a general wastebasket for other trash exist in the life space, the console window shows the location icons only (a recycle basket icon and a general wastebasket icon). In this case, for example, when the user wants to instruct the robot 102 to throw away the trash existing in the life space, he/she has to identify whether the trash is recyclable or not and designate either the recycle basket icon or the general wastebasket icon.

According to the present invention, however, a wastebasket icon is provided as a generic icon covering (generically indicative of) both of the two wastebaskets. When the article icon and the wastebasket icon are designated in the console window, the destination of the article is determined according to the attribute of the article, i.e., the recycle basket is selected when the designated article icon is indicative of recyclable trash, or alternatively, the general wastebasket is selected when the designated article icon is indicative of other trash.

In this manner, a location suitable for the attribute of the designated article is selected from the plurality of locations in the life space covered (generically indicated) by the generic icon. As a result, the robot 102 transfers the designated article to the selected location in the life space.

If the generic icon is provided in the console window as described above, the user is allowed to designate the task of "putting (transferring) the trash in the wastebasket" in the console window without paying attention to the attribute to the trash. Then, the robot 102 puts the designated trash in the wastebasket corresponding to the attribute of the trash. Thus, the generic icon allows the user to designate the task more easily.

The article transfer system according to the present invention further has, as a console mode of the designation device, a virtual space console mode for displaying on the display section 117 a console window showing a virtual space which simulates the actual conditions of the life space and an article icon which is placed, in the virtual space to correspond to an article existing in the life space.

As the virtual space simulating the actual conditions of the life space is shown in the console window, the actual conditions of the life space such as homes, which are more complicated than those in factories and warehouses, are displayed as they are in the console window. For example, article icons are placed in the virtual space such that the article icons correspond to the articles actually existing in the life space, though the positions of the articles are not fixed in the life space. Therefore, among the articles placed at various positions in the life space, an article transferred by the robot 102 is designated with ease. By designating the task of the robot 102 in the virtual space, the task of the robot 102 in the complicated life space is easily designated.

If the location icon console mode and the virtual space console mode are established, the console modes may be switched in accordance with the task of the robot 102. As a result, a desired task is surely assigned to the robot 102 by a simple operation.

The article transfer system according to the present invention further includes, as a console mode of the designation device, an action icon console mode for displaying on the display section 117 a console window showing an article icon indicative of an article existing in the life space and an action icon indicative of an action exerted on the article. Specifically, in the console window in the action icon console mode, the action icon indicative of the action exerted on the article is shown in place of the location icon displayed in the location icon console mode.

In the action icon console mode, the article icon and the action icon are designated in the console window, thereby designating an article handled by the robot 102 and an action exerted on the article. Once the article and the action exerted on the article are designated, a location in the life space is selected according to the attribute of the designated article and the designated action. Therefore, in the action icon console mode, for example, if the designated article is a "block (toy)" and the designated action is "clean up", a "closet" is selected as the destination. Alternatively, when the designated articles are a "glass (eating utensil)" and a "T-shirt (garment)" and the designated action is "clean up", a "kitchen" is selected as the destination of the "glass" and a "clothesbasket" is selected as the destination of the "T-shirt". Further, when the designated article is an "empty can (recyclable trash)" and the designated action is "throw away", a "recycle basket" is selected as the destination.

Thus, according to the destination which has been selected in this manner, the robot 102 transfers the designated article to the selected location.

In the action icon console mode, only the action exerted on the article is designated in the console window. Then, a destination suitable for the article is selected and the robot 102 transfers the article to the selected destination. Therefore, the user is not required to specifically designate the destination. Thus, the user is allowed to designate the task significantly easily.

If the two console modes including the location icon console mode and the action icon console mode are established, or the three console modes including the location icon console mode, the action icon console mode and the virtual space console mode are established, the console modes may be switched in accordance with the task of the robot 102.

In the article transfer system according to the present invention, the article icon is dragged and dropped onto a different icon (location icon or action icon) in the console window, thereby designating the article transferred by the robot 102 and the destination of the article or the action exerted on the article. As the task of the robot 102 is designated in the console window by an intuitive action of dragging and dropping of the article icon, the designation of the task of the robot 102 is carried out more easily.

Further, if the virtual space console mode is configured such that the article transferred by the robot 102 and the destination of the article are designated by dragging and dropping a desired article icon to a desired location in the virtual space, the task of transferring the article is designated by an intuitive action of dragging and dropping the article icon to the desired location in the virtual space. As a result, the task of the robot 102 is significantly easily designated. Further, unlike the location icon console mode, the virtual space console mode allows the user to designate the destination of the article as he/she likes because the destination of the article is determined in the virtual space.

In the article transfer system according to the present invention, the console window in the location icon console mode or the action icon console mode is configured such that a plurality of article icons are drag-and-droppable at one time. When the plurality of article icons are dragged and dropped onto the location icon at one time, the articles are transferred to the location indicated by the location icon. Further, when the plurality of article icons are dragged and dropped onto a generic icon at one time, locations corresponding to their attributes are selected and the articles are transferred to suitable destinations, respectively. When the plurality of article icons are transferred to the action icon at one time, locations corresponding to their attributes are selected and the articles are transferred to suitable destinations, respectively. Since the plurality of article icons are dragged and dropped at one time, the user is allowed to designate the task more easily.

Another article transfer system according to the present invention includes a robot 102 for transferring an article existing in a predetermined life space and a designation device (console terminal 103) including a display section 117 for displaying a console window and an input section 116 which serves as an interface for a user. In the article transfer system, the display section 117 displays a console window showing an article icon indicative of the article existing in the life space and an action icon indicative of an action exerted on the article and the user designates the article handled by the robot 102 and the action exerted on the article in the console window through the input section 116 such that a location in the life space is selected according to the attribute of the article and the action both designated in the console window. Thus, the robot 102 transfers the designated article to the selected location in the life space.

According to the above-described structure, all that the user has to do is to designate the article and the action exerted on the article in the console window. Then, a destination suitable for the article is selected and the article is transferred to the selected destination by the robot 102. Since there is no need of specifically designating the destination, the user is allowed to designate the task easily.

The article transfer system according to the present invention further includes a sensing unit 120 for detecting an article existing in a life space and the console window shows an article icon corresponding to the article detected by the sensing unit 120.

A robot control unit according to the present invention (console terminal 103) designates a task of the robot 102 which transfers an article existing in a predetermined life space. The robot control unit includes a display section 117 for displaying a console window and an input section 116 which serves as an interface for a user and further has a location icon console mode for displaying on the display section 117 a console window showing an article icon indicative of the article existing in the life space and a location icon indicative of a specific location in the life space such that the user designates the task of the robot 102 in the console window through the input section 116.

Thus, as described above, the task is assigned to the robot 102 by designating the article icon and the location icon in the console window. Therefore, everybody can easily designate the task of the robot 102.

The robot control unit according to the present invention further includes a virtual space console mode for displaying on the display section 117 a console window showing a virtual space which simulates actual conditions of the life space and an article icon which is placed in the virtual space to correspond to an article existing in the life space. In this mode, the user designates the task of the robot 102 in the virtual space through the input section 116.

The robot control unit according to the present invention further has an action icon control mode for displaying on the display section 117 a console window showing an article icon indicative of an article existing in the life space and an action icon indicative of an action exerted on the article such that the user designates the task of the robot 102 in the console window through the input section 116.

Another robot control unit according to the present invention includes a display section 117 for displaying a console window and an input section 116 serving as an interface for the user and further has an action icon console mode for displaying on the display section 117 a console window showing an article icon indicative of an article existing in the life space and an action icon indicative of an action exerted on the article such that the user designates the task of the robot 102 in the console window through the input section 116.

As described above-described structure, since the designation of the task of the robot 102 is carried out by merely designating the article and the action exerted on the article in the console window, the task of the robot 102 is easily designated.

In the present embodiment, the environment management server 101 creates robot control commands in response to a task message sent from the console terminal 103 and then sends the created robot control commands to the laborer robot 102. However, for example, the console terminal 103 may create the robot control commands in accordance with the task designated in the console window and then sends them to the laborer robot 102.

In the present embodiment, the article transfer system is composed of three subsystems including the environment management server 101, robot 102 and console terminal 103 and information exchange among the subsystems 101 to 103 is carried out through a wireless or wired network. However, the article transfer system is not limited to the structure. For example, the console terminal 103 and the environment management server 101 may be integrated.

The number of the robot 102 is not limited to one. A plurality of robots may work simultaneously in collaboration with each other.

In the present system, the destination selector 130 is incorporated in the laborer robot 102 which is the second subsystem. However, the destination selector 130 may be included in the environment management server 101 which is the first subsystem or the console terminal 103 which is the third subsystem.

Further, the action/location translator 131 incorporated in the console terminal 103. However, the action/location translator 131 may be included in the environment management server 101 or the laborer robot 102.

The present system has three console modes including the virtual space console mode, location icon console mode and action icon console mode. However, for example, the system may have any two of the three console modes or any one of the location icon console mode and the action icon console mode.

As described above, as to the article transfer system and the robot control system according to the present invention for use in life space, the display section of the console terminal (robot control unit) in the location icon console mode displays a console window showing an article icon indicative of an article existing in the life space and a location icon indicative of a specific location in the life space. Therefore, the user designates the article transferred by the robot and the destination of the article with use of the icons shown in the console window. Thus, everybody can easily designate the task of the robot. If a generic icon is included in the console window, the user is allowed to instruct the transfer of a desired article to a destination suitable for the attribute of the article without specifically designating the destination.

In the virtual space console mode, a console window showing a virtual space which simulates the actual conditions of the environment is displayed on the display section of the console terminal. Therefore, an article to be transferred and the destination of the article are designated by intuitively designating the article icon which is placed in the virtual space to correspond to the article existing in the life space and a location in the virtual space. Further, in the virtual space console mode, the user is allowed to designate the destination of the article in the virtual space as he/she likes.

In the action icon console mode, the display section of the console terminal (robot control unit) displays a console window showing the article icon and the location icon. Therefore, the user is allowed to designate the article and the action exerted on the article with use of the icons in the console window. As a result, the article is transferred to a specific destination according to the designated action and the attribute of the article. Thus, the user is allowed to designate the task with great ease.

As the system includes these console modes, the console modes are switched in accordance with the task of the robot. Thus, the article transfer system improves in convenience.

(Embodiment 4)

In this embodiment, an object of the present invention is to make a laborer robot place a transfer subject article in an appropriate state at a designated place in a life space such as a house or an office.

An article management system according to the present invention is a system for managing an article existing in a life space. The inventive article management system includes: a database containing at least information about an article in the life space; a designation device for designating a transfer subject article and a placement location which is a destination of the transfer subject article; a laborer robot having a holder for holding an article, the laborer robot holding the transfer subject article in the holder to place the transfer subject article at the placement location; and a placement posture determination section for determining a posture of the transfer subject article placed by the laborer robot based on the information contained in the database according to information about other articles in the vicinity of the placement location, wherein the transfer subject article is placed at the placement location in the posture determined by the placement posture determination section.

According to the article management system, the transfer subject article is placed in the posture determined according to the state of the other articles present in the vicinity of the placement location. Therefore, the transfer subject article is placed in an appropriate state, whereby the article is stored in an organized manner and the space is used efficiently.

Further, an article management system according to the present invention includes: a database containing article information about an article in the life space and map information of the life space; the designation device; the laborer robot; and a placement posture determination section for determining a posture of the transfer subject article placed by the laborer robot based on the information contained in the database according to circumstances in the vicinity of the placement location, wherein the transfer subject article is placed at the placement location in the posture determined by the placement posture determination section.

By the article management system, the transfer subject article is placed in the posture determined according to the circumstances in the vicinity of the placement location, and is thus placed in an appropriate state.

Furthermore, an article management system according to the present invention includes: the database; the designation device; the laborer robot; and a placement location determination section for determining a placement location for the transfer subject article based on the information contained in the database, wherein the placement location determination section determines based on the information of the database whether or not there is another article previously placed at the designated placement location, and if there is no article placed, the placement location determination section does not change the placement location, and if there is another article already placed, the placement location determination section changes the placement location to a vicinal location in which the transfer subject article does not overlap the other article; and the transfer subject article is placed at the placement location determined by the placement location determination section.

According to the article management system, in cases where the designated placement location is occupied by a different article, for example, the transfer subject article is not forced to overlap the different article for the placement, whereby the transfer subject article is placed in an appropriate state. Therefore, even in the case of an ambiguous instruction, the transfer subject article is placed in an appropriate state.

Moreover, an article management system according to the present invention includes: the database; the designation device; the laborer robot; and a placement location determination section for determining a placement location for the transfer subject article based on the information contained in the database, wherein the placement location determination section determines based on the information of the database whether or not there is another article previously placed at the designated placement location, and, if there is another article already placed, further determines whether or not it is possible to place the transfer subject article on the other article, and if possible, the placement location determination section does not change the placement location, and if not possible, the placement location determination section changes the placement location to a vicinal location in which the transfer subject article does not overlap the other article; and the transfer subject article is placed at the placement location determined by the placement location determination section.

According to the article management system, the transfer subject article is placed on another article, if possible, whereby the transfer subject article is placed in an appropriate state.

Furthermore, an article management system according to the present invention includes: the database; the designation device; the laborer robot; and a placement location determination section for determining a placement location for the transfer subject article based on the information contained in the database, wherein the placement location determination section determines based on the information of the database whether or not it is possible to place the transfer subject article at a designated placement location, and if possible, the placement location determination section does not change the placement location, and if not possible, the placement location determination section changes the placement location to a vicinal location where placement of the transfer subject article is possible; and the transfer subject article is placed at the placement location determined by the placement location determination section.

According to the article management system, even if a location where the transfer subject article cannot be placed is designated as the placement location, it is possible to place the transfer subject article in a vicinal location where placement of the transfer subject article is possible. Therefore, even in the case of an ambiguous instruction, the transfer subject article is placed in an appropriate state.

In the above article management system, the holder of the laborer robot may be any means for holding an article, and there is no specific limit to its holding manner. As the holder, various means can be used, such as means for grabbing an article, means for supporting an article, means for holding an article by suction, and means for holding an article by a magnetic or electric force, for example.

The life space means a space in which humans and articles exist while the formers are associated with the latters, such as a house or an office.

Specifically, a first aspect of this embodiment is directed to a system for managing an article existing in a life space and the system includes: a database containing at least information about an article in the life space; a designation device for designating a transfer subject article and a placement location which is a destination of the transfer subject article; a laborer robot having a holder for holding an article, the laborer robot holding the transfer subject article in the holder to place the transfer subject article at the placement location; and a placement posture determination section for determining a posture of the transfer subject article placed by the laborer robot based on the information contained in the database according to information about other articles in the vicinity of the placement location, wherein the transfer subject article is placed at the placement location in the posture determined by the placement posture determination section.

In a second aspect of this embodiment, the database in the first aspect contains information at least on either the type or shape of the article and information on a location and posture of the article; and the placement posture determination section in the first aspect determines whether or not an article equal or similar at least either in type or shape to the transfer subject article exists in the vicinity of the placement location, and if the equal or similar article exits, the placement posture determination section makes the placement posture of the transfer subject article fit in with that of the equal or similar article.

In a third aspect of this embodiment, in the second aspect if the placement location designated as the transfer destination is in a wastebasket, the placement posture determination section determines that the placement posture of the transfer subject article is not made to fit in with the posture of other articles in the wastebasket.

A fourth aspect of this embodiment is directed to a system for managing an article existing in a life space and the system includes: a database containing article information about an article in the life space and map information of the life space; a designation device for designating a transfer subject article and a placement location which is a destination of the transfer subject article; a laborer robot having a holder for holding an article, the laborer robot holding the transfer subject article in the holder to place the transfer subject article at the placement location; and a placement posture determination section for determining a posture of the transfer subject article placed by the laborer robot based on the information contained in the database according to circumstances in the vicinity of the placement location, wherein the transfer subject article is placed at the placement location in the posture determined by the placement posture determination section.

In a fifth aspect of this embodiment, if a placement space at the placement location is limited, the placement posture determination section in the fourth aspect determines the posture of the transfer subject article such that the transfer subject article is accommodated in the placement space.

In a sixth aspect of this embodiment, the placement posture determination section in the fourth aspect determines, as the placement posture of the transfer subject article, a posture that allows the transfer subject article to be stably placed at the placement location.

A seventh aspect of this embodiment is directed to a system for managing an article existing in a life space and the system includes: a database containing article information about an article in the life space and map information of the life space; a designation device for designating a transfer subject article and a placement location which is a destination of the transfer subject article; a laborer robot having a holder for holding an article, the laborer robot holding the transfer subject article in the holder to place the transfer subject article at the placement location; and a placement location determination section for determining a placement location for the transfer subject article based on the information contained in the database, wherein the placement location determination section determines based on the information of the database whether or not there is another article previously placed at the designated placement location, and if there is no article placed, the placement location determination section does not change the placement location, and if there is another article already placed, the placement location determination section changes the placement location to a vicinal location in which the transfer subject article does not overlap the other article; and the transfer subject article is placed at the placement location determined by the placement location determination section.

An eighth aspect of this embodiment is directed to a system for managing an article existing in a life space and the system includes: a database containing article information about an article in the life space and map information of the life space; a designation device for designating a transfer subject article and a placement location which is a destination of the transfer subject article; a laborer robot having a holder for holding an article, the laborer robot holding the transfer subject article in the holder to place the transfer subject article at the placement location; and a placement location determination section for determining a placement location for the transfer subject article based on the information contained in the database, wherein the placement location determination section determines based on the information of the database whether or not there is another article previously placed at the designated placement location, and, if there is another article already placed, further determines whether or not it is possible to place the transfer subject article on the other article, and if possible, the placement location determination section does not change the placement location, and if not possible, the placement location determination section changes the placement location to a vicinal location where the transfer subject article does not overlap the other article; and the transfer subject article is placed at the placement location determined by the placement location determination section.

A ninth aspect of this embodiment is directed to a system for managing an article existing in a life space and the system includes: a database containing article information about an article in the life space and map information of the life space; a designation device for designating a transfer subject article and a placement location which is a destination of the transfer subject article; a laborer robot having a holder for holding an article, the laborer robot holding the transfer subject article in the holder to place the transfer subject article at the placement location; and a placement location determination section for determining a placement location for the transfer subject article based on the information contained in the database, wherein the placement location determination section determines based on the information of the database whether or not it is possible to place the transfer subject article at the designated placement location, and if possible, the placement location determination section does not change the placement location, and if not possible, the placement location determination section changes the placement location to a vicinal location where placement of the transfer subject article is possible; and the transfer subject article is placed at the placement location determined by the placement location determination section.

Embodiment 4 of the present invention relates to an article management system for managing an article existing in a life space. Herein, the term "a life space" means a space in which humans and articles exist while the formers are associated with the latters, such as a house or an office.

Figure 29:
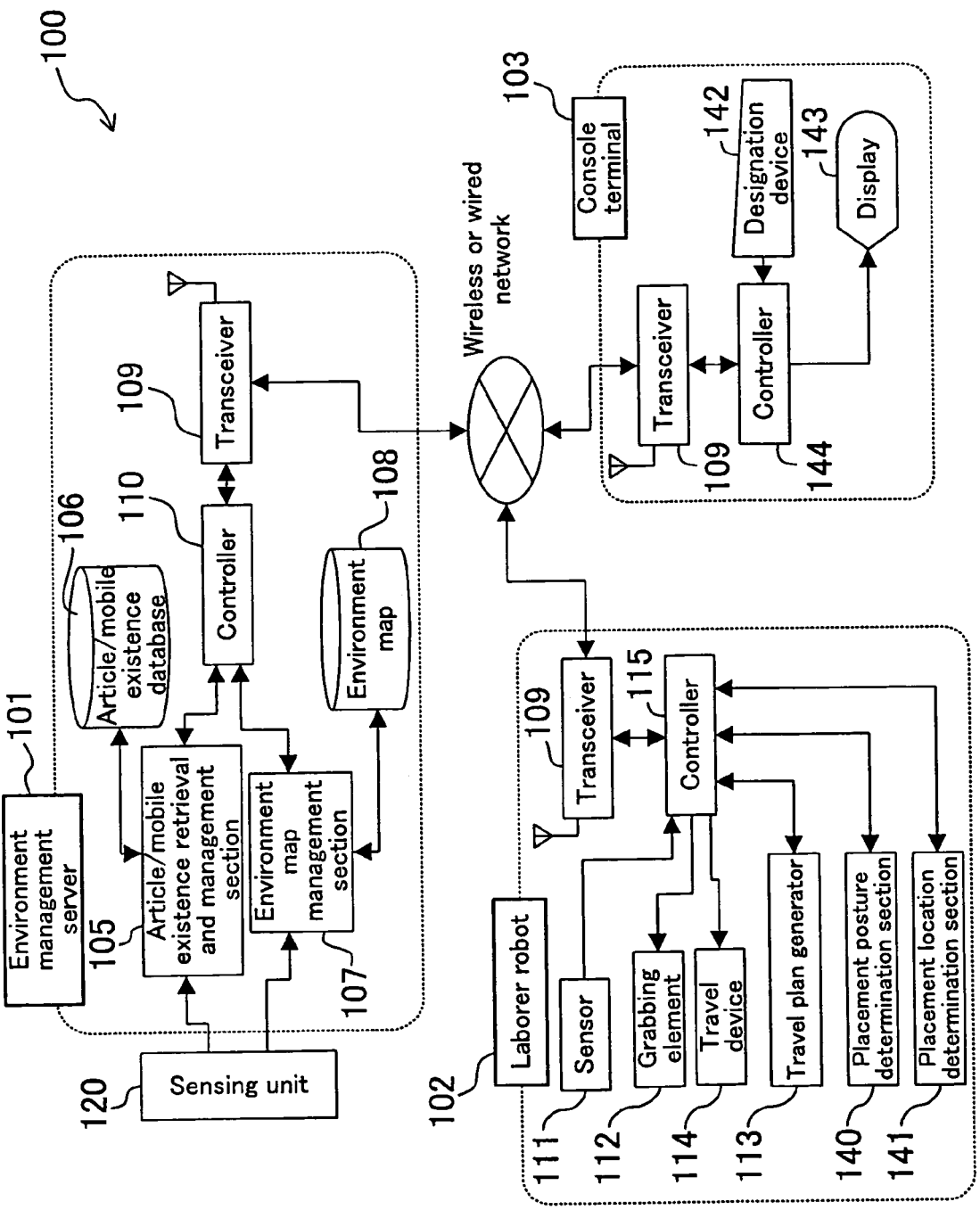
FIG. 29 illustrates a configuration of an article management system according to embodiment 4.

FIG. 29 is a block diagram illustrating an example of the entire configuration of an article management system 100 according to this embodiment. In FIG. 29, components common to those shown in FIG. 2 are designated by the same reference numerals and the detailed descriptions thereof will be thus omitted herein.

An article/mobile existence database 106 and an environment map 108 constitute a "database" of this invention. In this embodiment, the term "environment" means a so-called life space.

Map information contains structural information on objects (immovable objects) that are normally hardly moved, such as a room or furniture. The structural information means regional information on a placement surface which exists at least inside of a space occupied by the immobile object and on top of the immobile object and on which another object can be placed. Examples of the placement surface on which another object can be placed include, if the immobile object is a room, a floor and, if it is a storage space, a shelf. An example of the regional information on the placement surface is vertices of the circumscribed polygon of the placement surface. The regional information is represented by a coordinate system, by a coordinate system and shape, or the like.

Figure 30:
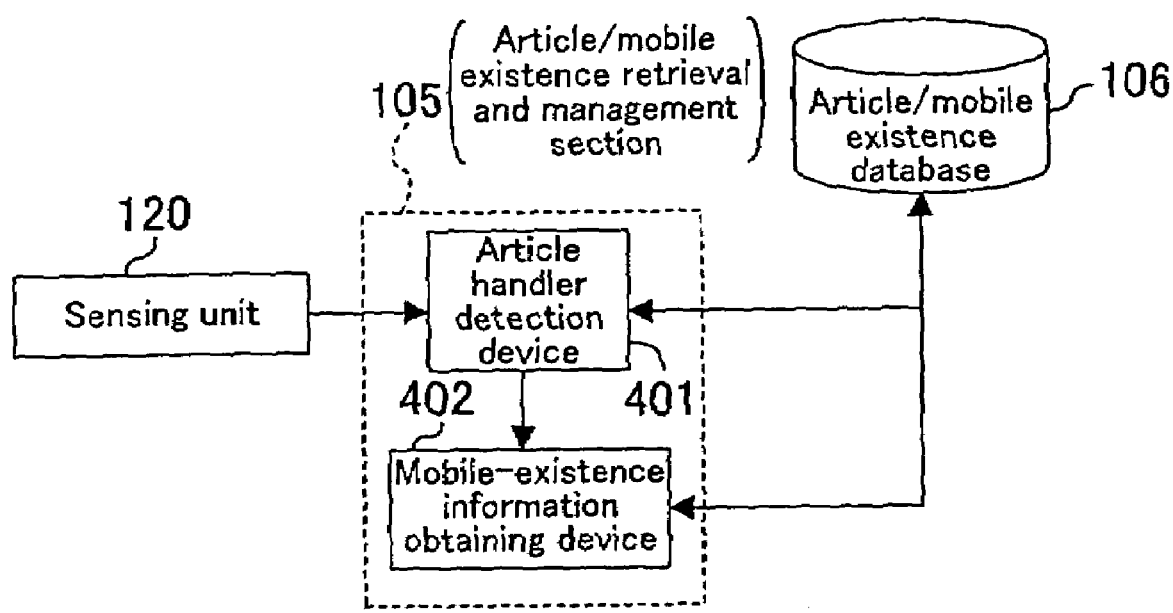
FIG. 30 is a block diagram schematically illustrating the basic structure of an article/mobile existence retrieval and management section.

FIG. 30 is a block diagram schematically illustrating the basic structure of an article/mobile existence retrieval and management section 105 according to this embodiment. The article/mobile existence retrieval and management section 105 of FIG. 30 includes an article handler detection device 401 for detecting that an article registered in the article/mobile existence database 106 is being handled by a mobile existence, and a mobile-existence information obtaining device 402 for obtaining information on the mobile existence that is handling the article detected by the article handler detection device 401.

The article handler detection device 401 uses a sensing unit 120 to detect that an article is being handled by a mobile existence. For example, where the sensing unit 120 uses a background difference method as described above, the sensing unit 120 compares an input image with a model image. And when a difference over time occurs in a region, the sensing unit 120 assumes that an article is handled in that region. The detection method of the article handler detection device 401 is not limited to the above method, but an electronic tag, for example, may be used.

When the article handler detection device 401 has detected that an article is being handled by a mobile existence, the mobile-existence information obtaining device 402 obtains information on the mobile existence that is handling the article. For example, when a camera is used as the sensing unit 120 as described above, an image of the region in which the article was handled is taken by the camera, and the image is subjected to a face identification process. It can be assumed that the mobile existence identified in this manner existed near the article when the article was handled, thereby assuming that this mobile existence is the handler. In a background difference method, since a wide angle camera is typically used, there may be cases in which the resolution of image is too low for face identification. Therefore, in addition to a camera for a background difference method, a narrow-angle high-resolution camera may be provided for face identification, and the narrow-angle camera may be trained on the region in which handling of an article has been detected by the article handler detection device 401 so as to perform the identification. The mobile-existence identification method is not limited to face identification, but may be iris identification, for example. Alternatively, the identification does not have to be performed, in which case images of the region in which article handling has been performed may be taken by a camera and the images may be used by other means. These images may be used only when the identification was not performed successfully.

Where electronic tags are used as the sensing unit 120, information on articles and mobile existences can be collected by appropriately placing tag reader/writers as shown in FIG. 5. Also, when handling of articles in a specific place is controlled, it is desirable that article information and mobile-existence information be obtained by disposing tag reader/writers in the specific place.

In cases where such tag reader/writers are used, it is desirable that information on a mobile existence that has passed through the door or window together with an article be stored in the article/mobile existence database 106 as the carrier of the article. Then, carriers of articles can be controlled automatically by simple processing.

<Article/Mobile Existence Database>

Figure 31A:
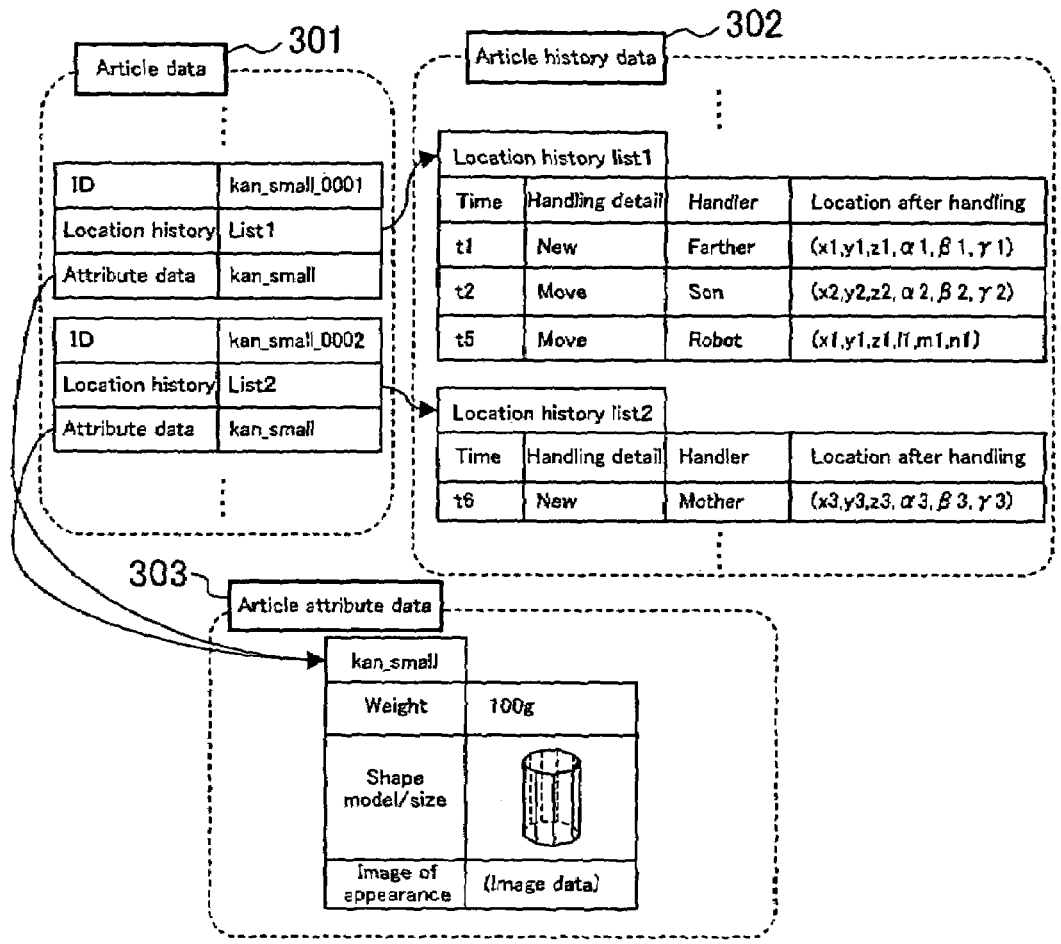
FIG. 31 is an explanatory diagram of a data configuration of an article/mobile existence database.
Figure 31B:
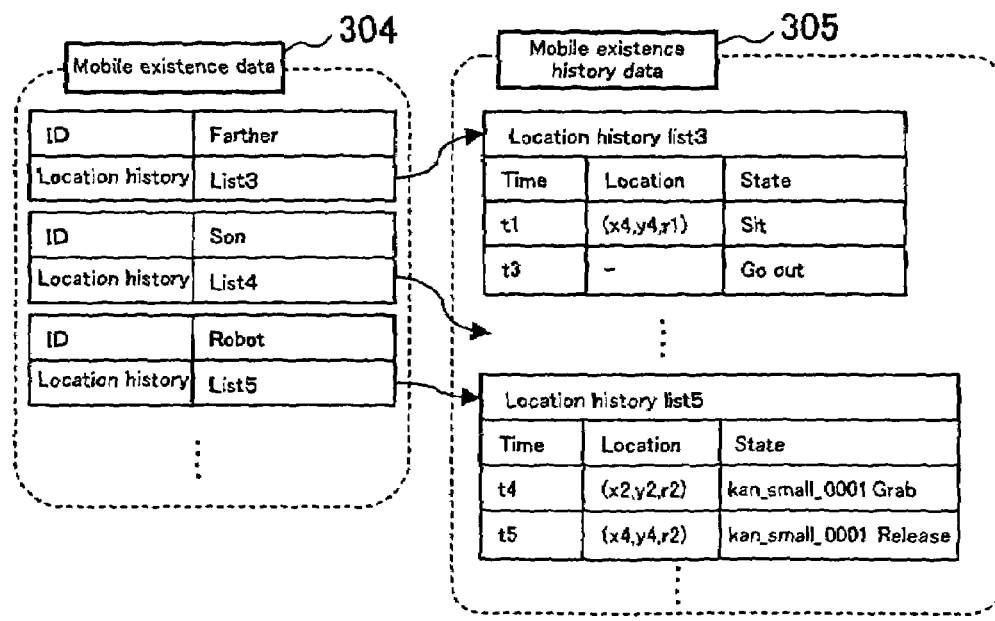

FIG. 31 is a conceptual diagram illustrating an exemplary configuration of the article/mobile existence database 106 and exemplary contents of the data therein. The article/mobile existence database 106 is roughly composed of a database for dealing with an article (see FIG. 31A) and a database for dealing with a mobile existence (see FIG. 31B).

The database for dealing with an article is composed of three sub-databases for storing different types of data: a sub-database containing article data 301, a sub-database containing article history data 302, and a sub-database containing article attribute data 303. The contents of the data of the three types are as follows.

A single set of article data 301 is composed of an ID for use in identifying an individual article, a pointer to a single set of article history data 302 containing a history of motions of that article, and a pointer to a single set of article attribute data 303 containing physical attributes of that article. Even articles of the same kind must be handled as different articles, so long as they are physically different from each other. Therefore, even articles of the same kind are assigned different IDs. Nevertheless, articles of the same kind, having different IDs, have the same physical attributes. Therefore, in the case of articles of the same kind, their pointers indicate the same article attribute data 303 so as not to waste the storage space in the database.

Each set of article history data 302 contains a history of motions of an article and is composed of the four items: times at which the article was handled, the handling detail, handlers, and the locations after the handling. Each location is represented by six parameters in this embodiment, although the data on locations can be expressed in various ways. The first three parameters (x1, y1, z1) represent the position of the article at one time (for example, the center of gravity of the article may be used as the representative position), while the latter three parameters ($\alpha 1$, $\beta 1$, $\gamma 1$) represent the posture of the article at that one time. How to express the posture of the article will be described later. The data on locations and postures is obtained by the sensing unit 120 or a sensor 111 of a robot, which will be discussed later (see FIG. 29). The handler is selected from the mobile existences registered in mobile existence data (which will be described later) by making a conjecture in such a manner as described above.

Each set of article attribute data 303 contains information on physical attributes of an article unique to that article. In FIG. 31A, shape, weight, image of outward appearance, etc. are shown as examples of the physical attributes. The attribute data is obtained beforehand for registration by manual operation using measurement methods suitable for the respective attributes.

Next, shape data and posture data of an article will be described with reference to FIG. 32.

First, shape data of an article will be discussed. FIG. 32A illustrates the original shape (cylinder) of an article (e.g., a beverage can). When such an article is measured using stereoscopic three-dimensional measurement technique or the like, polygon data can be obtained in which one surface of the article is approximated by a plurality of surfaces as shown in FIG. 32B. Each surface is described as a set of vertex coordinates in an appropriately selected reference coordinate system ((X', Y', Z') in the figure) for the article.

Next, posture data of an article will be described. FIG. 32C shows the state of the article in the real world. The coordinates X, Y, and Z indicate the coordinates in the real world, while the coordinates X', Y', and Z' represent the coordinates (article coordinates) relative to the article. As described above, the shape of the article in the real world can be obtained, e.g., by constructing the sensing unit 120 of the environment management server 101 or the sensor ill of the laborer robot 102 with two cameras and by performing stereoscopic three-dimensional measurement. And the obtained shape of the article in the real world is compared with the shape data of the article (polygon model) for a match, whereby it can be found how the article is rotated in three dimensions in the real world, and based on this matching, the posture data of the article can be obtained.

Figure 33A:
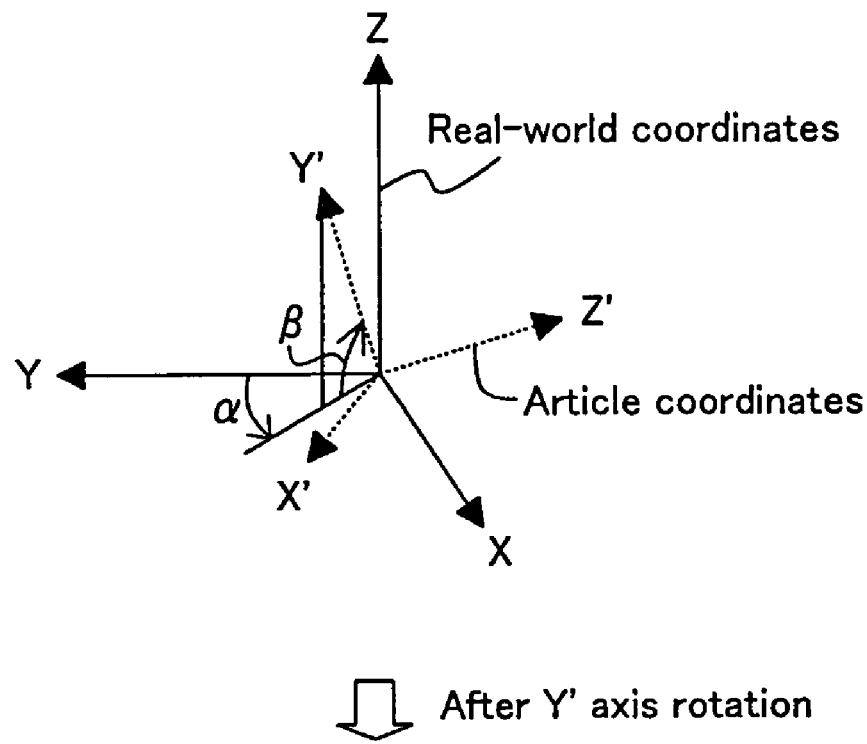
FIG. 33 shows relationship between coordinates in the real world and article coordinates.
Figure 33B:
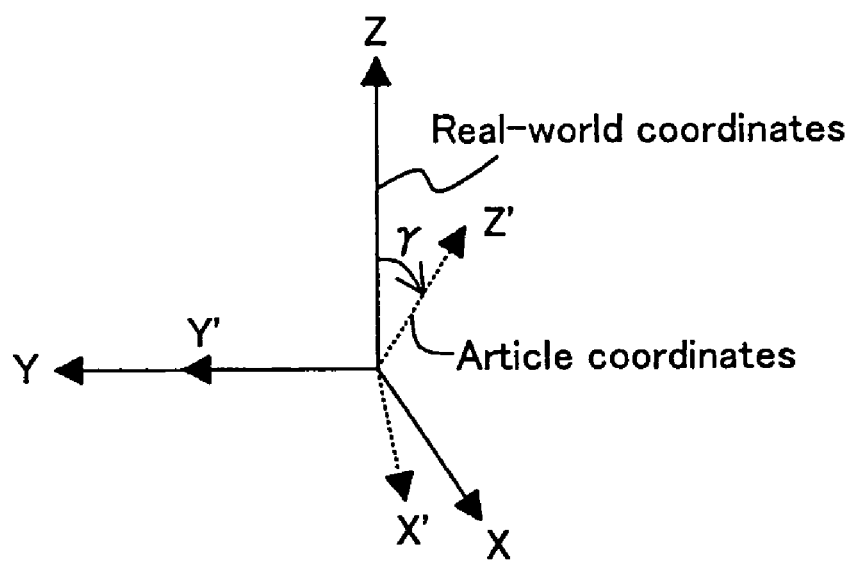

More specifically, after the matching between the shape data of the article (polygon model) and the shape data in the real world, how the coordinates of the article associated with the shape data of the article are rotated in three dimensions in the real world is calculated. To that end, first, it is assumed that the X' axis is horizontally rotated by an angle of a and vertically rotated by an angle of β with respect to the X axis, and the values of the angles α and β are obtained. FIG. 33A is a view illustrating the X' axis that is horizontally rotated by an angle of –α and vertically rotated by an angle of –β. Then, as shown in FIG. 33B, it is assumed that the Z' axis is rotated with respect to the Z axis by an angle of γ, and the value of the angle γ is obtained. In this manner, posture data on the posture of the article placed in the real world can be specified using the variables (α, β and γ).

Such posture data is used, e.g., to change the posture of an article. For example, in using the robot 102 to place an article grabbed by the robot, if the circumstances of the placement location and the grabbed posture of the article do not match, the posture data is used to change the posture of the article to an appropriate posture. For instance, as will be described in FIG. 37, in a case where a grabbed book 50 is placed on a bookshelf 55, if the height of the book in a posture (a posture 2), in which the book stands vertically, is higher than that of the space in the bookshelf 55, the grabbed posture is changed from the posture 2 to a posture (a posture 3 in which the book stands with its backbone being the bottom or the top) that allows the book to be accommodated on the bookshelf. The posture data described above is used in cases like this.

Next, a database for dealing with a mobile existence will be described (see FIG. 31B). The database for dealing with a mobile existence is composed of three sub-databases: a sub-database containing mobile existence data 304, a sub-database containing mobile existence history data 305, and a sub-database containing mobile existence attribute data (not shown). The contents of the data of the three types are as follows.

A single set of mobile existence data 304 is composed of an ID for use in identifying an individual mobile existence and a pointer to a single set of mobile existence history data 305 containing a history of motions of that mobile existence.

A single set of mobile existence history data 305 is composed of times, locations of the mobile existence at the above times and states of the mobile existence at the above times. The location of the mobile existence at one time is expressed by three values including coordinates (X, Y) in a surface and a direction r.

Although not shown, a set of mobile existence attribute data contains information about inherent physical attributes of the particular mobile existence. Examples of the physical attributes include weight, shape, etc.

In the mobile existence history data 305, the state of the mobile existence indicates, if the mobile existence is a human, a normal human action such as "sit", "stand", "lie" or "walk" and, if it is a robot, handling that the robot can perform on an article, such as "grab" or "release". Possible states of each mobile existence may be previously defined and one of the states may be selected later. If the mobile existence is a robot, the state is expressed, not by the handling detail only, but by a combination of the ID of the article to be handled and the handling detail.

As will be described later, one of the functions of the article management system 100 of this embodiment is that when the robot 102 places a grabbed article in a destination location, the posture of the article is changed according to the circumstances of the placement location or the like. For example, when a different article is already placed in the vicinity of the placement location, the article management system 100 functions, e.g., to place the grabbed article next to the different article. In order to exhibit this function, it is necessary to successively record and store information about the article in the database, such as where and in what posture the article is being placed. However, history data which shows past locations and postures is not always needed, but it is sufficient if the latest information is always obtained.

An example of data update for the article/mobile existence database 106 is as described in embodiment 1.

<Environment Map Management Section>

Figure 34A:
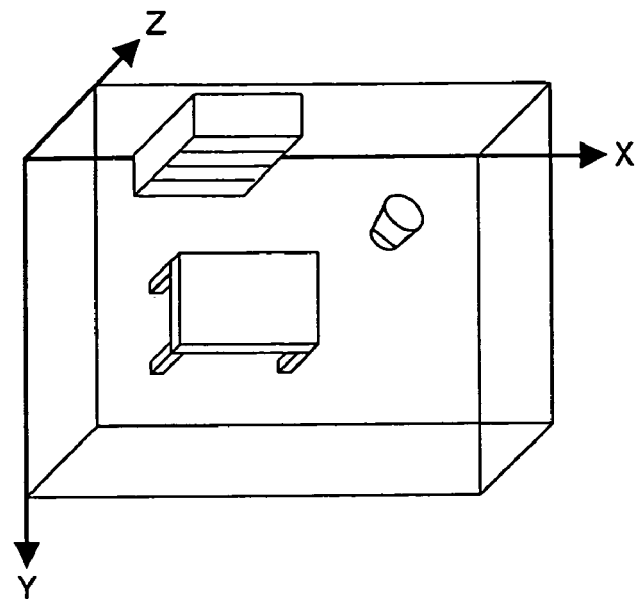
FIGS. 34A, 34B and 34C are explanatory views of environment maps.
Figure 34B:
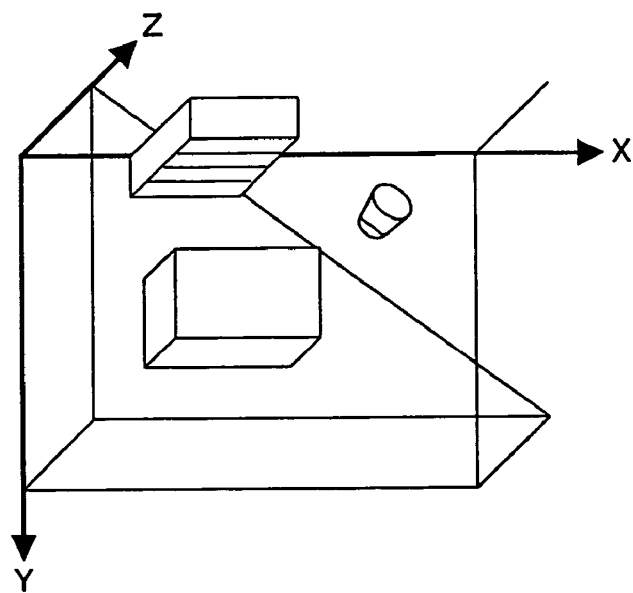
Figure 34C:
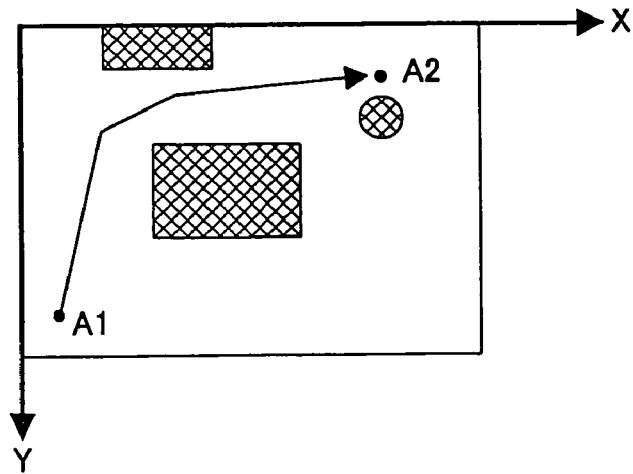

The environment map management section 107 manages a map of the environment in which handling of articles is performed. FIG. 34 schematically illustrates exemplary environment maps in comparison with the actual environment. FIG. 34A illustrates the actual environment, FIG. 34B shows, as an environment map, a cubic model in which the actual environment is simplified, and FIG. 34C shows a planar model in which the actual environment is further simplified. In this way, the environment map may be provided as cubic data, or more simply, as planar data. The data may be prepared with consideration given to the application of the map or the time and labor required for preparation of the map. For example, if it is necessary to prepare a cubic model in a very short time, cubic objects may be modeled as the smallest rectangular parallelepipeds that cover the cubic objects. For instance, the model in FIG. 34B shows an example of such a case. In FIG. 34B, the table existing in the center in FIG. 34A is modeled as a rectangular parallelepiped. In the case of planar data, modeling is also carried out similarly. In the model in FIG. 34C, the table in the center is represented by a rectangular region (a rectangular hatched region shown in FIG. 34C) orthogonally projected on the plane, and this region is defined as a region where the robot cannot enter (a robot non-enterable region).

<Environment Map>

Figure 35:
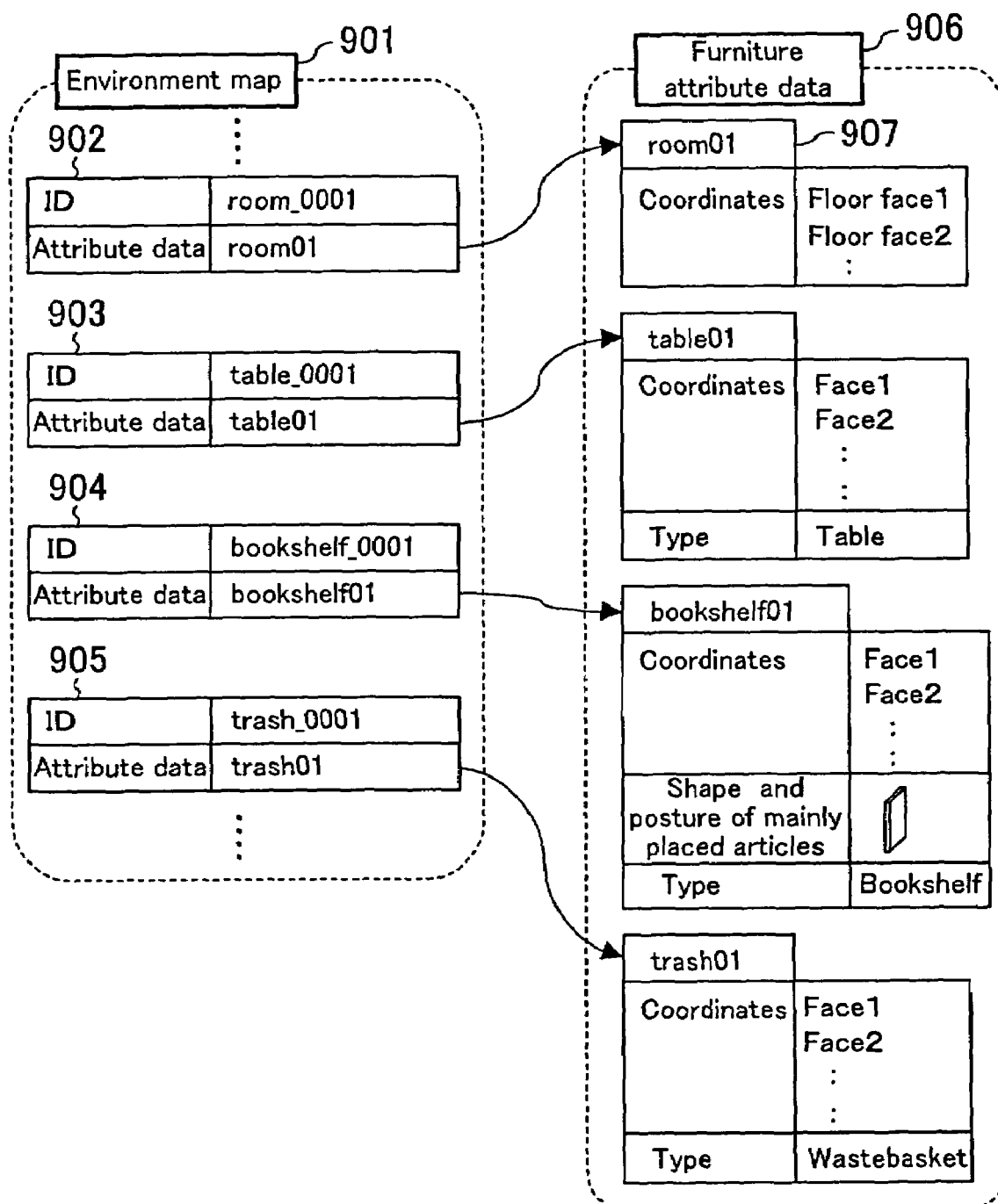
FIG. 35 is an explanatory view of a data configuration of the environment map.

FIG. 35 shows exemplary data in the environment map 108 that correspond to FIG. 34. The environment map 108 contains an environment map 901 and furniture attribute data 906.

In the environment map 901, data 902 indicating the size of the room is stored. In this example, since there are a table, a bookshelf and a wastebasket in the room, respective data 903 to 905 are stored in the environment map 901. The furniture attribute data 906 contains attributes of the room, furniture, and the like. For example, when there are a plurality of floor faces of different heights in the room, floor-face data is recorded in the room attributes 907 in the furniture attribute data 906 for each of that number of floor faces.

In a single set of floor-face data, the coordinates (the coordinate locations in the real-world coordinate system) of the vertices of that particular face are written, and in addition, the height to the ceiling and the material of that floor face are provided. For example, data of a rectangular floor face is represented by ((X1, Y1, Z1), (X2, Y2, Z2), (X3, Y3, Z3), (X4, Y4, Z4), 2200, 0).

As the reference of the height, the lowest floor face in the room is regarded as 0. The first four sets of coordinates represent the coordinates of the vertices, the next value "2200" indicates the height (2200 mm) to the ceiling, and the last figure represents the material of the floor face. As to the floor face material, a corresponding number is determined in advance for each material. For example, "0" is for wooden floor, "1" for tatami, and "2" for carpet.

The attributes of each furniture include data on a plurality of surfaces of a polyhedron that approximate a surface of the furniture, the type of furniture, surfaces of the furniture on which an article can be placed (available faces), the shapes and postures of articles mainly placed on the available faces, and the like.

A single set of furniture surface data contains the coordinates (the coordinate locations in the real-world coordinate system) of the vertices of that surface, and in addition, a flag indicating whether or not an article can be placed on that surface. If an article can be placed on that surface, the upward height is also added. The upward height means, in the case of the top of a table, the height to the ceiling, and in the case of a shelf, the distance to the next-higher shelf, for example.

For example, data on a surface having three vertices is represented by ((X1, Y1, Z1), (X2, Y2, Z2), (X3, Y3, Z3), 1, 400).

The first three sets of coordinates indicate the coordinates of the vertices, and the next figure "1" indicates that an article can be placed on that surface. If this figure is "0", it means that no article can be placed on that surface. The last figures "400" indicate that the upward height is 400 mm. The data on the type of furniture is used to determine what (a table, a bookshelf, a wastebasket, or the like) is the furniture existing in the particular location.

Examples of the shapes, postures, etc. of articles mainly placed on the available faces of furniture are as follows. In a case where the furniture is a bookshelf, for example, the shape of "books", which are the articles mainly accommodated in the furniture, and the normal posture of the books when they are placed in the furniture are described. The shape of books when they stand on the bookshelf in a normal manner is a rectangular parallelepiped, whose depth and height are extremely longer than the width. However, as in the case of a table or a wastebasket, there are cases where the shapes and postures of articles to be placed are not limited. The furniture attribute data 906 containing such attributes enables the laborer robot 102 to place a grabbed article in a favorable posture. For instance, when the article grabbed by the laborer robot 102 is similar in shape to a book and a bookshelf is designated as the placement location for that article, the laborer robot 102 can place the grabbed article in a way in which books are normally placed on a bookshelf. This is applicable not only to the relation between a bookshelf and a book, but also to other relations between a shoebox and shoes, between a dish dryer (or a cupboard) and dishes, and the like.

When the laborer robot 102 is moved in this environment, a traveling route plan is made using the environment map 108. For example, when the laborer robot 102 is moved from a point A1 to a point A2 using the plan-model environment map of FIG. 34C, a route avoiding the non-enterable regions (indicated by the curved arrow of FIG. 34C) may be determined by calculation in consideration of the shape and size of the laborer robot 102.

<Controller in Environment Management Server>

The controller 110 of the environment management server 101 controls the entire server 101 and mainly performs the following control as described above.

More specifically, upon receipt of a query about data in the server 101 from outside through the transceiver 109, the controller 110 issues, according to the content of the query, a request for reference to that data to the article/mobile existence retrieval and management section 105 or the environment map management section 107. The controller 110 also transmits to the querying source through the transceiver 109 the reference results sent from the article/mobile existence retrieval and management section 105 or the environment map management section 107 in response to the request. Also, the controller 110 interprets requests for registration/update of the various data in the server transmitted from outside through the transceiver 109, and according to their contents, the controller 110 outputs the data registration/update requests to the article/mobile existence retrieval and management section 105 or the environment map management section 107. Details of operation of the controller 110 will be described later.

Structure of Laborer Robot

In the article management system 100, the laborer robot 102 functions to actually grab and transfer an article existing in the environment. The article grabbing and transfer process by the laborer robot 102 may be partially or completely automated. In this embodiment, the user gives an instruction through a console terminal 103, which will be described later, and the laborer robot 102 functions in accordance with the instruction.

As shown in FIG. 29, the laborer robot 102 includes as its basic components a sensor 111, a grabbing element 112, a travel plan generator 113, a placement posture determination section 140, a placement location determination section 141, a travel device 114, a transceiver 109, and a controller. 115. The sensor 111 senses obstacles and the like existing around the robot and obtains information on the article to be grabbed. The grabbing element 112 grabs the article. The travel plan generator 113 makes a travel plan using the environment map 108. The placement posture determination section 140 calculates the placement posture of the article to be grabbed according to the circumstances of the placement location and the like. The placement location determination section 141 determines, e.g., whether or not a different article is already placed at the placement location when the grabbed article is placed, and, if necessary, changes the placement location. The travel device 114 is used for traveling of the robot. The transceiver 109 sends/receives data to/from the environment management server 101 and the console terminal 103. The controller 115 controls these components.

A placement location herein indicates a single point in the real-world space, for example. To place an article at a placement location is, e.g., to place the article so that the representative point (e.g., the center of gravity) of the article matches the placement location. Therefore, where the center of gravity, e.g., is the representative point, the location of the placed article represents the center of gravity of the article. Nevertheless, the representative point of the article is not limited to the center of gravity, but may be the shape center or other point.

Figure 36:
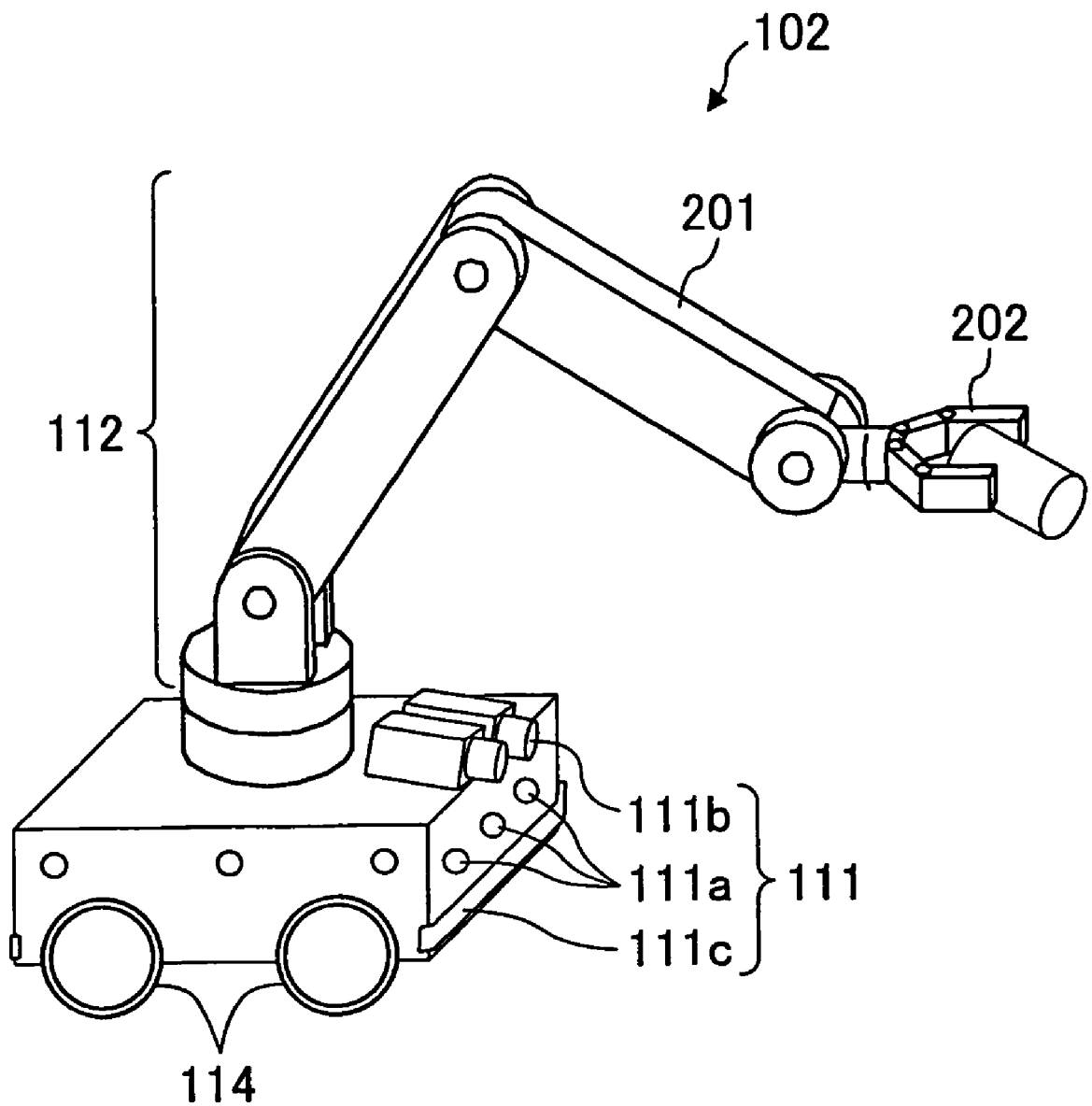
FIG. 36 is an oblique view of a laborer robot.

FIG. 36 schematically illustrates an example of the laborer robot 102 according to this embodiment. Hereinafter, a description will be made of the components of the laborer robot 102 with reference to FIG. 36 in which the direction in which the tip of an arm 201 faces is considered to be the front of the robot.

As the travel device 114, two wheels are provided on each side of the robot main body, that is, a total of four wheels are provided on both sides. In this example, wheels are provided as an example of the travel device 114. However, as the travel device 114, most suitable means may be selected in accordance with the place and environment in which the robot is used. For example, in cases where the robot moves on the rough ground, a crawler travel device or a multi-legged-walking travel device may be used. When the range of motion of the grabbing element 112, which is composed of the arm 201 and the hand 202, is the entire house, the travel device 114 is not necessarily needed.

The sensor 111 senses obstacles and the like existing in the vicinity of the robot. In this example, the sensor 111 is composed of ultrasonic sensors 111a, a stereo camera 111b serving as a vision sensor, and a collision sensor 111c. Three ultrasonic sensors 111a are disposed on each of the front face, the back face, and the left and right side faces. Each ultrasonic sensor 111a emits an ultrasonic wave and measures the duration of time between the emitting of ultrasonic wave and the receiving of its reflected wave, thereby roughly calculating the distance from the sensor to the obstacle. In this embodiment, the ultrasonic sensors 111a sense obstacles in the vicinity of the robot, before the robot comes into collision with those obstacles. The stereo camera 111b obtains the surrounding circumstances as an image, and performs processing, such as recognition, on the image, thereby obtaining more precise information for use in making determination about the presence/absence of obstacles and more precise information on the article to be grabbed. The collision sensor 111c senses application of an impact of a certain magnitude to the collision sensor 111c, thereby detecting that an obstacle that the other sensors cannot sense hit the robot or the robot itself hit the obstacle while traveling.

When the robot is instructed to move to a designated location, the travel plan generator 113 makes a travel route starting from the current location to the designated location by using data in the environment map 108 obtained from the environment management server 101. When an obstacle exists between the current location and the designated location, a route for avoiding the obstacle is naturally needed. Since the region in which the robot can travel is described beforehand in the environment map as mentioned above, a travel route may be prepared so as to be within that region. In preparing a travel route, the most commonly used Dijkstra method or the like is employed.

The placement posture determination section 140 determines the grabbed posture (placement posture) of an article grabbed to be placed by the robot, according to the circumstances of the placement location. For example, if a different article similar to the grabbed article is already placed in the vicinity of the placement location, the posture of the grabbed article is changed to fit in with the posture of the different article. Also, if the grabbed article cannot be placed at the placement location without changing the posture of the grabbed article (for example, the grabbed article cannot be accommodated within the space at the placement location), the posture of the grabbed article is changed so that the grabbed article can be placed at the placement location. At this time, information on the circumstances of the placement location (such as the width, depth, height, etc. of the placement location) and information on the different article placed in the vicinity of the placement location are necessary to change the posture of the grabbed article, and such information can be obtained by making reference to the environment management server 101.

Figure 37:
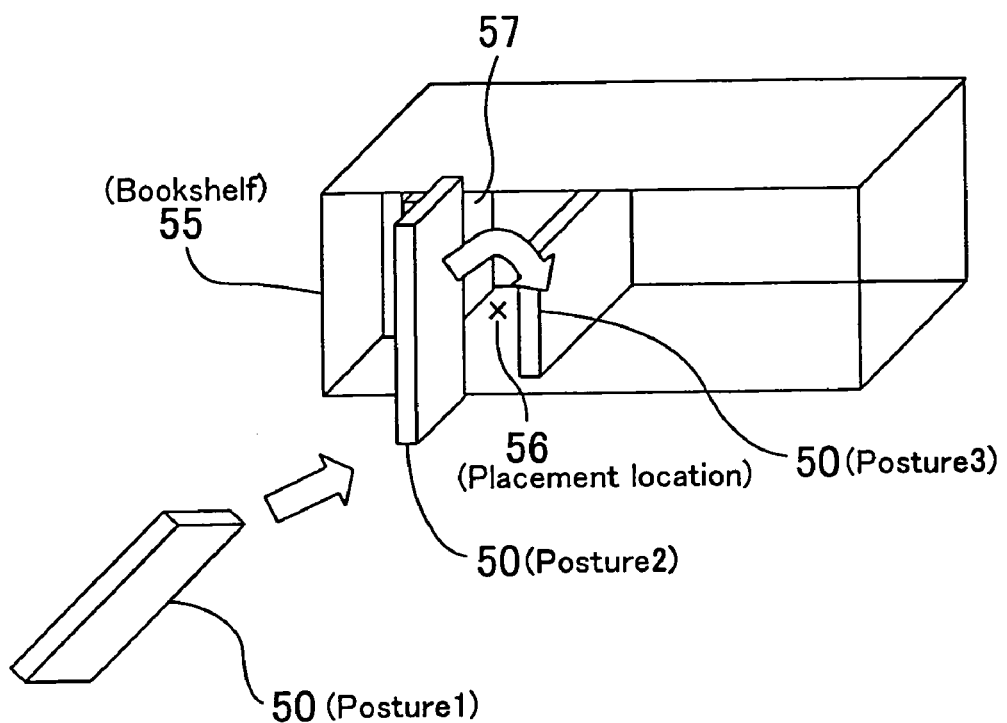
FIG. 37 is an explanatory view of an operation for placing a book on a bookshelf.

Referring to FIG. 37, an example in which a book 50 is placed on a bookshelf 55 will be described. When the book 50 (in a posture 1) grabbed by the robot 102 is placed on the bookshelf 55, the article management system 100 of this embodiment first checks whether or not a different book 57 exists in the vicinity of a designated placement location 56. If the different book 57 is present, the posture of the book 57 is checked, and the posture of the grabbed book 50 is made to fit in with the posture of the different book 57. In this example, since the different book 57 is accommodated in a standing posture, the grabbed book 50 is also made to take a standing posture.

However, the standing posture may be either of two postures: a posture (a posture 2) in which the longer sides of the book 50 extend vertically, and a posture (a posture 3) in which the longer sides of the book 50 extend horizontally. The placement space on the bookshelf 55 is limited, and when the height of the book 50 exceeds the height of the space on the bookshelf 55, the book 50 cannot be accommodated if the book 50 takes the posture 2 in which the longer sides of the book 50 extend vertically. In this case, the posture (the posture 3) that fits in with that of the different book 57 and allows the book 50 to be accommodated in the placement space on the bookshelf 55 is selected, and the posture of the grabbed book 50 is changed to that posture before the book 50 is placed. Whether or not the placement space is limited can be determined based on, e.g., whether or not the placement space is a space divided by a divider, whether or not the maximum length of the placement space is shorter than that of the article, or the like. This is applicable not only to cases where a book is placed on a bookshelf, but also to cases where a dish is efficiently placed in a cupboard or a dishwasher/dryer.

The conventional technique is based on the premise that a placement location is sufficiently larger than an article to be handled. Therefore, in cases where a placement location has a limited height as in the case of a bookshelf, for example, the conventional technique is not applicable as it is. In addition, since articles for industrial use are uniform in shape, it has not been necessary to perform special processing when the articles are transferred. Even so, it has been consequently possible to place the articles in an organized manner. However, in order to place articles of various shapes used at home or in an office in an organized manner, processing such as that performed by the placement posture determination section 140 is required. Details of operation of the placement posture determination section will be described later.

When an article grabbed by a robot is placed at a placement location, the placement location determination section 141 checks whether or not a different article is already placed at the placement location. If a different article is already placed at the placement location, the placement location determination section 141 determines whether or not the top face of the different article is flat (horizontal), whether or not the area of the top face is sufficiently large to have the grabbed article thereon, whether or not the material of the different article is solid, and the like. And if the placement location determination section 141 determines that it is not possible to place the grabbed article on the different article, the placement location is changed to a location near the different article where the grabbed article can be placed. At this time, information on the article at the placement location and information on the space near the placement location where the grabbed article can be placed can be obtained by making reference to the environment management server 101.

Figure 38A:
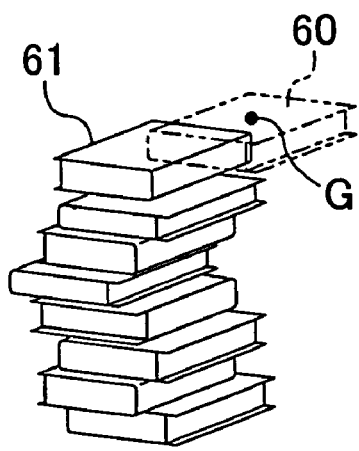
FIGS. 38A, 38B and 38C are explanatory views of an operation, in which a placement location is corrected, when other articles are already present at the placement location.
Figures 38B, 38C:
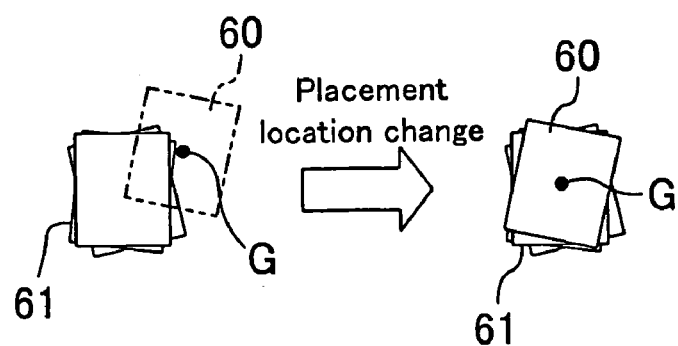

Now, referring to FIG. 38, a description will be made of an example of the determination as to "whether or not a different article exists at a placement location" and an example of the change of the placement location. FIG. 38 shows an example in which when a plurality of stacked books 61 are already present at the designated placement location, the placement location for a grabbed book 60 is changed. In this example, "whether or not a different article is present at the placement location" is determined by whether or not the grabbed article 60 overlaps the already placed articles 61 when the center of the gravity of the grabbed article 60 is aligned over the placement location (see FIG. 38B). It is most desirable that "a location near the placement location where the grabbed article can be placed" be a location where the grabbed article 60 does not overlap the different articles 61 at all, but "a location near the placement location where the grabbed article can be placed" is not limited to such a location. For example, depending on the type of article, even if the placed article 60 overlaps or is in contact with the different articles 61 to such an extent that the placed article 60 does not lose its posture (fall down), such overlapping or contact may be considered allowable. In the example shown in FIG. 38, the article is a book, and therefore, even if the book is stacked to such a degree that the book does not lose its posture, there will be no problem. FIG. 38 thus shows an example of such a case. As shown in FIGS. 38A and 38B, assume a case in which the placement location (the center of gravity of the book 60) is set slightly outwardly of a number of stacked books 61. In this case, if the book 60 is placed at the placement location, the stack of the books 61 will collapse and the book 60 itself will become unstable and fall down. Therefore, in this case, the placement location is changed to the position of the center of gravity of the stacked books 61. Details of this operation will be also described later.

The grabbing element 112 is means for grabbing an article. In this embodiment, as shown in FIG. 36, the grabbing element 112 is composed of an articulated arm 201 and a hand 202 disposed at the head of the arm 201. Nevertheless, the holding means of the laborer robot 102 is not limited to means for grabbing an article. For example, the laborer robot 102 may be equipped with supporting means having a plate-like shape and may be designed so as to travel to a, destination location with an article put on that supporting means.

The controller 115 of the laborer robot 102 interprets a robot handling command list transmitted from outside through the transceiver 109 and successively executes the commands. Operation of the controller 115 of the laborer robot 102 will be described in detail, as will be the controller 110 of the environment management server 101.

Structure of Console Terminal

In the article management system 100, the consol terminal 103, i.e., the third sub-system, is a device used by a user to give an instruction for handling of an article in an environment.

As shown in FIG. 29, the console terminal 103 includes, as its basic components, a designation device 142, a display 143, a transceiver 109, and a controller 144. The designation device 142 is used to give an instruction for handling of an article. The display 143 displays an operation screen. The transceiver 109 performs send/receive operation, such as sending, to the environment management server 101, of the content of an article-handling instruction input by the designation device 142. The controller 144 controls these components.

An operator gives an instruction for a transfer of an article or inputs information about an article or a mobile existence by using the designation device 142 and the display 143. In the case of a transfer of an article, the article transfer instruction input through the designation device 142 is sent to the laborer robot 102 via the transceiver 109. Upon receipt of the instruction, the laborer robot 102, taking the circumstances of the transfer destination into account, transfers the article in accordance with the instruction. Also, when information on an article or a mobile existence has been input or an article has been retrieved through the designation device 142, this request is sent to the environment management server 101 and a response is received from the environment management server 101. The controller 144 controls the above-mentioned components, and the operation of the controller 144 will be described in detail later.

In the foregoing, the entire structure of the article management system 100 has been described by giving descriptions of the respective sub-systems 101, 102, and 103 in this order.

In the example shown in FIG. 29, the article management system 100 is composed of three sub-systems: the environment management server 101, the laborer robot 102, and the console terminal 103, and is configured so that these sub-systems exchange information among them via a wireless or wired network. However, the structure of the article management system of the present invention is not limited to the above. For example, the article management system 100 may have a structure in which the console terminal 103 is mounted on the environment management server 101 or the laborer robot 102. Also, the article management system 100 is not limited to the structure having a single robot 102 but may have a structure having a plurality of robots so that they concurrently perform individual works while cooperating with each other. Alternatively, the article management system 100 may have a structure in which not the laborer robot 102 but the environment management server 101 includes the travel plan generator 113, the placement posture determination section 140, and the placement location determination section 141, whereby it is possible to reduce the amount of traffic associated with database access.

Operation of Article Management System

Below, a description will be made of the operation of the article management system 100, that is, it will be described how the controllers 110, 115 and 144 of the sub-systems, i.e., the environment management server 101, the laborer robot 102 and the console terminal 103, operate.

In this embodiment, for the sake of consistency, the environment management server 101, the laborer robot 102, and the console terminal 103 all make requests for an instruction, a query, a response, and the like by exchanging messages described below.

FIG. 39 shows an example of the form of such a message. From the top row, the items included in this example are: message start code (STX); message length; total packet count; packet number; sent date and time; message ID; source; destination; command number; parameter; and message end code (ETX). When UDP/IP or the like for packet communications is used as communications protocol, data does not necessarily arrive at the destination on a packet-by-packet basis. Therefore, the receiving part that has received the divided portions of the packets reconstructs those portions to obtain the message by using the total packet count and the packet number. Also, the message length and the total packet count are used to confirm that all the packets have been received, so that the message can be sent/received correctly.

Further, an ACK message or a NACK message, which indicates whether or not the message has been received, is sent back to the source. FIG. 40 shows an example of the ACK/NACK message. The message ID indicated by Number 6 is made equal to the message ID of a received message, whereby the source that has received the ACK or NACK message can know to which message sent by the source the received ACK or NACK message has been sent back. When all the packets have been received to obtain the message, the ACK message is sent back to the source. When it seems that a trouble has occurred in the communications, such as a failure to receive all the packets within a certain time period, an error code is substituted in the item indicated by Number 10 and a NACK message is sent back to the source. The source waits for an ACK or NACK message for a certain period of time. If neither message is sent back within that period of time, the source resends the message. If, even after the source has resent the message several times, neither an ACK message nor a NACK message is sent back, it is determined that a communication error has occurred, resulting in a measure such as a system shutdown, for example.

Below, it will be described how messages used in common by the sub-systems are sent/received and processed. Then, for each sub-system, its inherent structure, a concrete message, and its operation performed when that message is received will be described.

Figure 41:
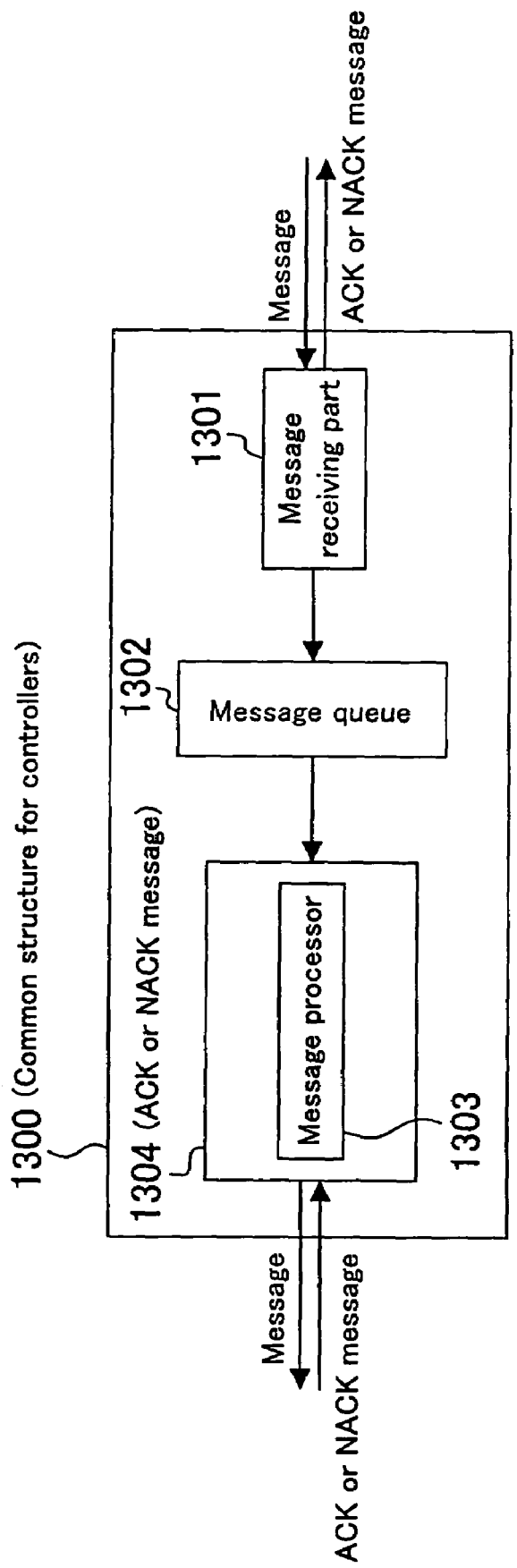
FIG. 41 is an explanatory diagram of a common message-processing configuration, lo which shows message exchange in each controller.

FIG. 41 shows a message processing configuration 1300 used in common by the respective controllers 110, 115, and 118 in the environment management server 101, the laborer robot 102, and the console terminal 103. The configuration 1300 includes a message receiving part 1301, a message queue 1302, and a message handler 1304. The message receiving part 1301 reconstructs, as a message, packets input from the transceiver 109. The message queue 1302 stores therein the reconstructed message. The message handler 1304 retrieves messages one by one from the head of the message queue, interprets the retrieved message, and provide a message processor 1303 with the message. The message receiving part 1301 and the message handler 1304 may be each included as a thread program or the like, whereby it is possible to receive a message while other message is processed.

Figure 42:
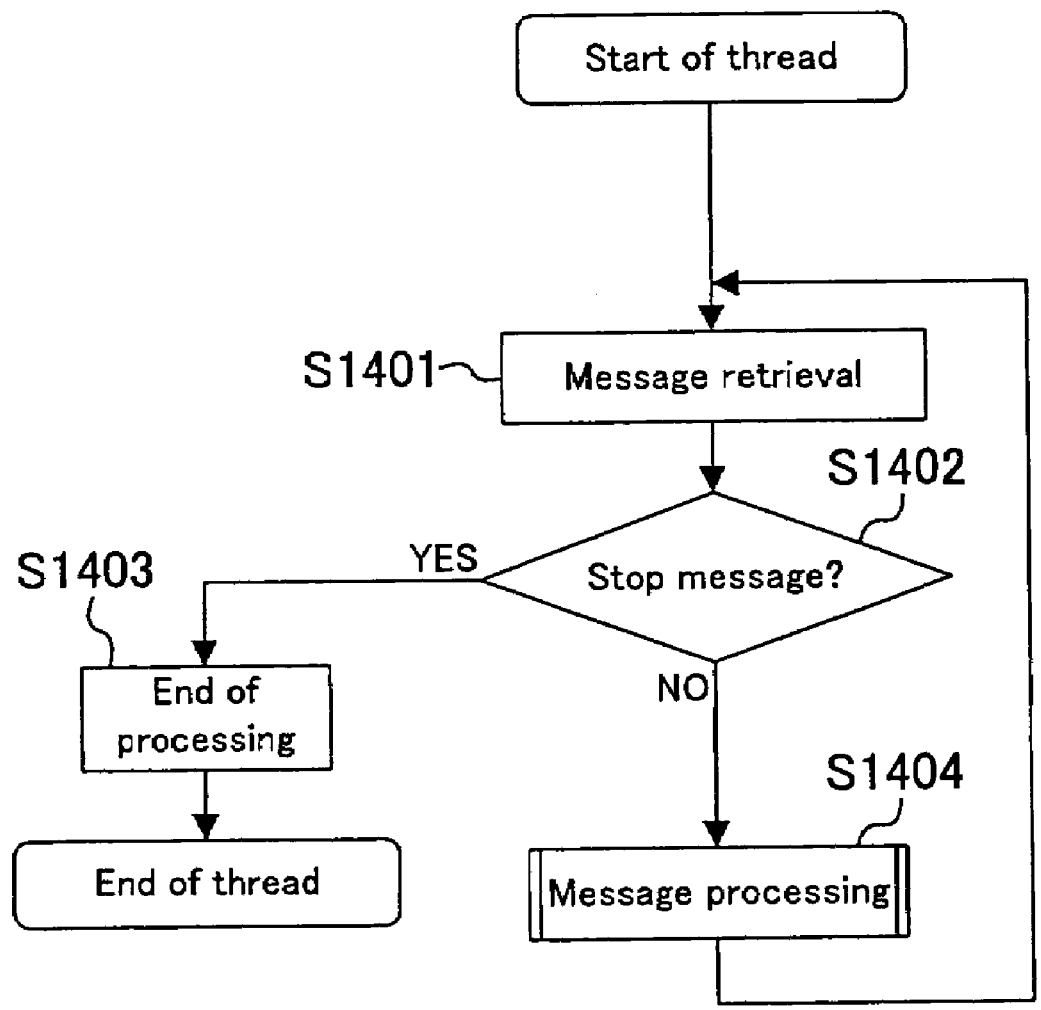
FIG. 42 is a flow chart of operation of a message handler in each controller.

FIG. 42 is a flow chart of operation for sending/receiving a message in the configuration 1300 shown in FIG. 41. In this operation, it is checked in step S1401 whether or not a message/messages is stored in the message queue 1302, and if there is a stored message/messages, the uppermost message is retrieved. In step S1402, it is determined whether or not the retrieved message is a stop message. If it is a stop message, end processing (step S1403) is performed for a halt. The end processing herein means to stop other threads (e.g., the message receiving part 1301 and the like). If the determination result in step 1402 shows that the message is not a stop message, the message processor 1303 carries out processing of the message in step S1404. The message processor 1303 executes operation corresponding to each component or transmits as a message the value of an internal variable to the inquiry source (for example, in the case of the environment management server 101, the position of an article, mobile existence, etc. is transmitted). Since different operations are performed for the respective sub-systems, those operations will be described later.

In the foregoing, the basic message exchange mechanism of the sub-systems has been described. However, messages understandable by the message processor 1303 in the message handler 1304 shown in FIG. 41 and the actions that the message processor 1303 performs according to the messages are different for the respective subsystems, i.e., the environment management server 101, the laborer robot 102, and the console terminal 103. Therefore, a specific task will be taken up, and in line with that specific task, the process configuration of the controller in each subsystem will be discussed, and then the operation of each controller performed to process a message will be described.

As a specific task, an example in which an operator causes an article (e.g., an empty can) to be transferred to a designated location (e.g., a wastebasket) will be described.

Figure 43:
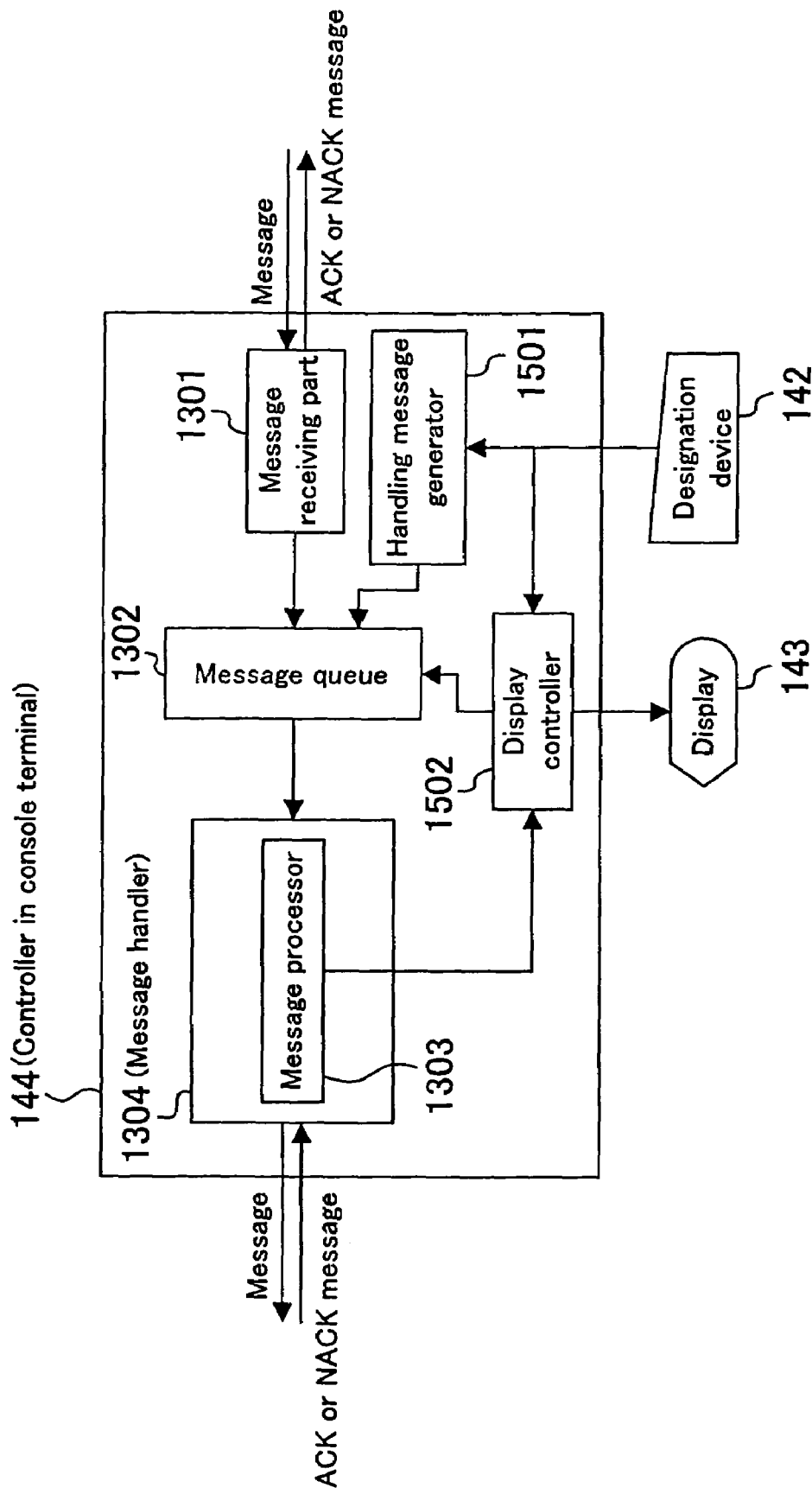
FIG. 43 is a diagram of a process configuration of the controller in a console terminal.

First, the operation of the controller 144 in the console terminal 103 will be described. FIG. 43 shows the process configuration of the controller 144 in the console terminal 103. The controller 144 in the console terminal 103 includes, in addition to the common components described above, a handling message generator 1501 and a display controller 1502. The handling message generator 1501 generates a message corresponding to a handling instruction input from the designation device 142. The display controller 1502 obtains the latest environment information (such as an image of a room, the position of an article, or the like) and then displays the information on the display 143. The handling message generator 1501 generates a message, corresponding to a handling instruction from the operator, in the above-described message format, and stores the message in the message queue 1302. The display controller 1502 always makes reference to the environment management server 101 for the environment information and displays the environment information as visual information on the display 143. The operator gives a handling instruction such as a transfer of an article using the designation device 142 (e.g., a pointing device such as a mouse, a touch panel, or a tablet), while referring to the display 143. In this example, a GUI is used as the designation device 142, but an audio I/F (interface) using voice recognition/synthesis, a keyboard I/F, or the like may be used. The handling message generator 1501, like the message receiving part 1301, is executed as a thread program simultaneously with other threads, and is thus always capable of receiving a handling instruction from the operator.

When the console terminal 103 is turned on, it carries out initialization only once immediately after the turn-on. This initialization includes, e.g., establishment of a communication channel with the other sub-systems, execution of each thread program, and the like.

Figures 44, 45:
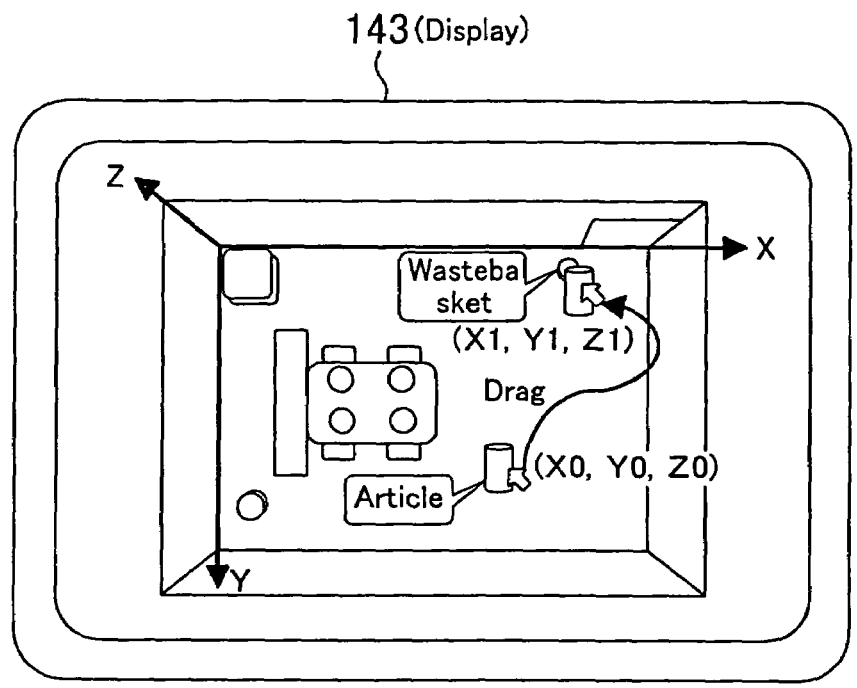
FIG. 44 illustrates a display showing an example in which an article is handled using the console terminal.
FIG. 45 shows an example of a message generated in a handling message generator in the console terminal.

Specifically, when an operator inputs an instruction into the designation device 142, the handling message generator 1501 stores a message including the instruction in the message queue 1302. FIG. 44 shows an example of an instruction input in which the operator inputs an instruction to transfer an article (an empty can) from the floor (coordinates: X0, Y0, Z0) to a wastebasket (coordinates: X1, Y1, Z1) by a drag and drop operation using a mouse while referring to the display 143. FIG. 45 shows an example of a message generated in the handling message generator 1501 in this case. The items indicated by Numbers 1 to 6 and 11 in FIG. 45 are necessary to correctly receive any message. However, they are independent of the content of the message, and descriptions thereof will be thus omitted herein. FIG. 45 shows a message for sending a command (an article transfer command "01" for the robot) from the source ("PO" indicating the operator) to the destination ("I0" indicating the console terminal). The item indicated by Number 10, Parameter, means to transfer a single (the first term "001" means the number of articles to be transferred) article (an article at a coordinate point (X0, Y0, Z0)) to a location of a coordinate point (X1, Y1, Z1). When a plurality of articles are transferred, the current location and the destination are put in this order for each article.

Figure 46:
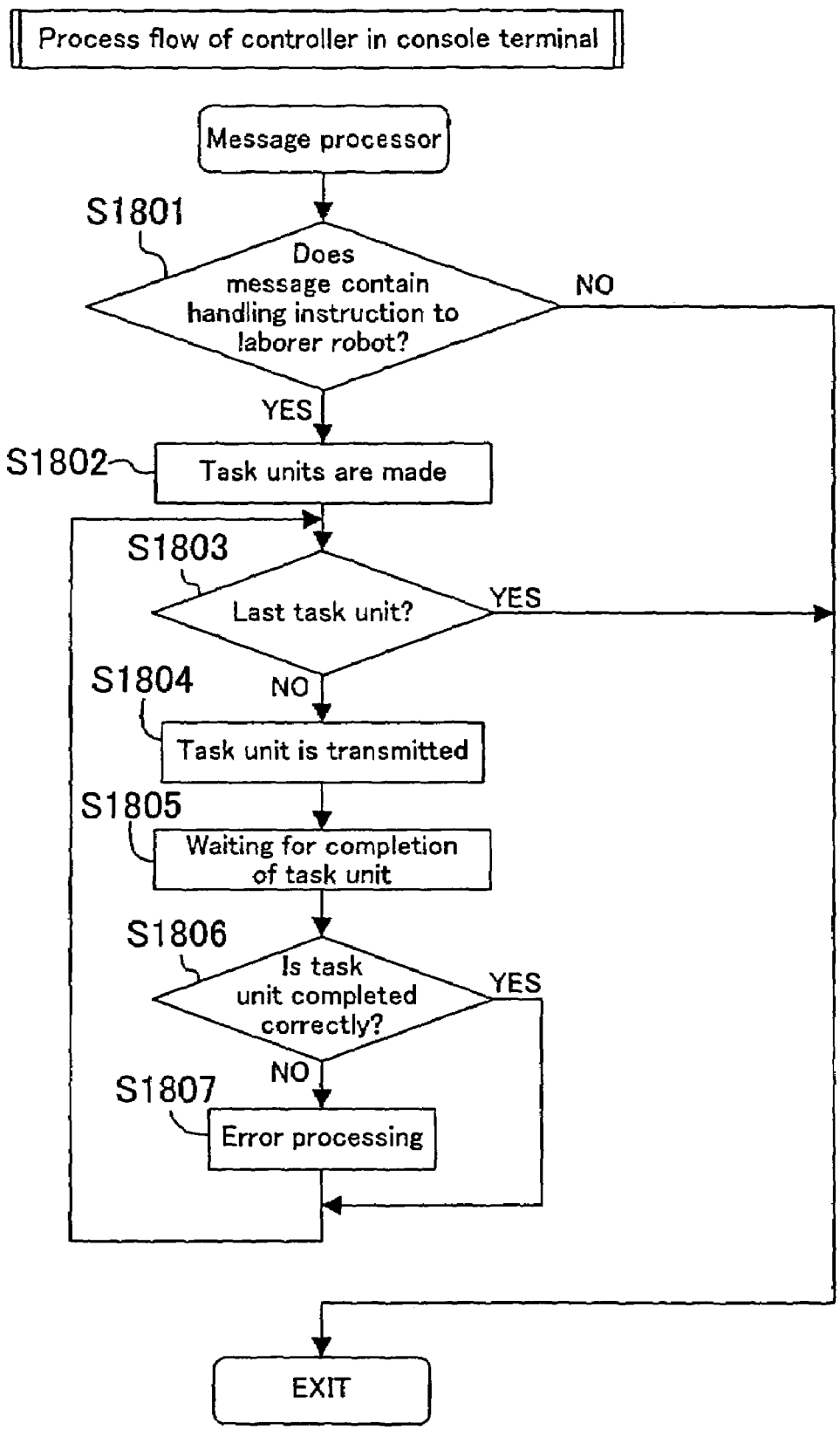
FIG. 46 is a flow chart of operation of a message processor of the controller in the console terminal.

FIG. 46 is a flow chart of the processing of the message processor 1303 in the console terminal 103. The message handler 1304 fetches one message from the message queue 1302, and then in step S1801, the message handler 1304 determines whether the content of the message is an instruction to the laborer robot 102. And in step S1802, the message handler 1304 divides the instruction into task units. In this step, the instruction for "a transfer of an article" is divided into four task units. The four task units are "travel (to the location of the article)", "grabbing (of the article)", "travel (to the transfer destination location)", and "placement", and these four task units make a single set. Therefore, when an instruction to transfer a plurality of articles is given, a single set of task units is put for each article. In step S1803, it is determined whether or not there is a task unit to be executed next. In step S1804, one task unit is transmitted to the laborer robot 102.

FIG. 47 shows an example of a message for sending one task unit to the laborer robot 102. The exemplary message means to send a command (a robot travel command "01") from the source ("I0" indicating the console terminal) to the destination ("R0" indicating the laborer robot). The parameter indicated by Number 10, which is a coordinate point (X0, Y0, Z0), indicates the transfer destination location.

Next, in step S1805, the message processor 1303 receives the end state (an ACK or NACK message) of the task unit from the laborer robot 102. In step S1806, the message processor 1303 determines whether or not the task unit has been completed as intended. If the message processor 1303 receives a NACK message, or if no message is sent back within a certain time period, the message processor 1303 carries out error processing (in step S1807). The error processing is processing in which, in the case of trouble, for example, when an obstacle or the like has prevented the laborer robot 102 from moving or when the laborer robot 102 has failed to grab the designated article, the occurrence of trouble is presented to the operator through the GUI. In this processing, if there is an audio I/F, the occurrence of trouble may be presented by voice. And the flow returns to the step S1803, and if there is no task unit to be processed, the operation of the message processor is ended and a next message is fetched from the message queue 1302 to perform processing of that message.

Although in this example the task units are sent one by one, the article management system 100 may be configured so that all the task units are sent at a time and that the laborer robot confirms the completion of each task unit.

Figure 48:
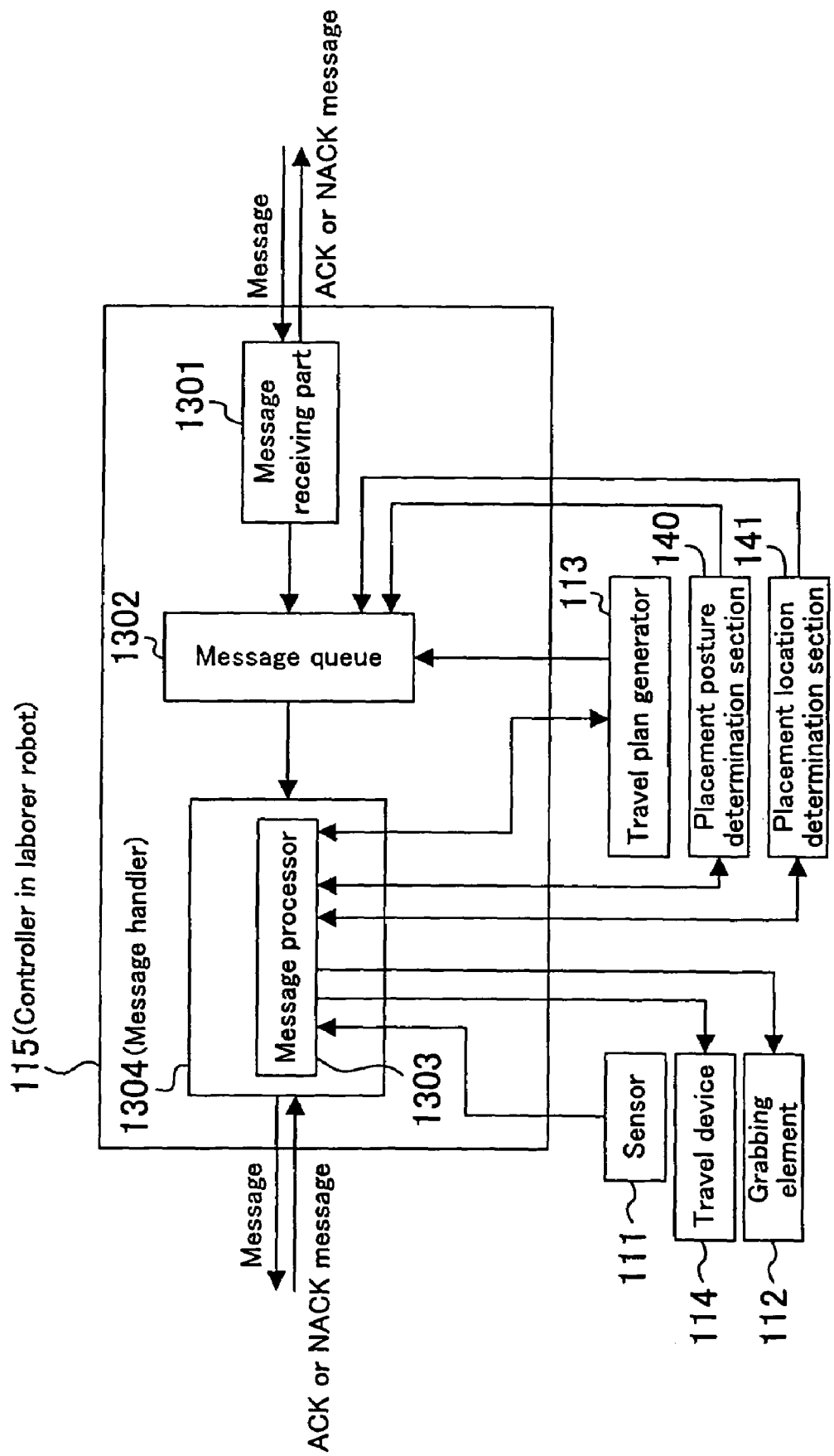
FIG. 48 shows a process configuration of the controller of the laborer robot.

Next, a description will be made of the operation of the controller 115 of the laborer robot 102. FIG. 48 shows the process configuration of the controller 115 of the laborer robot 102.

When the laborer robot 102 is turned on, it carries out initialization only once immediately after the turn-on. This initialization includes, e.g., establishment of a communication channel, execution of each thread program, and the like. The message receiving part 1301 receives the above-mentioned task unit-containing message (see FIG. 47) transmitted from the console terminal 103 through the transceiver 109 and stores the message in the message queue 1302. FIG. 49 shows examples of messages that the laborer robot 102 can understand.

Figure 50:
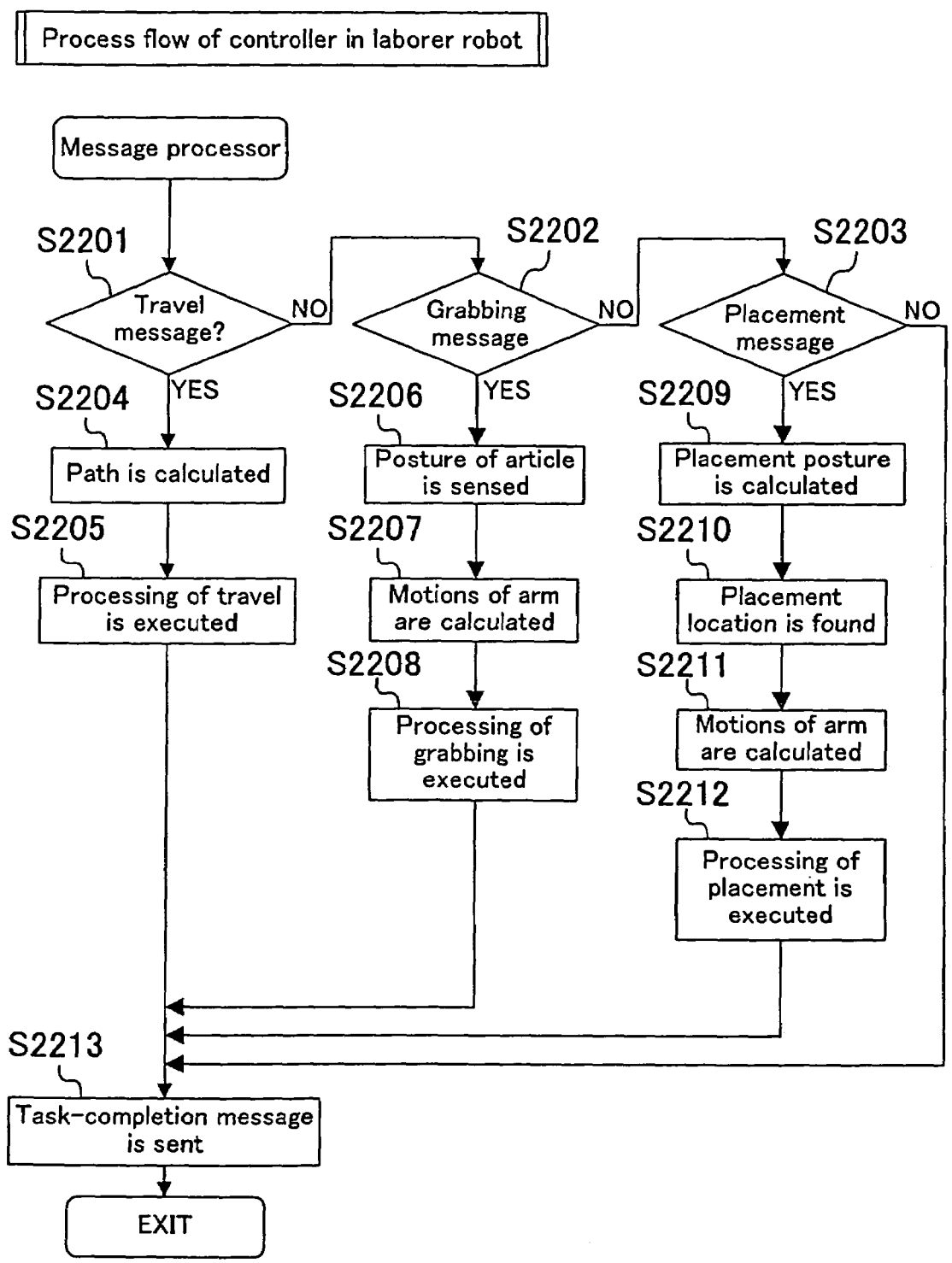
FIG. 50 is a flow chart of operation of a message processor of the controller in the laborer robot.

FIG. 50 is a flow chart of the processing of the message processor 1303 in the laborer robot 102. An example of messages input to the message processor 1303 is a task unit-containing massage transmitted from the console terminal 103. In this processing, first of all, it is determined in steps S2201, S2202 and S2203 what type the task unit is. Then, processing is carried out in accordance with the task unit type.

If it is determined in step S2201 that the task unit is "travel", the flow proceeds to step S2204 in which the path to the designated location is calculated using the travel plan generator 113. Then, in step S2205, a control command to travel according to the path obtained by the travel plan generator 113 is sent to the travel device 114 and the travel device 114 executes the processing of travel to the designated location. When the laborer robot 102 receives, for example, the message shown in FIG. 47, the above processing flow is carried out.

If it is determined in step S2202 that the task unit is "grab", the flow proceeds to step S2206, in which the posture of the article is sensed using the above-described sensor (for example, a camera) 111 for the grabbing of the article, and in step S2207, the motions of the arm, 201 and the hand 202 are calculated. Then, in step S2208, a command to grab the article is sent to the grabbing element 112 and the grabbing element 112 grabs the article. Although in this example the posture of the article is sensed using the sensor in step S2206, the posture of the article may be recognized by referring to the environment management server 101. The information about the current posture of the article is recorded in the article history data (see FIG. 31).

If it is determined in step S2203 that the task unit is "placement", the placement posture of the article is calculated using the placement posture determination section 140 (in step S2209). Then, the circumstances of the placement location for the article are checked using the placement location determination section 141, and if it is determined that the article cannot be placed at the placement location, a suitable placement location is found (in step S2210). Then, the motions of the arm 201 and the hand 202 are calculated to accommodate the placement posture and the placement location (in step S 2211) and a control command to actuate the arm 201 and the hand 202 is issued to place the grabbed article in place (step S2212)

Finally, in step S2213, a message of the completion of travel, grabbing, and placement is sent to the instruction source (the console terminal).

One feature of the present invention resides in a processing performed when the message processor 1303 in the laborer robot 102 receives a placement message. Specifically, in the article management system 100, the placement posture determination section 140 and the placement location determination section 141 are used to appropriately change the placement posture and the placement location in accordance with the grabbed article and the circumstances of the placement location therefor. This processing significantly differs from that in the prior art that is performed in an automated warehouse in a plant.

Figure 51:
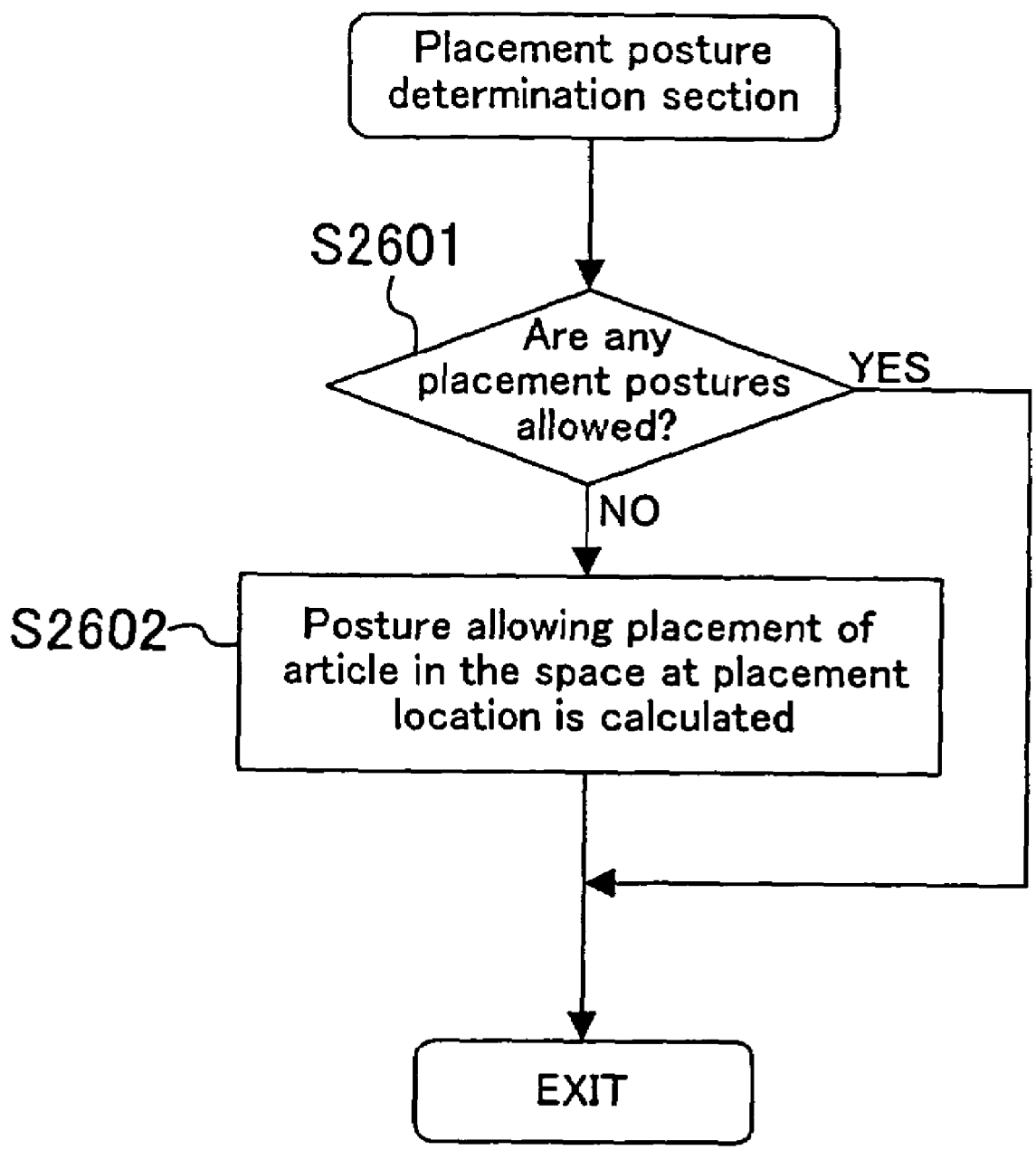
FIG. 51 is a flow chart of operation of a placement posture determination section in the laborer robot.

FIG. 51 is a flow chart of normal operation of the placement posture determination section 140. In step S2601, the placement posture determination section 140 determines whether or not it is necessary to decide a placement posture. For example, if the placement location is inside a box and the grabbed article is smaller than the box, the placement posture is not taken into consideration and, therefore, the posture of the grabbed article remains unchanged. On the other hand, if it is determined in step S2601 that it is necessary to decide a placement posture, the placement posture of the grabbed article is calculated based on the circumstances of the placement location and the attribute of the grabbed article in step S2602.

Figure 52:
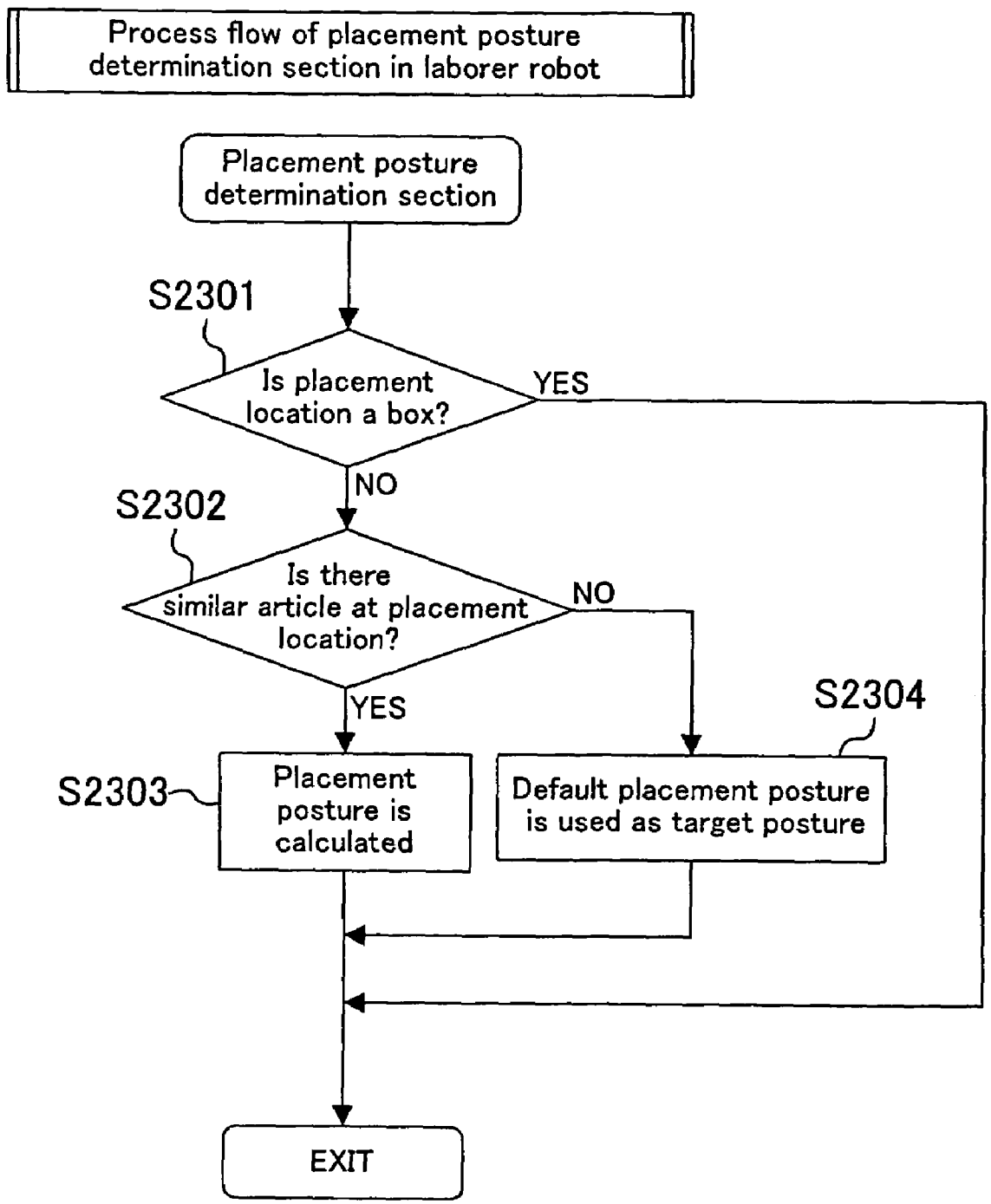
FIG. 52 is a flow chart of a specific operation of the placement posture determination section of the laborer robot.

FIG. 52 is a flow chart of an example of a specific operation of the placement posture determination section 140. In this exemplary operation, first of all, it is determined in step S2301 whether or not the placement location is a box (e.g., a wastebasket). This can be implemented by referring to the environment management server 101 in the form of a message (see Command number 12 in FIG. 56). If the placement location is a box, the placement posture is not taken into consideration and, therefore, the posture of the grabbed article remains unchanged. If it is determined in step S2301 that the placement location is not a box, it is further checked in step S2302 whether or not an article, whose attribute (e.g., the type, shape, etc. of the article) is equal or similar to that of the grabbed article, exists in the vicinity of the placement location. The term "similar" herein means that the articles are of the same kind or they are similar in shape, even if they are of different kinds, for example. And the term "being similar in shape" means that the shape parameters (in the case of a cylinder, the height and the radius of the bottom face; in the case of a sphere, the radius; and in the case of a rectangular parallelepiped, the lengths of the three sides (i.e., width, height, and depth)) of those articles are similar. Whether or not the shape parameters are similar to each other can be determined based on, e.g., whether or not the differences between the corresponding parameters are each within a certain threshold value. Such determination can be also implemented by referring to the environment management server 101 for the data (see Command number 23 in FIG. 56).

If an article similar to the grabbed article is present in the vicinity of the placement location, the placement posture of the grabbed article is made similar to that of the similar article in step S2303. The posture of the similar article can be obtained by referring to the posture data in the article history data 302. If it is determined in step S2302 that there is no article similar to the grabbed article at the placement location, a predetermined placement posture is used (in step S2304). The predetermined placement posture is a posture suitable for the furniture at the placement location and is determined by using data recorded in the furniture attribute data 906 in the environment map 108 (see "the shapes and postures of main articles" in the furniture attribute data 906 shown in FIG. 35). If such a posture is not recorded in the furniture attribute data 906 in the environment map 108, the posture of the article, in which the shape of the article was measured, is used, for example. For instance, the article is placed such that the article coordinates shown in FIG. 33B match the real-world coordinates.

In this manner, when an article similar to the grabbed article is already placed in the vicinity of the designated placement location, the placement posture of the grabbed article is made to fit in with the posture of the similar article, whereby the article can be put orderly, resulting in space saving and good looks in the house.

Figure 53:
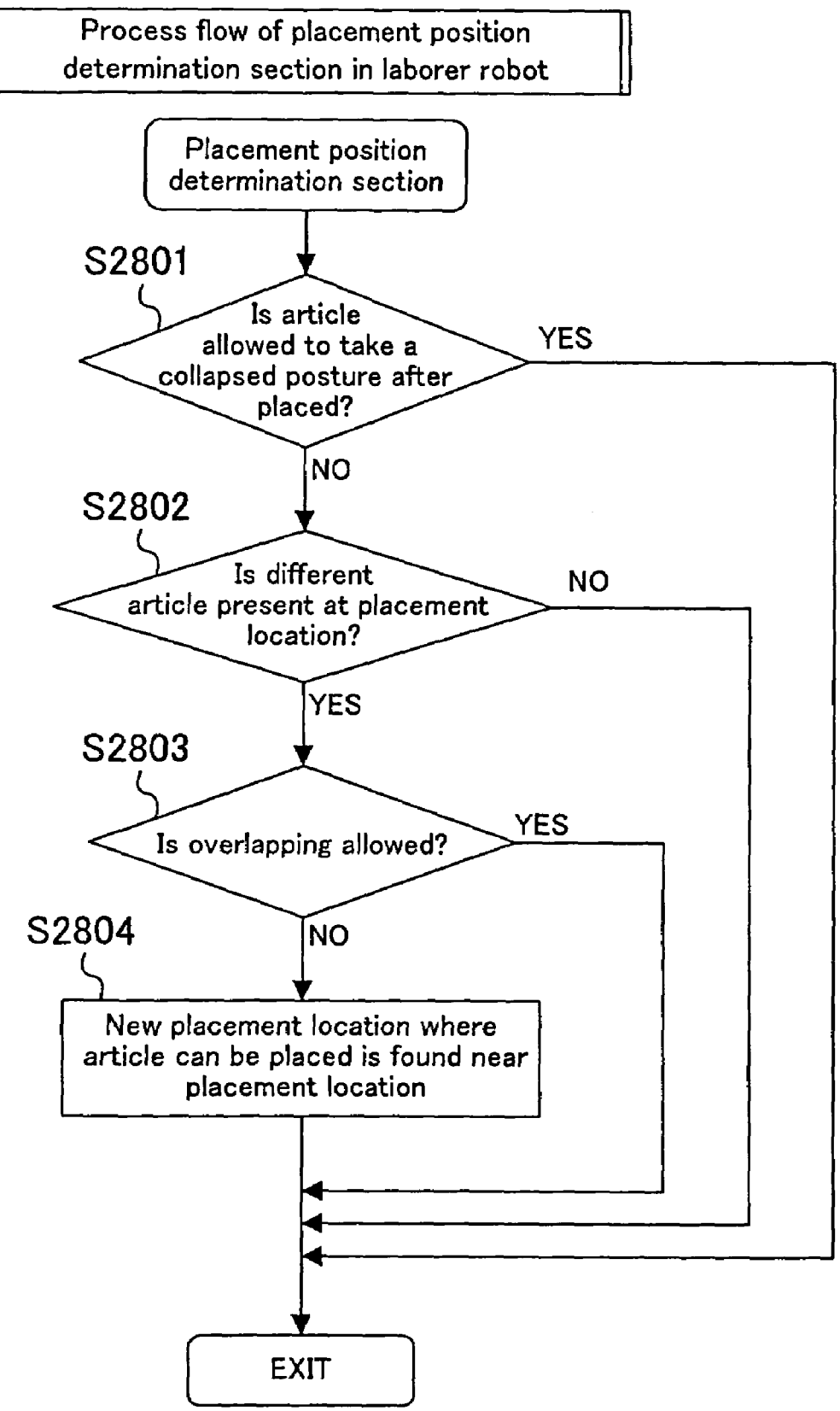
FIG. 53 is a flow chart of operation of a placement location determination section in the laborer robot.

Next, referring to FIG. 53, normal operation of the placement location determination section 141 will be described. In step S2801, it is determined whether or not it is allowed for the article to take a collapsed posture when placed, based on the circumstances of the placement location and the attribute of the grabbed article. If the article should not take a collapsed posture after it is placed, the flow proceeds to step S2802, in which it is determined whether or not a different article is present at the placement location. If there is a different article at the placement location, the flow proceeds to step S2803, in which the placement location determination section 141 makes a determination as to whether or not the grabbed article may be placed to overlap the different article present at the placement location. If the grabbed article should not overlap the different article, a new placement location where the grabbed article can be placed is found in the vicinity of the placement location in step S2804.

Figure 54:
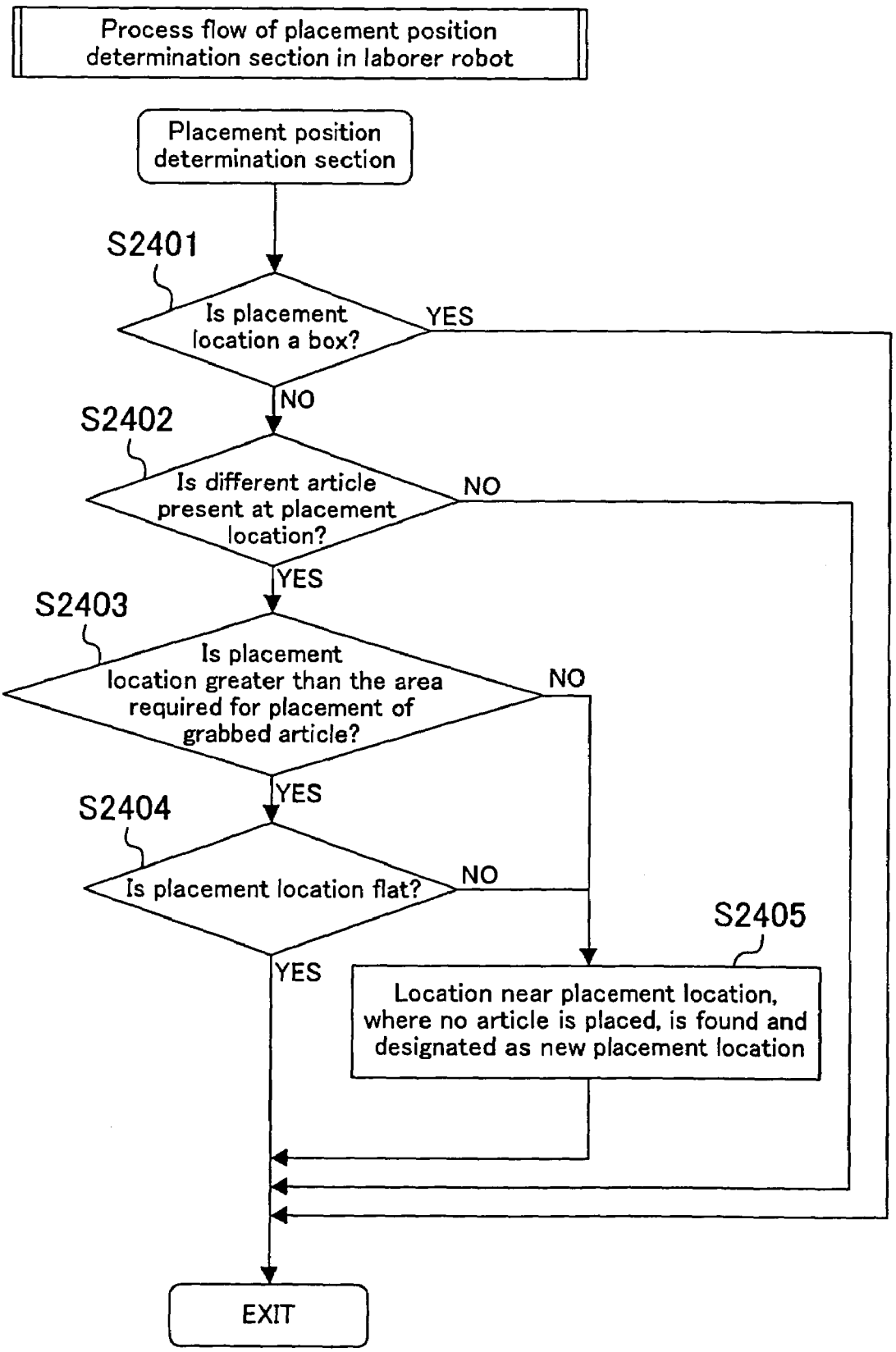
FIG. 54 is a flow chart of a specific operation of the placement location determination section of the laborer robot.

Next, referring to FIG. 54, an example of a specific operation of the placement location determination section 141 will be described. In this exemplary operation, it is checked in step S2401 whether the placement location is a box. If it is not a box, the flow proceeds to step S2402. On the other hand, the placement location is a box, the placement location is not changed and the flow thus gets out of the processing of the placement location determination section 141.

In step S2042, it is checked whether or not a different article exists at the placement location. If no different article exists, the placement location is also not changed in this step. Whether or not a different article already exists at the placement location can be checked by sending an inquiring message (see Command number 23 in FIG. 56) to the environment management server 101. If there is a different article at the placement location, the flow proceeds to step S2403, in which it is determined whether or not the top surface of the different article is greater than the area required for the placement of the grabbed article. If the top surface of the different article is greater, it is determined in step S2404 whether or not the top surface of the different article is flat. The term "flat" herein means to include not only completely flat surfaces, but also substantially flat surfaces. Specifically, the term "flat" herein includes the state of a surface that is regarded as flat in common practice. Therefore, even a surface which is somewhat inclined or uneven is also regarded as flat, so long as the grabbed article can be placed on the surface. The area of the top surface of the already placed article and whether or not that top surface is flat can be known by making reference to the environment management server 101 for the shape data and the placement posture (recorded as the article history data) (see Command number 23 in FIG. 56).

If the top surface of the different article is flat, the grabbed article is put on the different article without changing the placement location. If it is determined in step S2403 that the area of the top surface of the different article is smaller than the area required for the placement of the grabbed article, or if it is determined in step S2404 that the top surface of the different article is not flat, the flow proceeds to step S2405, in which a location where no article is placed is found in the vicinity of the placement location, and this location is designated as the new placement location. When it is determined in step S2402 that no other article is placed at the placement location, whether or not articles of the same kind or of the same shape as the grabbed article exist in the vicinity of the placement location may be checked, and the placement location for the grabbed article may be set next to those articles.

In this manner, if there are other articles already placed at the placement location, it is determined whether or not it is possible to place the grabbed article on those already placed articles, and if it is not possible, the placement location is changed. Therefore, even if the operator randomly designates a placement location without knowing the circumstances of the article-placement destination location, the robot can cope flexibly with the real-world situations.

In the example shown in FIG. 44, since the placement location is a wastebasket, the laborer robot 102 consequently drops the empty can into the wastebasket without changing the grabbed posture of the empty can.

As another example, a case in which a book put on the floor is placed on a bookshelf will be described. In this case, when it is found, by referring to the environment management server 101, that there are other books at the placement location and that those books are articles of the same kind as the book (i.e., the grabbed article), the posture of the grabbed book is changed to the same posture as that of the other books already placed (in this case, since the books already placed on the bookshelf are accommodated in a standing posture, the posture of the grabbed book is also changed to a standing posture), and then the grabbed book is placed on the bookshelf. On the other hand, if there are stacked books at the placement location, the grabbed book can be placed on the stack in the same posture as the other books, so long as the grabbed book can be placed stably in that posture. Instead of the books, if there is a television at the placement location and the top surface of the television is flat, the grabbed book can be placed in a stable posture, and therefore, the grabbed book is placed on the television. If an article whose top surface is not flat, such as a vase, exists at the placement location, the book is not placed on the vase but in an empty space next to the vase.

If any trouble occurs in the laborer robot 102 during execution of a task, such as a disability to produce the designated motion, an error message can be transmitted to the instruction source (the console terminal 103 in this example) to halt the task at any timing.

In this embodiment, the laborer robot 102 usually measures its own position using the amount of movement of its wheels (the number of rotations, the angle of rotation, etc.) However, the actual position of the laborer robot 102 may not match the self-measured position owing to a slip between the floor and the wheels or an unavoidable collision with an obstacle. To compensate for such a position mismatch, the robot can periodically make reference to the environment management server 101 for its own position.

Further, when an article is grabbed after its name is specified, the attribute of the article, such as shape, can be previously retrieved and then used as a clue to find the designated article from among articles before a sensor, such as a camera. In these manners, the environment management server 101 may be made reference to for the attribute of the article, the position of the laborer robot 102 or the environment map 108 necessary for the travel plan generator 113, as needed. Such a reference can also be implemented by sending an inquiring message to the environment management server 101 and receiving a response to it therefrom.

Figure 55:
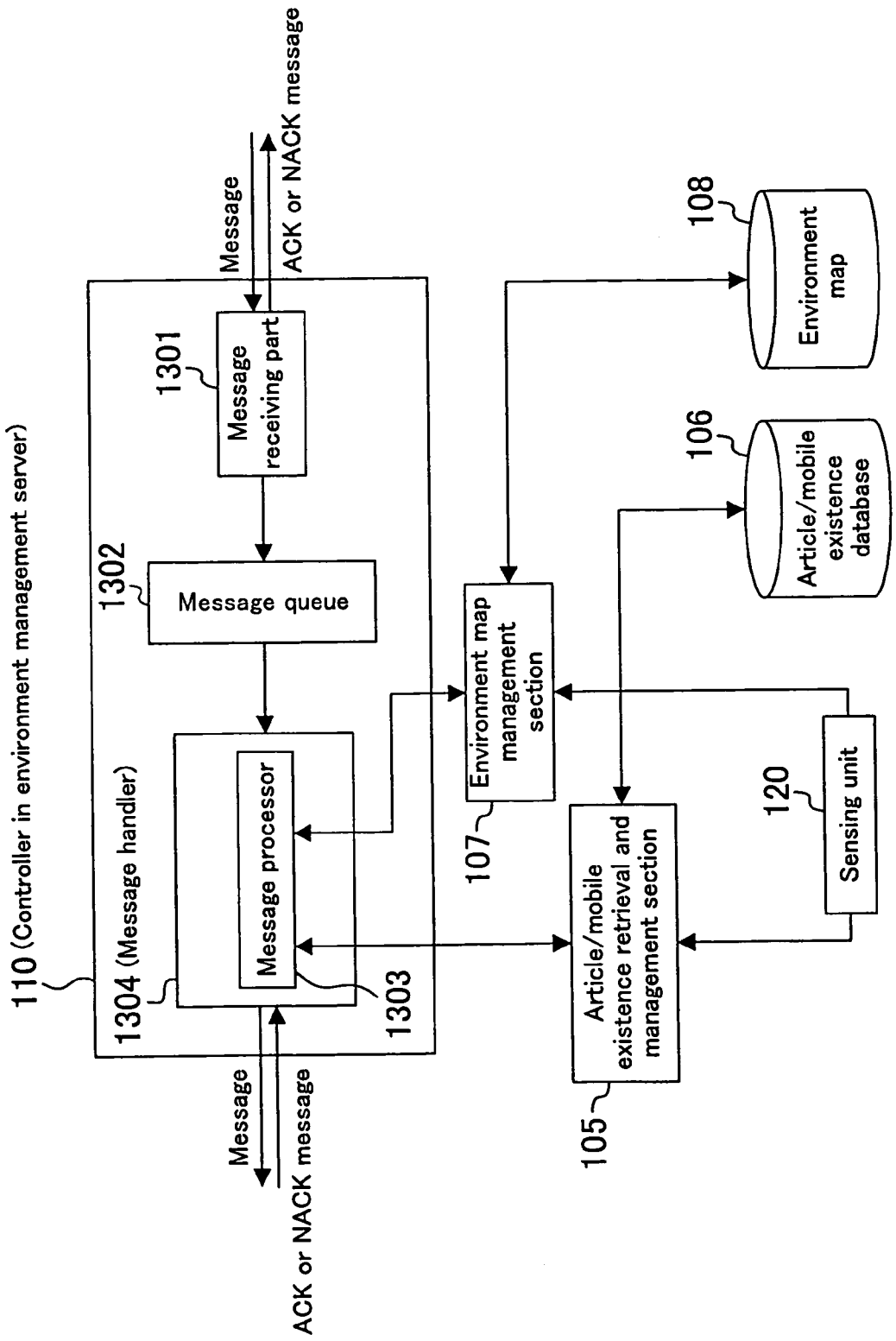
FIG. 55 shows a process configuration of the controller in an environment management server.

Lastly, a description will be made of the operation of the controller 110 in the environment management server 101. FIG. 55 shows the process configuration of the controller 110 in the environment management server 101.

When the environment management server 101 is turned on, it carries out initialization only once immediately after the turn-on. This initialization includes, e.g., establishment of a communication channel and execution of each thread program. The environment management server 101 receives a message containing an inquiry from the laborer robot 102 or the console terminal 103 through the transceiver 109, and the message receiving part 1301 stores the message in the message queue 1302. FIG. 56 shows examples of messages understandable by the environment management server 101.

FIG. 57 is a flow chart of the processing of the message processor 1303 in the environment management server 101. In this processing, the forefront message is fetched from the message queue 1302 and input into the message processor 1303. And in steps S2701, S2702, S2703, S2704, and S2705, it is determined what is requested by this message.

In step S2701, if it is determined that there has been a query about the location of the robot, information on the robot location is retrieved from the article/mobile existence database 106 and the robot location is transmitted to the querying source (in step S2705). In step S2702, if it is determined that there has been a query about a map, the map is retrieved from the environment map 108 and sent to the querying source (in step S2706). The map information is used to find a path for the laborer robot 102, for example. In step S2703, if it is determined that the message is a query about environment information, information on the designated location is retrieved from the environment map 108 (in step S2707) and sent to the querying source (in step S2708). In step S2704, if it is determined that the message is a query about information on an article, necessary information on the designated article is retrieved from the article/mobile existence database 106 (in step S2709) and sent to the querying source (step S2710). In step S2705, if it is determined that the message requests registration of information on an article obtained by the laborer robot 102 and the like in the article/mobile existence database 106, the attribute value of the designated article is registered in the article/mobile existence database 106 (in step S2711).

In the above processing, the queries to, and the information registration in, the article/mobile existence database 106 and the environment map 108 are performed through the article/mobile existence search and management section 105 and the environment map management section 107. The sensing unit 120 always senses the latest information. In the article/mobile existence database 106 and the environment map 108, information is always updated through the article/mobile existence search and management section 105 and the environment map management section 107.

In the foregoing, the configuration and operation of the article management system 100 according to embodiment 4 of the present invention has been described.

According to the article management system 100 of this embodiment, in using a laborer robot in a life space such as a house or an office to transport an article, the laborer robot can place any articles in an organized manner without causing collapse of the articles. Further, even in the case of an ambiguous instruction, the robot can place the article in an appropriate state. For example, when the robot places a book on a bookshelf, it places the book in a standing posture; when the placement location is a wastebasket, the robot drops the article without considering the posture of the article; and when the placement location is a so-called dish washer, the robot places a dish in a predetermined posture. In these manners, the robot can place any article in an appropriate state in accordance with the relationship between the designated placement location and the article.

Effects of the Invention

According to the present invention, in using a laborer robot to transport an article in a life space, the placement posture of the article to be transported is determined with consideration given to other articles and circumstances in the vicinity of the placement location. This allows articles to be placed in an appropriate state; for example, articles of the same kind or of the same shape can be arranged in an orderly manner. This also enables suitable placement in which relationship between the article and the placement location has been taken into account.

Moreover, according to the present invention, if there is a different article already placed at the designated placement location, or if a transfer subject article cannot be placed at the designated placement location, the placement location is changed to a location near the designated location. Also, when the transfer subject article can be placed on the different article, the transfer subject article is placed on the different article without changing the placement location. Therefore, even if a placement location for an article is designated without knowing the details of circumstances of the placement location, the robot can perform the placement processing appropriately, allowing the article to be placed in an appropriate state.

(Embodiment 5)

An object of this embodiment of the present invention is to cause a laborer robot to smoothly move a transfer subject article in a life space, such as a house or an office, without re-holding it.

To attain the above object, a system for managing an article existing in a life space according to the present invention comprises: a designation device for designating a transfer subject article and a placement location which is a destination of the transfer subject article; a laborer robot having a holder for holding an article, the laborer robot holding the transfer subject article in the holder to place the transfer subject article at the placement location; a database containing information about an article in the life space and map information of the life space; and a holding position determination section for determining, based on information about the transfer subject article and the placement location which are stored in the database, a holding position of the transfer subject article held by the holder to be a position at which the laborer robot places the transfer subject article at the placement location without re-holding the transfer subject article.

According to the above system, the holding position of the transfer subject article is previously determined to be an appropriate position based on the information about the transfer subject article and the placement location stored in the database. Therefore, the laborer robot can place the transfer subject article at the placement location without re-holding it.

Further, a system for managing an article existing in a life space according to the present invention comprises: a database containing at least information about an article in the life space; the aforesaid designation device; the aforesaid laborer robot; and a holding position determination section for selecting a contact region in which the transfer subject article is in contact with the placement location and determining a holding position of the transfer subject article held by the holder to be a position at which the holder places the transfer subject article at the placement location such that the holder neither overlaps the contact region nor re-holds the transfer subject article, based on information about the transfer subject article stored in the database.

According to the above system, the holding position of the transfer subject article is previously determined to be an appropriate position at which the holder does not overlap the contact region, based on the information about the transfer subject article stored in the database. Therefore, the laborer robot can place the transfer subject article at the placement location without re-holding it.

Furthermore, a system for managing an article existing in a life space according to the present invention comprises: the aforesaid designation device; the aforesaid laborer robot; a database containing information about an article in the life space, information about an operational constraint to the laborer robot and map information of the life space; and a holding position determination section for determining, based on information about the operational constraint to the laborer robot and information about the transfer subject article and the placement location which are stored in the database, a holding position of the transfer subject article held by the holder to be a position at which the laborer robot places the transfer subject article at the placement location without re-holding the transfer subject article.

According to the above system, the holding position of the transfer subject article is previously determined to be an appropriate position based on the information about the operational constraint to the laborer robot and the information about the transfer subject article and the placement location which are stored in the database. Therefore, the laborer robot can place the transfer subject article at the placement location without re-holding it.

In the above systems, the holder of the laborer robot need only have a function of holding an article and there is no specific limit to its holding manner. Various means can be used as a holder, including means for grabbing an article, means for supporting an article, means for holding an article by suction and means for holding an article by a magnetic or electric force.

The life space means a space in which humans and articles exist while the formers are associated with the latters, such as a house or an office.

Specifically, a first aspect of this embodiment is directed to a system for managing an article existing in a life space and the system comprises: a designation device for designating a transfer subject article and a placement location which is a destination of the transfer subject article; a laborer robot having a holder for holding an article, the laborer robot holding the transfer subject article in the holder to place the transfer subject article at the placement location; a database containing information about an article in the life space and map information of the life space; and a holding position determination section for determining, based on information about the transfer subject article and the placement location which are stored in the database, a holding position of the transfer subject article held by the holder to be a position at which the laborer robot places the transfer subject article at the placement location without re-holding the transfer subject article.

In a second aspect of this embodiment, the holding position determination section in the first aspect selects a contact region in which the transfer subject article is in contact with the placement location and determines the holding position such that the holder does not overlap the contact region based on information about the transfer subject article and the placement location which are stored in the database before the holder holds the transfer subject article.

In a third aspect of this embodiment, the holding position determination section in the second aspect checks an available space at the placement location based on information about the placement location which is contained in the database and selects the contact region such that at least the transfer subject article is accommodated within the available space.

In a fourth aspect of this embodiment, the holding position determination section in the second aspect checks an available space at the placement location based on information about the placement location which is contained in the database and selects the contact region such that the transfer subject article is accommodated within the available space excluding a space necessary for a placement operation of the holder.

In a fifth aspect of this embodiment, the holding position determination section in the first aspect determines whether a placement location designated as the transfer destination is inside or outside a box, and if the placement location is inside the box, the holding position determination section determines the holding position without selecting a contact region of the transfer subject article.

In a sixth aspect of this embodiment, the article existing in the life space in the first aspect includes a specific article which has human-grasp part and human-nongrasp part, the holding position determination section determines whether or not the transfer subject article is the specific article and the placement location is a human, and if the transfer subject article is the specific article and the placement location is a human, the holding position determination section selects the human-nongrasp part as the holding position.

A seventh aspect of this embodiment is directed to a system for managing an article existing in a life space and the system comprises: a database containing at least information about an article in the life space; a designation device for designating a transfer subject article and a placement location which is a destination of the transfer subject article; a laborer robot having a holder for holding an article, the laborer robot holding the transfer subject article in the holder to place the transfer subject article at the placement location; and a holding position determination section for selecting a contact region in which the transfer subject article is in contact with the placement location and determining a holding position of the transfer subject article held by the holder to be a position at which the holder places the transfer subject article at the placement location such that the holder neither overlaps the contact region nor re-holds the transfer subject article, based on information about the transfer subject article stored in the database.

An eighth aspect of this embodiment is directed to a system for managing an article existing in a life space and the system comprises: a designation device for designating a transfer subject article and a placement location which is a destination of the transfer subject article; a laborer robot having a holder for holding an article, the laborer robot holding the transfer subject article in the holder to place the transfer subject article at the placement location; a database containing information about an article in the life space, information about an operational constraint to the laborer robot and map information of the life space; and a holding position determination section for determining, based on information about the operational constraint to the laborer robot and information about the transfer subject article and the placement location which are stored in the database, a holding position of the transfer subject article held by the holder to be a position at which the laborer robot places the transfer subject article at the placement location without re-holding the transfer subject article.

Embodiment 5 of the present invention also relates to an article management system for managing an article existing in a life space. A detailed description will not be given here to overlaps with the above-mentioned fourth or other embodiments.

Figure 58:
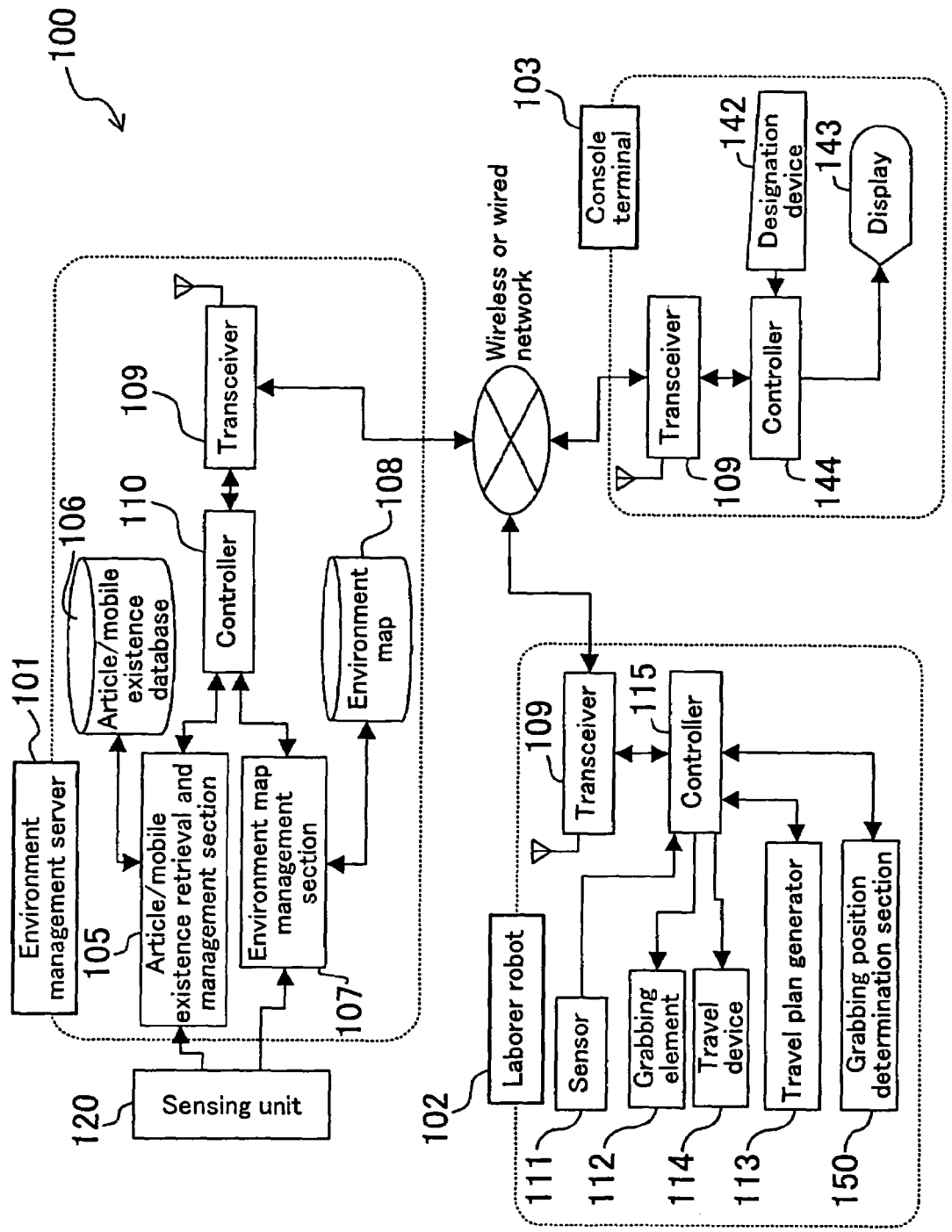
FIG. 58 is a block diagram of an article management system according to embodiment 5 of the present invention.

FIG. 58 is a block diagram showing an exemplary general structure of the article management system 100 according to this embodiment. In FIG. 58, the same components as described in the first embodiment referring to FIG. 2 are indicated by the same reference numerals as in FIG. 2.

Figure 60A:
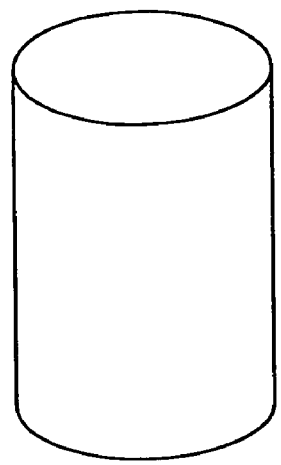
FIG. 60A shows the original shape of the article.
Figure 60B:
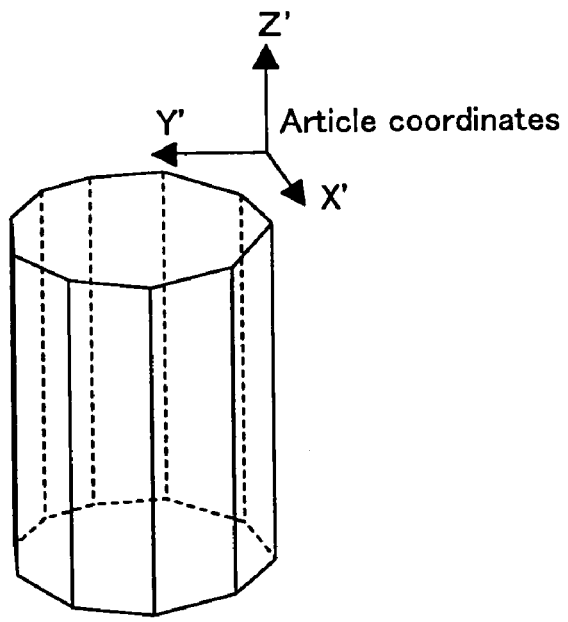
FIG. 60B shows the shape of a modeled article.
Figure 60C:
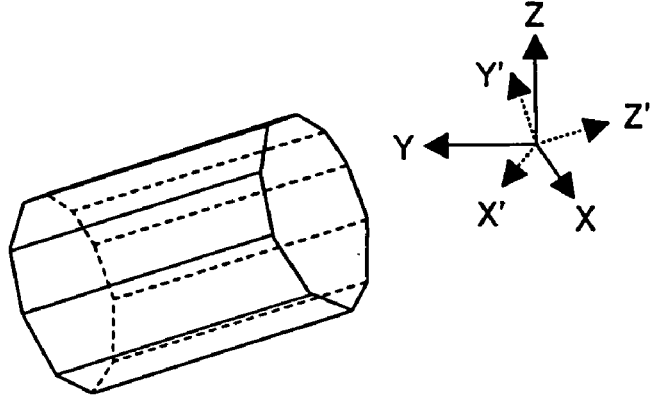
FIG. 60C shows the shape of the modeled article placed in the real world.

First, a description will be made of geometric data of an article in this embodiment. FIG. 60A shows the original shape (cylinder) of an article (a drink can). When such an article is measured using stereoscopic three-dimensional measurement technique or the like, polygon data can be obtained in which one surface of the article is approximated by a plurality of surfaces as shown in FIG. 60B. Each surface is described as a set of vertex coordinates in an appropriately selected reference coordinate system for the article. Each surface is given some attributes. Specifically, the attributes include a flag about whether that surface is suitable as a contact surface with a surface on which the article will be placed and a flag about whether that surface serves as a surface normally used by a human to grasp the article. Examples of the surface suitable as a contact surface include a cup bottom and the bottom of a juice can. Examples of the surface normally used by a human to grasp the article include a cutting tool handle and a cup handle. These attributes, like other attributes, are given by manual input or otherwise when data on the article is input. As can be seen, articles existing in the life space include a specific article formed of human-grasp part grasped by a human and human-nongrasp part not grasped by the human.

For example, data on a particular surface in a triangular polygon is expressed as follows:

(PID, x1', y1', z1', x2', y2', z2', x3', y3', z3', 1, 0)

In the above data, the first term "PID" indicates the number of the particular surface (the number uniquely determined by the data on the article). The next nine values indicate the locations of three vertices of that surface in the reference coordinate system. The further next value "1" indicates that the surface is suitable as a contact surface. If the surface is not suitable as a contact surface, the value is assigned to "0". The last value "0" indicates that the surface does not serve as a surface normally used by a human to grasp. If the surface serves as a surface normally used by a human to grasp, the value is assigned to "1".

The posture data on an article is the same as in the fourth embodiment and, therefore, a description will not be given here thereto.

Figure 59:
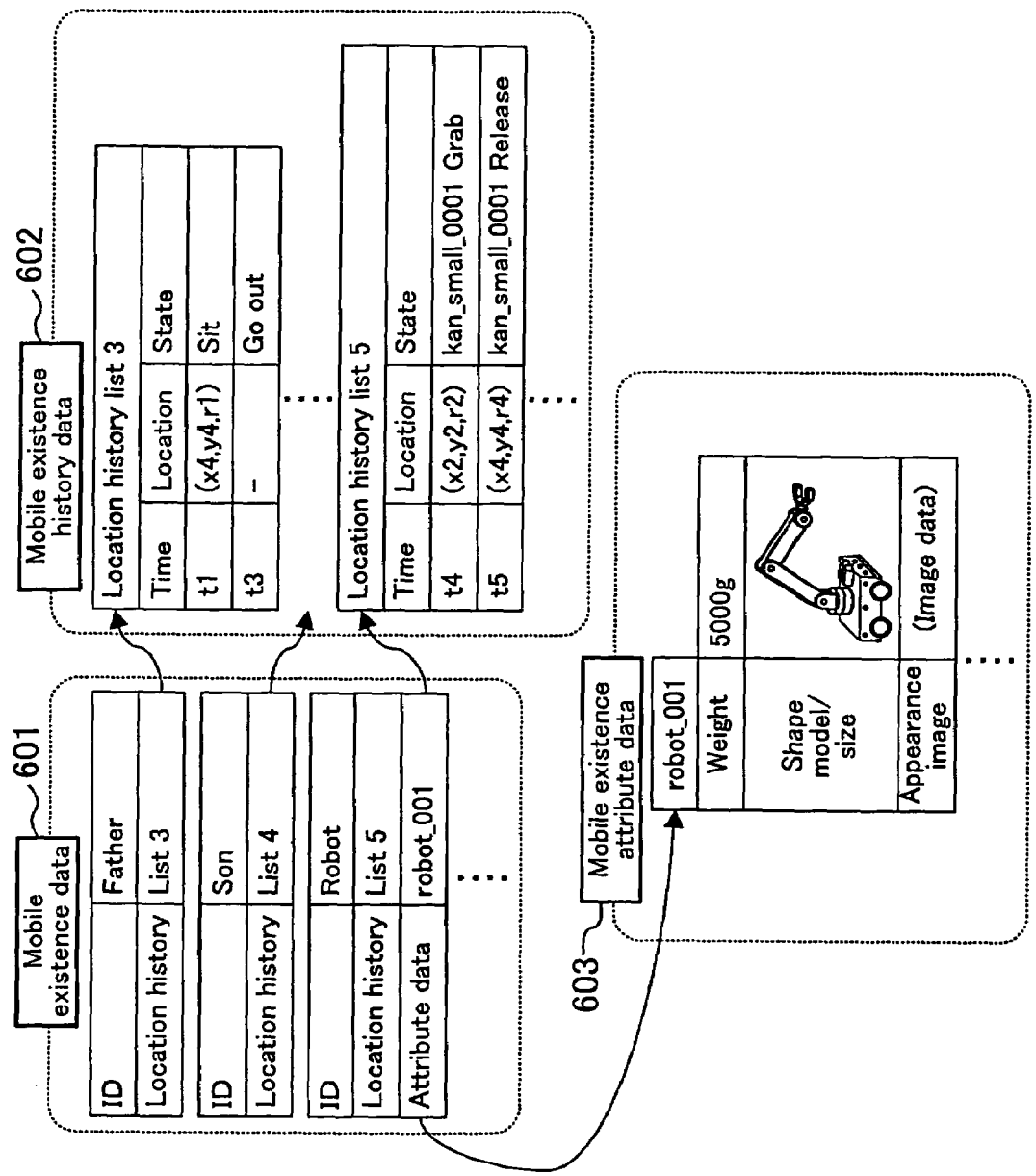
FIG. 59 is a diagram illustrating the data structure of mobile existence data in the article/mobile existence database.

Next, a description will be made of a database for dealing with a mobile existence (see FIG. 59). The database for dealing with a mobile existence is composed of three sub-databases: a sub-database containing mobile existence data 601, a sub-database containing mobile existence history data 602 and a sub-database containing mobile existence attribute data 603. The contents of the data of the above three types are as follows.

A single set of mobile existence data 601 is composed of an ID for use in identifying an individual mobile existence and a pointer to a single set of mobile existence history data 602 containing a history of motions of the particular mobile existence.

A single set of mobile existence history data 602 is composed of times, locations of the mobile existence at the above times and states of the mobile existence at the above times. The location of the mobile existence at one time is expressed by three values including coordinates (X, Y) in a surface and a direction r.

A single set of mobile existence attribute data 603 contains information about inherent physical attributes of the particular mobile existence. FIG. 59 shows as exemplary physical attributes the weight and geometry of the particular mobile existence.

In the mobile existence history data 602, the state of the mobile existence indicates, if the mobile existence is a human, a normal human action such as "sit", "stand", "lie" or "walk" and, if it is a robot, handling that the robot can perform on an article, such as "grab" or "release". Possible states of each mobile existence may be previously defined and one of the states may be selected later. If the mobile existence is a robot, the state is expressed, not by the handling detail only, but by a combination of the ID of the article to be handled and the handling detail.

For example, if the mobile existence is a laborer robot, a single record set of mobile existence attribute data 603 thereon contains the weight and geometry of the laborer robot and information about the occupied space of the grabbing element (part of information about constraints to the motion of the laborer robot). The information about the occupied space of the grabbing element means information about a space occupied by the grabbing element itself and required to grab the article.

Figure 61:
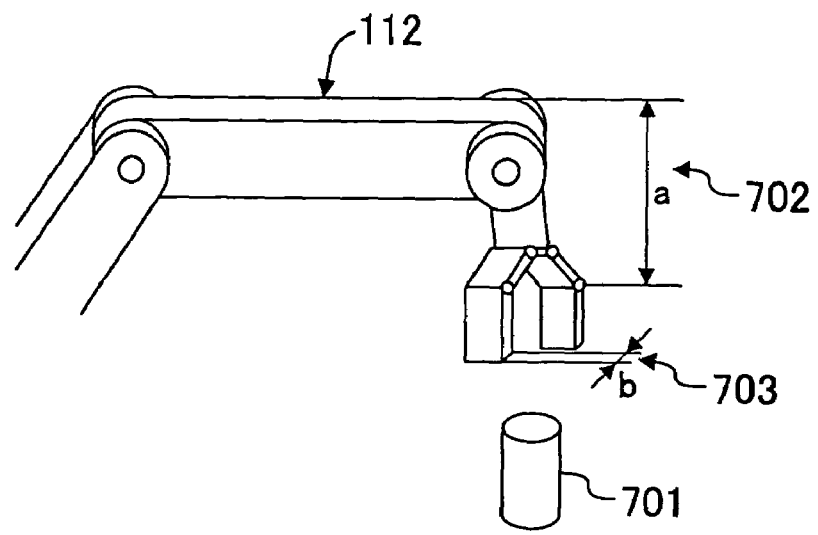
FIG. 61 is a perspective view of a grabbing element of a laborer robot.

FIG. 61 is a view illustrating a space occupied by a grabbing element 112 of a laborer robot when it grabs an article 701. Possible methods for grabbing the article 701 in this example include a method for grabbing the article 701 from above and a method for grabbing it from sideways. When the article 701 is grabbed from above, there is a need to allow for an occupied height 702 extending above from the grabbed article 701 for a distance of a and lateral occupied regions 703 extending laterally from the article 702 and corresponding to twice a length of b (the thickness of the robot hand). On the other hand, when the article 701 is grabbed from sideways, there is a need to allow for only the lateral occupied regions 703 corresponding to twice a length of b.

As described later, one of functions of the article management system 100 of this embodiment is the function of previously determining the grabbing positions on an article in consideration of circumstances of a target placement location such that, when the robot 102 transfers the grabbed article to the target placement location, there is no need to re-hold the grabbed article. To exhibit this function, it is necessary to know in advance, for example, how large space exists at the designated placement location and it is desirable to store information about the article in the database, such as where and in what posture the article is being placed. Nevertheless, retrospective history data is not necessarily needed but it suffices to always obtain the latest information. In an example described below, however, not only the latest information but also histories of an article and a mobile existence are recorded.

An example of data update for the article/mobile existence database 106 is as described in the first embodiment.

<Environment Map>

The environment map is composed of structural information on immobile objects that normally hardly move, such as a room and furniture. The structural information means regional information on a placement surface which exists at least inside of a space occupied by the immobile object and on top of the immobile object and on which another object can be placed and to the height of a space upwardly of the placement surface of the immobile object. Examples of the placement surface on which another object can be placed include, if the immobile object is a room, a floor and, if it is a storage space, a shelf. An example of the regional information on the placement surface is vertices of the circumscribed polygon of the placement surface.

Note that the height of a space upwardly of the placement surface means the distance in a direction substantially orthogonal to the placement surface and does not exactly mean only the vertical distance from the placement surface.

An example of the environment map data, the environment map management section and the controller of the environment management server are the same as in the fourth embodiment and, therefore, a description will not be given here thereto.

Structure of Laborer Robot

The structure of the laborer robot is also substantially the same as in the above-mentioned fourth or other embodiments but is different from the fourth embodiment in that the laborer robot includes, instead of the placement posture determination section 140 and the placement location determination section 141, a grabbing position determination section 150 for determining the grabbing positions on an article grabbed by the grabbing element 112 (a more specific form of the holder) or a holding position determination section if not the grabbing element 112 but a more general holder is used.

The grabbing position determination section 150 makes reference to the environment management server 101 for information about the article to be grabbed and information about the designated placement location and determines, based on the reference results, the grabbing positions on the article to be grabbed by the grabbing element 112 such that the grabbing element 112 can place the grabbed article at the placement location without re-holding it.

Further, the grabbing position determination section 150 previously selects a contact region in which a transfer subject article will be in contact with the placement location before the grabbing element 112 grabs the transfer subject article, and then determines the grabbing positions such that the grabbing element 112 does not overlap the contact region.

In doing so, the grabbing position determination section 150 makes reference to the environment management server 101 for the available space at the designated placement location and selects as the contact region a contact region in which at least the transfer subject article can be accommodated within the available space. Here, "space" means a two-dimensional region, height, or a three-dimensional space defined by a two-dimensional region and a height, and the available space at the placement location means, if the particular space is a box-shaped space, the product of the area of a region on which the article can be placed and the height of the space upwardly of the region.

Preferably, the grabbing position determination section 150 makes reference to the environment management server 101 for the available area at the designated placement location and selects as the contact region a contact region having a smaller area than the available area. More preferably, the grabbing position determination section 150 selects, in consideration of the occupied area of the grabbing element 112 itself when placing the article, a contact region having a smaller area than the available area excluding the area necessary for the grabbing element 112 (the area on the placement surface required for the placement operation).

Preferably, the grabbing position determination section 150 makes reference to the environment management server 101 for the available height at the designated placement location and selects as the contact region such a contact region that the transfer subject article when placed has a height equal to or smaller than the available height. More preferably, the grabbing position determination section 150 selects, in consideration of the occupied height of the grabbing element 112 itself when placing the article, a contact region on which the transfer subject article when placed has a height equal to or smaller than the available height excluding the height necessary for the grabbing element 112 (the height required for the placement operation).

The operation details of the grabbing position determination section 150 will be described later.

The example of the article management system 100 shown in FIG. 58 is composed of three sub-systems: the environment management server 101, the laborer robot 102 and the console terminal 103, and is configured so that these sub-systems exchange information among them via a wireless or wired network. The structure of the article management system of the present invention, however, is not limited to the above. For example, the article management system may have a structure in which the console terminal 103 is mounted on the environment management server 101 or the laborer robot 102. Further, the article management system 100 is not limited to the structure having a single robot 102 but may be a structure having a plurality of robots so that they concurrently perform individual works while cooperating with each other. Alternatively, the article management system 100 may have a structure in which not the laborer robot 102 but the environment management server 101 includes the travel plan generator 113 and the grabbing position determination section 150 and transmits calculation results of these sections to the laborer robot 102.

Operation of Article Management System

Below, a description will be made of the operation of the article management system 100, i.e., how the controllers 110, 115 and 144 of the sub-systems, i.e., the environment management server 101, the laborer robot 102 and the console terminal 103, operate.

The basic information exchange mechanisms of the sub-systems are the same as in the fourth embodiment and, therefore, detailed descriptions will not be given here to them.

Instead, a specific task of transferring a book onto a bookshelf will be described here as an example of a task of transferring an article designated by an operator to a designated location. In this connection, when a plurality of rows of bookshelves exist, the article management system can designate on what number bookshelf an article should be placed through the operation of the console terminal 103.

The process configuration of the controller 144 of the consol terminal 103 is the same as shown in the fourth embodiment with reference to FIG. 43.

Figure 62:
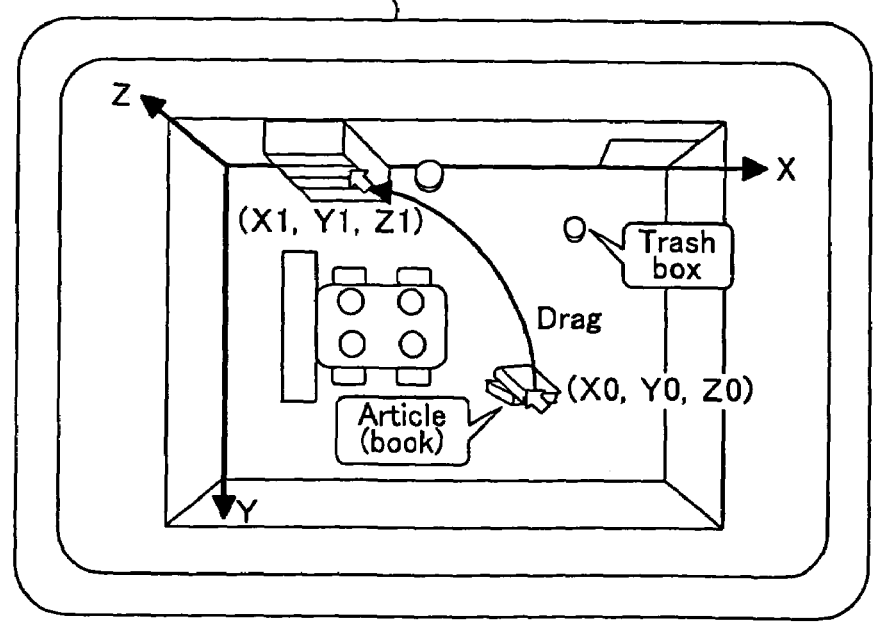
FIG. 62 is a picture on a display showing an example of an instruction input in which an article is handled on a console terminal.

Specifically, when an operator inputs an instruction into the designation device 142, the handling message generator 1501 stores a message including the instruction in the message queue 1302. FIG. 62 shows an example of an instruction input in which the operator inputs an instruction to transfer an article (book) from the floor (coordinates: X0, Y0, Z0) to a bookshelf (coordinates: X1, Y1, Z1) by a drag and drop operation using a mouse while referring to the display 143. FIG. 63 shows an example of a message generated in the handling message generator 1501 in this case. The items indicated by Number 1 to 6 and 11 in the figure are necessary to correctly receive any message. However, they are independent of the content of the message and, therefore, a description will not be given here to them. This table shows a message for sending a command (an article transfer command "01" for the robot) from the source ("P0" indicating the operator) to the destination ("I0" indicating the console terminal). The item indicated by Number 10, Parameter, means to transfer a single (the first term "001" means the number of articles to be transferred) article (an article at a coordinate point (X0, Y0, Z0)) to a location of a coordinate point (X1, Y1, Z1). When a plurality of articles are transferred, the current location and the destination are put in this order for each article.

The processing flow of the message processor 1303 in the console terminal 103 is the same as shown in the fourth embodiment referring to FIG. 46, and an example of a message when a single task unit is transmitted from the console terminal 103 to the laborer robot 102 is as shown in FIG. 47.

Figure 64:
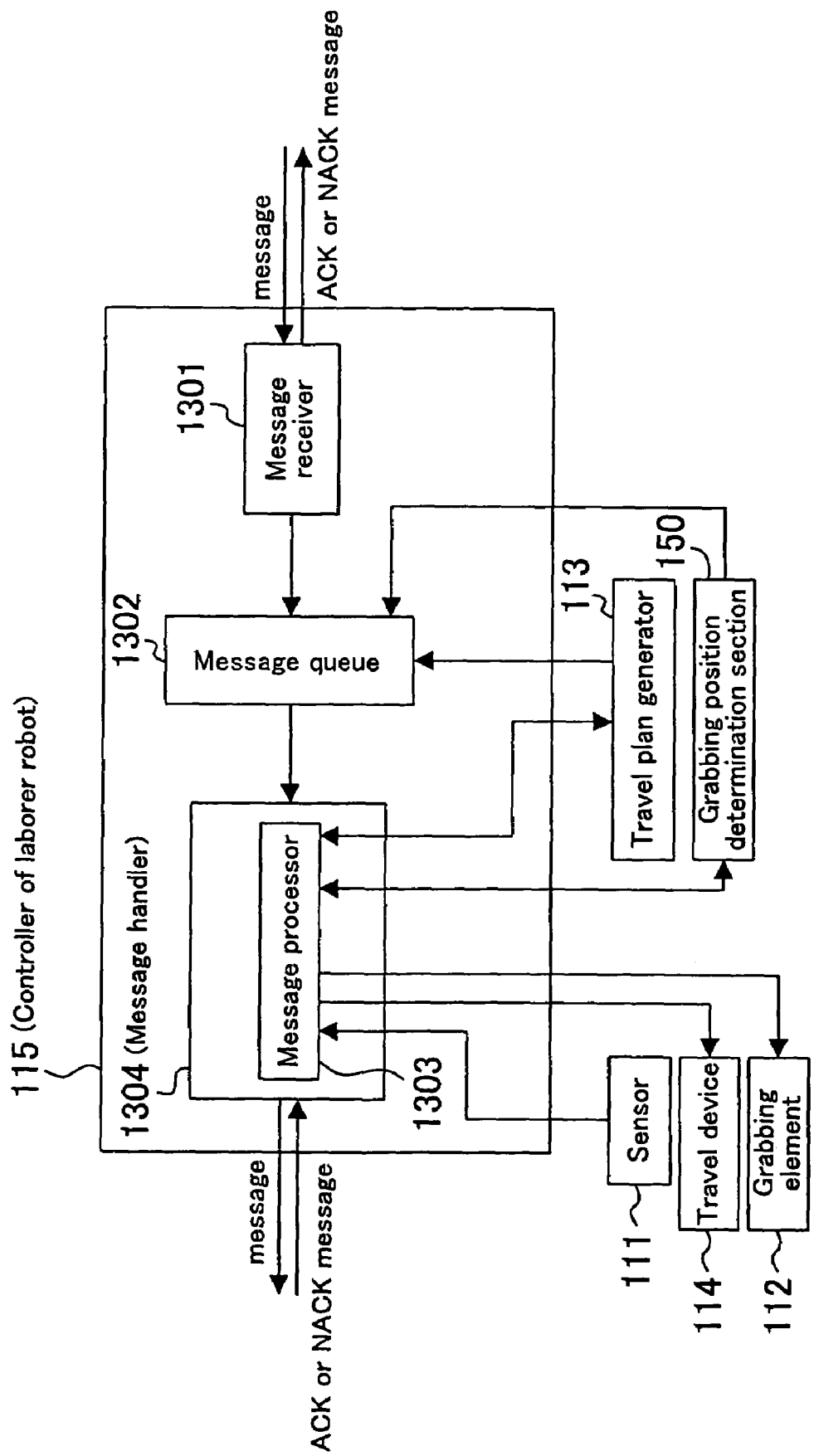
FIG. 64 is a diagram showing the process configuration of a controller of a laborer robot.

Next, a description will be made of the operation of the controller 115 of the laborer robot 102. FIG. 64 shows the process configuration of the controller 115 of the laborer robot 102.

When the laborer robot 102 is turned on, it carries out initialization only once immediately after the turn-on. This initialization includes, for example, establishment of a communication channel and execution of each program thread. The message receiving part 1301 receives the above-mentioned task unit-containing message (see FIG. 47) transmitted from the console terminal 103 through the transceiver 109 and stores the message in the message queue 1302. FIG. 65 shows examples of messages that can be understood by the laborer robot 102.

Figure 66:
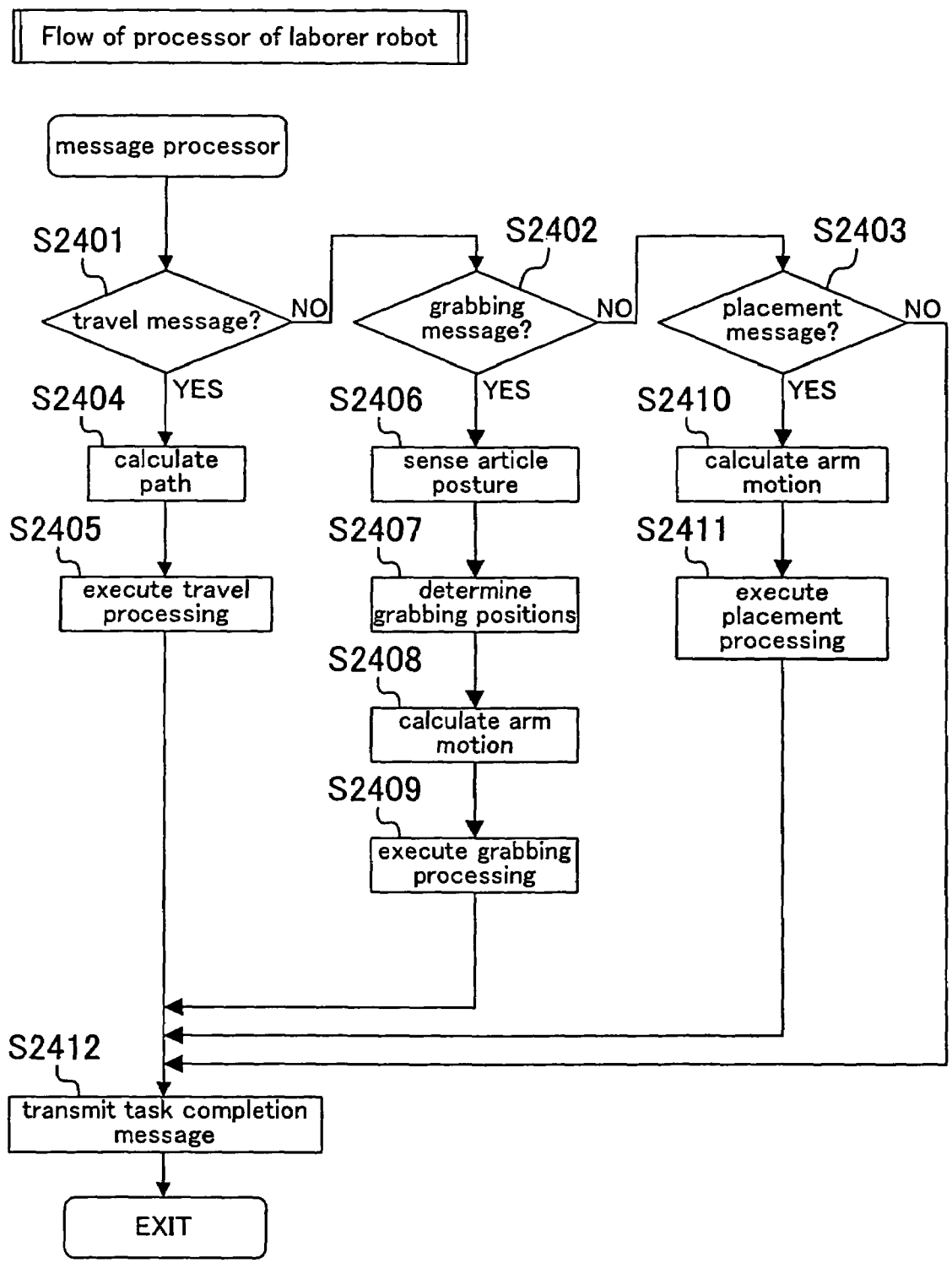
FIG. 66 is a flow chart showing the operation of a message processor in the controller of the laborer robot.

FIG. 66 is a flow chart of the processing of the message processor 1303 in the laborer robot 102. An example of messages input to the message processor 1303 is a task unit-containing massage transmitted from the console terminal 103. In this processing, first of all, it is determined in steps S2401, S2402 and S2403 what type the task unit is. Then, processing is carried out according to the task unit type.

If it is determined in step S2401 that the task unit is "travel", the flow proceeds to step S2404 in which the path to the designated location is calculated using the travel plan generator 113. Next, in step S2405, a control command to travel according to the path calculated by the travel plan generator 113 is sent to the travel device 114 and the travel device 114 executes the processing of travel to the designated location. When the laborer robot 102 receives, for example, the message shown in FIG. 47, the above processing flow is carried out.

If it is determined in step S2402 that the task unit is "grab", the flow proceeds to step S2406 in which the posture of the article is sensed using the sensor (e.g., camera) 111 in order to grab it. Then, in step S2407, the grabbing positions on the article are calculated. In doing so, the placement posture of the article is expected according to the circumstances of the placement location and, then, the grabbing positions are determined to positions suitable to place the article in the expected placement posture. The expected placement posture of the article is stored in a memory or the like and used for later calculations of motions of the arm 201 and the hand 202 during the below-described placement task unit (see step S2411 in FIG. 66). Next, in step S2408, the motions of the arm 201 and the hand 202 are calculated. Then, in step S2409, a command to grab the article is sent to the grabbing element 112 and the grabbing element 112 grabs the article. Though in this example the posture of the article is sensed using the sensor in step S2406, the posture of the article may be recognized by referring to the environment management server 101. The information about the current posture of the article is recorded in the article history data (see FIG. 6).

If it is determined in step S2403 that the task unit is "placement", the motions of the arm 201 and the hand 202 are calculated to accommodate the placement posture stored in the memory during the grabbing task unit or the designated placement posture (step S2410) and a control command to actuate the arm 201 and the hand 202 is issued to place the grabbed article in place (step S2411).

Finally, in step S2412, a message of the completion of travel, grabbing and placement is transmitted to the instruction source (console terminal).

One of features of the present invention lies in a processing when the message processor 1303 in the laborer robot 102 receives a grabbing message. This processing is different from that in the known art that requires re-holding. In the article management system 100 of this embodiment, the grabbing positions on an article to be grabbed is calculated using the grabbing position determination section 150 according to the circumstances of the placement location for the article and the article is transferred without the need to re-hold it.

Figure 67:
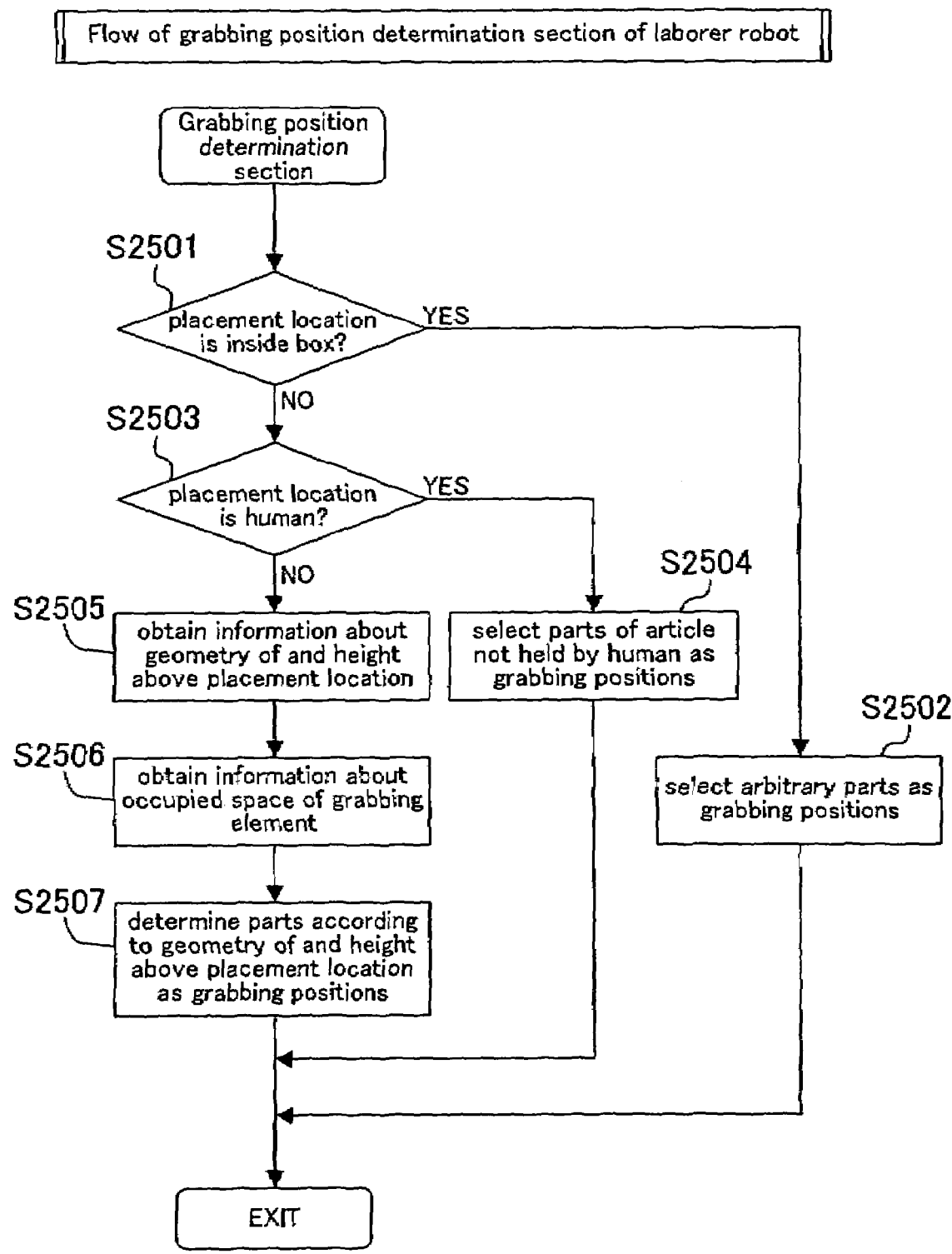
FIG. 67 is a flow chart showing the operation of a grabbing position determination section of the laborer robot.

FIG. 67 is a flow chart showing the operation of the grabbing position determination section 150. In this operation, first, it is determined in step S2501 whether the placement location is inside a box. This can be implemented by referring to the environment management server 101 in the form of a message (see Command number 12 in FIG. 71). If the placement location is inside a box, the placement posture is not taken into consideration and, therefore, the grabbing positions are also not particularly limited. Thus, in step S2502, arbitrary grabbable parts are selected as grabbing positions. The method for finding grabbing positions will be described later.

On the other hand, if the placement location is not inside a box, the flow proceeds to step S2503 in which it is determined whether the placement location is a location at which a human exists. In other words, it is determined whether the transfer subject article is passed to a human. The existence or absence of a human at the placement location can be known by referring to the article/mobile existence database 106. If the placement location is a location at which a human exists, the flow proceeds to step S2504, in which parts of the article not held by a human are selected as grabbing positions. Part of the article held by a human can be known by referring to the geometry data or the like in the article/mobile existence database 106, as described above. If the determination in step S2503 shows that the placement location is not a location at which a human exists, the flow proceeds to step S2505, in which information about the shape of the available region at the placement location and the height of a space upwardly thereof (available height) is obtained.

Figure 68:
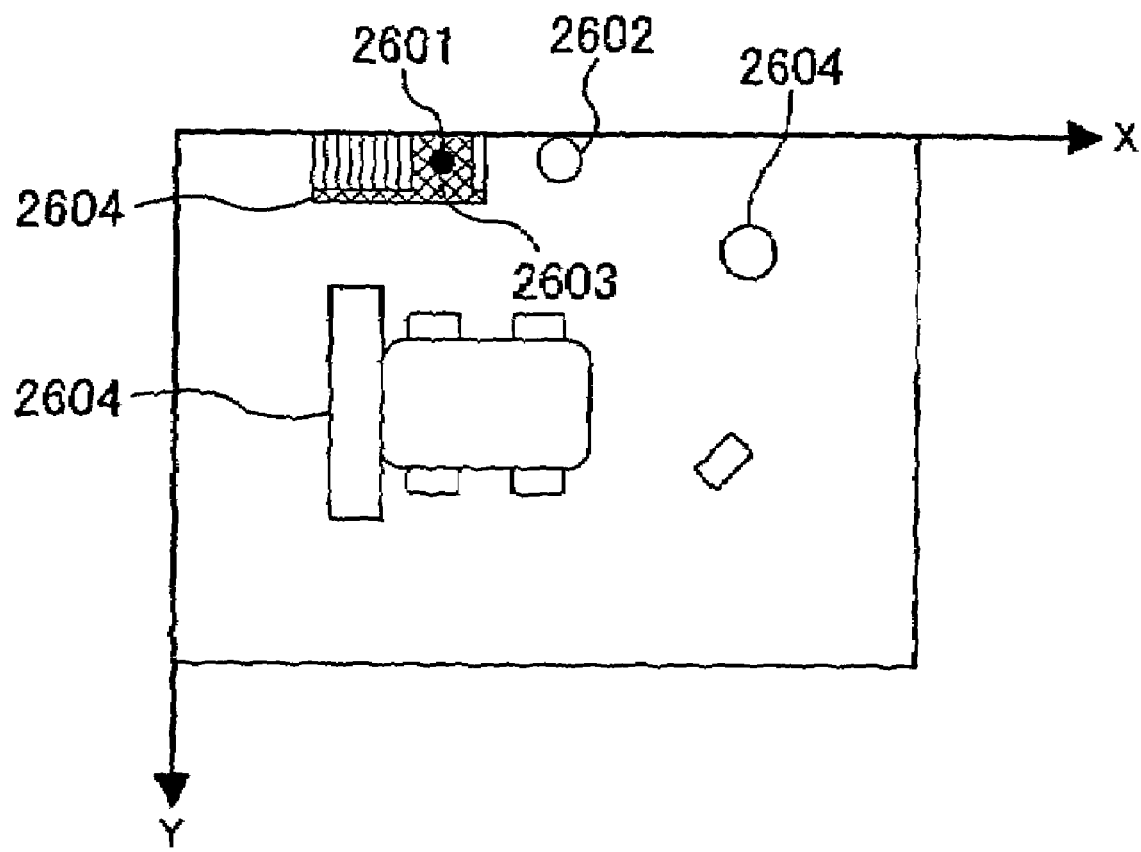
FIG. 68 is a diagram illustrating a method for determining the available space of the placement location.

The available region at the placement location can be known by referring to the environment map 108 and the article/mobile existence database 106. FIG. 68 is a diagram illustrating a method for determining the available space at the placement location. Specifically, information about the environment map 108 (see FIG. 35) is obtained from the environment management server 101, information about the positions, shapes and postures of the article and the mobile existence (not shown) is obtained from the article/mobile existence database 106, and the region in which the article and mobile existence exist is projected from above on the environment map (see FIG. 68) modeled in plan. As a result, an available region 2603 (the hatched region in FIG. 68) can be obtained as a region in which nothing is projected on the environment map. Since, however, the available region 2603 is limited to a flat surface having the same X coordinate value as the placement location, the area on a furniture piece 2604 having a different height and the area on the mobile existence (not shown) are excluded from the available region in the case of FIG. 68. Further, the height of a space at the placement location (the distance between two adjacent bookshelves in this example) can be obtained from the furniture data 1105 on the environment map. As described above, the surfaces forming each furniture piece are accompanied with information about the height of a space upwardly thereof.

In the above manner, the available region at the placement location and the height of a space upwardly thereof can be known in step S2505. Next, in step S2506, information about the occupied space of the grabbing element 112 is obtained from the attribute data on the laborer robot 102.

Finally, in step S2507, the grabbing positions on the transfer subject article are determined such that the transfer subject article falls within the shape of the available region at the placement location and the height of the space upwardly thereof. Specifically, first, search is made for candidates for a contact surface of the article which can fall within the shape of the available region at the placement location. Since, actually, the grabbing element 112 requires its own occupied region (for example, when grabbing an article from sideways), candidates for a contact surface of the article are searched for in consideration of the occupied region of the grabbing element 112. For example, candidates for a contact surface of the article are searched for, based on the above information about the occupied space obtained in step S2506, such that they can fall within a shape obtained by narrowing the width of the available region by a distance twice the thickness b (see FIG. 61) of the robot hand 202.

As described above, the geometry of the article is stored as a polygon model in the article attribute data 303. Therefore, candidates for a contact surface can be known using a flag added to each surface (polygon). Needless to say, all the surfaces of the article may be selected as candidates for a contact surface.

Next, it is determined whether the height of the article when each candidate for a contact surface contacts the placement location falls within the height of a space upwardly of the available region at the placement location, and any contact surface candidate not falling within the above height is excluded from the candidates. Then, the posture of the article when each remaining contact surface candidate contacts the available region at the placement location is expected and positions that allow the grabbing element to place the article in the expected posture without laboring are selected as the grabbing positions.

Figures 69A, 69B:
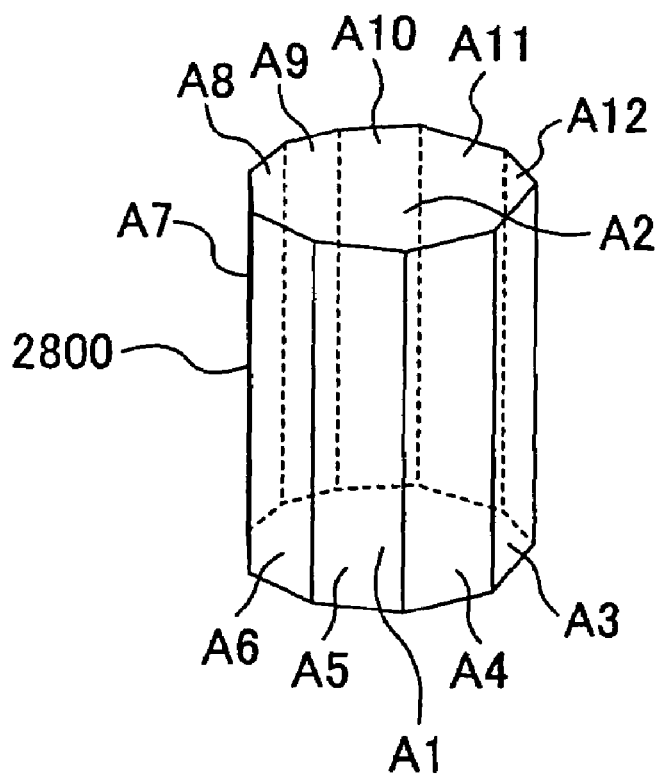
FIG. 69 illustrates the relation between contact surface and grabbing surfaces.

In this example, one or more predetermined pairs of surfaces of an article are previously defined as grabbing surfaces for each contact surface and the centers of gravity of each pair of surfaces are defined as the grabbing positions on the article grabbed by the robot hand 202. FIG. 69A is a table showing the relation between contact surface and grabbing surfaces using an article 2800 shown in FIG. 69B as an example. For example, if the surface A1 is a contact surface, five pairs are possible: (A3, A8), (A4, A9), (A5, A10), (A6, A11) and (A7, A12). The grabbing positions can be determined by referring to such a table. In this example, a plurality of pairs of grabbing positions exist for each contact surface. For example, out of these pairs of grabbing positions, one pair of grabbing positions may be selected which has a small distance between the two opposed surfaces and does not change the posture of the hand 202 as much as possible.

Further, on the assumption that the designated placement location would be surrounded by another article, each article is principally grabbed from above the placement posture. If, however, the length obtained by summing the height of the article when placed and the occupied height of a space upwardly of the grabbing element 112 obtained from the information about the occupied space exceeds the height of a space upwardly of the placement location, the article is preferably grabbed from sideways of the placement posture.

In this example, the contact region (surface) is selected such that the transfer subject article can fall within a space satisfying both the available region and the available height at the placement location. The contact region (surface), however, may be selected such that the transfer subject article can fall within either the available region and the available height.

By grabbing each article in consideration of the circumstances of the placement location and an expected placement posture of the article in the above manner, the article can be transported smoothly without the need to re-hold it.

According to the article management system 100 of this embodiment, an article is grabbed in consideration of an expected placement posture of the article, which avoids the grabbing element 112 overlapping the contact surface. Consequently, the article can be smoothly transported without re-holding it. As an example, in carrying a book casually put on somewhere to a bookshelf and arranging it thereon together with the other books, the robot grabs the book, in consideration of the shelf height, such that the book can fall within the shelf height. Therefore, the book can be arranged on the bookshelf together with the other books without re-holding it. As another example, in passing a cutting tool, such as scissors or a kitchen knife, to a person, the robot grabs not part of the cutting tool held by the person (e.g., the haft of a kitchen knife) but the blade thereof. Therefore, such an article can be passed to a person with safety and user-friendliness without the need to re-hold it.

If any trouble occurs in the laborer robot 102 during execution of a task, such as a disability to produce the designated motion, an error message can be transmitted to the instruction source (the console terminal 103 in this example) to halt the task at any timing.

In this embodiment, the laborer robot 102 usually measures its own position using the amount of movement of its wheels (the number of rotations, the angle of rotation or the like). However, the actual position of the laborer robot 102 may not match the self-measured position owing to a slip between the floor and the wheels or an unavoidable collision with an obstacle. To compensate for such a position mismatch, the robot can periodically make reference to the environment management server 101 for its own position. Further, when an article is grabbed after its name is specified, the attribute of the article, such as geometry, can be previously retrieved and then used as a clue to find the designated article from among articles before a sensor such as a camera. In these manners, the environment management server 101 may be made reference to for the attribute of the article, the position of the laborer robot 102 or the environment map 108 necessary for the travel plan generator 113, as needed. Such a reference can be implemented by sending a query message to the environment management server 101 and receiving a response to it therefrom.

The operation of the controller 110 of the environment management server 101 is the same as in the fourth embodiment and, therefore, the description thereof will not be given here.

Up to this point, we have described the configuration and operation of the article management system 100 according to embodiment 5 of the present invention.

According to the article management system 110 of this embodiment, in using a laborer robot in a life space such as a house or an office to transport an article, the laborer robot can grab an article of any shape and any type without re-holding it, which provides an efficient and safe transportation of the article.

Effects of the Invention

According to a system for managing an article existing in a life space of this embodiment of the invention, there is no need to re-hold the transfer subject article in using a laborer robot to transfer the article, thereby providing a smooth transfer of the article. The elimination of the need to re-hold the transfer subject article simplifies the structure of the holder of the laborer robot. Furthermore, this system can reduce the inconvenience of the operator specifying the posture of the article when grabbed or placed.

(Embodiment 6)

Herein, an objective of the present invention is to provide a non-industrial article handling system for instructing a robot to execute a task of handling an article in a life space in which human beings take an action, such as an ordinary house, office, hotel, store, hospital, or the like, which facilitates designation of details of a task which is assigned to a robot and allows every user to easily operate the robot.

An article handling system of the present invention represents a system for handling an article which exists in a predetermined life space. This system comprises: a robot for handling the article; an input section for inputting a task instruction including a subject article for a task of the robot and a transfer destination of the subject article; and a task plan generator for generating a task plan according to the task instruction, wherein the task plan generator generates a task plan for transfer of the subject article to the transfer destination by the robot while supplementing a task at the transfer destination.

With this configuration, the task instruction input by the input section includes the subject article for the task of the robot and the transfer destination of the subject article.

Upon receipt of the task instruction, the task plan generator generates the task plan for transfer of the subject article to the transfer destination by the robot while supplementing a task at the transfer destination.

More particularly, when a user designates a task of "transferring a subject article to a desired destination", the task plan generator generates a task plan in which the robot transfers the article to the transfer destination. Thus, the task of transferring a subject article designated by the user to the designated transfer destination is executed by the robot. Since in this case the task plan generator generates a task plan supplementarily including the task at the transfer destination, the user does not need to additionally designate a task in view of the transfer destination of the article. This facilitates designation of a task which is assigned to the robot and allows every user to easily operate the robot.

The transfer destination may include an appliance having an accommodation section in which an article is accommodated. When the transfer destination included in the task instruction is the appliance having the accommodation section, the task plan generator may add, to the task plan, an operation of the appliance which is necessary for accommodating an article in the accommodation section. Herein, "appliances" include objects which are placed in a life space and have specific functions associated with articles. The appliances herein include, for example, household electrical appliances and case furniture. A refrigerator that is one of the household electrical appliances has functions of accommodating articles and cooling the articles. A microwave oven that is one of the household electrical appliances has functions of accommodating articles and heating the articles. Furthermore, case furniture has a function of accommodating articles.

The subject article may include an article accommodated in an accommodation section of an appliance. When the subject article included in the task instruction is an article accommodated in the accommodation section, the task plan generator may add, to the task plan, an operation of the appliance that is necessary for taking an article out of the accommodation section.

The accommodation section of the appliance may be provided with a door, and the task plan generator may add the opening/closing operations of the door to the task plan.

The transfer destination may include an appliance exerting an action on an article. When the transfer destination included in the task instruction is the appliance exerting an action on a subject article, the task plan generator may add an operation of the appliance for exerting an action on the subject article to the task plan.

In this case, the task plan generator may select an action corresponding to the subject article from a plurality of actions and add an operation of the appliance for exerting the selected action on the subject article to the task plan.

Upon receipt of the task plan, the appliance may execute an operation of the appliance included in the task plan.

The system may further include a notification section for notifying the task plan generated by the task plan generator before the robot starts executing the task.

The system may further include a space management database for managing the conditions in a life space. The task plan generator should generate a task plan with reference to the space management database.

Another article handling system of the present invention is a system for handling an article existing in a predetermined life space.

This system comprises: a robot for handling the article; an input section for inputting a task instruction including a subject article for a task of the robot and a transfer destination of the subject article; and a task plan generator for generating a task plan according to the task instruction, wherein the task plan generator generates a task plan for transfer of the subject article included in the task instruction to the transfer destination by the robot while supplementing a task corresponding to the conditions before the transfer of the subject article.

Still another article handling system of the present invention is a system for handling an article existing in a predetermined life space.

This system comprises: a robot for handling the article; an operation database in which details of an operation of an appliance existing in the life space are accumulated; an input section for inputting a task instruction including a subject article for a task of the robot and a transfer destination of the subject article; and a task plan generator for generating a task plan for allowing the robot to transfer the subject article included in the task instruction to the transfer destination according to the task instruction with reference to the operation database.

An article handling server of the present invention is a server for handling an article which exists in a predetermined life space.

The article handling server comprises a task plan generator for generating a task plan for a robot which handles the article according to a task instruction including a subject article for a task of the robot and a transfer destination of the subject article, wherein the task plan generator generates a task plan for transfer of the subject article included in the task instruction to the transfer destination by the robot while supplementing a task at the transfer destination.

Another article handling server of the present invention comprises a task plan generator for generating a task plan for a robot which handles the article according to a task instruction including a subject article for a task of the robot and a transfer destination of the subject article, wherein the task plan generator generates a task plan for transfer of the subject article to the transfer destination by the robot while supplementing a task corresponding to the conditions before the transfer of the subject article.

Still another article handling server of the present invention comprises a task plan generator for generating a task plan for allowing the robot to transfer the subject article included in the task instruction to the transfer destination according to a task instruction including a subject article for a task of the robot and a transfer destination of the subject article with reference to an operation database in which details of an operation of an appliance existing in the life space are accumulated.

In other words, according to a first aspect of the present invention, there is provided a system for handling an article which exists in a predetermined life space, comprising: a robot for handling the article; an input section for inputting a task instruction including a subject article for a task of the robot and a transfer destination of the subject article; and a task plan generator for generating a task plan according to the task instruction, wherein the task plan generator generates a task plan for transfer of the subject article to the transfer destination by the robot while supplementing a task at the transfer destination.

According to a second aspect of the present invention, in the article handling system of the first aspect, the transfer destination includes an appliance having an accommodation section in which an article is accommodated, and when the transfer destination included in the task instruction is the appliance having the accommodation section, the task plan generator adds, to the task plan, an operation of the appliance which is necessary for accommodating an article in the accommodation section.

According to a third aspect of the present invention, in the article handling system of the first aspect, the subject article includes an article accommodated in an accommodation section of an appliance, and when the subject article included in the task instruction is an article accommodated in the accommodation section, the task plan generator adds, to the task plan, an operation of the appliance that is necessary for taking an article out of the accommodation section.

According to a fourth aspect of the present invention, in the article handling system of the second or third aspect, the accommodation section of the appliance is provided with a door, and the task plan generator adds the opening/closing operations of the door to the task plan.

According to a fifth aspect of the present invention, in the article handling system of the first aspect, the transfer destination includes an appliance exerting an action on an article, and when the transfer destination included in the task instruction is the appliance exerting an action on a subject article, the task plan generator adds an operation of the appliance for exerting an action on the subject article to the task plan.

According to a sixth aspect of the present invention, in the article handling system of the fifth aspect, the task plan generator selects an action corresponding to the subject article from a plurality of actions and add an operation of the appliance for exerting the selected action on the subject article to the task plan.

According to a seventh aspect of the present invention, in the article handling system of any one of the second through sixth aspects, upon receipt of the task plan, the appliance executes an operation of the appliance included in the task plan.

According to an eighth aspect of the present invention, the article handling system of any one of the first through sixth aspects further includes a notification section for notifying the task plan generated by the task plan generator before the robot starts executing the task according to the task details.

According to a ninth aspect of the present invention, the article handling system of any one of the first through sixth aspects further includes a space management database for managing the conditions in a life space, and the task plan generator generates a task plan with reference to the space management database.

According to a tenth aspect of the present invention, there is provided a system for handling an article existing in a predetermined life space, comprising: a robot for handling the article; an input section for inputting a task instruction including a subject article for a task of the robot and a transfer destination of the subject article; and a task plan generator for generating a task plan according to the task instruction, wherein the task plan generator generates a task plan for transfer of the subject article included in the task instruction to the transfer destination by the robot while supplementing a task corresponding to the conditions before the transfer of the subject article.

According to an eleventh aspect of the present invention, there is provided a system for handling an article existing in a predetermined life space, comprising: a robot for handling the article; an operation database in which details of an operation of an appliance existing in the life space are accumulated; an input section for inputting a task instruction including a subject article for a task of the robot and a transfer destination of the subject article; and a task plan generator for generating a task plan for allowing the robot to transfer the subject article included in the task instruction to the transfer destination according to the task instruction with reference to the operation database.

According to a twelfth aspect of the present invention, there is provided a server for handling an article which exists in a predetermined life space, comprising a task plan generator for generating a task plan for a robot which handles the article according to a task instruction including a subject article for a task of the robot and a transfer destination of the subject article, wherein the task plan generator generates a task plan for transfer of the subject article included in the task instruction to the transfer destination by the robot while supplementing a task at the transfer destination.

According to a thirteenth aspect of the present invention, there is provided a server for handling an article which exists in a predetermined life space, comprising a task plan generator for generating a task plan for a robot which handles the article according to a task instruction including a subject article for a task of the robot and a transfer destination of the subject article, wherein the task plan generator generates a task plan for transfer of the subject article included in the task instruction to the transfer destination by the robot while supplementing a task corresponding to the conditions before the transfer of the subject article.

According to a fourteenth aspect of the present invention, there is provided a server for handling an article in a predetermined life space, comprising a task plan generator for generating a task plan for allowing the robot to transfer the subject article included in the task instruction to the transfer destination according to a task instruction including a subject article for a task of the robot and a transfer destination of the subject article with reference to an operation database in which details of an operation of an appliance existing in the life space are accumulated.

Embodiment 6 of the present invention is directed to an article handling system for instructing a laborer robot to transfer an article existing in life space. According to the pre-sent embodiment, a certain room in a general residential construction is considered as target space of the article handling system (hereinafter the space is referred to as environment).

Figure 70:
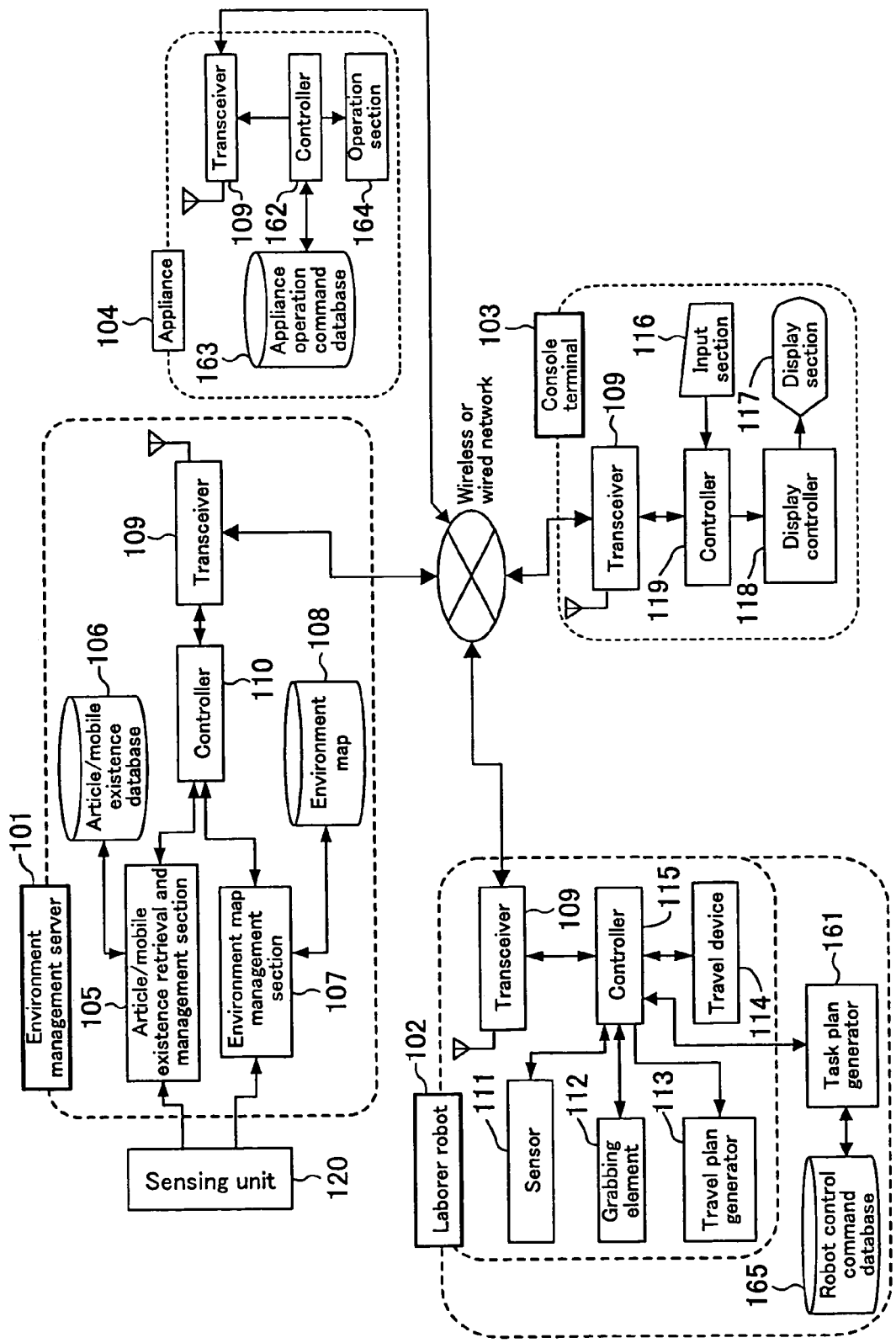
FIG. 70 is a block diagram illustrating an example of the whole configuration of an article handling system according to a sixth embodiment.

FIG. 70 is a block diagram showing an exemplary structure of the whole article handling system according to this embodiment. In FIG. 70, the same reference numerals are given to the same components as in FIG. 2 of the first embodiment. As shown in FIG. 70, roughly explaining, this system is formed by four subsystems, an environment management server 101 (hereinafter, sometimes abbreviated simply as server), a laborer robot 102 (hereinafter, sometimes abbreviated simply as robot), a console terminal 103, and an appliance 104. These fourth subsystems 101 through 104 are connected through a wireless or wired network to one another and configured to exchange information with one another over this network.

The four subsystems 101 through 104 each have a controller 110, 115, 119, 162 and a transceiver 109. Herein, the same reference numeral 109 is given to the respective transceivers of the subsystems 101 through 104, because the transceivers 109 perform a common operation.

A sensing unit 120 is identical with that in the first embodiment, and a description is not given in this embodiment.

<Structure of Environment Management Server>

The environment management server 101 serving as the first subsystem includes an article/mobile existence retrieval and management section 105, an article/mobile existence database 106, an environment map management section 107, an environment map 108, a transceiver 109, and a controller 110. The article/mobile existence retrieval and management section 105 manages the conditions of articles (that can be handled by the robot 102) and mobile existences (which principally handle articles, such as persons and the robot 102) in the environment among the conditions grasped by the sensing unit 120. The article/mobile existence database 106 stores data about the articles and mobile existences. The environment map management section 107 manages the conditions of the entire environment excluding the articles and mobile existences. The environment map 108 stores data about the entire environment. The transceiver 109 receives a query (signal) about the data of the article/mobile existence database 106 and the data of the environment map 108 from outside and transmits a reply signal to the query to the outside. The controller 110 controls the sensing unit 120, the article/mobile existence retrieval and management section 105, the environment map management section 107, and the transceiver 109.

The article/mobile existence retrieval and management section 105 accumulate, in the article/mobile existence database 106, information about articles and mobile existences existing in the environment which is detected by the sensing unit 120 and entered by the user. The information accumulated in the article/mobile existence database 106 includes at least the current locations of articles and mobile existences.

When a query is issued from the outside of the environment management server 101 through the transceiver 109 and the controller 110 to the article/mobile existence database 106, the article/mobile existence retrieval and management section 105 retrieves information necessary in view of the query from the article/mobile existence database 106 and also transmits the retrieved information to the controller 110. This allows, a user to retrieve the current location of an article from the information accumulated in the article/mobile existence database 106 by entering, into a console terminal 103, a search keyword for more specificity about the attribute of an article, e.g., the date, the type of the article, etc.

Furthermore, when requests for registration/update of information about articles are issued from a robot 102 and console terminal 103 which will be described later to the server 101, the article/mobile existence retrieval and management section 105 registers the information about the articles in the article/mobile existence database 106 and updates the article/mobile existence database 106.

Only the article/mobile existence retrieval and management section 150 obtains access to the article/mobile existence database 106. This prevents identical data from being updated and read from the article/mobile existence database 106 at the same time in this system.

The article/mobile existence database 106 of the environment management server 101 is a database in which information about articles and mobile existences is accumulated and includes an article database 106a (FIG. 71) about articles and a (unshown) mobile existence database about mobile existences.

The article database 106a is configured to have the following five attributes for each of articles.

1) Article IDs

The article IDs are IDs for distinguishing articles and assigned to articles, respectively. In other words, different IDs are assigned to physically different articles even if they are of the same type. The reason for this is that these articles are treated as different articles.

2) Article Names

The article names are names representing the types of articles. Unlike the article IDs, even if there exist a plurality of articles of the same type in the environment, the same name is assigned to the articles of the same type.

3) Times

The times are the latest times at which articles were handled by mobile existences (persons and the robot 102).

4) Locations

The locations are the locations to which articles were most recently transferred (the current locations of articles). The locations are specified by the IDs in the environment attribute data 602 or appliance attribute data 603 registered in a later-described environment map 108. Furthermore, when it is difficult or impossible to specify a spatial location of an article by only the ID of the article, the spatial location of the article is specified by adding a coordinate value (a world coordinate system shown in FIG. 76) indicating the current location of the article to the ID. When an article is currently located inside an appliance, such as a "refrigerating compartment" or a "freezer compartment" (the current location of the article is included in the later-described appliance attribute data 603), it can be specified only by an ID indicating the "refrigerating compartment" or the "freezer compartment" that the article exists in the refrigerating or freezer compartment, resulting in the specified spatial location of the article. This eliminates the need for adding a coordinate value to the ID of the article (In the drawings, "Freezer_0001"). On the other hand, when an article is currently located, for example, on the "floor" (the current location of the article is included in the later-described environment attribute data 602), it is difficult or impossible to specify the spatial location of the article only by an ID indicating the "floor". The reason for this is that the floor is relatively wide. In this case, the spatial location of the article can be specified by adding a coordinate value to the ID thereof (in the drawings, "floor_0001 (x1, y1, 0)"). A judgment about whether or not a coordinate value is to be added to the ID of an article is preferably made not only on the basis of whether the current location of an article is included in the environment attribute data 602 or the appliance attribute data 603 but also in view of the performance of the robot 102 that will handle the articles. For example, even when an article is accommodated in a refrigerating compartment and the current location of the article can be specified by an ID indicating the refrigerating compartment, its coordinate value is preferably added to the ID in the following case: for example, the robot 102 has a very low performance and thus requires the exact coordinate value of the article in the refrigerating compartment to grab the article.

It is preferable that initial settings of the current locations of articles in the article database 106a and updates of the current locations thereof in the transfer of the articles are executed as automatically as possible based on results detected by the sensing unit 120. However, when they cannot be executed automatically, they may be executed manually.

5) Article Images

The article images are images showing articles.

Although in this embodiment the article database 106a has five attributes to distinguish the features of articles, it may have other attributes as necessary. For example, when the article database 106a has data about three-dimensional geometries of articles, more accurate location data of the articles, and posture data of the articles, the robot 102 can more easily execute the operation of grabbing the articles by utilizing the data.

Figure 73:
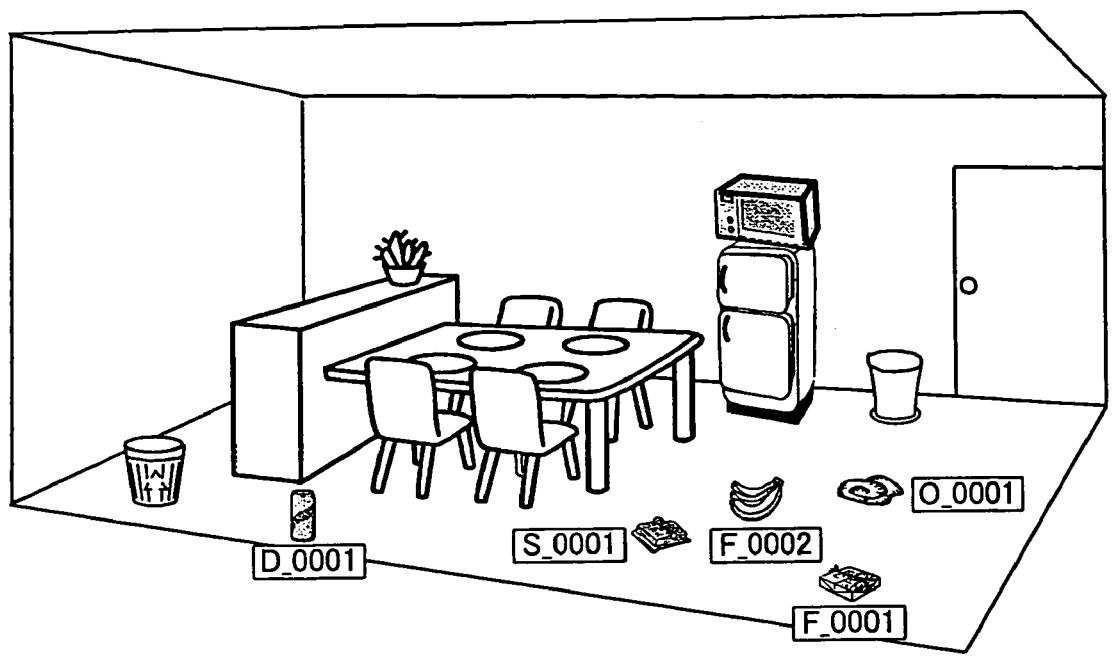
FIG. 73 is a diagram illustrating the state of the interior of the environment.
Figure 74:
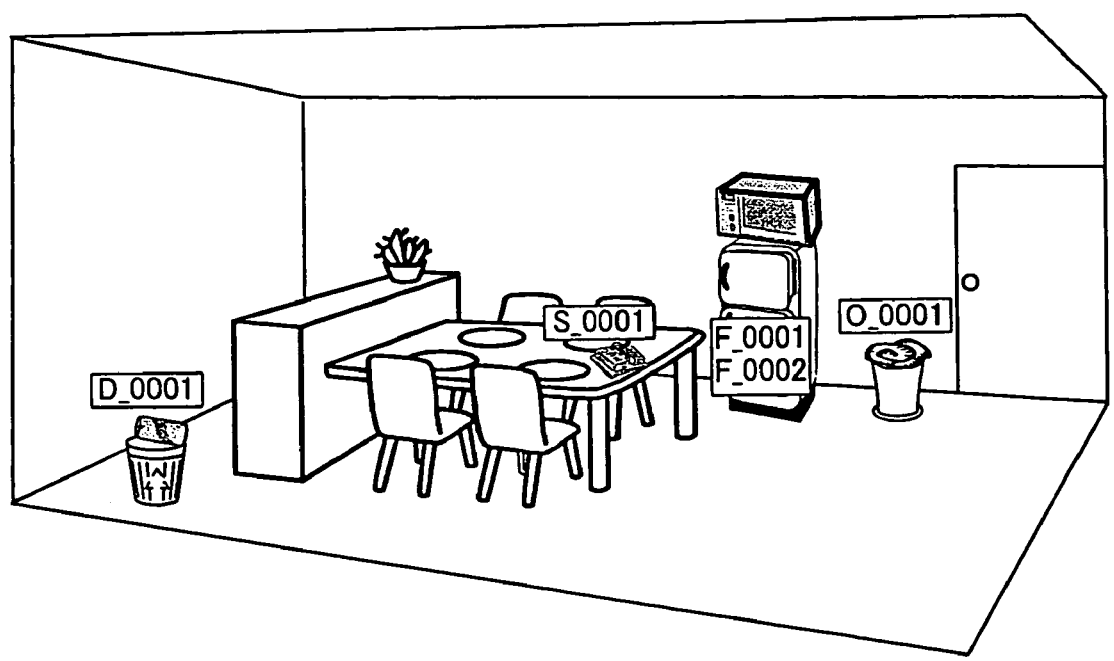
FIG. 74 is a diagram illustrating the state of the interior of the environment at a different time from that in FIG. 73.

Next, update of the article database 106a will be specifically described with reference to FIGS. 71 through 74. FIGS. 73 and 74 are illustrations showing the state of the interior of a target of this system, i.e., the environment, and are different in time from each other. FIG. 73 shows the state of the interior of the environment on Oct. 10, 2002, at 9:00, and FIG. 74 shows the state of the interior of the environment on Oct. 10, 2002, at 20:00. The article database 106*a* shown in FIG. 71 corresponds to the environment at the time shown in FIG. 73. The article database 106*a* shown in FIG. 72 corresponds to the environment at the time shown in FIG. 74.

Seven articles, i.e., a juice can, a lunch pack, a notebook, a banana, a paper trash, an ice cream, and a Popsicle, are registered, as articles existing in the environment on Oct. 10, 2002, at 9:00, in the article database 106*a* shown in FIG. 71. Out of these articles, five articles, the juice can (D-0001), the lunch pack (F-0001), the notebook (S-0001), the banana (F-0002), and the paper trash (O-0001) are placed on the floor in the environment as shown in FIG. 73. Therefore, the location attributes of these five articles in the article database 106*a* are represented as "floor_0001" that is an ID of the "floor". Simultaneously, the ID additionally includes a coordinate value corresponding to the current location of each article. On the other hand, the other two articles, the ice cream and the. Popsicle, are accommodated in a freezer compartment although not specifically shown in FIG. 73. Therefore, the location attributes of these two articles in the article database are represented as "Freezer_0001" that is the ID of the "freezer compartment". This ID does not additionally include any coordinate value.

Assume that, on Oct. 10, 2002 at 10:00, a robot 102 executed a task of cleaning up or throwing away articles, more specifically, a juice can, a lunch pack, a notebook, a banana, and a paper trash, which are placed on the floor according to the user's instruction (the task executed by the robot 102 according to the user's instruction will be described later in detail) and the user ate the ice cream and the Popsicle in the freezer compartment. In this case, the state of the interior of the environment varied as shown in FIG. 74. Furthermore, as shown in FIG. 72, five articles, i.e., the juice can, the lunch pack, the notebook, the banana, and the paper trash, are registered, as articles existing in the environment on Oct. 10, 2002, at 20:00, in the article database 106*a*. Among these articles, the juice can was transferred to a wastebasket (recycle basket) by the robot 102. Therefore, the location attribute of the juice can has changed to "wastebasket_0002" representing a recycle basket. Likewise, the location attributes of the lunch pack and the banana have changed to "refrigerator_0001" representing a refrigerating compartment, the location attribute of the notebook has changed to "table_0001" representing a table, and the location attribute of a paper trash has changed to "wastebasket_0001" representing a general wastebasket.

On the other hand, the ice cream and Popsicle that were eaten by the user and thus disappeared from the interior of the environment are deleted from the article database 106*a*. Such a deletion of an article from the article database 106*a* may be executed by the user entering the disappearance of the article or may be automatically executed by determining whether or not the article disappeared based on an electronic tag attached to the article. To be specific, a reader/writer for electronic tags is attached to the wastebasket and detects the entry of the electronic tag attached to an article into the wastebasket. The article to which the electronic tag is attached is deleted from the article database 106*a* based on the above detection. In this way, the deletion of the article from the article database 106*a* can be automatically carried out.

As described in the above example, articles that may substantially disappear from the real world, typified by food, may be deleted from the article database 106*a* at the time when the articles disappear. Alternatively, while an article of this type is left in the article database 106*a* without being deleted from the article database 106*a*, not the ID of an appliance or a location in the environment but a mobile existence that causes the article to disappear may be described in the location attribute of the article in the article database 106*a* (for example, when an article was eaten and thus disappeared, the ID of a person who ate the article may be described therein).

As seen from the above, the article database 106*a* is updated by an article/mobile existence retrieval and management section 105 in every transfer and disappearance of each article in the environment. This allows registration of latest information in the article database 106*a* all the times.

Although not shown, a mobile existence database is configured to have at least the IDs of mobile existences, the names thereof, the times, and the location attributes thereof. Furthermore, the mobile existence database is also updated according to the state of the interior of the environment by the article/mobile existence retrieval and management section 105. This allows registration of latest information in the mobile existence database all the times.

An environment map management section 107 of an environment management server 101 creates an environment map 108 for accumulating data about the whole environment based on information from a sensing unit 120 and information entered by the user and manages the created environment map 108.

Furthermore, when a query is issued from the controller 110 to the environment map 108, the environment map management section 107 retrieves information necessary in view of the query from the environment map 108 and transmits the retrieved information to the controller 110.

As described above, the environment map 108 is utilized not only to refer to the IDs indicating appliances or locations in the environment but also when the robot 102 travels in the environment. The robot 102 acquires the environment map 108 from the server 101 to make a transfer route plan.

Figure 75A:
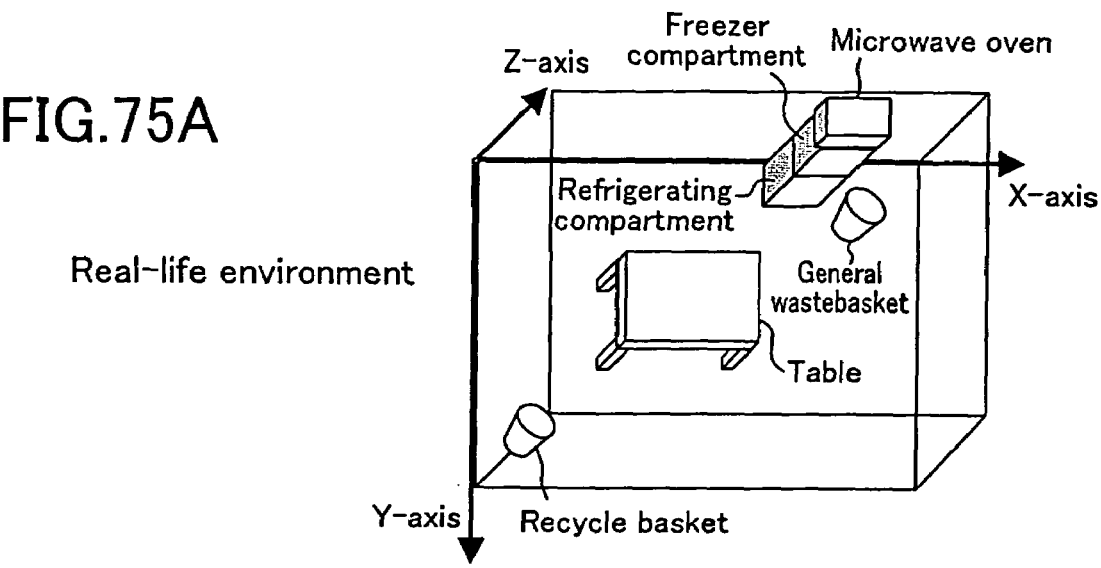
FIGS. 75 are diagrams illustrating the real conditions in the environment and environment maps corresponding to the real conditions.

The environment map 108 may be created (as shown in FIG. 75(*b*)) by simplifying real conditions in the environment in the form of a cubic model, for example, when the real conditions in the environment are shown in FIG. 75(*a*). Alternatively, as shown in FIG. 75(*c*), the environment map 108 may be a map obtained by simplifying the real conditions in the environment in the form of a planar model. Otherwise, a cubic model of a real-life environment as shown in FIG. 75(*a*) may be used as the environment map 108. In other words, the environment map 108 may be created in consideration of its purpose and time (efforts) required for creation. For example, when it is necessary to create an environment map of a cubic model within a very short period of time, a cubic object existing in the environment is modeled by the minimum rectangular parallelepiped which covers the object. The environment map 108 shown in FIG. 75(*b*) is used as an example, and in FIG. 75(*b*), a table is modeled by a rectangular parallelepiped. This procedure also applies to an environment map of a planar model. In FIG. 75(*c*), the table is modeled by a rectangular region (hatched region) orthogonally projected on a plane. This region is set as a region in which the robot 102 cannot travel.

Figure 75B:
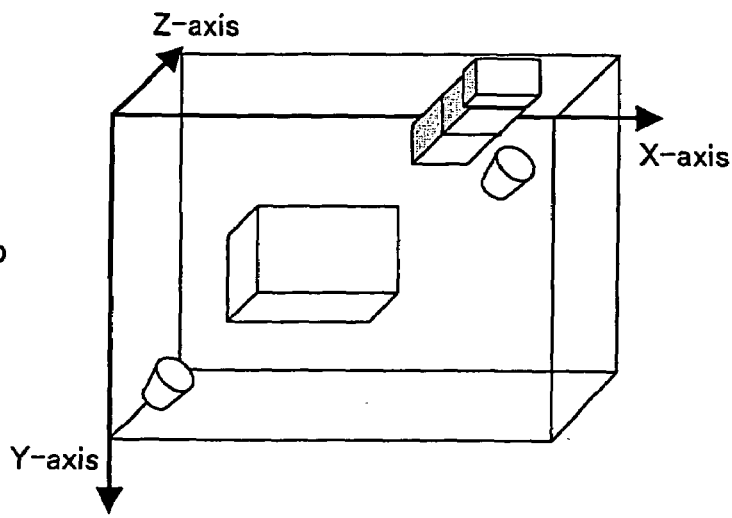
Figure 75C:
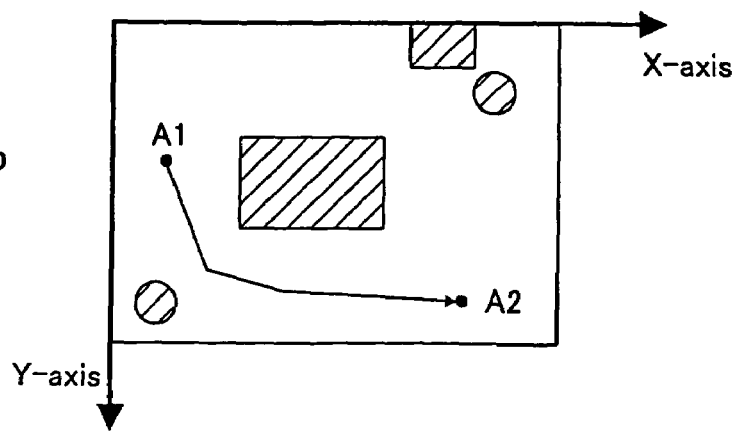
Figure 76:
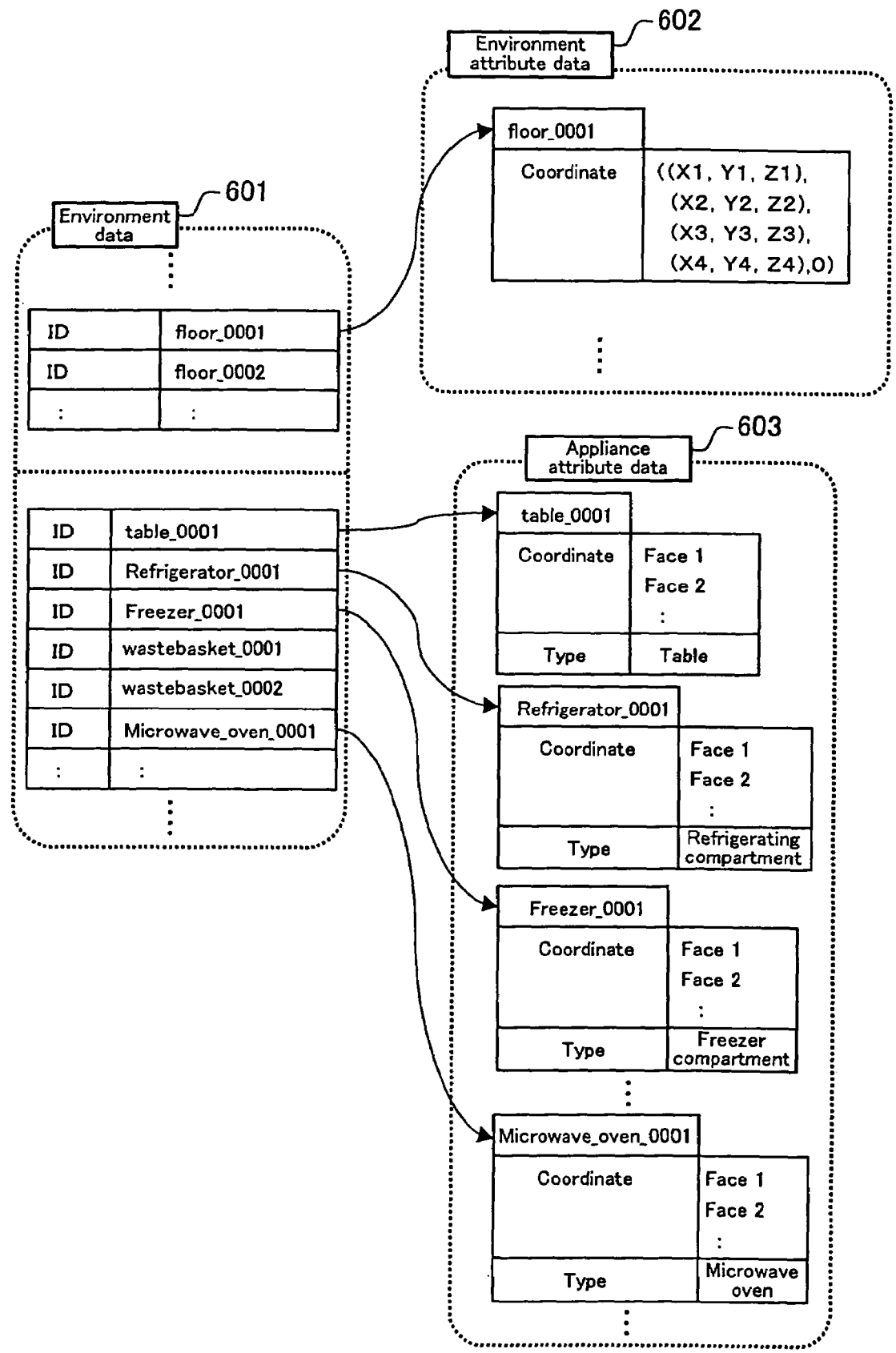
FIG. 76 is a diagram illustrating the structures of environment attribute data and appliance attribute data and exemplary contents described therein.

FIG. 76 is a diagram illustrating an example of data of the environment map 108. The illustrated data correspond to the environment shown in FIGS. 75. The data in the environment map 108 include the following three data: environment data 601 listing the IDs of floor faces included in the environment and the IDs of appliances 104 existing in the environment; environment attribute data 602; and appliance attribute data 603.

If the environment has a plurality of floor faces at different levels, a number of floor face data pieces equal to the number of floor faces are registered (floor_0001, floor_0002, . . . ).

The appliance attribute data 602 represent detailed data about the environment (room) and are accumulated for each floor face registered in the environment data 601. The environment attribute data 602 include coordinate values at the corners of the floor face (representing real-world coordinates in which the level of the lowest floor face in the room is considered as 0) and data indicating the type of the floor face. When the shape of the floor face is rectangular, the environment attribute data are expressed as follows:

((X1, Y1, Z1), (X2, Y2, Z2), (X3, Y3, Z3), (X4, Y4, Z4), 0).

Herein, the first four sets of coordinate values represent coordinates at the corners of the floor face. The last value "0" means the type of the floor face. For example, "0" means wood floor, "1" means tatami floor (Japanese traditional mat), and "2" means carpet.

The appliance attribute data 603 are detailed data about appliances 104 existing in the environment (room). The appliances 104 herein are different from articles to be transferred by persons or the robot 102 and are not usually transferred. For example, furniture and household electrical appliances are considered as the appliances herein. Each appliance 104 serves as one of subsystems of the article handling system and will be described later in detail.

As shown in FIGS. 75, since there exist a table (table_0001), a refrigerating compartment (Refrigerator_0001), a freezer compartment (Freezer_0001), wastebaskets (wastebasket_0001, wastebasket_0002), and a microwave oven (Microwave_oven_0001) in the environment, the IDs of the above-listed appliances are registered in the environment data 601 as shown in FIG. 76. Detailed data about each appliance are registered in the environment data 601 shown in FIG. 76. In this relation, although a "refrigerating compartment" and a "freezer compartment" are combined in one unit to form one "refrigerator", appliances are distinguished from one another in units of locations in which articles are accommodated. In other words, a refrigerating compartment and a freezer compartment are treated as independent appliances without treating a refrigerator as one appliance 104.

In the appliance attribute data 603, data relating to faces forming an appliance 104 (face 1, face 2, . . . ) and the type of the appliance 104 are registered. The data relating to the faces forming the appliance 104 include coordinate values at the corners of each face (real-world coordinates) and a flag indicative of whether or not an article is placeable on the face. For example, when the number of the corners of each face is four, data relating to the face are expressed as follows:

((X1, Y1, Z1), (X2, Y2, Z2), (X3, Y3, Z3), (X4, Y4, Z4), 1).

Herein, the first four sets of coordinate values represent coordinate values (real-world coordinates) at the corners of the face. The subsequent value "1" is a flag indicative of whether or not an article is placeable on the face. For example, "1" means that an article is placeable on the face, and "0" means unplaceable thereon. Although the identification flag does not usually change, the identification flags for some types of appliances 104 are changed according to conditions. For example, when an appliance has an accommodation section provided, at its opening, with a door, the identification flag indicating a face in the accommodation section is changed according to the opening/closing operations of the door.

This will be described in detail with reference to FIGS. 77. A freezer compartment 71 shown in FIGS. 77 is used as an example of an appliance 104 forming an accommodation section having a door at its opening. FIG. 77(a) shows appliance attribute data when a door 72 of the freezer compartment 71 is closed. As shown in FIG. 77(a), when the door 72 of the freezer compartment 71 is closed, the door 72 prevents articles from being placed on a face in the freezer compartment 71. In this case, the identification flag of the appliance attribute data indicates "0". On the other hand, FIG. 77(b) shows appliance attribute data when the door 72 of the freezer compartment 71 is opened. As shown in FIG. 77B, when the door 72 of the freezer compartment 71 is opened, an article can be placed on the face in the freezer compartment 71. In this case, the identification flag of the appliance attribute data is changed to "1".

Like the freezer compartment 71 shown in FIGS. 77, each of appliances 104 having an accommodation section may include a tray 73. This tray 73 moves between its location in which it is accommodated in the accommodation section and its location in which it projects toward the outside of the accommodation section according to the opening/closing operations of the door 72. The use of the tray 73 facilitates the execution of the task of transferring an article into and from the appliance 104 by the robot 102. As shown in FIG. 77(b), when the appliance 104 has such a tray 73, the appliance attribute data for the appliance 104 may include coordinate values indicating the edges of the tray 73 when the tray 73 projects toward the outside of the accommodation section. This allows the robot 102 to place an article on the tray 73 projecting toward the outside of the accommodation section or grab an article on the tray 73 by referring to the coordinate values registered in the appliance attribute data 603. The movement of the tray 73 changes the coordinate values indicating the edges thereof. However, when the door 72 is closed and thus the tray 73 is accommodated in the accommodation section, the robot 102 does not transfer an article into and from the accommodation section. In this case, it is not necessary to change the coordinate values in the appliance attribute data 603 and thus only the identification flag need be changed.

A process of recognizing whether or not a face is crowded with articles (whether or not another article can be placed on the face) may be additionally executed and the identification flag indicating the face in the accommodation section may be changed according to the result after the recognition process. More particularly, since another article cannot be additionally placed on the face crowded with articles, the identification flag indicates "0" even when the door 72 is opened. On the other hand, when an article is placeable on the face that is not crowded with articles, the identification flag is changed according to the opening/closing operations of the door 72.

In this embodiment, only an identification flag indicating whether or not another article is placeable on a face is added to appliance attribute data 603 for each appliance. However, another flag may be added thereto as necessary. For example, like the environment attribute data 602, a flag indicating a material of the face may be added thereto.

A path through which an arm of the robot 102 approaches a face when the robot 102 places an article on the face or grabs an article placed on the face (hereinafter, referred to as "arm approach path") may be added to the appliance attribute data 603. Furthermore, a program for the arm operation relating to the arm approach path may be added to the appliance attribute data 603 for each appliance. To be specific, the code of the program for the arm operation of the robot 102 for each appliance is previously registered, and the previously registered program code is added to the appliance attribute data 603. The robot 102 reads the program code stored in the appliance attribute data 603 over a communications network, such as a wireless network, when necessary. The arm of the robot 102 is controlled based on the read program. This eliminates the need for the robot 102 (or the server 101) to store the program of the arm operation for each appliance, resulting in the saved memory capacity for storing a program.

The controller 110 is a section of the environment management server 101 which controls the entire server 101, and the primary control operations thereof are as follows:

1) When the transceiver 109 receives a query about various data in the server 101, the controller 110 analyzes the query and issues a data reference request to the article/mobile existence retrieval and management section 105 or the environment map management section 107 according to the analysis result.

2) The controller 110 forwards a result transmitted from the article/mobile existence retrieval and management section 105 or the environment map management section 107 in response to the request to the origin of the query through the transceiver 109.

3) The controller 110 interprets a request for registration/update of the various data in the server transmitted from outside through the transceiver 109, and according to the requested contents, the controller 110 issues the data registration/update request to the article/mobile existence retrieval and management section 105 or the environment map management section 107.

Structure of Appliance

As described above, an appliance 104 serving as the second subsystem is placed and fixed in the environment and is not usually transferred. In this embodiment, the appliance 104 mean, in particular, an appliance having an accommodation section for accommodating various articles. Since, for example, a refrigerating compartment and a freezer compartment have their sections for accommodating food, they are included in the appliance 104 in this embodiment. Furthermore, objects acting on the articles accommodated in the objects are included in the appliance 104. For example, a microwave oven is an example of the appliance 104 exerting an action on food accommodated in the microwave oven, more particularly, heating the food. In this embodiment, "accommodate" includes the meaning that an article is stored for a relatively long period of time and the meaning that an article is temporarily stored.

As shown in FIG. 70, the appliance 104 includes a transceiver 109 for receiving an external appliance operation command (that will be described later) and transmitting, to a source from which the appliance operation command is transmitted, a result of an appliance operation corresponding to the appliance operation command, an appliance operation command database 163 for operating the appliance 104, an operation section 164 for executing the opening/closing operations of the door of the appliance 104 and operations exerting an action on articles as described later, and a controller 162 for controlling the transceiver 109 and the operation section 164. Although in FIG. 70 only one appliance 104 is shown, a plurality of appliances 104 may be set up in the environment so as to be connected to a network.

The operation section 164 executes the opening/closing operations of the door of the appliance 104 when the appliance 104 is, for example, a refrigerating compartment or a freezer compartment. More particularly, a refrigerating compartment or a freezer compartment of this system automatically opens and closes its door when it receives a later-described appliance operation command. The door is also manually opened and closed. When the appliance 104 is, for example, a microwave oven, the operation section 164 opens and closes its door and heats articles (food) accommodated in the microwave oven.

The appliance operation command database 163 stores appliance operation commands and corresponding procedures. These appliance operation commands are commands for externally operating the corresponding appliance 104 by remote control. The controller 162 controls the operation section 164 such that the operation section 164 executes the procedures corresponding to the appliance operation commands by referring to the appliance operation command database 163.

FIG. 78 is a diagram illustrating appliance operation commands stored in the appliance operation command database 163 in the form of tables. The following information items described in the columns of the tables are illustrated in the left-to-right order:

1) appliance IDs for distinguishing appliances 104 existing in the environment from one another;
2) appliance operation command names for externally controlling the corresponding appliances 104;
3) procedures corresponding to the commands; and
4) return values that are returned to the outside as results of executing the procedures.

FIG. 78 illustrates appliance operation commands relating to three appliances 104, i.e., a refrigerating compartment, a freezer compartment and a microwave oven serving as examples of the appliances 104, and stored in the appliance operation command database 163.

Two commands of 1) door_open and 2) door_close are prepared as appliance operation commands for each of the refrigerating and freezer compartments. When the transceiver 109 of the refrigerating compartment or the freezer compartment receives an externally transmitted command of door_open, the controller 162 instructs the operation section 164 to execute a procedure of "opening the door" of the refrigerating compartment or the freezer compartment. When the transceiver 109 receives a command of door_close, the controller 162 instructs the operation section 164 to execute a procedure of "closing the door" of the refrigerating compartment or the freezer compartment.

When the procedure corresponding to each appliance operation command is successfully completed, the controller 162 returns Ack as a return value through the transceiver 109 to the source from which the command is transmitted. When the procedure is not successfully completed, it returns Nack as a return value to the source from which the command is transmitted.

Five commands of 1) door_open, 2) door_close, 3) warm_start, 4) warm_end, and 5) is_object are prepared as appliance operation commands for the microwave oven. Among these commands, the commands of door_open and door_close are the same as those for the refrigerating compartment and the freezer compartment, and thus a description thereof is not given.

When a transceiver 109 of the microwave oven receives an externally transmitted command of warm_start, the controller 162 instructs the operation section 164 to execute a procedure of "heating food in the microwave oven" as one of the functions of the microwave oven. In this case, when food (an article) has been in the microwave oven and started being heated, the controller 162 returns Ack as a return value to the source from which the command is transmitted. Otherwise, it returns Nack as a return value to the source from which the command is transmitted.

Furthermore, when the transceiver 109 receives an externally transmitted command of warm_end, the controller 162 instructs the operation section 164 to judge whether or not heating of food in the microwave oven is completed. When the heating is completed, the controller 162 returns True as a return value to the source from which the command is transmitted. When the heating is not completed (food is still being heated), it returns False as a return value to the source from which the command is transmitted.

Moreover, when the transceiver 109 receives a command of is_object, the controller 162 instructs the operation section 164 to judge whether or not an article is in the microwave oven by using an image sensor, a weight sensor, or any other sensor. When the article is in the microwave oven, the controller 162 returns True as a return value to the source from which the command is transmitted. When the article is not in the microwave oven, the controller 162 returns False as a return value to the source from which the command is transmitted.

Although the appliance operation commands were described above using the three appliances 104 as an example, necessary appliance operation commands need be prepared according to the functions of each appliance 104.

The appliance operation command database 163 need be updated as necessary. In this case, the database 163 may be updated in the manner in which, for example update information is read into each appliance 104 through a recording medium or in which update information is read into the appliance 104 through a network. This permits support for a version upgrade of the appliance operation commands. Furthermore, when the appliance 104 is connected to an external network, this makes it possible to read update information into the appliance 104 through the external network. For example, appliance operation commands upgraded by the manufacturer of the appliance 104 can be downloaded by the appliance 104 through the external network.

Constitution of Console Terminal

The console terminal 103 serving as the third subsystem is an interface for the user in the present system and is a terminal that the user operates mainly for designating a task of handling an article by the robot 102.

As shown in FIG. 70, the console terminal 103 includes, as basic elements, a display section 117 of, for example, a CRT or a liquid crystal display for displaying a console window, an input section 116 of, for example, a pointing device for designating, on the console window, details of a task for the robot 102, a display controller 118 for performing display control such as generation of a console window to be displayed in the display section 117 or the like, a transceiver 109 for transmitting to the robot 102 details of a task for the robot 102, which is input through the input section 116, and a controller 119 for controlling each of the elements 109, 116 to 118.

As the console terminal 103, a general-purpose personal computer may be employed, for example. In this employment, the general-purpose personal computer can be used as the console terminal 103 by allowing the personal computer to read a control program for executing each processing described later.

The display controller 118 generates a console window on the basis of information sent from the server 101, specifically, data of images obtained by capturing the environment, data accumulated in the article/mobile existence database 106, and the environment map 108. The console window thus generated by the display controller 118 is displayed in the display section 117.

Figure 79:
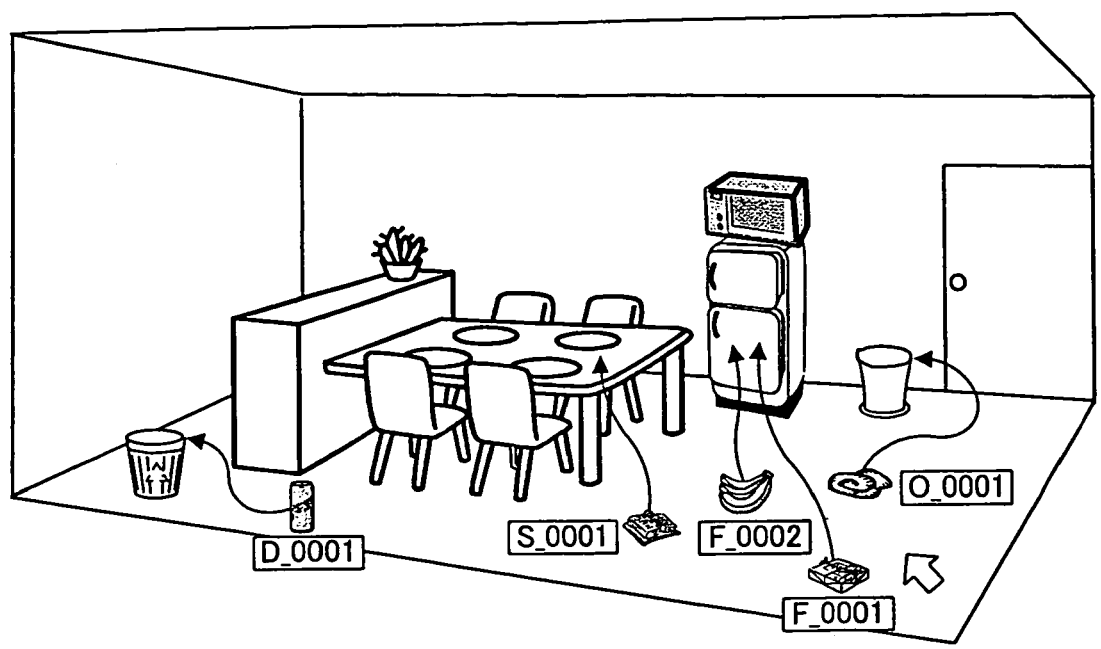
FIG. 79 is an illustration showing one example of the console window.

FIG. 79 shows one example of the console window displayed in the display section 117 of the console terminal 103 in the present system, which is composed of a virtual space in accordance with the actual environmental state.

The virtual space is generated on the basis of image data captured by a camera (not shown in the drawings) installed within the environment. Accordingly, the console window shown in FIG. 79 is identical with the environment shown in FIG. 73 as it looks. It is noted that a camera install on the side wall in the environment as the sensing unit 120 may be used as this camera.

The console window also includes a cursor (a pointer) and article icons arranged within the virtual space correspondingly to articles existing in the environment. The console window shown in FIG. 79 includes article icons of a juice can (D-0001), a lunch pack (F-0001), a notebook (S-0001), banana (F-0002), and paper trash (O-0001). Though appliances existing in the environment are displayed on the console window, these appliances do not serve as article icons. The article icons on the console window are only articles handleable by the robot 102.

The user operates the input section 116 of the console terminal 103 for operating the cursor in the console window to designate details of a task to be executed by the robot 102. Specifically, a desired article icon and a desired location in the virtual space are designated. In the console window, each of the article icons can be moved within the virtual space composing the console window by generally called a dragging operation. For designating an article icon and a location in the virtual space, the desired article icon within the virtual space is designated by the cursor and the designated article icon is drag-and-dropped onto the desired location in the virtual space. This operation designates the subject article for the robot 102 and the transfer destination of the article. For example, the arrows shown in FIG. 79 indicate operation examples of drag-and-drop of the juice can icon (D-0001) onto the recycle basket in the virtual space, the lunch pack icon (F-0001) and the banana icon (F-0002) onto the refrigerating compartment in the virtual space, the notebook icon (S-0001) onto the table in the virtual space, and the paper trash icon (O-0001) to the wastebasket in the virtual space.

Conversion of the above designation operation on the console window into instruction data of task details for the robot 102 necessitates at least the following two pieces of processing 1) and 2).

1) Processing for identifying regions in image data as the virtual space composed of the console window with the article icons, specifying what corresponds to the article icon designated on the console window in the environment, and specifying where corresponds to the transfer destination of the article designated on the console window corresponds in the environment 2) Processing for enabling the user to designate an article accommodated inside an appliance, which cannot be captured positively in camera images First, for the former processing 1), the console window is composed as follows. For performing the processing for identifying regions in the image data with the article icons, the console window includes, in addition to the above image data composing the virtual space, window mask data which is in one-to-one correspondence with the image data (the virtual space) and specifies the locations of the article icons in the virtual space. The "one-to-one correspondence" herein means correspondence in coordinate values with each other.

In the window mask data, mask data is set correspondingly to regions where the article icons are arranged on the console window. When the location (coordinate values) of an article icon is designated by the cursor on the console window of the virtual space, the same coordinate values are referred to in the window mask data to check whether or not the designated region is an article (an article icon). The window mask data can be generated by a background subtraction image (see FIG. 2C). Because, the background subtraction image specifies the location of an article in an image captured by a camera.

Next, for performing the processing for specifying what is the article icon designated on the console window, a pointer to the article database 106a (see FIG. 71) is descried in the coordinates of the mask data in the window mask data. By the description, the article database 106a is referred through the pointer described in the coordinates as a key when an article icon is designated, thereby specifying what article is represented by the article icon that the cursor points on the console window.

Figure 80:
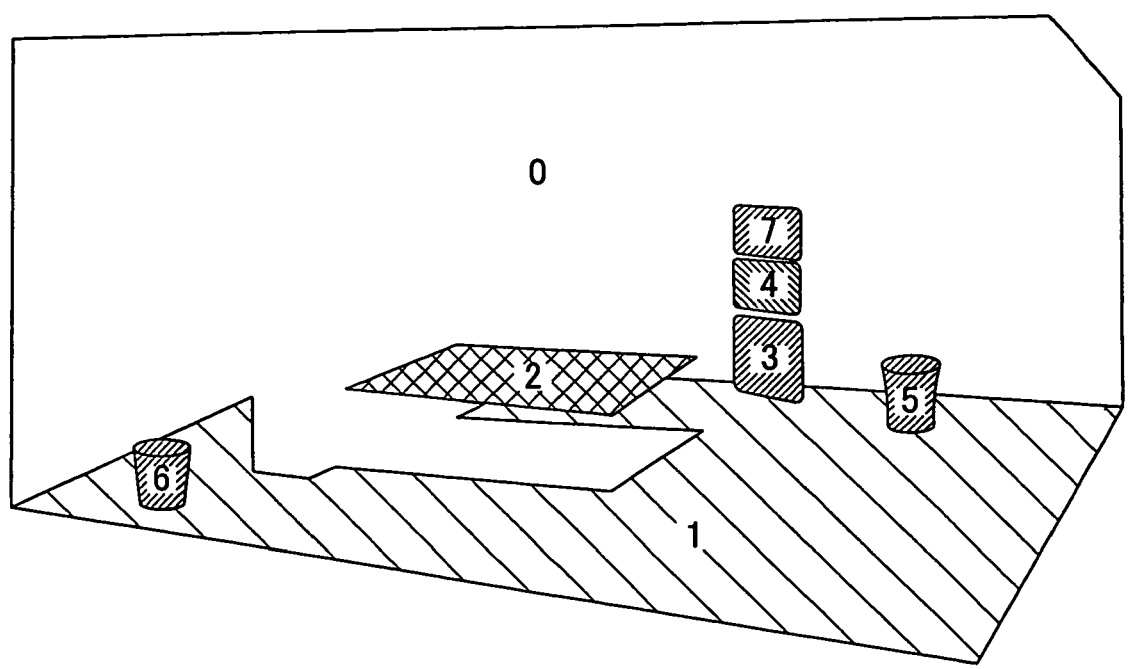
FIG. 80 is an illustration showing an image map corresponding to the consol window shown in FIG. 79.

Further, for performing the processing for specifying where is the transfer destination of the article designated on the console window, the console window includes, in addition to the image data (FIG. 79) of the virtual space, an image map of which coordinate values correspond to those of the image data, as shown in FIG. 80. This image map is data for specifying where the floor included in the environment attribute data 602 of the environment map 108 and each appliance 104 included in the appliance attribute data 603 are on the console window. The image map can be generated as image data. Specifically, the image map is set as image data each pixel of which is expressed by an integer value, and the integer values and the appliances are brought into correspondence with the appliances 104, like: 0 with nothing, 1 with the floor (floor-0001), 2 with the table (table-0001), 3 with the refrigerating compartment (refrigerator-0001), 4 with the freezer compartment (freezer-0001), 5 with the wastebasket (wastebasket-0001), 6 with the recycle basket (wastebasket-0002), 7 with the microwave oven (Microwave-oven-0001), and the like.

With the correspondence, when a certain location on the console window is designated by the cursor, the integer value of the pixel having the sane coordinate values as those in the image map is referred to. This enables specification of the designated location as an appliance in the environment. Wherein, this processing is performed only when it is confirmed that any article does not exist at the location designated on the console window.

The above-described image map can be generated automatically if each cubic model of the appliances 104 is known and the installation location of each appliance can be computed accurately. Further, if the image map would be difficult to generate automatically, it may be generated manually. Usually, each appliance 104 in the environment is rarely moved once installed in the environment, so that it is rarely needed to modify the image map once generated.

The latter processing 2) is necessary because the console window is generated on the basis of the camera images as described above, and any article accommodated inside an appliance 104 cannot be captured positively in the camera images, so that the corresponding article icon does not appear on the console window. In order to enable the user to designate an article icon not appearing on the console window, the console window is composed as follows.

As described above, in the present system, the article/mobile existence database 106 registers the current locations of the articles in the environment. Accordingly, the existence of an article accommodated inside an appliance 104 can be grasped by referring to the article/mobile existence database 106.

Figure 81A:
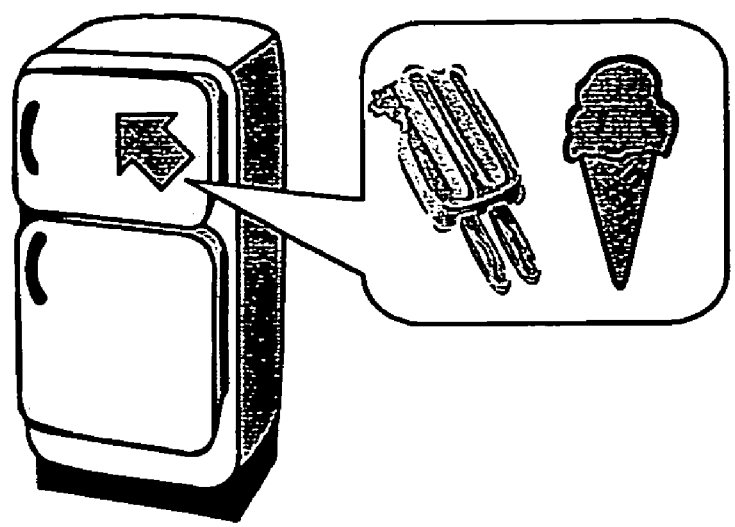
FIG. 81A and FIG. 81B are illustrations showing display examples of articles accommodated in appliances on the consol window.
Figure 81B:
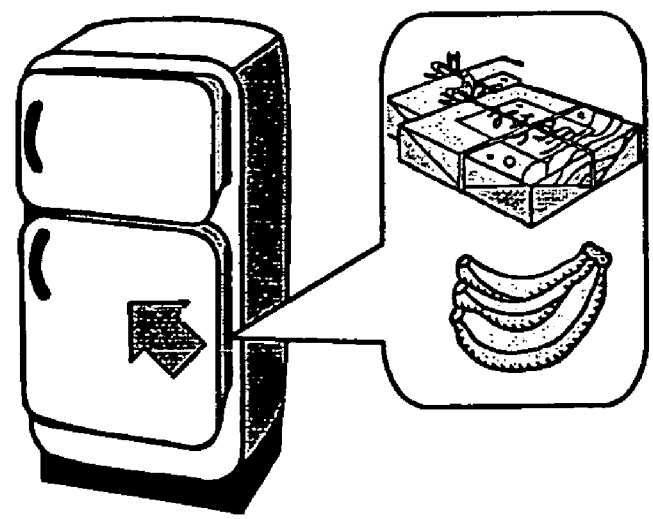

Utilizing this matter, the article/mobile existence database 106 is referred to when the cursor points an appliance on the console window. Then, whether or not any articles are accommodated in the appliance 104 is checked. If an article is accommodated therein, the article icon corresponding to the article is indicated on the console window in a pop-up style, as shown in FIG. 81. The example illustrated in FIG. 81A shows the case where an article icon indicating an ice cream and an article icon indicating a Popsicle which are accommodated inside the freezer compartment that the cursor points are displayed in the pop-up style, and the example illustrated in FIG. 81B shows the case where an article icon indicating a lunch pack and an article icon indicating a banana which are accommodated inside the refrigerating compartment that the cursor points are displayed in the pop-up style.

Thus, when an article icon is clicked by the cursor when the article icon is indicated in the pop-up style, the article is pointed as a subject article. It is noted that the article icon display style is not limited thereto and another display style may be employed. Article names may be displayed rather than the article icons.

Moreover, only two articles are accommodated in each of the refrigerating compartment and the freezer compartment in the example shown in FIG. 81, so that the articles (article icons) accommodated therein can be all displayed in one window. In contrast, if a large number of articles would be accommodated inside an appliance 104, it would be expected that the console window is too complicated for the user to designate a desired article icon when all the article icons are displayed in the pop-up style. In order to deal with this problem, when an appliance 104 accommodates a large number of articles, the articles are classified category by category in a branch structure and the hierarchy is followed from the upper category to the lower category to allow the article icons to be displayed, for example. Referring to the refrigerating compartment and the freezer compartment as examples, articles to be accommodated therein are food usually, and therefore, categories of meat, vegetable, and the like are displayed, for example, on the console window to allow the user to select one of the categories. When one of the categories is selected, article icons belonging to the selected category are displayed. In this display, in the case where the articles are food, a predetermined number of article icons may be displayed in the order of earlier freshness date. Or, in the case of the refrigerating compartment or the freezer compartment, a predetermined number of article icons having higher frequencies of taking out and putting in may be displayed. These display schemes lead the console window to be easy for user to view. Wherein, the display according to the frequency of taking out and putting in implies that: in a case of food, for example, an article having a higher frequency of taking out and putting in is liable to deteriorate severer, and therefore, such an article is positively and prominently displayed; and an article to be used frequently is displayed with priority.

It is noted that indication for designating an article icon not appearing on the console window is not limited to the pop-up style.

The controller 119 of the console terminal 103 generates, when a subject article and its transfer destination are designated on the console window, instruction data according thereto, as described above, and sends it to the laborer robot 102 through the transceiver 109.

The instruction data is base data for allowing the task plan generator 161 of the robot 102 to generate a robot control command and includes two values of:

(subject article, transfer destination of subject article).

The instruction data when task details of transfer of the notebook to the table are designated by drag-and-dropping the notebook icon onto the table on the console window, for example, is:

(notebook S-0001 (subject article), table table-0001 (transfer destination)).

It is noted that only the locations (floor and the appliances 104) registered in the environment attribute database 602 or the appliance attribute database 603 can be designated as the transfer destination.

Further, if the transfer destination would include a comparatively wide range such as the floor, for example, and an exact location could not be identified with the transfer destination by the mere name (ID) thereof, the coordinate values (world coordinate system shown in FIG. 76) is attached to the transfer destination. For example, the instruction data of transfer of the notebook onto the floor is:

(notebook S-0001, floor floor-0001 (x1, y1, 0)).

It is noted that as shown in FIG. 75B, the correspondence between a location designated on the console window and coordinate values of the world coordinate system can be computed on the basis of a cubic model obtained by modeling the state within the environment used as the environment map 108 and various kinds of parameters (camera location, camera posture, an angle of view, and the like) of the camera used for capturing image data for the console window. This computation is known in the technical art of computer graphics, and therefore, the description thereof is omitted.

It is also noted that drag-and-dropping of an article icon on the console window composes a console interface for designating an article and its transfer destination but the operation for designating an article and its transfer destination is not limited to the drag-and-dropping and another operation may be employed appropriately.

Constitution of Laborer Robot

The laborer robot 102 serving as the fourth subsystem performs a task of handling an article in the environment in accordance with task details designated by the user.

As shown in FIG. 70, the robot 102 includes, as basic elements, a sensor 111 for detecting an obstacle and the like around the robot 102 and for acquiring information about an article to be handled, a grabbing element 112 for grabbing an article, a travel plan generator 113 for generating a travel plan with the use of the environment map 108, a travel device 114 for moving the robot 102 itself, a transceiver 109 for sending/receiving various kinds of data between the environment management server 101 and the console terminal 103, a task plan generator 161 for generating a task plan for allowing the robot 102 to execute task details designated by the user, a robot control command database 165 in which a robot control command for operating an appliance 104 is stored, and a controller 115 for controlling the sensor 111 and each elements 109, 112 to 116, and 161.

Each task executed by the robot 102, such as an article grabbing task, an article transferring task, and the like, which will be described later in detail, is performed in such a manner that the transceiver 109 receives coded instruction data, the task plan generator 161 generates, on the basis of the received instruction data, a robot control command row, then the controller 115 processes the thus generated robot control command row in sequence.

Figure 82:
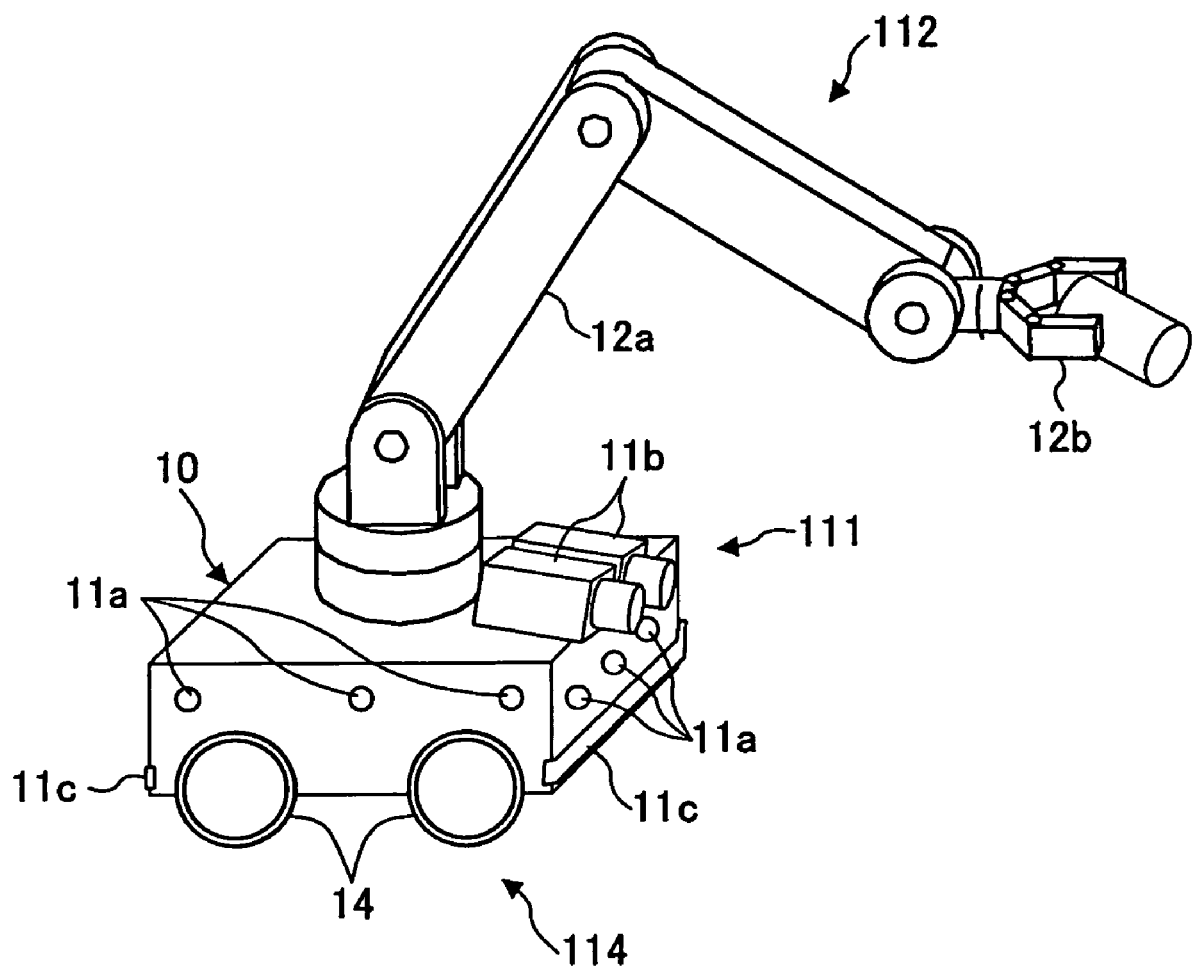
FIG. 82 is a schematic view showing one example of the construction of the laborer robot.

FIG. 82 is a schematic view illustrating one example of the construction of the robot 102 in the present system. The robot 102 includes a main body 10 substantially in the shape of a box for accommodating the travel plan generator 113, the controller 115, and the like. Herein, the right side, the left side, the back side, and the front side on the paper of FIG. 82 are called the front side, the rear side, the left side, and the right side, respectively.

The grabbing element 112 includes a multi-joint arm 12a and a hand 12b arranged at the tip end of the arm 12a and is mounted on the upper face of the main body 10. The arm 12a and the hand 12b may be those using actuators by motor control or using other actuators such as actuators of artificial muscles. The grabbing element 112 performs, when an article grabbing location is instructed in a robot control command, which will be described later, an article grabbing operation, namely, an operation of moving the tip end of the arm 12a to the location and grabbing the article by the and 12b. The grabbing element 112 itself may perform arm control for moving the hand 12b. Similarly, when release of the grabbed article is instructed in the robot control command, which will be described later, the grabbing element 112 performs a hand 12 release operation.

The travel device 114 includes two pairs of wheels 14 mounted on the right and left sides of the main body 10 (the wheels on the left side are not shown in the drawings). Herein, the travel device 114 is composed of the wheels 14 but the composition of the travel device 114 may be selected optimally according to environment where the robot 102 is used. For example, in the case where the floor face is rather rough in the environment, the travel device 114 is preferably formed of a crawler or a multi legged walking robot, or the like. It is noted that in the case where the grabbing element 112 can move in every region of the environment, the travel device 114 may be omitted.

In the present system, the obstacle sensor 111 includes a ultrasonic sensors 11a, stereo cameras 11b as auditory sensors, and collision sensors 11c.

Each ultrasonic sensor 11a computes a rough distance from the sensor 11a to an obstacle by measuring a time period from origination of a ultrasonic wave to receipt of the reflection wave thereof to detect an obstacle in a short range before collision therewith. The ultrasonic sensors 11a are mounted three by three at each side face. (front face, rear face, and right and left faces) of the main body 10.

Each stereo camera 11b receives a surrounding state of the robot 102 as an image and performs processing such as recognition of the image to acquire further accurate information for checking the presence or absence of an obstacle and information about a subject article to be grabbed. The stereo cameras lib are mounted at the front part of the main body 10.

The collision sensors 11c are sensors for detecting receipt of predetermined impact force to the robot 102. For example, the collision sensors 11c detect collision of an obstacle with the robot 102, collision of the robot 102 in action with an obstacle, or the like. The collision sensors 11c are mounted at the front face and the rear face of the main body 10.

When travel of the robot 102 which is accompanied by a task of transferring an article or another task is designated, the travel plan generator 113 generates, with the use of the environment map 108, a travel path from the current location of the robot 102 to the designated location (target place). In the travel, any obstacle must not exist on the travel path from the current location to the target place, wherein the robot off-limits region (hatched region in FIG. 75C, for example) is set in the environment map 108, as described above. Therefore, generation of a travel path in a region other than the off-limits region means generation of a travel path that detours every obstacle. For example, in order to allow the robot 102 to travel from a point A1 to a point A2 in the environment map 108 using a planer model of FIG. 75C, a rout (see an arrow in FIG. 75C) that detours the off-limits region is generated taking account of the size of the robot 102. Such a travel path may be generated using a Dijkstra method that is the most general method or using a path search algorithm, which is an improved Dijkstra method, if the environment is complicated. Further, every time when the sensor 111 detects an obstacle after the travel based on a generated travel path starts, a new path is generated again for detouring the detected obstacle.

It is noted that for dealing with the case where the state of the environment is too complicated to compute a travel path of the robot 102 or where the state thereof is so complicated as to take too long time for the computation, a mode that allows the user to designate a travel path of the robot 102 may be provided.

The controller 115 of the laborer robot 102 sends instruction data sent from the outside through the transceiver 109 to the task plan generator 161 for converting it to a robot control command and receives a robot control command row converted by the task plan generator 161, thereby executing the commands in sequence.

The robot control command is a command for executing grabbing of an article, travel of the robot 102 itself, or control of the appliances 104, and is roughly divided into four types, "travel," "grab," "release," and "appliance operation." The four types of commands will be described briefly.

1) Travel: (Move, Coordinates) or (Move, Appliance ID)

This is a command for allowing the robot 102 to travel from the current location of the robot 102 to a location designated in the coordinates or a location of the appliance designated by the appliance ID. Coordinates are specified in a coordinate system optimal for the state, and the travel plan generator 113 plans a travel path from the current location to a target place.

In a case of travel to the location of an appliance designated by an appliance ID, a path to approach a place with a predetermined distance left from the appliance is generated, wherein the coordinates of the appliance are computed utilizing the appliance attribute data 603 of the environment map 108.

2) Grab: (Grab, Article ID)

This is a command for grabbing by the hand 12b an article designated by an article ID. The article database 106a is referred to for the location of the article and the grabbing element 112 generates a grabbing plan.

3) Release: (Release)

This is a command for releasing an article from the hand 12b.

4) Appliance Operation (Robot ID; Appliance ID, Appliance Operation Command)

This is a command for sending a designated appliance operation command to an appliance 104 designated by an appliance ID. The appliance operation command is an instruction command that a subject appliance 104 receives from the outside, as described above, and the appliance 104 that receives the appliance operation command executes processing corresponding to the command. Wherein, the reason why the robot ID is attached to the appliance operation command is that an appliance 104 that receives an appliance operation command sends a return value to the sender of the command.

So far, the four types of robot control commands are described briefly. It is needless to say that the robot control command is not limited to these four types and the types may be increased according to needs.

The task plan generator 161 of the laborer robot 102 receives instruction data sent from the console terminal 103 and converts the instruction data into a robot control command with reference to the robot control command database 165 according to necessity, thereby generating a task plan.

The task plan generator 161 and the robot control command database 165 are provided in the present system, so that the user can make the robot 102 execute an appropriate task by only designating a desired article and a transfer destination of the article through the console terminal 103.

Specifically, as described above, the instruction data is data including two values of:

(subject article, transfer destination of subject article), and means "transfer of a designated subject article to a designated transfer destination." Herein, if the designated subject article is in a state in which the robot 102 can garb a subject article as it is and in the state in which the robot 102 can releases the subject article as it is, namely, if the operation of the robot 102 is not obstructed in executing the designated task for the robot 102, the robot control command database 165 is unnecessary.

In contrast, in the case where a designated subject article is accommodated inside an accommodation section of which door is closed, the door must be opened before the robot 102 grabs the subject article. Also, in the case where a designated transfer destination is the inside of the accommodation section of which door is closed, the door must be opened before the robot 102 grabbing a subject article releases it. In this connection, if the user would have to further designate a door opening/closing operation for designating task details of transferring an article accommodated in an accommodation section to another accommodation section, for example, ease of operation would become worse.

Moreover, in the case where a designated transfer destination is an appliance for exerting an action on an article accommodated therein, such as the microwave oven, the user may desire not only to accommodate the article within the microwave oven but also to heat the article. If the user who wishes to designate details of a task for the robot 102 would be required to designate an action to be exerted on the subject article, in addition to a subject article and a transfer destination, the designation operation by the user would become complicated.

For tackling these disadvantages, it is necessary to provide knowledge data for generating a robot control command which includes an action of an appliance 104 on the basis of instruction data including a subject article and a transfer destination. The robot control command database 165 is provided for storing the knowledge data. The constitutions and functions of the appliances 104 are different from each other, and therefore, the knowledge data is set for each appliance 104. The robot control command database 165 contains robot control commands for appliances' actions on the appliance 104 basis.

FIG. 83 shows tables indicating examples of the robot control commands stored in the robot control command database 165. The robot control command database 165 includes appliance IDs, location attributes, and the robot control commands, so as to correspond to one another. Of these, the "appliance IDs" stores IDs of the appliances 104. The "location attributes" are divided into a transfer origin and a transfer destination, wherein the "transfer origin" corresponds to the case where the appliance 104 accommodates a subject article designated in the designated data while the "transfer destination" corresponds to the case where an appliance 104 is designated as a transfer destination into which the subject article is to be accommodated.

The robot control commands are described separately so as to individually correspond to the "transfer origin" and the "transfer destination." Each command basically includes three values of:

(robot ID, appliance ID, appliance operation command).

A robot control command list (row) will be specifically described with reference to an example of the case where the refrigerating compartment (Refrigerator-0001) is a transfer origin. The robot control command row in this case is a command row where transfer of an article accommodated in the refrigerating compartment is designated in instruction data from the console terminal 103.

The robot control command row includes three commands, which mean execution of the following operations.

1) (Robot-0001, Refrigerator-0001, door-open): to allow the refrigerating compartment to open the door
2) (grab, $object): to allow the robot to grab and take out an article
3) (Robot-0001, Refrigerator-0001, door-close): to allow the refrigerating compartment to close the door Herein, an ID of a subject article is applied to "$object" in (grab, $object). In this way, information of which value varies according to the state is set as a variation by attaching "$", and the article ID is applied to the variation when a subject article is set in the instruction data. Thus, the robot control command bears generality.

Further, in the case where the microwave oven (Microwave-oven-0001) is a transfer destination, the robot control command row includes five commands as follows.

1) (Robot-0001, Microwave-oven-0001, is-object): to allow the microwave oven to confirm whether or not any article exists in the inside thereof
2) (Robot-0001, Microwave-oven-0001, door-open): to allow the microwave oven to open the door
3) (release, $object): to allow the robot to release the article
4) (Robot-0001, Microwave-oven-0001, door-close): to allow the microwave oven to close the door
5) (Robot-0001, Microwave-oven-0001, warm start): to allow the microwave oven to start heating the inside thereof Of the above commands, the robot control command 1) is a command for allowing the microwave oven to confirm whether or not any articles exist inside the microwave oven, which is necessary because a subject article could not be put therein if any other article would exist within the microwave oven as a transfer destination. When the return value from the microwave oven is "False," there is no article therein, and accordingly, the controller 162 can execute the following commands 2) to 5) in sequence. While, when the return value from the microwave oven is "True," namely, when there is some article within the microwave oven, the controller 162 preferably informs the user of the existence of the article inside the microwave oven and halts execution of the following commands 2) to 5).

Moreover, in the case where the microwave oven has, as a function of "heating" an article, a plurality of modes such as a "warning" mode, a "thawing" mode, and the like, it is preferable to provide a plurality of appliance operation commands (robot control commands) correspondingly. In the case where plural appliance operation commands are provided in this way, a robot control command row may be generated so that the robot 102 is allowed to recognize the attribute of a subject article and to send an appliance operation command corresponding thereto to the microwave oven.

For example, when an article is recognized as a frozen food on the basis of image processing, a temperature sensor, or information on an electronic tag attached to the article, an appliance operation command for setting the "thawing" mode may be sent to the microwave oven. Alternatively, when a command "warm-start" is received as an appliance operation command, the microwave oven may check the attribute of an article therein on the basis of image processing or information on an electronic tag so that the microwave oven exchange modes between the "warming" mode and the "thawing" mode according to the attribute of the article.

Next, the procedure for generating a robot control command which the task plan generator 161 of the laborer robot 102 performs will be described with reference to the flowchart of FIG. 84.

As described above, when the user designates task details through the console terminal 103, the console terminal 103 sends instruction data to the laborer robot 102 through the network. In a step S1201, the instruction data is read.

In a subsequent step S1202, the current location of the designated subject article is recognized on the basis of the read instruction data by referring to the article database 106*a* of the server 101. Upon recognition of the current location of the subject article, in a step S1203, a robot control command for allowing the robot 102 to travel from the current location of itself to the current location of the subject article is generated.

Next, in a step S1204, whether or not the designated subject article is accommodated in an appliance 104 is checked. This check is performed by judging whether or not the current location of the subject article is an appliance 104 registered in the appliance attribute data 603 of the environment map 108. When it is YES, namely, when the subject article is accommodated in the appliance 104, the routine proceeds to a step S1205. On the other hand, when it is NO, namely, when the subject article is not accommodated in the appliance 104, the routine proceeds to a step S 1206.

In the step S1205, the robot control command (row) where the appliance 104 is a transfer origin is read from the robot control command database 165, as described above, and the read command (row) is added to a robot control command that has been already generated.

In the step S1206, a robot control command for allowing the robot 102 to travel to the transfer destination designated in the instruction data is generated. The thus generated robot control command is added to the robot command that has been already generated.

In a step S1207, whether or not the transfer destination is inside an appliance 104 is checked. This check is performed by judging whether or not the transfer destination is an appliance 104 registered in the appliance attribute data 603 of the environment map 108, likewise the step S1204. When it is YES, namely, the transfer destination is inside the appliance 104, the routine proceeds to a step S1208. On the other hand, when it is NO, namely, when the transfer destination is not inside the appliance 104, the routine proceeds to a step S1209.

In the step S1208, as described above, the robot control command (row) where the appliance 104 is the transfer destination is read from the robot control command database 165, and the read command (row) is added to the robot control command row that has been already generated.

In the step S1209, the finally generated robot control command row is sent to the controller 115.

The procedure in which the robot 102 executes task details that the user designates in the present system constituted as above will be described with reference to a specific example. Herein, an example is referred to in which the user designates task details of "transferring a lunch pack (F-0001) accommodated in the refrigerating compartment (Refrigerator-0001) into the microwave oven (Microwave-oven-0001) (for warming).

First, the console window shown in FIG. 79, for example, is displayed in the display section 117 of the console terminal 103. When the user operates the input section 116 to designate the refrigerating compartment in the virtual space by the cursor, articles (article icons) accommodated in the refrigerating compartment are displayed in the pop-up style, as shown in FIG. 81B. When the lunch pack icon is selected by operating the input section 116, the "lunch pack" is designated as a subject article.

Next, the user operates the input section 116 so as to drag-and-drop the lunch pack icon onto the microwave oven in the virtual space to designated the "microwave oven" as a transfer destination, thereby completing user's operation for designating task details.

When the task details are designated in this way, the console terminal 103 generates instruction data and sends it to the laborer robot 102. The subject article is the lunch pack (F-0001) and the transfer destination is the microwave oven (Microwave-oven-0001), and accordingly, the instruction data is:

(F-0001, Microwave-oven-0001).

The task plan generator 161 of the laborer robot 102 reads the instruction data sent from the console terminal 103 (the step S1201) and recognizes the current location of the lunch pack as the subject article by referring to the article database 106a of the server 101 (the step S1202). The lunch pack is accommodated in the refrigerating compartment (Refrigerator-0001), and accordingly, the robot control command for allowing the robot 102 to travel to the refrigerating compartment:

(move, Refrigerator-0001)

is generated (the step S1203).

Subsequently, the task plan generator 161 checks whether or not the lunch pack is accommodated in an appliance 104 (the step S1204). The refrigerating compartment (Refrigerator-0001) is registered in the appliance attribute data, as shown in FIG. 76, which means that the lunch pack is accommodated in the appliance 104. Accordingly, the robot control command (row) where the refrigerating compartment is the transfer origin is read from the robot control command database 165 (the step S1205). Specifically, as shown in FIG. 83, (Robot-0001, Refrigerator-0001, door-open), (grab, F0001), and (Robot-0001, Refrigerator-0001, door-close)

are read. Wherein, "F-0001" as an ID of the lunch pack is already assigned to the variation, "$object." This robot control command row is added to the robot control command row that has been already generated.

The transfer destination designated in the instruction data is the microwave oven, and accordingly, the task plan generator 161 generates a robot control command for allowing the robot 102 to travel to the microwave oven (the step S1206). Specifically, (move, Microwave-oven-0001)

is generated and added to the robot control command row that has been already generated.

The task plan generator 161 subsequently checks whether or not the transfer destination is inside the appliance 104 (the step S1207). The microwave oven (Microwave-oven-0001) is an appliance 104 registered in the appliance attribute data 603 (see FIG. 76), and accordingly, the transfer destination is inside the appliance 104. The task plan generator 161 reads from the robot control command database 165 a robot control command (row) where the microwave oven is a transfer destination (the step S1208). Specifically, as shown in FIG. 83, (Robot-0001, Microwave-oven-0001, is-object), (Robot-0001, Microwave-oven-0001, door-open), (release, F-0001), (Robot-0001, Microwave-oven-00001, door-close), and (Robot-0001, Microwave-oven-0001, warm-start)

are read. Wherein "F-0001" as an ID of the lunch pack is already assigned to the variation, "$object." This robot control command row is added to the robot control command row that has been already generated.

Figures 85, 86:
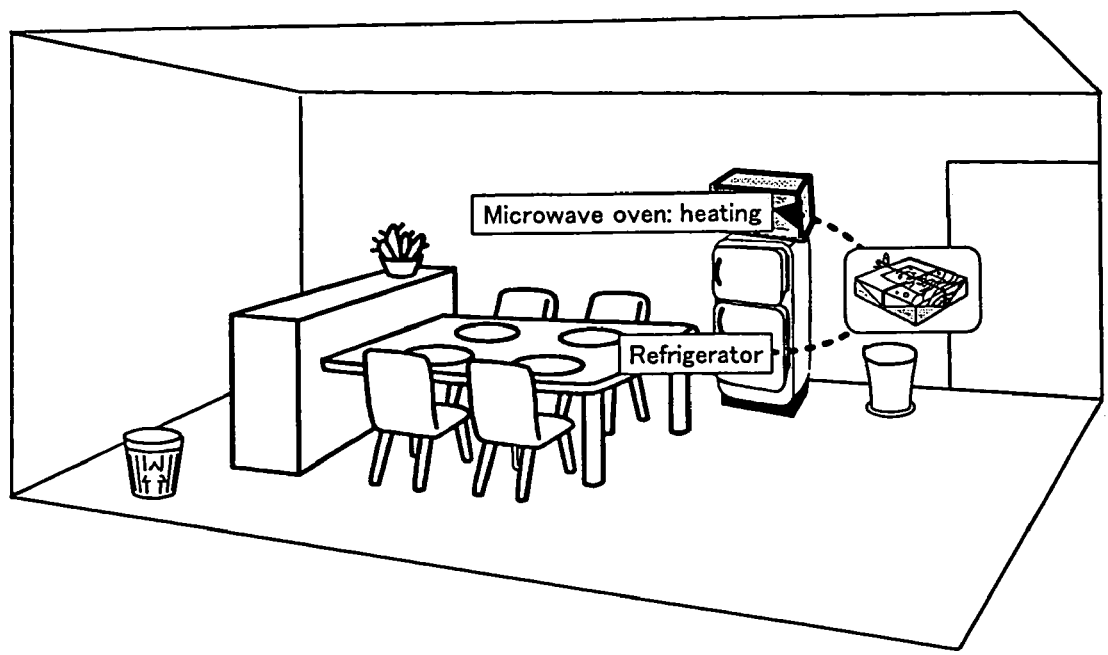
FIG. 85 is a list showing one example of a generated robot control command row.
FIG. 86 is an illustration showing one example of an image that displays task details.

The robot control command row thus generated by the task plan generator 161 so as to correspond to the task details of transfer of the lunch pack in the refrigerating compartment to the microwave oven is as shown in FIG. 85.

The controller 115 controls the travel device 114 and the grabbing element 112 on the basis of the thus generated robot control command row. As a result, the robot 102 executes transfer of the lunch pack in the refrigerating compartment to the microwave oven and heating of it by the microwave oven.

At that time, the controller 115 executes the commands of the robot control command row in sequence, wherein the execution timing of each command is set appropriately according to the state.

For example, in the above robot control command row, there are two robot control commands in series:

1) (move, Refrigerator-0001): to allow the robot 102 to travel to the refrigerating compartment, and 2) (robot-0001, Refrigerator-0001, door-open): to send an appliance operation command for opening the door, from the robot 102 to the refrigerating compartment. However, the controller 115 may execute the command 2) only after completion of the command 1). Alternatively, the command 2) may be executed a predetermined time period before completion of the command 1). Namely, the door of the refrigerating compartment may be opened before the robot 102 reaches the refrigerating compartment. This attains smooth task execution, resulting in reduction in time period required for the task. It is noted that each timing of command execution may be set in advance according to the relationship between a command and the preceding command or the following command or may be determined, if possible, by inference as occasion arises.

Furthermore, the controller 115 may execute a robot control command row immediately after the task plan generator 161 generates it. Or, the task plan generator 161 may notify details of the robot control command row generated by the task plan generator 161 to the outside before the controller 115 starts executing the robot control command row.

Figure 84:
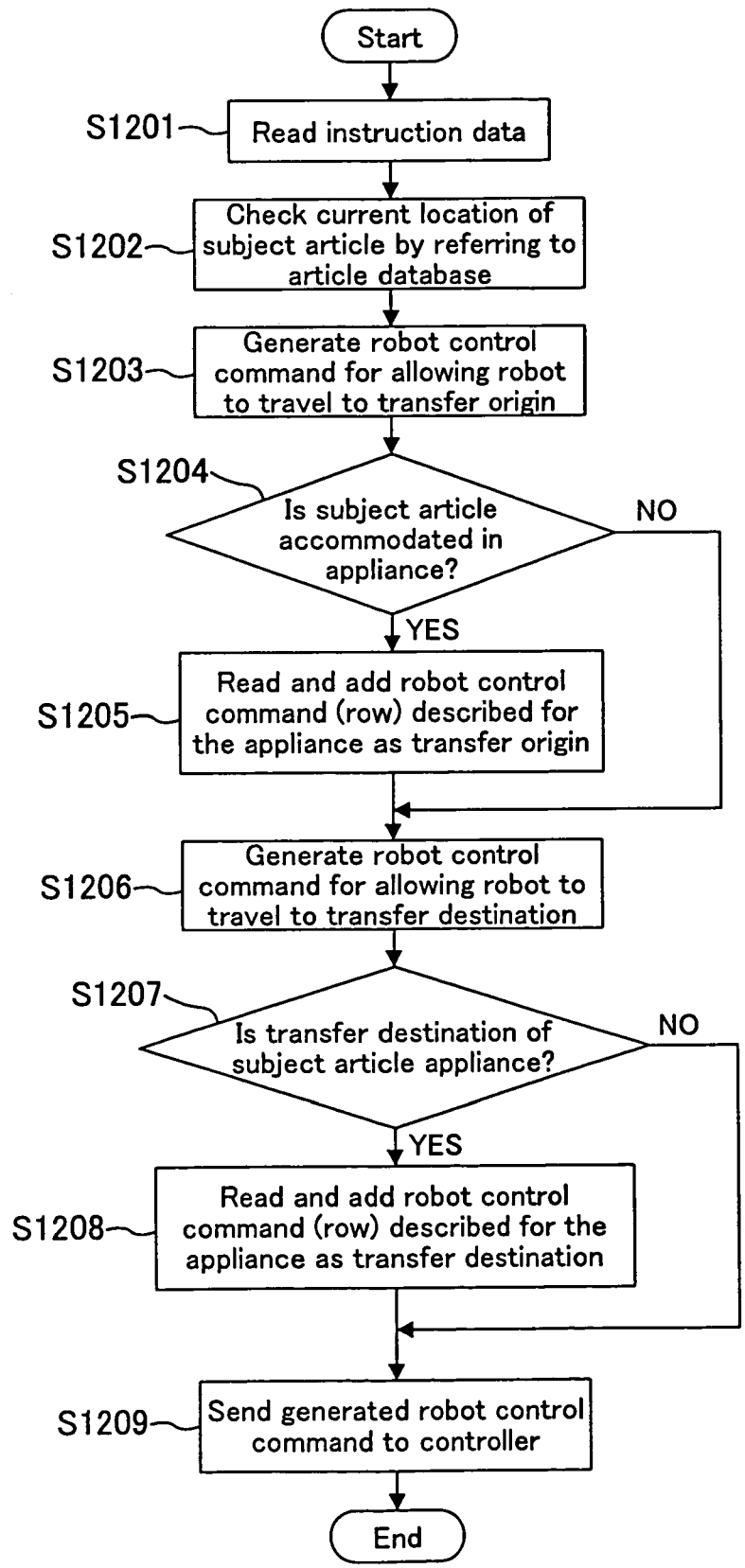
FIG. 84 is a flowchart showing a procedure performed by a task plan generator.

For example, in the flowchart shown in FIG. 84, the generated robot control command row may be sent to the console terminal 103 through the network after the step S1208 and before the step S1209. The console terminal 103 receives and interprets the robot control command row to allow the display section 117 to display the task details to be executed according to the robot control command row. For example, as shown in FIG. 86, an article icon as a subject article is displayed while the names of a transfer origin and a transfer destination are displayed in the form of letters. FIG. 86 corresponds to the aforementioned specific example, wherein the lunch pack icon is displayed as the subject article while the letters "Refrigerator" and the letters "Microwave oven" are displayed as the transfer origin and the transfer destination, respectively. The example shown in the drawing indicates an arrow from the transfer origin to the transfer destination in the virtual space for clarifying the transfer origin and the transfer destination of the article. Further, in the case where the subject article is to be subjected to an action at the transfer destination, the action is displayed in the form of letters. In FIG. 86, the letters "heating" are displayed. It is noted that in the case where a transfer origin and a transfer destination of an article are not any appliance 104 (in the case where they have no names as appliances 104), letters indicating the transfer origin and the transfer destination are not displayed. Further, the display for task details confirmation by the user is not limited to the example shown in FIG. 86. The name of a subject article may be displayed in the form of letters or a transfer origin and/or a transfer destination in the virtual space may be highlighted. Alternatively, a sentence explaining task details, such as "transfer of lunch pack in refrigerating compartment into microwave oven and heating of it" may be displayed in the display section 117, for example. Further, notification of the task details is not limited to such display schemes and the task details may be notified by sound.

Notification of task details to the outside leads the user (including the user who designates the task details) to know the task details assigned to the robot 102. Hence, a task based on an erroneous operation can be prevented from being executed even if the user would make miss-operation on the console window, namely, even if the user who tries to drag-and-drop the lunch pack icon onto the microwave oven in the virtual space drag-and-drops it onto the refrigerating compartment in error in the above specified example, for example.

Moreover, in the case where a transfer destination is an appliance 104 for exerting an action on a subject article, such as a microwave oven, the system may miss-operate the an action on the subject article. For example, when task details of transferring a "frozen meat" as a subject article into the microwave oven are designated, a robot control command for "warming" the "frozen meat" at the microwave oven rather than for "thawing" the "frozen meat" at the microwave oven may be generated. Even in this case, notification to the user leads to prevention of erroneous task from being executed.

Furthermore, in a case of erroneous task details or in the case where the user changes the designated task details, the input section 116 of the console terminal 103 is preferably operated to appropriately modify the task details in the console window.

In the above description, the user operates the console terminal 103 to designate details of a single task, in detail, designates transfer of one desired article to one transfer destination. While, there are some cases where user's operation for designation would be facilitated if details of a plurality tasks would be designated at once. For example, the following plural tasks are executed for a single article successively.

1) Putting of a lunch pack accommodated in the refrigerating compartment into the microwave oven and warming of it 2) Transfer of the lunch pack in the microwave oven to the user's location after completion of lunch pack warming In such a case, it is preferable that the above task details 1) and 2) are designated at once on the console window and the laborer robot 102 executes the designated plural tasks in sequence. For designation of plural tasks on the console window, the article icons may be drag-and-dropped successively, for example. Specifically, in the above example, the lunch pack icon is drag-and-dropped onto the microwave oven in the virtual space and the lunch pack icon dropped on the microwave oven is drag-and-dropped onto the user's location in the virtual space, thereby designating the above tasks 1) and 2).

There is another case where tasks for a plurality of articles are executed in parallel. For example:

1) The lunch pack in the refrigerating compartment is transferred to the microwave oven; while 2) A banana in the refrigerating compartment is transferred onto the table.

In this case, also, it is preferable that the above task details 1) and 2) are designated at once on the console window and the robot 102 executes the designated plural tasks in sequence. In so doing, the efficiency of the tasks as a whole may be enhanced by allowing the robot 102 to schedule the plurality of tasks. In the above example, the robot 102 may schedule the tasks such that the door of the refrigerating compartment is opened, the designated lunch pack and banana are taken out at once, and then, of the taken-out two articles, the lunch pack is transferred to the microwave oven while the banana is transferred onto the table rather than tasks such that the lunch pack in the refrigerating compartment is transferred to the microwave oven, the door of the refrigerating compartment is opened again, and then, the banana is taken out and is transferred onto the table. In order to enable execution of the above tasks, the laborer robot 102 may have a plurality of arms 12a and hands 12b, rather than that having one arm 12a and one hand 12b (see FIG. 82), so as to be capable of grabbing a plurality of articles simultaneously.

As described so far, the article handling system of the present invention is a system for handling an article existing in a predetermined life space (environment) and includes the robot 102 for performing the above-described article handling, the input section 116 for inputting a task instruction including a task subject article for the robot 102 and a transfer destination of the subject article, and the task plan generator 161 for generating a task plan according to the task instruction received.

The task plan generator 161 generates a task plan for allowing the robot 102 to transfer a subject article included in a task instruction to a transfer destination while supplementing a task at the transfer destination.

With the above constitution, when the user inputs only a task subject article for the robot 102 and a transfer destination of the subject article through the input section 116, a task instruction (instruction data) including the task subject article for the robot 102 and the transfer destination of the subject article is generated.

Upon receipt of the task instruction, the task plan generator 161 generates a task plan for allowing the robot 102 to transfer the subject article to the transfer destination while supplementing a task at the transfer destination according to the transfer destination. This eliminates the need of the user to designate an additional task details taking account of the transfer destination of the article. Thus, the operation for designating task details to be executed by the robot 102 is simplified, enabling every user to easily operate the robot 102.

In the present invention, transfer destinations to be included in the above-described task instruction include an appliance 104 that has an accommodation section for accommodating an article. When a transfer destination included in a task instruction is an appliance 104 that includes the accommodation section, the task plan generator 161 adds to the task plan an operation of the appliance 104 which is necessary for putting the article into the accommodation section.

By this addition, even in the case where the transfer destination is an appliance 104 having an accommodation section and an operation of the appliance 104 necessary for putting an article into the accommodation section, for example, a door opening/closing operation is necessary, the user is not required to input task details for operating the appliance 104.

In the present invention, subject articles to be included in the above-described task instruction include an article accommodated in an accommodation section of an appliance 104. In the case where a subject article included in a task instruction is an article accommodated in an accommodation section, the task plan generator 161 adds to the task plan an operation of the appliance 104 necessary for taking out the article from the accommodation section.

By this addition, even in the case where a subject article included in a task instruction is accommodated in an accommodation section of an appliance 104 and an operation of the appliance 104 necessary for taking out the article from the accommodation section, for example, a door opening/closing operation is necessary, the user is not required to input a task for operating the appliance 104.

In the present invention, transfer destinations include an appliance 104 for exerting an action on an article. When a transfer destination included in a task instruction is an appliance 104 that exerts an action, the task plan generator 161 adds to the task plan an action of the appliance 104 for exerting the action on the subject article.

By this addition, even when the user designates task details of transferring an article to an appliance 104 for the purpose of exerting a predetermined action on the article, the user is not required to input task details for operating the appliance 104. Referring to one example, when the user designates transfer of a food to the microwave oven for the purpose of heating the food, task details of heating the food by the microwave oven is added to the task plan without designating the task details of "heating the food by the microwave oven." Thus, operation for designating details of a task to be executed by the robot 102 is further facilitated.

In the present invention, the task plan generator 161 selects an action according to a subject article from a plurality of actions and adds to the task plan an action of an appliance for exerting the selected action on the subject article.

By the selection and addition, the action according to a subject article is exerted on the article without designating the action to be exerted on for the subject article. Referring to one example, in the case where the transfer destination is the microwave oven and the subject article is a frozen food, an appliance's action of thawing the frozen food is added to the task plan. In contrast, in the case where the transfer destination is the microwave oven and the subject article is a cooked food, an appliance's action for warming the cooked food is added to the task plan. In this way, an action to be exerted on a subject article is determined according to the subject article and the action of the appliance is added to the task plan, eliminating user's designation operation for exerting the action on the article. This facilitates designation of details of a task to be executed by the robot, realizing a user-friendly system.

In the present invention, the above-described appliances 104 perform, upon receipt of a task plan, the appliances' action included in the task plan. This simplifies constitution of the robot 102 compared with the case where the robot 102 itself opens/closes the door of the appliance 104 with the use of the arm 12a or operates various switches provided in the appliance 104 with the use of the arm 12a.

In the present invention, the article handling system further includes the notification section 117 for notifying the task details generated by the task plan generator 161 before the robot 102 starts executing the task according to the task details.

The present system supplements a task plan, and accordingly, the robot 102 may execute a task that the user does not intend. Also, the user may make a mistake in designating task details. In this connection, the notification section 117 is provided for notifying a task plan generated by the task plan generator 161 before the robot 102 starts executing the task. This notification enables the user to confirm the task plan, thereby preventing the robot 102 to execute an erroneous task.

Another article handling system of the present invention includes the robot 102 for performing the article handling, the input section 116 for inputting a task instruction including a task subject article for the robot 102 and a transfer destination of the subject article, and the task plan generator 161 for generating a task plan according to the task instruction received.

Wherein, the task plan generator 161 generates a task plan for allowing the robot 102 to transfer a subject article included in the task instruction to a transfer destination while supplementing a task according to the state of the subject article before the transfer.

With this constitution, as described above, when the user inputs only a task subject article for the robot 102 and a transfer destination of the subject article through the input section 116, the task plan generator 161 generates a task plan for allowing the robot 102 to transfer the subject article to the transfer destination while supplementing a task at the transfer destination according to the state of the subject article before the transfer. Accordingly, the user is not required to designate an additional operation taking account of the transfer origin of the article. Thus, the operation for designating task details to be executed by the robot 102 is facilitated, enabling every user to easily operate the robot 102.

Still another article handling system of the present invention includes the robot 102 for performing the article handling, the operation database 165 in which operation details of the appliances 104 existing in the life space are accumulated, the input section 116 for inputting a task instruction including a task subject article for the robot 102 and a transfer destination of the subject article, and the task plan generator 161 for generating, according to the task instruction received, a task plan for allowing the robot 102 to transfer a subject article included in the task instruction to a transfer destination while referring to the operation database 165.

With the above constitution, when the user inputs only a task subject article for the robot 102 and a transfer destination of the subject article through the input section 116, the task plan generator 161 generates a task plan with reference to the operation database 165 in which the details of the operations of the appliances 104 are accumulated. Hence, the user can designate task details to be executed by the robot 102 without taking account of the operations of the appliances 104.

OTHER EMBODIMENTS

In the present embodiment, the console terminal 103 sends instruction data to the laborer robot 102 and the laborer robot 102 generates a robot control command. However, the instruction data may be sent from the console terminal 103 to the server 101 for allowing the server 101 to generate a robot control command and to send the thus generated command to the laborer robot 102, for example. In this case, a command for an appliance' operation out of the robot control commands may be sent directly from the server 101 to a corresponding appliance 104. Alternatively, the console terminal 103 may generate a robot control command according to the task details designated on the console window and send it to the laborer robot 12 (and/or a corresponding appliance 104).

Further, in the present embodiment, the article handling system includes four subsystems of the environment management server 101, the robot 102, the console terminal 103, and the appliances 104 so that the subsystems 101 to 104 exchange information through the network such as a wireless network, a wired network, or the like. However, the article handling system is not limited to this constitution and may include an integration of the console terminal 103 and the environment management server 101, for example. Alternatively, the console terminal 103 may be integrated with the laborer robot 102.

Further, the robot 102 may include a plurality of robots for performing tasks in parallel in harmony.

The console window is not limited to that shown in FIG. 79 only if it can designate at least a subject article and a transfer destination. For example, the console window may display an article icon corresponding to an article in the environment and a location icon indicative of a location to be a transfer destination.

As describe so far, in the article handling system and the server for handling an article according to the present invention, a task plan is generated while supplementing a task at an input transfer destination, which requires the user to input only a task subject article for the robot and a transfer destination of the subject article, facilitating the operation for designating details of a task to be executed by the robot to enable every user to easily operate the robot.

What is claimed is:

1. A system for managing an article existing in a life space, comprising:
   a designation device for designating a transfer subject article and a placement location which is a destination of the transfer subject article;
   a laborer robot having a holder for holding an article, the laborer robot holding the transfer subject article in the holder to place the transfer subject article at the placement location;
   a database containing information about an article in the life space and map information of the life space; and
   a holding position determination section for determining, based on information about the transfer subject article and the placement location which are stored in the database, a holding position of the transfer subject article held by the holder to be a position at which the laborer robot places the transfer subject article at the placement location without re-holding the transfer subject article,
   wherein the holding position determination section selects a contact region in which the transfer subject article is in contact with the placement location and determines the holding position such that the holder does not overlap the contact region based on information about the transfer subject article and the placement location which are stored in the database before the holder holds the transfer subject article, and
   the holding position determination section checks an available space at the placement location based on information about the placement location which is contained in the database and selects the contact region such that at least the transfer subject article is accommodated within the available space.

2. A system for managing an article existing in a life space, comprising:
   a designation device for designating a transfer subject article and a placement location which is a destination of the transfer subject article;
   a laborer robot having a holder for holding an article, the laborer robot holding the transfer subject article in the holder to place the transfer subject article at the placement location;
   a database containing information about an article in the life space and map information of the life space; and
   a holding position determination section for determining, based on information about the transfer subject article and the placement location which are stored in the database, a holding position of the transfer subject article held by the holder to be a position at which the laborer robot places the transfer subject article at the placement location without re-holding the transfer subject article,
   wherein the holding position determination section selects a contact region in which the transfer subject article is in contact with the placement location and determines the holding position such that the holder does not overlap the contact region based on information about the transfer subject article and the placement location which are stored in the database before the holder holds the transfer subject article, and
   the holding position determination section checks an available space at the placement location based on information about the placement location which is contained in the database and selects the contact region such that the transfer subject article is accommodated within the available region excluding a space necessary for a placement operation of the holder.

3. A system for managing an article existing in a life space, comprising:
   a designation device for designating a transfer subject article and a placement location which is a destination of the transfer subject article;
   a laborer robot having a holder for holding an article, the laborer robot holding the transfer subject article in the holder to place the transfer subject article at the placement location;

a database containing information about an article in the life space and map information of the life space; and a holding position determination section for determining, based on information about the transfer subject article and the placement location which are stored in the database, a holding position of the transfer subject article held by the holder to be a position at which the laborer robot places the transfer subject article at the placement location without re-holding the transfer subject article, wherein the holding position determination section determines whether a placement location designated as the transfer destination is inside or outside a box, and if the placement location is inside the box, the holding position determination section determines the holding position without selecting a contact region of the transfer subject article.

4. A system for managing an article existing in a life space, comprising:

a designation device for designating a transfer subject article and a placement location which is a destination of the transfer subject article;

a laborer robot having a holder for holding an article, the laborer robot holding the transfer subject article in the holder to place the transfer subject article at the placement location;

a database containing information about an article in the life space and map information of the life space; and a holding position determination section for determining, based on information about the transfer subject article and the placement location which are stored in the database, a holding position of the transfer subject article held by the holder to be a position at which the laborer robot places the transfer subject article at the placement location without re-holding the transfer subject article, wherein the article existing in the life space includes a specific article which has human-grasp part and human-nongrasp part, the holding position determination section determines whether or not the transfer subject article is the specific article and the placement location is a human, and if the transfer subject article is the specific article and the placement location is a human, the holding position determination section selects the human-nongrasp part as the holding position.

5. A robot controller for instructing a laborer robot to handle an article existing in a life space, the laborer robot having a holder for holding the article, the laborer robot holding a transfer subject article in the holder to place the transfer subject article at a placement location based on information input from an designation device through which the transfer subject article and the placement location as a transfer destination are designated, the robot controller comprising:

a holding position determination section for retrieving information about the transfer subject article and the placement location from a server which includes a database containing information about an article in the life space and map information of the life space and determining based on the retrieved information a holding position of the transfer subject article held by the holder to be a position at which the laborer robot places the transfer subject article at the placement location without re-holding the transfer subject article, wherein the holding position determination section selects a contact region in which the transfer subject article is in contact with the placement location and determines the holding position such that the holder does not overlap the contact region based on information about the transfer subject article and the placement location which are stored in the database before the holder holds the transfer subject article, and the holding position determination section checks an available space at the placement location based on information about the placement location which is contained in the database and selects the contact region such that at least the transfer subject article is accommodated within the available space.

6. A robot controller for instructing a laborer robot to handle an article existing in a life space, the laborer robot having a holder for holding the article, the laborer robot holding a transfer subject article in the holder to place the transfer subject article at a placement location based on information input from an designation device through which the transfer subject article and the placement location as a transfer destination are designated, the robot controller comprising:

a holding position determination section for retrieving information about the transfer subject article and the placement location from a server which includes a database containing information about an article in the life space and map information of the life space and determining based on the retrieved information a holding position of the transfer subject article held by the holder to be a position at which the laborer robot places the transfer subject article at the placement location without re-holding the transfer subject article, wherein the holding position determination section selects a contact region in which the transfer subject article is in contact with the placement location and determines the holding position such that the holder does not overlap the contact region based on information about the transfer subject article and the placement location which are stored in the database before the holder holds the transfer subject article, and the holding position determination section checks an available space at the placement location based on information about the placement location which is contained in the database and selects the contact region such that the transfer subject article is accommodated within the available region excluding a space necessary for a placement operation of the holder.

7. A robot controller for instructing a laborer robot to handle an article existing in a life space, the laborer robot having a holder for holding the article, the laborer robot holding a transfer subject article in the holder to place the transfer subject article at a placement location based on information input from an designation device through which the transfer subject article and the placement location as a transfer destination are designated, the robot controller comprising:

a holding position determination section for retrieving information about the transfer subject article and the placement location from a server which includes a database containing information about an article in the life space and map information of the life space and determining based on the retrieved information a holding position of the transfer subject article held by the holder to be a position at which the laborer robot places the transfer subject article at the placement location without re-holding the transfer subject article, wherein the holding position determination section determines whether a placement location designated as the transfer destination is inside or outside a box, and if the placement location is inside the box, the holding position determination section determines the holding position without selecting a contact region of the transfer subject article.

8. A robot controller for instructing a laborer robot to handle an article existing in a life space, the laborer robot having a holder for holding the article, the laborer robot holding a transfer subject article in the holder to place the transfer subject article at a placement location based on information input from an designation device through which the transfer subject article and the placement location as a transfer destination are designated, the robot controller comprising:

a holding position determination section for retrieving information about the transfer subject article and the placement location from a server which includes a database containing information about an article in the life space and map information of the life space and determining based on the retrieved information a holding position of the transfer subject article held by the holder to be a position at which the laborer robot places the transfer subject article at the placement location without re-holding the transfer subject article, wherein the article existing in the life space includes a specific article which has human-grasp part and human-nongrasp part, the holding position determination section determines whether or not the transfer subject article is the specific article and the placement location is a human, and if the transfer subject article is the specific article and the placement location is a human, the holding position determination section selects the human-nongrasp part as the holding position.

* * * * *